(12) United States Patent
Kozuka et al.

(10) Patent No.: US 11,350,053 B2
(45) Date of Patent: May 31, 2022

(54) IMAGING DEVICE, METHOD THEREOF, AND IMAGING ELEMENT

(71) Applicant: SONY CORPORATION, Tokyo (JP)

(72) Inventors: Noriaki Kozuka, Tokyo (JP); Akira Matsui, Kanagawa (JP); Yoshitaka Miyatani, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/765,756

(22) PCT Filed: Oct. 19, 2018

(86) PCT No.: PCT/JP2018/038949
§ 371 (c)(1),
(2) Date: May 20, 2020

(87) PCT Pub. No.: WO2019/106999
PCT Pub. Date: Jun. 6, 2019

(65) Prior Publication Data
US 2020/0288076 A1    Sep. 10, 2020

(30) Foreign Application Priority Data
Nov. 30, 2017   (JP) .............................. JP2017-229907

(51) Int. Cl.
*H04N 5/33*    (2006.01)
*H04N 5/378*   (2011.01)
(Continued)

(52) U.S. Cl.
CPC ............. *H04N 5/378* (2013.01); *H04N 5/341* (2013.01); *H04N 5/3745* (2013.01)

(58) Field of Classification Search
CPC ...... H04N 5/378; H04N 5/341; H04N 5/3745; H04N 5/379; H04N 5/225
See application file for complete search history.

(56) References Cited

U.S. PATENT DOCUMENTS

2014/0253781 A1    9/2014  Gill et al.
2015/0015760 A1    1/2015  Tsunai
(Continued)

FOREIGN PATENT DOCUMENTS

CN    104247401 A    12/2014
CN    105008969 A    10/2015
(Continued)

OTHER PUBLICATIONS

Varghese, et al., "Track-and-Tune Light Field Image Sensor", Sensors Journal, IEEE, XP011562493, vol. 14, No. 12, Dec. 1, 2014, pp. 4372-4384.
(Continued)

*Primary Examiner* — Tony Ko
(74) *Attorney, Agent, or Firm* — Chip Law Group

(57) ABSTRACT

The present technology relates to an imaging device, a method thereof, and an imaging element capable of controlling resolution of a detection image. Provided is a plurality of pixel output units that receives incident light incident without intervention of either an imaging lens or a pinhole and each outputs one detection signal indicating an output pixel value modulated by an incident angle of the incident light, and a signal processing unit provided so as to be associated with an area in which at least two pixel output units out of the plurality of pixel output units are formed that processes signals read out from the pixel output units formed in the area and obtains output pixel values. The present disclosure may be applied to, for example, an imaging element, an imaging device, an image processing device, an electronic device, a system and the like.

17 Claims, 65 Drawing Sheets

(51) Int. Cl.
*H04N 5/341* (2011.01)
*H04N 5/3745* (2011.01)

(56) References Cited

U.S. PATENT DOCUMENTS

| | | | |
|---|---|---|---|
| 2016/0126275 A1 | 5/2016 | Kurokawa | |
| 2016/0234446 A1* | 8/2016 | Numata | ............... H04N 5/3559 |
| 2017/0118422 A1 | 4/2017 | Tsunai | |
| 2017/0153599 A1 | 6/2017 | Gill et al. | |
| 2018/0227512 A1 | 8/2018 | Tsunai | |

FOREIGN PATENT DOCUMENTS

| | | |
|---|---|---|
| CN | 110148605 A | 8/2019 |
| CN | 110149485 A | 8/2019 |
| CN | 110177227 A | 8/2019 |
| CN | 110265415 A | 9/2019 |
| CN | 110299373 A | 10/2019 |
| EP | 2833620 A1 | 2/2015 |
| EP | 3490247 A1 | 5/2019 |
| EP | 3700194 A1 | 8/2020 |
| JP | 2002-165136 A | 6/2002 |
| JP | 2016-510910 A | 4/2016 |
| JP | 2016-092413 A | 5/2016 |
| JP | 6277954 B2 | 2/2018 |
| JP | 6593468 B2 | 10/2019 |
| JP | 6593469 B2 | 10/2019 |
| JP | 6593470 B2 | 10/2019 |
| JP | 2020-017987 A | 1/2020 |
| RU | 2014143824 A | 5/2016 |
| RU | 2018130065 A | 3/2019 |
| WO | 2013/145765 A1 | 10/2013 |
| WO | 2014/137922 A1 | 9/2014 |
| WO | 2016/123529 A1 | 8/2016 |
| WO | 2019/078340 A1 | 4/2019 |

OTHER PUBLICATIONS

Extended European Search Report of EP Application No. 18883551.6, dated Jul. 27, 2020, 09 pages.
Asif, et al., "Flatcam: Replacing lenses with masks and computation", IEEE International Conference on Computer Vision Workshop (ICCVW), 2015, pp. 663-666.
International Search Report and Written Opinion of PCT Application No. PCT/JP2018/038949, dated Jan. 8, 2019, 08 pages of ISRWO.
Varghese, et al., "Track-and-Tune Light Field Image Sensor", IEEE, Sensors Journal, vol. 14, No. 12, Dec. 2014, pp. 4372-4384.
Asif, et al., : "FlatCam: Replacing Lenses with Masks and Computation", 2015 IEEE International Conference on Computer Vision Workshop, Aswin Sankaranarayanan Carnegie Mellon University, 2015, pp. 663-666.
Office Action for EP Patent Application No. 18883551.6, dated Dec. 15, 2021, 09 pages of Office Action.

* cited by examiner

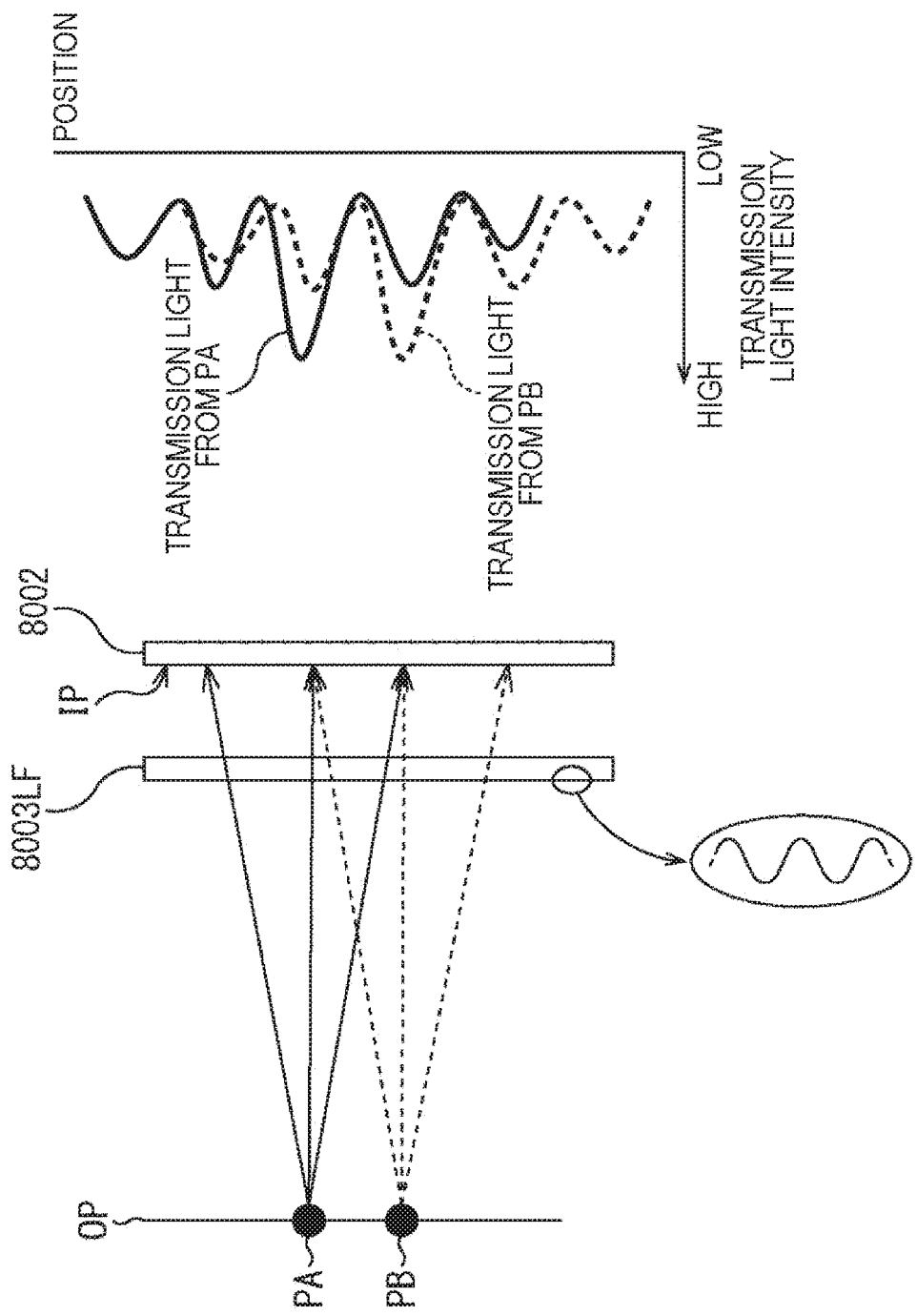

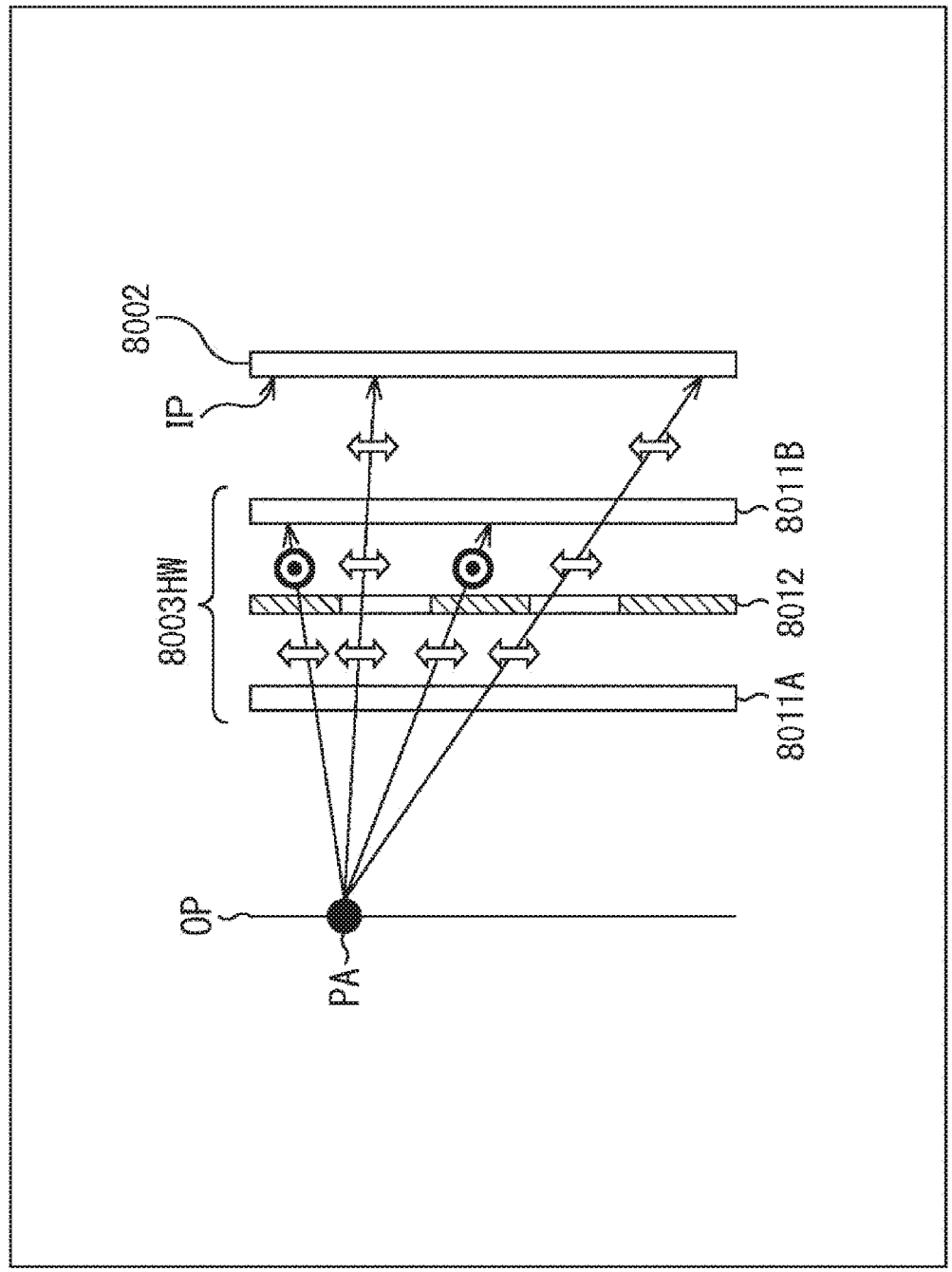

IMAGING DEVICE, METHOD THEREOF, AND IMAGING ELEMENT

CROSS REFERENCE TO RELATED APPLICATIONS

This application is a U.S. National Phase of International Patent Application No. PCT/JP2018/038949 filed on Oct. 19, 2018, which claims priority benefit of Japanese Patent Application No. JP 2017-229907 filed in the Japan Patent Office on Nov. 30, 2017. Each of the above-referenced applications is hereby incorporated herein by reference in its entirety.

TECHNICAL FIELD

The present technology relates to an imaging device, a method thereof, and an imaging element, and especially relates to an imaging device, a method thereof, and an imaging element capable of controlling resolution of a detection image.

BACKGROUND ART

Conventionally, an imaging element is generally used in combination with an imaging lens which collects light on the imaging element. By guiding light from a subject surface to each pixel of the imaging element so as to reproduce light intensity distribution on the subject surface by the imaging lens, the imaging element may obtain a detection signal at a level according to the light intensity distribution in each pixel, and obtain an imaged image of a subject as a whole.

However, in this case, a physical size becomes large. Therefore, an imaging element not using an imaging lens has been considered (for example, refer to Patent Document 1, Patent Document 2, and Non-Patent Document 1).

CITATION LIST

Patent Document

Patent Document 1: International Publication No. 2016/123529
Patent Document 2: Japanese Unexamined Patent Publication No. 2016-510910

Non-Patent Document

Non-Patent Document 1: M. Salman Asif and four others, "Flatcam: Replacing lenses with masks and computation", "2015 IEEE International Conference on Computer Vision Workshop (ICCVW)", 2015, pp. 663-666

SUMMARY OF THE INVENTION

Problems to be Solved by the Invention

However, according to such a method, only a detection image including information obtained from all pixels of an imaging element could be obtained, and a detection image at desired resolution could not be obtained.

The present disclosure is achieved in view of such a situation and an object thereof is to control resolution of the detection image.

Solutions to Problems

An imaging device according to an aspect of the present technology is an imaging device provided with: an imaging element provided with: a plurality of pixel output units that receives incident light incident without intervention of either an imaging lens or a pinhole and each outputs one detection signal indicating an output pixel value modulated by an incident angle of the incident light; and a signal processing unit provided so as to be associated with an area in which at least two pixel output units out of the plurality of pixel output units are formed that processes signals read out from the pixel output units formed in the area and obtains output pixel values; and a readout control unit that selectively reads out the output pixel value of each pixel output unit of the imaging element.

An imaging method according to an aspect of the present technology is
an imaging method of selectively reading out an output pixel value of each pixel output unit of an imaging element provided with: a plurality of pixel output units that receives incident light incident without intervention of either an imaging lens or a pinhole and each outputs one detection signal indicating an output pixel value modulated by an incident angle of the incident light; and a signal processing unit provided so as to be associated with an area in which at least two pixel output units out of the plurality of pixel output units are formed that processes signals read out from the pixel output units formed in the area and obtains output pixel values.

An imaging element according to another aspect of the present technology is an imaging element provided with: a plurality of pixel output units that receives incident light incident without intervention of either an imaging lens or a pinhole and each outputs one detection signal indicating an output pixel value modulated by an incident angle of the incident light; and a signal processing unit provided so as to be associated with an area in which at least two pixel output units out of the plurality of pixel output units are formed that processes signals read out from the pixel output units formed in the area and obtains output pixel values.

In an imaging device and a method thereof according to an aspect of the present technology, an output pixel value of each pixel output unit of an imaging element provided with a plurality of pixel output units that receives incident light incident without intervention of either an imaging lens or a pinhole and each outputs one detection signal indicating an output pixel value modulated by an incident angle of the incident light, and a signal processing unit provided so as to be associated with an area in which at least two pixel output units out of the plurality of pixel output units are formed that processes signals read out from the pixel output units formed in the area and obtains output pixel values is selectively read out.

In an imaging element according to another aspect of the present technology is provided with: a plurality of pixel output units that receives incident light incident without intervention of either an imaging lens or a pinhole and each outputs one detection signal indicating an output pixel value modulated by an incident angle of the incident light; and a signal processing unit provided so as to be associated with an area in which at least two pixel output units out of the plurality of pixel output units are formed that processes signals read out from the pixel output units formed in the area and obtains output pixel values.

Effects of the Invention

According to the present technology, a subject may be imaged or an image may be processed. According to the present technology, resolution of a detection image may be controlled.

BRIEF DESCRIPTION OF DRAWINGS

FIGS. 64A and 64B are views illustrating a case where an optical interference mask is used.

FIG. 65 is a view illustrating a variation of an imaging element.

MODE FOR CARRYING OUT THE INVENTION

Modes for carrying out the present disclosure (hereinafter, referred to as embodiments) are hereinafter described. Note that, the description is given in the following order.
1. First Embodiment (Imaging Device/Thinning Mode)
2. Second Embodiment (Imaging Device/Area Driving Mode)
3. Third Embodiment (Imaging Device/Mode Selection)
4. Fourth Embodiment (Monitoring System)
5. Fifth Embodiment (Subject Distance Measurement)
6. Sixth Embodiment (Medical System, etc.)
7. Seventh embodiment (On-vehicle System etc.)
8. Eighth Embodiment (Another Configuration Example of Imaging Element/Imaging Device)
9. Others 1. First Embodiment <Imaging Device>

Figure 1:
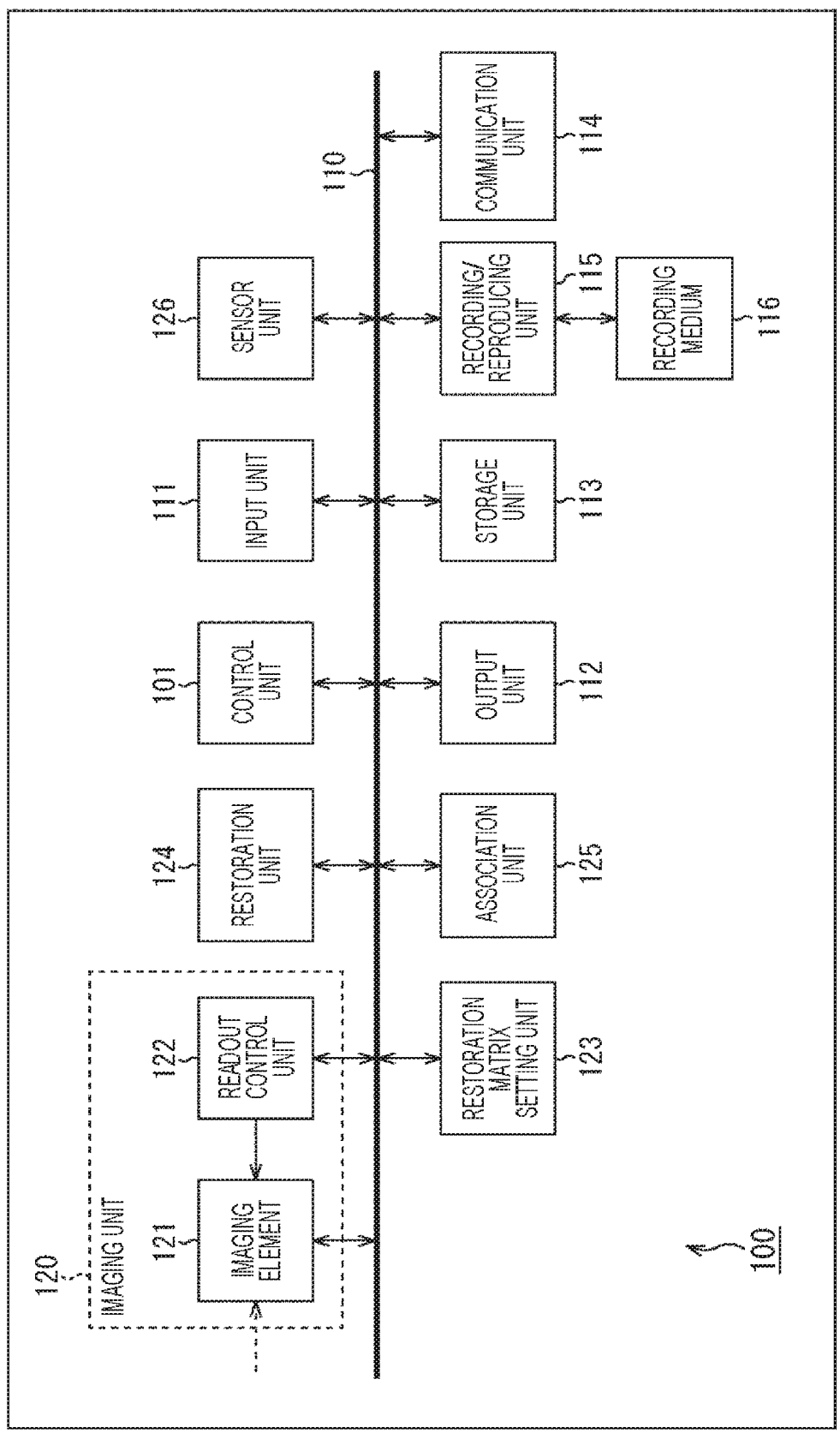
FIG. 1 is a block diagram illustrating a main configuration example of an imaging device.

FIG. 1 is a view illustrating a main configuration example of an imaging device being one embodiment of an imaging device or an image processing device to which the present technology is applied. An imaging device 100 illustrated in FIG. 1 is a device which images a subject and obtains electronic data regarding an imaged image.

As illustrated in FIG. 1, the imaging device 100 includes a control unit 101, an input unit 111, an output unit 112, a storage unit 113, a communication unit 114, and a recording/reproducing unit 115. Furthermore, the imaging device 100 includes an imaging element 121, a readout control unit 122, a restoration matrix setting unit 123, a restoration unit 124, an association unit 125, and a sensor unit 126. The respective processing units and the like are connected to one another via a bus 110 and may exchange information, instructions and the like with one another.

Note that, the imaging element 121 and the readout control unit 122 may be integrated into an imaging unit 120. The imaging unit 120 may be realized by any physical configuration. For example, the imaging unit 120 may be realized as a processor such as a system large scale integration (LSI) and the like. Furthermore, the imaging unit 120 may be realized as a module using a plurality of processors and the like, a unit using a plurality of modules and the like, or a set and the like obtained by further adding another function to the unit (that is, a partial configuration of the device), for example. Furthermore, the imaging unit 120 may be realized as a device.

The control unit 101 is configured to perform processing regarding control of each processing unit and the like in the imaging device 100. For example, the control unit 101 includes a central processing unit (CPU), a read only memory (ROM), a random access memory (RAM) and the like and executes a program by using the CPU and the like to perform the above-described processing.

The input unit 111 is configured to perform processing regarding an information input. For example, the input unit 111 includes input devices such as an operation button, a dial, a switch, a touch panel, a remote controller, a sensor and the like, and an external input terminal. For example, the input unit 111 receives an instruction from outside of a user and the like (information corresponding to an input operation) by these input devices. Furthermore, for example, the input unit 111 obtains arbitrary information (program, command, data and the like) supplied from an external device via the external input terminal. Furthermore, for example, the input unit 111 supplies the received information (obtained information) to another processing unit and the like via the bus 110.

Note that, the sensor included in the input unit 111 may be any sensor as long as this may receive the instruction from the outside of the user and the like such as an acceleration sensor and the like, for example. Furthermore, the input device included in the input unit 111 is arbitrary, and the number thereof is also arbitrary. The input unit 111 may include a plurality of types of input devices. For example, the input unit 111 may include a part of or all of the above-described examples. Furthermore, the input unit 111 may include an input device other than the above-described examples. Moreover, for example, the input unit 111 may obtain its own control information (input device and the like) supplied via the bus 110 and drive on the basis of the control information.

The output unit 112 is configured to perform processing regarding an information output. For example, the output unit 112 includes an image display device such as a monitor and the like, an image projection device such as a projector and the like, an audio output device such as a speaker and the like, an external output terminal and the like. For example, the output unit 112 outputs information supplied from another processing unit and the like via the bus 110 using the output devices and the like. For example, the output unit 112 displays an imaged image (a restored image to be described later) on the monitor, projects the imaged image (the restored image to be described later) from the projector, outputs audio (for example, audio corresponding to input operation, a processing result and the like), or outputs arbitrary information (program, command, data and the like) to the outside (another device).

Note that, the output device and the like included in the output unit 112 is arbitrary, and the number thereof is also arbitrary. The output unit 112 may include a plurality of types of output devices and the like. For example, the output unit 112 may include a part of or all of the above-described examples. Furthermore, the output unit 112 may include an output device and the like other than the above-described examples. Moreover, for example, the output unit 112 may obtain its own control information (output device and the like) supplied via the bus 110 and drive on the basis of the control information.

The storage unit 113 is configured to perform processing regarding information storage. For example, the storage unit 113 includes an arbitrary storage medium such as a hard disk, a semiconductor memory and the like. For example, the storage unit 113 stores information (program, command, data and the like) supplied from another processing unit and the like via the bus 110 in the storage medium. Furthermore, the storage unit 113 may store arbitrary information (program, command, data and the like) at the time of shipment. Furthermore, the storage unit 113 reads out the information stored in the storage medium at an arbitrary timing or in response to a request from another processing unit and the like, and supplies the readout information to the other processing unit and the like via the bus 110.

Note that, the storage medium included in the storage unit 113 is arbitrary, and the number thereof is also arbitrary. The storage unit 113 may include a plurality of types of storage media. For example, the storage unit 113 may include a part of or all of the above-described examples of the storage medium. Furthermore, the storage unit 113 may include a storage medium and the like other than the above-described examples. Furthermore, for example, the storage unit 113 may obtain its own control information supplied via the bus 110 and drive on the basis of the control information.

The communication unit 114 is configured to perform processing regarding communication with another device. For example, the communication unit 114 includes a communication device which performs communication for exchanging information such as a program, data and the like with an external device via a predetermined communication medium (for example, an arbitrary network such as the Internet and the like). For example, the communication unit 114 communicates with another device and supplies the information (program, command, data and the like) supplied from the other processing unit and the like via the bus 110 to the other device being a communication partner. Furthermore, for example, the communication unit 114 communicates with another device, obtains the information supplied from the other device being a communication partner, and supplies the information to the other processing unit and the like via the bus 110.

Any communication device may be included in the communication unit 114. For example, this may be a network interface. A communication method and a communication standard are arbitrary. For example, the communication unit 114 may perform wired communication, wireless communication, or both of them. Furthermore, for example, the communication unit 114 may obtain its own control information (communication device and the like) supplied via the bus 110 and drive on the basis of the control information.

The recording/reproducing unit 115 is configured to perform processing regarding recording and reproduction of information using the recording medium 116 mounted thereon. For example, the recording/reproducing unit 115 reads out information (program, command, data and the like) recorded in the recording medium 116 mounted thereon and supplies the information to another processing unit and the like via the bus 110. Furthermore, for example, the recording/reproducing unit 115 obtains information supplied from another processing unit and the like via the bus 110, and writes (records) the information on the recording medium 116 mounted thereon. Note that, for example, the recording/reproducing unit 115 may obtain its own control information supplied via the bus 110 and drive on the basis of the control information.

Note that, the recording medium 116 may be of any type. For example, this may be a magnetic disk, an optical disk, a magneto-optical disk, a semiconductor memory and the like.

The imaging element 121 is configured to perform processing regarding imaging of the subject. For example, the imaging element 121 images the subject and obtains data (electronic data) regarding the imaged image. At that time, the imaging element 121 may image the subject without intervention of an imaging lens, an optical filter and the like such as a diffraction grating and the like, a pinhole and the like, and obtain the data regarding the imaged image. For example, the imaging element 121 images the subject and obtains data (detection signal and the like) which may obtain the data of the imaged image by a predetermined arithmetic operation.

Note that, the imaged image is an image including pixel values with which the image of the subject is formed, the image visually recognized as the image by the user. In contrast, an image (referred to as a detection image) including a detection signal which is a detection result of incident light in a pixel unit output of the imaging element 121 is an image which cannot be recognized as the image by the user (that is, the subject cannot be visually recognized) because the subject image is not formed. That is, the detection image is the image different from the imaged image. However, as described above, by performing a predetermined arithmetic operation on data of the detection image, it is possible to restore the imaged image, that is, the image visually recognized as the image by the user in which the image of the subject is formed (that is, in which the subject may be visually recognized). This restored imaged image is referred to as the restored image. That is, the detection image is the image different from the restored image.

Note that, an image forming the restored image, the image before synchronization processing, color separation processing and the like (for example, demosaic processing and the like) is referred to as a raw image. As is the case with the imaged image, this raw image is also an image visually recognized as the image by the user (that is, in which the subject may be visually recognized). In other words, the detection image is an image according to color filter arrangement, but is the image different from the raw image.

However, in a case where the imaging element 121 is sensitive only to invisible light such as infrared light, ultraviolet light and the like, for example, the restored image (raw image and imaged image) also is the image which cannot be visually recognized as the image by the user (in which the subject cannot be visually recognized). However, since this depends on a wavelength range of detected light, the restored image may be made an image in which the subject may be visually recognized by converting the wavelength range to a visible light range. In contrast, since the subject image is not formed in the detection image, it is not possible to make the same an image in which the subject may be visually recognized only by converting the wavelength range. Therefore, even in a case where the imaging element 121 is sensitive only to the invisible light, an image obtained by performing the predetermined arithmetic operation on the detection image as described above is referred to as the restored image. Note that, in the following, the present technology is described basically using a case where the imaging element 121 receives visible light as an example unless otherwise specified.

That is, the imaging element 121 may image the subject and obtain data regarding the detection image. For example, the imaging element 121 may supply the data regarding the detection image to the restoration unit 124 via the readout control unit 122 and generate the restored image. Furthermore, for example, the imaging element 121 may supply the data regarding the detection image to the association unit 125 and the like via the readout control unit 122 and associate metadata and the like therewith. It goes without saying that the imaging element 121 may supply the data regarding the detection image to an arbitrary processing unit and the like. Furthermore, for example, the imaging element 121 may obtain its own control information supplied via the bus 110 and drive on the basis of the control information.

The readout control unit 122 is configured to perform processing regarding readout control of the data from the imaging element 121 and control resolution of the detection image. For example, the readout control unit 122 controls readout of the detection image from the imaging element 121 and selectively reads out the detection signal which is an output from each pixel output unit of the imaging element 121.

For example, the readout control unit 122 may read out the detection signals from all the pixel output units of the imaging element 121 and select the detection signals of all the pixel output units read out as the detection signals to be included in the detection image.

For example, the readout control unit 122 may select a part of the pixel unit outputs out of a plurality of pixel output units of the imaging element 121 and read out the detection signals from the selected pixel output units. Furthermore, for example, the readout control unit 122 may read out the detection signals from all the pixel output units of the imaging element 121 and select a part of the detection signals of the respective pixel output units read out as the detection signals to be included in the detection image.

For example, the readout control unit 122 may select a part of the pixel output units in an arbitrary position out of a plurality of pixel output units of the imaging element 121. That is, for example, the readout control unit 122 may select a part of the pixel unit outputs in the arbitrary position from a plurality of pixel output units of the imaging element 121 and read out the detection signals from the selected pixel output units. Furthermore, for example, the readout control unit 122 may read out the detection signals from all the pixel output units of the imaging element 121 and select the detection signals read out from a part of the pixel output units in the arbitrary position out of the readout detection signals of the respective pixel output units as the detection signals to be included in the detection image.

For example, the readout control unit 122 may select a part of the pixel output units in a positional relationship with a predetermined regularity out of a plurality of pixel output units of the imaging element 121. That is, for example, the readout control unit 122 may select a part of the pixel unit outputs in the positional relationship with a predetermined regularity out of a plurality of pixel output units of the imaging element 121 and read out the detection signals from the selected pixel output units. Furthermore, for example, the readout control unit 122 may read out the detection signals from all the pixel output units of the imaging element 121 and select the detection signals read out from a part of the pixel output units in the positional relationship with a predetermined regularity out of the readout detection signals of the respective pixel output units as the detection signals to be included in the detection image.

For example, the readout control unit 122 may select the pixel output units formed in a partial region in a part of a pixel region in which a plurality of pixel output units of the imaging element 121 is formed. That is, for example, the readout control unit 122 may select the partial region in the pixel region and read out the detection signals from the pixel output units in the selected partial region. Furthermore, for example, the readout control unit 122 may read out the detection signals from all the pixel output units of the imaging element 121 and select the detection signals read out from the pixel output units formed in a desired partial region out of the read out detection signals of the respective pixel output units as the detection signals to be included in the detection image.

For example, the readout control unit 122 may select such pixel output units according to an operation mode of the imaging element 121.

Selecting the detection signals to be adopted to the detection image also means selecting the detection signals not adopted in other words. That is, the readout control unit 122 controls (sets) the resolution of the detection image by choosing the detection signals (a case where all the detection signals are selected is included). For example, the readout control unit 122 reads out the detection signals of all the pixels from the imaging element 121, reads out the detection signals from the imaging element 121 while thinning the same, thins the detection signals read out from the imaging element 121, and adds the detection signals read out from the imaging element 121 by a predetermined number, thereby controlling (setting) the resolution of the detection image.

The readout control unit 122 supplies the read out detection image (the resolution of which is set) (in a case where thinning, addition and the like are performed, the detection image after the processing) to another processing unit and the like (for example, the restoration matrix setting unit 123, the restoration unit 124, the association unit 125 and the like) via the bus 110.

The restoration matrix setting unit 123 is configured to perform processing regarding setting of a restoration matrix. The detection image may be converted into the restored image by performing a predetermined arithmetic operation. As described later in detail, this predetermined arithmetic operation is to multiply each detection signal included in the detection image by a predetermined coefficient and add them to each other. That is, the detection image may be converted into the restored image by performing predetermined matrix operation. In this specification, a matrix including the above-described coefficients used for this matrix operation is referred to as the restoration matrix.

The restoration matrix setting unit 123 sets, for example, the restoration matrix corresponding to the detection image the resolution of which is set by the readout control unit 122 (restoration matrix used when restoring the restored image from the detection signals selectively read out by the readout control unit 122). That is, the restoration matrix corresponds to the resolution of the detection image to be processed. For example, the restoration matrix setting unit 123 supplies the set restoration matrix to another processing unit and the like (for example, the restoration unit 124, the association unit 125 and the like) via the bus 110.

Note that, in predetermined matrix operation to convert the detection image into the restored image, the detection image may be converted into the restored image at arbitrary resolution. In this case, the restoration matrix setting unit 123 may set the restoration matrix having the number of rows and the number of columns according to the resolution of the detection image and target resolution of the restored image.

Note that, for example, the restoration matrix setting unit 123 may obtain its own control information supplied via the bus 110 and drive on the basis of the control information.

The restoration unit 124 is configured to perform processing regarding generation of the restored image. For example, the restoration unit 124 generates the restored image from the data regarding the detection image (detection signal and the like) supplied from the imaging element 121 by performing a predetermined arithmetic operation. Furthermore, the restoration unit 124 supplies data regarding the generated restored image (pixel value and the like) to another processing unit and the like via the bus 110.

Note that, it is possible that the detection image in which a plurality of color components is mixed is obtained by using a color filter and the like in the imaging element 121, and the restoration unit 124 performs a predetermined arithmetic operation on the detection image to obtain the raw image in which a plurality of color components is mixed. Then, the restoration unit 124 may supply the raw image in which the plurality of color components is mixed to another processing unit and the like as the restored image, or may perform the synchronization processing, the color separation processing and the like (for example, demosaic processing and the like) on the raw image, and supply the processed image to another processing unit and the like as the restored image. It goes without saying that it is possible that a monochrome detection image and a detection image for each color may be obtained, and the synchronization processing, color separation processing and the like (for example, demosaic processing and the like) are not required in the imaging element 121.

Furthermore, the restoration unit 124 may perform arbitrary image processing such as gamma correction (γ correction) white balance adjustment and the like, for example, on the restored image, and supply data regarding the restored image after the image processing to another processing unit and the like. Moreover, the restoration unit 124 may convert a format of the data of the restored image data or compress the same by a predetermined compression method such as Joint Photographic Experts Group (JPEG), Tagged Image File Format (TIFF), Graphics Interchange Format (GIF) and the like, for example, and supply the converted (compressed) data to another processing unit and the like.

Note that, for example, the restoration unit 124 may obtain its own control information supplied via the bus 110 and drive on the basis of the control information.

The association unit 125 is configured to perform processing regarding data association. For example, the association unit 125 associates data (for example, a coefficient and the like) used for a predetermined arithmetic operation for generating the restored image with the data regarding the detection image (detection signal and the like) supplied from the imaging element 121 and the like.

Here, the term "to associate" is intended to mean, for example, to make, when one information (data, command, program and the like) is processed, the other information utilizable (linkable). That is, the pieces of information associated with each other may be collected as one file and the like or may be made separate pieces of information. For example, information B associated with information A may be transferred on a transfer path different from that of the information A. Furthermore, for example, the information B associated with the information A may be recorded on a recording medium different from that of the information A (or another recording area of the same recording medium). Note that, this "association" may be that of not the entire information but a part of the information. For example, an image and information corresponding to the image may be associated with each other in arbitrary units such as a plurality of frames, one frame, a part in the frame or the like.

Furthermore, for example, the association unit 125 supplies the associated data to another processing unit and the like via the bus 110. Note that, for example, the association unit 125 may obtain its own control information supplied via the bus 110 and drive on the basis of the control information.

The sensor unit 126 is configured to perform processing regarding detection. For example, the sensor unit 126 includes an arbitrary sensor and performs detection about a predetermined parameter. For example, the sensor unit 126 performs detection about a parameter regarding a state around the imaging device 100, a parameter regarding a state of the imaging device 100 and the like. For example, the sensor unit 126 performs detection about a parameter regarding a state of the imaging element 121. Furthermore, for example, the sensor unit 126 supplies the detected information to another processing unit and the like via the bus 110. Note that, for example, the sensor unit 126 may obtain its own control information supplied via the bus 110 and drive on the basis of the control information.

<Regarding Imaging Element>

Next, the imaging element 121 is described with reference to FIGS. 2 to 20.

<Pixel and Pixel Output Unit>

In this specification, the term "pixel" (or "pixel output unit") is used to describe the present technology. In this specification, the "pixel" (or "pixel output unit") is intended to mean a divided unit including at least one physical configuration capable of receiving light independent from other pixels in a region (also referred to as the pixel region) in which the physical configuration for receiving incident light of the imaging element 121 is formed. The physical configuration capable of receiving the light is, for example, a photoelectric conversion element, and, for example, a photo diode (PD). The number of physical configurations (for example, photo diodes) formed in one pixel is arbitrary, and may be singular or plural. A type, a size, a shape and the like thereof are also arbitrary.

Furthermore, not only the above-described "physical configuration capable of receiving the light" but also all the physical configurations regarding reception of the incident light such as an on-chip lens, a light-shielding film, a color filter, a planarization film, an antireflection film and the like, for example, are included in the physical configuration in the "pixel" unit. Moreover, a configuration of a readout circuit and the like is sometimes included. That is, the physical configuration in the pixel unit may be any configuration.

Furthermore, the detection signal read out from the "pixel" (that is, the physical configuration in the pixel unit) is sometimes referred to as "detection signal in the pixel unit (or pixel output unit)" and the like. Moreover, the detection signal in the pixel unit (or pixel output unit) is also referred to as a "pixel unit detection signal (or pixel output unit detection signal)". Furthermore, this pixel unit detection signal is also referred to as a "pixel output". Moreover, a value thereof is also referred to as an "output pixel value".

A value of the detection signal in the pixel unit (output pixel value) of the imaging element 121 may have an incident angle directivity indicating a directivity with respect to an incident angle of the incident light from the subject independently from the others. That is, each pixel unit (pixel output unit) of the imaging element 121 has a configuration capable of independently setting the incident angle directivity indicating the directivity with respect to the incident angle of the incident light from the subject of the output pixel value. For example, in the imaging element 121, the output pixel values of at least two pixel units may have different incident angle directivities indicating the directivities with respect to the incident angle of the incident light from the subject.

Note that, as described above, since the number of "physical configurations capable of receiving the light" included in the "pixel (or pixel output unit)" is arbitrary, the pixel unit detection signal may be the detection signal obtained by a single "physical configuration capable of receiving the light" or may be the detection signal obtained by a plurality of "physical configurations capable of receiving the light".

Furthermore, a plurality of pixel unit detection signals (output pixel values) may be combined into one at an arbitrary stage. For example, the output pixel values of a plurality of pixels may be added in a state of analog signals, or may be added after being converted into digital signals.

Furthermore, after being read out from the imaging element 121, that is, in the detection image, a plurality of detection signals may be combined into a single signal or a single detection signal may be made a plurality of signals. That is, the resolution (number of data) of the detection image is variable.

By the way, hereinafter, for convenience of description, the imaging element 121 is described as including a pixel region in which a plurality of pixels is arranged in a matrix (to form a pixel array) unless otherwise specified. Note that, an arrangement pattern of the pixels (or pixel output units) of the imaging element 121 is arbitrary, and is not limited to this example. For example, the pixels (or pixel output units) may be arranged in a honeycomb structure. Furthermore, for example, the pixels (or pixel output units) may be arranged to form one row (or one column). That is, the imaging element 121 may be a line sensor.

Note that, a wavelength range in which (the pixel of) the imaging element 121 has sensitivity is arbitrary. For example, (the pixel of) the imaging element 121 may be sensitive to visible light, sensitive to invisible light such as infrared light and ultraviolet light, and sensitive to both the visible light and invisible light. For example, in a case where the imaging element detects far-infrared light which is invisible light, a thermograph (an image representing heat distribution) may be generated using the imaged image obtained by the imaging element. However, in a case of the imaging element with an imaging lens, glass has difficulty in transmitting far-infrared light, so that an imaging lens formed by using an expensive special material is required, which might increase a manufacturing cost. The imaging element 121 may image the subject without intervention of the imaging lens and the like and obtain the data regarding the imaged image, so that when the pixel may detect the far-infrared light, an increase in manufacturing cost may be suppressed. That is, far-infrared light may be imaged at a lower cost (the thermograph may be obtained at a lower cost). Note that, in a case where (the pixel of) the imaging element 121 is sensitive to invisible light, the restored image is not the image in which the user may visually recognize the subject but the image in which the user cannot visually recognize the subject. In other words, the restored image may be the image of visible light or the image of invisible light (for example, (far-)infrared light, ultraviolet light and the like).

<Incident Angle Directivity>

The imaging element 121 includes a plurality of pixel output units which receives the incident light incident without intervention of either the imaging lens or the pinhole and each outputs one detection signal indicating an output pixel value modulated by the incident angle of the incident light. For example, the imaging element 121 has a configuration for the incident angle directivities indicating the directivities with respect to the incident angle of the incident light from the subject of the output pixel values of at least two pixel output units to have different characteristics. That is, in this case, the imaging element 121 may obtain the detection signals of a plurality of pixel output units (a plurality of pixel output unit detection signals), and the incident angle directivities indicating the directivities with respect to the incident angle of the incident light from the subject of at least two pixel output unit detection signals are different from each other.

Here, the "incident angle directivity" is intended to mean a light-receiving sensitivity characteristic corresponding to the incident angle of the incident light, that is, detection sensitivity with respect to the incident angle of the incident light. For example, even with the incident light of the same light intensity, the detection sensitivity sometimes changes depending on the incident angle. Such deviation in detection sensitivity (including a case where there is no deviation) is referred to as the "incident angle directivity".

For example, when the incident light having the same light intensity is incident on the physical configurations of the two pixel output units at the same incident angle, signal levels (detection signal levels) of the detection signals of the respective pixel output units might be different from each other. (Each pixel output unit of) the imaging element 121 has the physical configuration having such a feature.

This incident angle directivity may be realized by any method. For example, it is possible to realize the incident angle directivity by providing a light-shielding film and the like in front of (on a light incident side of) a photoelectric conversion element (photo diode and the like) of the imaging element having a basic structure similar to that of a general imaging element such as a complementary metal oxide semiconductor (CMOS) image sensor, for example.

When imaging is performed only with the general imaging element including the pixels having the same incident angle directivity, the light of substantially the same light intensity is incident on all the pixels of the imaging element, so that the formed image of the subject cannot be obtained. Therefore, in general, the imaging lens and the pinhole are provided in front of the imaging element (on the light incident side). For example, by providing the imaging lens, an image of light from a subject surface may be formed on an imaging surface of the imaging element. Therefore, the imaging element may obtain the detection signal at a level corresponding to the formed image of the subject in each pixel (that is, the imaged image of the image formed subject may be obtained). However, in this case, there has been a possibility that a size physically increases, and downsizing of the device is difficult. Furthermore, in a case of providing the pinhole, the size may be reduced as compared with a case where the imaging lens is provided; however, since an amount of light incident on the imaging element decreases, measures such as increasing an exposure time, increasing a gain or the like are essential, and there has been a possibility that blurring is likely to occur in high-speed imaging of the subject, or natural color representation is lost.

In contrast, the imaging element 121 has a configuration for the incident angle directivities of the output pixel values of at least two pixel output units out of a plurality of pixel output units to have different characteristics, for example. With such a configuration, for example, in the imaging element 121, the detection sensitivities of the respective pixels have the incident angle directivities different from each other. That is, the light-receiving sensitivity characteristic corresponding to the incident angle of the incident light is different between the pixels. However, it is not necessary that the light-receiving sensitivity characteristics of all the pixels are completely different from each other; some pixels may have the same light-receiving sensitivity characteristic, and some pixels may have different light-receiving sensitivity characteristics.

Figure 2:
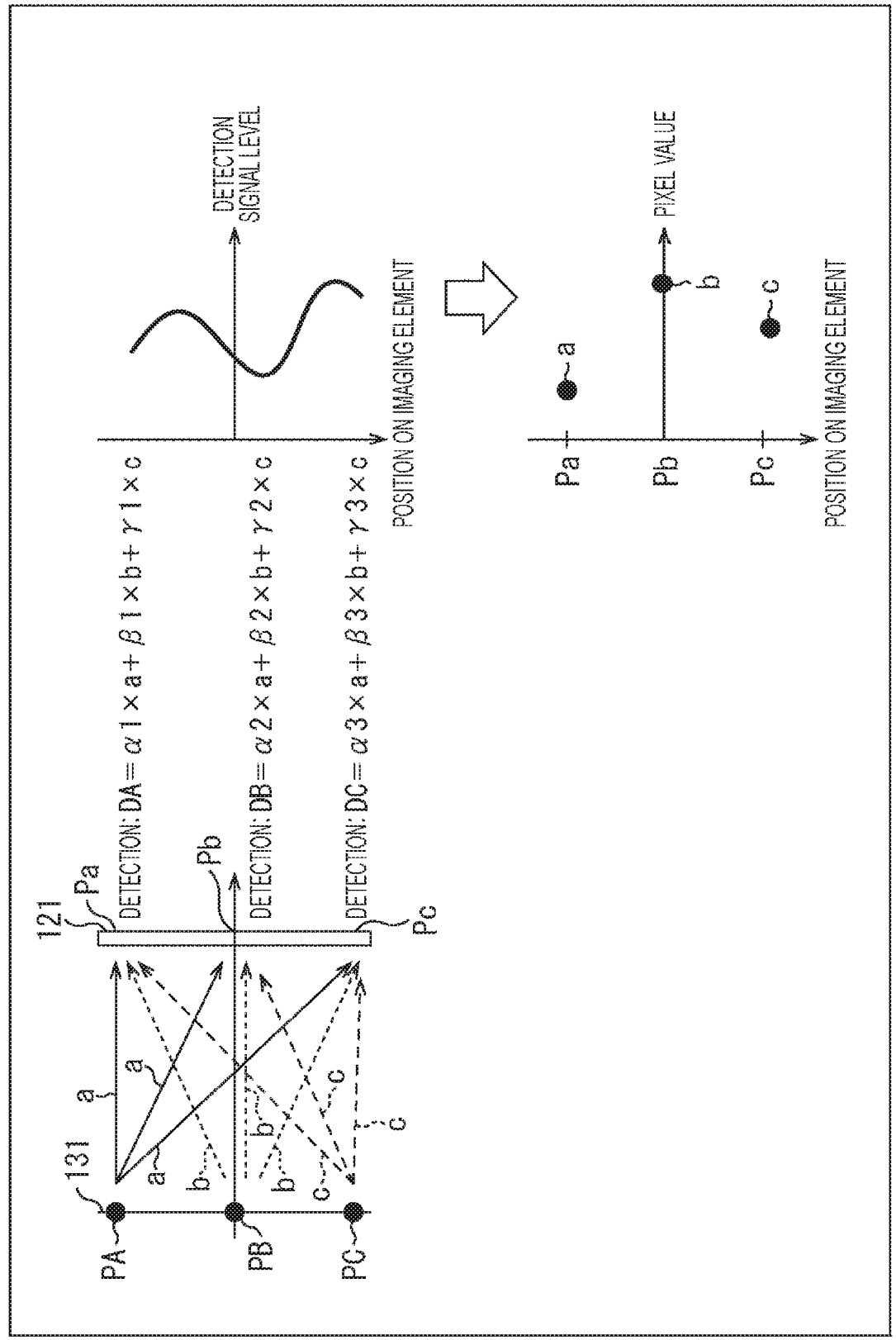
FIG. 2 is a view for illustrating a principle of imaging in the imaging device to which a technology of the present disclosure is applied.

For example, in FIG. 2, in a case where it is assumed that a light source forming a subject surface 131 is a point light source, in the imaging element 121, light beams having the same light intensity emitted from the same point light source are incident on all the pixels, but they are incident on the pixels at different incident angles. Then, since the respective pixels of the imaging element 121 have different incident angle directivities, the light beams having the same light intensity are detected with different sensitivities. That is, the detection signals having different signal levels are detected by the respective pixels.

In further detail, the sensitivity characteristic according to the incident angle of the incident light received by each pixel of the imaging element 121, that is, the incident angle directivity according to the incident angle in each pixel is represented by a coefficient representing the light-receiving sensitivity according to the incident angle, and the signal level of the detection signal (also referred to as a detection signal level) corresponding to the incident light in each pixel is obtained by multiplying the coefficient set corresponding to the light-receiving sensitivity corresponding to the incident angle of the incident light.

More specifically, as illustrated in an upper left part of FIG. 2, detection signal levels DA, DB, and DC in positions Pa, Pb, and Pc are expressed by following equations (1) to (3), respectively.

[Mathematical Equation 1]

$$DA = \alpha1 \times a + \beta1 - b + \gamma1 \times c \quad (1)$$

$$DB = \alpha2 \times a + \beta2 \times b + \gamma2 \times c \quad (2)$$

$$DC = \alpha3 \times a + \beta3 \times b + \gamma3 \times c \quad (3)$$

Here, $\alpha1$ is a coefficient set according to the incident angle of the light beam from the point light source PA on the subject surface 131 to be restored in the position Pa on the imaging element 121. Furthermore, $\beta1$ is a coefficient set according to the incident angle of the light beam from the point light source PB on the subject surface 131 to be restored in the position Pa on the imaging element 121. Moreover, $\gamma1$ is a coefficient set according to the incident angle of the light beam from the point light source PC on the subject surface 131 to be restored in the position Pa on the imaging element 121.

As expressed in equation (1), the detection signal level DA in the position Pa is expressed by a sum (composite value) of a product of the light intensity "a" of the light beam from the point light source PA in the position Pa and the coefficient $\alpha1$, a product of the light intensity "b" of the light beam from the point light source PB in the position Pa and the coefficient $\beta1$, and a product of the light intensity "c" of the light beam from the point light source PC in the position Pa and the coefficient $\gamma1$. Hereinafter, the coefficients $\alpha x$, $\beta x$, and $\gamma x$ (x is a natural number) are collectively referred to as a coefficient set.

Similarly, a coefficient set $\alpha2$, $\beta2$, and $\gamma2$ in equation (2) is the coefficient set according to the incident angles of the light beams from the point light sources PA, PB, and PC on the subject surface 131 to be restored in the position Pb on the imaging element 121. That is, as expressed in equation (2) described above, the detection signal level DB in the position Pb is expressed by a sum (composite value) of a product of the light intensity "a" of the light beam from the point light source PA in the position Pb and the coefficient $\alpha2$, a product of the light intensity "b" of the light beam from the point light source PB in the position Pb and the coefficient $\beta2$, and a product of the light intensity "c" of the light beam from the point light source PC in the position Pb and the coefficient $\gamma2$. Furthermore, coefficients $\alpha3$, $\beta3$, and $\gamma3$ in equation (3) are a coefficient set according to the incident angles of the light beams from the point light sources PA, PB, and PC on the subject surface 131 to be restored in the position Pc on the imaging element 121. That is, as expressed in equation (3) described above, the detection signal level DC in the position Pc is expressed by a sum (composite value) of a product of the light intensity "a" of the light beam from the point light source PA in the position Pc and the coefficient $\alpha3$, a product of the light intensity "b" of the light beam from the point light source PB in the position Pc and the coefficient $\beta3$, and a product of the light intensity "c" of the light beam from the point light source PC in the position Pc and the coefficient $\gamma3$.

As described above, these detection signal levels are different from those with which the image of the subject is formed because the light intensities of the light beams emitted from the point light sources PA, PB, and PC are mixed. That is, the detection signal level illustrated in an upper right part of FIG. 2 is not the detection signal level corresponding to the image (imaged image) in which the subject image is formed, so that this is different from a pixel value illustrated in a lower right part of FIG. 2 (they generally do not coincide with each other).

However, by forming simultaneous equations using the coefficient set $\alpha1$, $\beta1$, and $\gamma1$, the coefficient set $\alpha2$, $\beta2$, and $\gamma2$, the coefficient set $\alpha3$, $\beta3$, and $\gamma3$, and the detection signal levels DA, DB, and DC, and solving the simultaneous equations of equations (1) to (3) described above using a, b, and c as variables, it is possible to obtain the pixel values in the respective positions Pa, Pb, and Pc as illustrated in the lower right part of FIG. 2. Therefore, the restored image which is a set of the pixel values (image in which the subject image is formed) is restored.

With such a configuration, the imaging element 121 may output one detection signal indicating the output pixel value modulated by the incident angle of the incident light in each pixel without the need of the imaging lens, the optical filter including the diffraction grating and the like, the pinhole and the like. As a result, the imaging lens, the optical filter including the diffraction grating and the like, the pinhole and the like are not indispensable configurations, so that it is possible to make the imaging device short in height, that is, make a thickness thin in a light incident direction in a configuration to realize an imaging function.

<Formation of Incident Angle Directivity>

Figure 3:
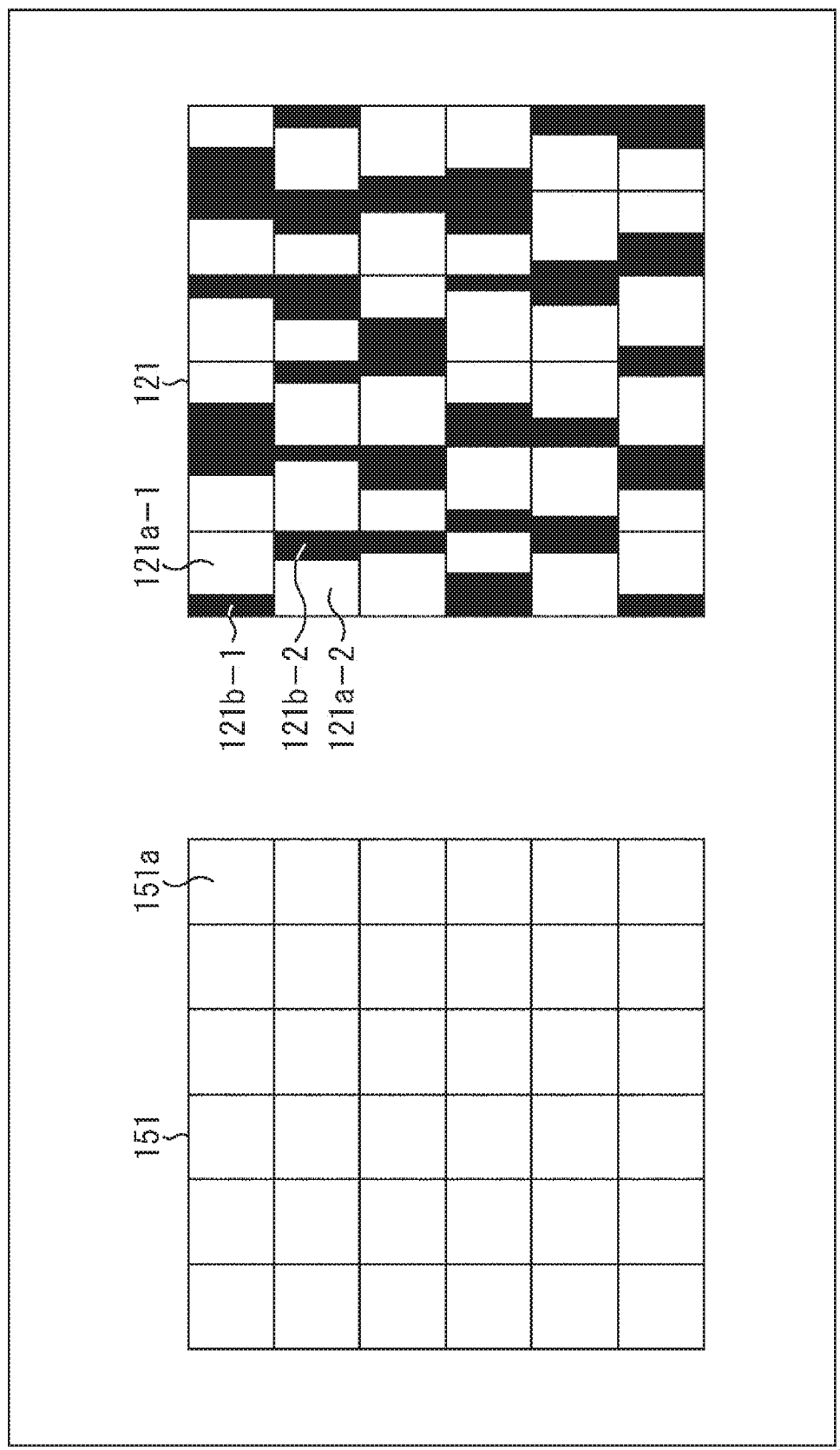
FIG. 3 is a view for illustrating a difference in configuration between a conventional imaging element and an imaging element according to the present disclosure.

A left part of FIG. 3 illustrates a front view of a part of a pixel array unit of a general imaging element, and a right part of FIG. 3 illustrates a front view of a part of a pixel array unit of the imaging element 121. Note that, FIG. 3 illustrates an example of a case where the pixel array unit has a configuration of six pixels horizontally x six pixels vertically, but the configuration of the number of pixels is not limited to this.

The incident angle directivity may be formed by a light-shielding film, for example. As in the example in the left part of FIG. 3, it is illustrated that the pixels 121a having the same incident angle directivity are arranged in an array in the general imaging element 121. In contrast, in the imaging element 121 in the example in the right part of FIG. 3, each pixel 121a is provided with a light-shielding film 121b which is one of modulation elements so as to cover a part of a light-receiving region of a photo diode thereof, and the incident light incident on each pixel 121a is optically modulated according to the incident angle. Then, for example, by providing the light-shielding film 121b in a different range for each pixel 121a, the light-receiving sensitivity to the incident angle of the incident light differs for each pixel 121a, and the respective pixels 121a have different incident angle directivities.

For example, a light-shielded range of the pixel is different between pixels 121a-1 and 121a-2 due to provided light-shielding films 121b-1 and 121b-2 (at least any one of the light-shielded region (position) or a light-shielded area is different). That is, in the pixel 121a-1, the light-shielding film 121b-1 is provided so as to light-shield a part on a left side in the light-receiving region of the photodiode by a predetermined width, and in the pixel 121a-2, the light-shielding film 121b-2 is provided so as to light-shield a part on a right side in the light-receiving region by a width wider in a horizontal direction than that of the light-shielding film 121b-1. In another pixel 121a as well, similarly, the light-shielding film 121b is provided so as to light-shield a different range of the light-receiving region for each pixel to be randomly arranged in the pixel array.

Note that, the range of the light-shielding film 121b desirably has such an area that a desired light amount may be secured because the larger the ratio of covering the light-receiving region of each pixel, the smaller the amount of light which may be received; for example, it is possible to limit such that the area of the light-shielding film 121b is up to about ¾ of an entire range capable of receiving the light at maximum. In this manner, it becomes possible to secure the light amount not smaller than the desired amount. However, if each pixel has an unshielded range with a width corresponding to a wavelength of the light to be received, it is possible to receive a minimum amount of light. That is, for example, in a case of a B pixel (blue pixel), the wavelength is about 500 nm, and it is possible to receive the minimum amount of light if the light is not shielded beyond a width corresponding to this wavelength.

<Configuration Example of Imaging Element>

Figure 4:
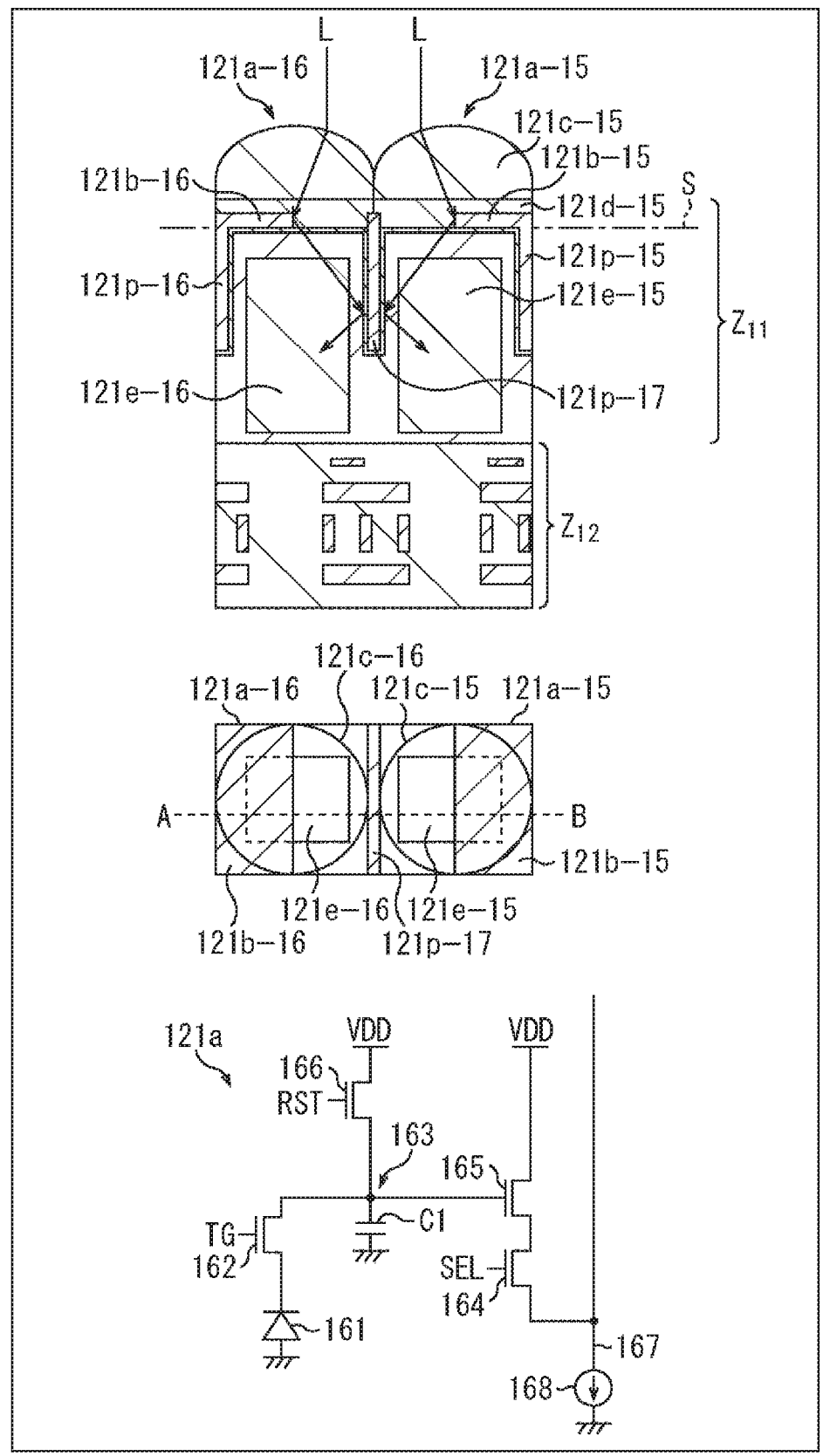
FIG. 4 is a view for illustrating a first configuration example of the imaging element.

A configuration example of the imaging element 121 in this case is described with reference to FIG. 4. An upper part of FIG. 4 is a side cross-sectional view of the imaging element 121, and a middle part of FIG. 4 is a top view of the imaging element 121. Furthermore, the side cross-sectional view in the upper part of FIG. 4 is an AB cross-section in the middle part of FIG. 4. Moreover, a lower part of FIG. 4 is a circuit configuration example of the imaging element 121.

The imaging element 121 having a configuration illustrated in FIG. 4 is provided with a plurality of pixel output units which receives the incident light incident without intervention of either the imaging lens or the pinhole and each outputs one detection signal indicating the output pixel value modulated by the incident angle of the incident light. For example, this has a configuration for the incident angle directivities indicating the directivities with respect to the incident angle of the incident light from the subject of the output pixel values of at least two pixel output units out of the plurality of pixel output units to have different characteristics. Furthermore, the imaging element 121 in this case has a configuration in which a plurality of pixel output units may independently set the incident angle directivity indicating the directivity with respect to the incident angle of the incident light from the subject for each pixel output unit.

In the imaging element 121 in the upper part of FIG. 4, the incident light is incident from the upper part of the drawing downward. Adjacent pixels 121a-15 and 121a-16 are so-called backside irradiation-type with a wiring layer Z12 provided in a lowermost layer in the drawing and a photo-electric conversion layer Z11 provided thereon.

Note that, in a case where it is not necessary to distinguish the pixels 121a-15 and 121a-16 from each other, they are simply referred to as the pixels 121a, and other configurations are also referred to in a similar manner. Furthermore, FIG. 4 illustrates only the side view and the top view of two pixels forming the pixel array of the imaging element 121; however, it goes without saying that the number of pixels 121a arranged is equal to or larger than this but not illustrated.

Moreover, the pixels 121a-15 and 121a-16 are provided with photo diodes 121e-15 and 121e-16 in the photoelectric conversion layer Z11, respectively. Furthermore, on the photodiodes 121e-15 and 121e-16, on-chip lenses 121c-15 and 121c-16 and color filters 121d-15 and 121d-16 are formed in this order from above, respectively.

The on-chip lenses 121c-15 and 121c-16 condense the incident light on the photo diodes 121e-15 and 121e-16, respectively.

The color filters 121d-15 and 121d-16 are optical filters which transmit light of specific wavelengths such as red, green, blue, infrared, white and the like, for example. Note that, in a case of white, the color filters 121d-15 and 121d-16 may be transparent filters or they are not required.

At a boundary between the pixels in the photoelectric conversion layer Z11 of the pixels 121a-15 and 121a-16, light-shielding films 121p-15 to 121p-17 are formed to suppress crosstalk between the adjacent pixels.

Furthermore, light-shielding films 121b-15 and 121b-16 being one of the modulation elements light-shield a part of a light-receiving surface S as illustrated in the upper and middle parts of FIG. 4. Since a part of the light-receiving surface S is light-shielded by the light-shielding film 121b, the incident light incident on the pixel 121a is optically modulated according to the incident angle. Since the pixel 121a detects the optically modulated incident light, this has the incident angle directivity. On the light-receiving surfaces S of the photodiodes 121e-15 and 121e-16 in the pixels 121a-15 and 121a-16, different ranges are light-shielded by the light-shielding films 121b-15 and 121b-16, respectively, so that different incident angle directivities are set for the respective pixels. However, it is not limited to a case where the light-shielded ranges are different for all the pixels 121a of the imaging element 121, and there may be a part of the pixels 121a in which the same range is light-shielded.

By the configuration as illustrated in the upper part of FIG. 4, a right end of the light-shielding film 121p-15 and an upper end of the light-shielding film 121b-15 are connected to each other, and a left end of the light-shielding film 121b-16 and an upper end of the light-shielding film 121p-16 are connected to each other to be formed into an L shape as seen from the side.

Moreover, the light-shielding films 121b-15 to 121b-17 and 121p-15 to 121p-17 are formed using metal such as, for example, tungsten (W), aluminum (Al), or an alloy of Al and copper (Cu). Furthermore, the light-shielding films 121b-15 to 121b-17 and 121p-15 to 121p-17 may be simultaneously formed using the same metal as that of wiring by the same process as the process by which the wiring is formed in a semiconductor process. Note that, the light-shielding films 121b-15 to 121b-17 and 121p-15 to 121p-17 do not necessarily have the same thickness depending on the position.

Furthermore, as illustrated in a lower part of FIG. 4, the pixel 121a is provided with a photo diode 161 (corresponding to the photo diode 121e), a transfer transistor 162, a floating diffusion (FD) unit 163, a selection transistor 164, an amplification transistor 165, and a reset transistor 166, and is connected to a current source 168 via a vertical signal line 167.

The photo diode 161 is configured such that an anode electrode is grounded and a cathode electrode is connected to a gate electrode of the amplification transistor 165 via the transfer transistor 162.

The transfer transistor 162 drives according to a transfer signal TG. For example, when the transfer signal TG supplied to a gate electrode of the transfer transistor 162 reaches a high level, the transfer transistor 162 is turned on. Therefore, charges accumulated in the photo diode 161 are transferred to the FD unit 163 via the transfer transistor 162.

The amplification transistor 165 serves as an input unit of a source follower which is a readout circuit which reads out a signal obtained by photoelectric conversion in the photo diode 161, and outputs a pixel signal at a level corresponding to the charges accumulated in the FD unit 163 to a vertical signal line 23. That is, the amplification transistor 165 forms the source follower with the current source 168 connected to one end of the vertical signal line 167 with a drain terminal connected to a power supply voltage VDD and a source terminal connected to the vertical signal line 167 via the selection transistor 164.

The floating diffusion (FD) unit 163 serves as a floating diffusion region having a charge capacitance C1 provided between the transfer transistor 162 and the amplification transistor 165, and temporarily accumulates the charges transferred from the photo diode 161 via the transfer transistor 162. The FD unit 163 serves as a charge detection unit which converts the charges into a voltage, and the charges accumulated in the FD unit 163 are converted into the voltage in the amplification transistor 165.

The selection transistor 164 is driven according to a selection signal SEL, turned on when the selection signal SEL supplied to a gate electrode reaches a high level, and connects the amplification transistor 165 to the vertical signal line 167.

The reset transistor 166 drives according to a reset signal RST. For example, the reset transistor 166 is turned on when the reset signal RST supplied to a gate electrode reaches a high level, discharges the charges accumulated in the FD unit 163 to the power supply voltage VDD, and resets the FD unit 163.

With the circuit configuration described above, the pixel circuit illustrated in the lower part of FIG. 4 operates as follows.

That is, as a first operation, the reset transistor 166 and the transfer transistor 162 are turned on, the charges accumulated in the FD unit 163 are discharged to the power supply voltage VDD, and the FD unit 163 is reset.

As a second operation, the reset transistor 166 and the transfer transistor 162 are turned off, an exposure period is started, and the charges according to the amount of the incident light are accumulated by the photo diode 161.

As a third operation, after the reset transistor 166 is turned on and the FD unit 163 is reset, the reset transistor 166 is turned off. By this operation, the FD unit 163 is reset and set to reference potential.

As a fourth operation, the potential of the FD unit 163 in the reset state is output from the amplification transistor 165 as the reference potential.

As a fifth operation, the transfer transistor 162 is turned on, and the charges accumulated in the photo diode 161 are transferred to the FD unit 163.

As a sixth operation, the potential of the FD unit 163 to which the charges of the photo diode are transferred is output from the amplification transistor 165 as signal potential.

By the above-described processing, the reference potential is subtracted from the signal potential and is output as the detection signal by correlated double sampling (CDS). A value of this detection signal (output pixel value) is modulated according to the incident angle of the incident light from the subject, and has a different characteristic (directivity) depending on the incident angle (has the incident angle directivity).

In this manner, each of the pixel 121a in a case of FIG. 4 is provided with one photo diode 121e, and the different range is light-shielded by the light-shielding film 121b for each pixel 121a, so that it is possible to express the detection signal of one pixel of the detection image having the incident angle directivity by one pixel 121a by optical modulation using the light-shielding film 121b.

<Another Configuration Example of Imaging Element>

Furthermore, the incident angle directivity may be formed by, for example, a position, a size, a shape and the like in the pixel of a light-receiving element (for example, photo diode). The pixels with different parameters have different sensitivities to the incident light having the same light intensity in the same direction. That is, by setting these parameters for each pixel, the incident angle directivity may be set for each pixel.

For example, a plurality of light-receiving elements (for example, photo diodes) may be provided in the pixel and used selectively. In this manner, the incident angle directivity may be set for each pixel by selecting the light-receiving element.

Figure 5:
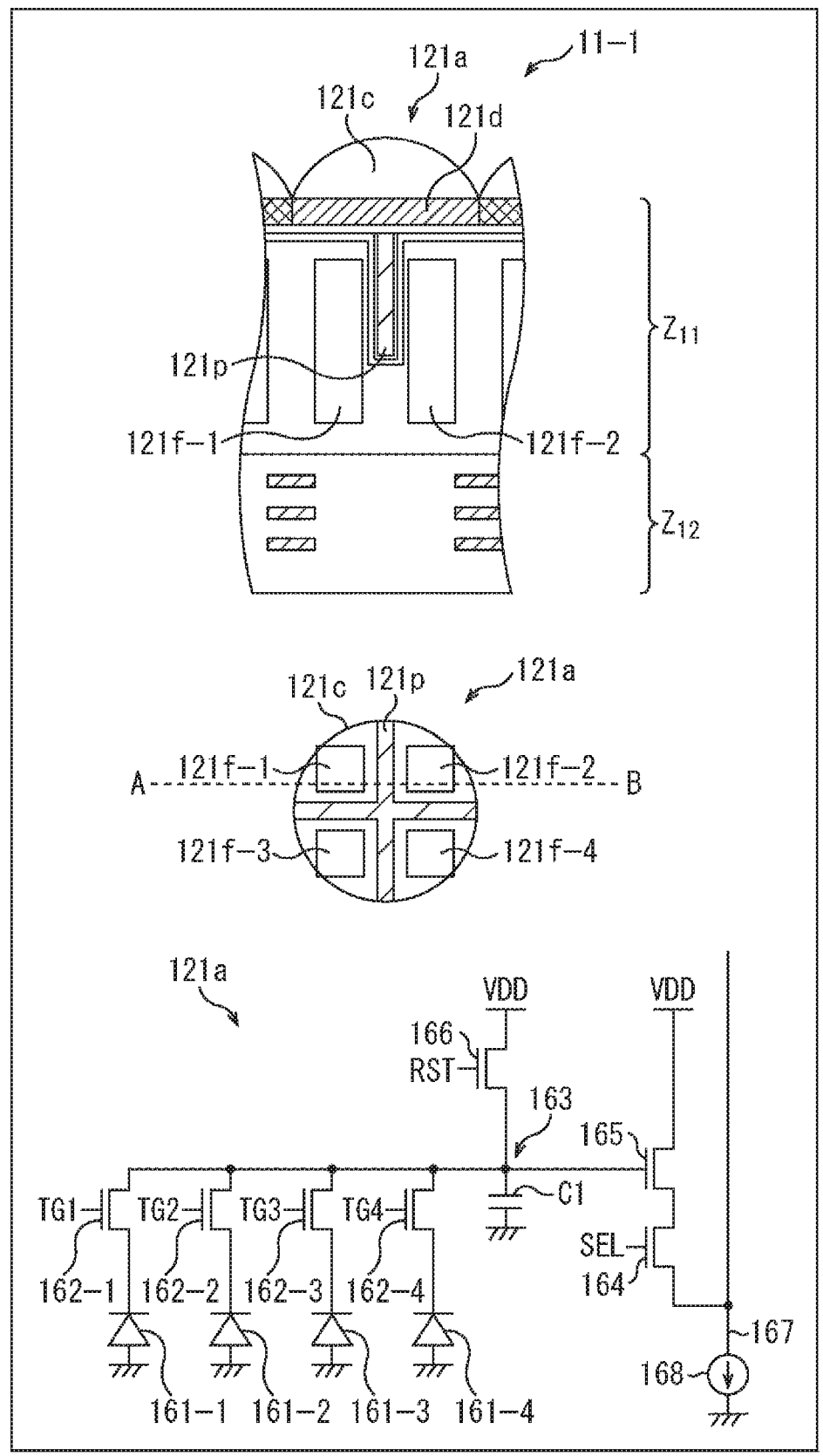
FIG. 5 is a view for illustrating the first configuration example of the imaging element.

FIG. 5 is a view illustrating another configuration example of the imaging element 121. In an upper part of FIG. 5, a side cross-sectional view of the pixel 121a of the imaging element 121 is illustrated, and in a middle part of FIG. 5, a top view of the imaging element 121 is illustrated. Furthermore, the side cross-sectional view in the upper part of FIG. 5 is an AB cross-section in the middle part of FIG. 5. Moreover, in a lower part of FIG. 5, a circuit configuration example of the imaging element 121 is illustrated.

The imaging element 121 having the configuration illustrated in FIG. 5 is provided with a plurality of pixel output units which receives the incident light incident without intervention of either the imaging lens or the pinhole and each outputs one detection signal indicating the output pixel value modulated by the incident angle of the incident light. For example, the imaging element 121 has the configuration for the incident angle directivities indicating the directivities with respect to the incident angle of the incident light from the subject of the output pixel values of at least two pixel output units out of a plurality of pixel output units to have different characteristics. Furthermore, the imaging element 121 in this case may independently set the incident angle directivity indicating the directivity with respect to the incident angle of the incident light from the subject of the output pixel value for each pixel output unit by making the photo diodes (PDs) contributing to the output of a plurality of pixel output units different from each other.

As illustrated in FIG. 5, the imaging element 121 has a configuration different from that of the imaging element 121 in FIG. 5 in that four photo diodes 121f-1 to 121f-4 are formed in the pixel 121a, and a light-shielding film 121p is formed in a region which separates the photo diodes 121f-1 to 121f-4 from one another. That is, in the imaging element 121 in FIG. 5, the light-shielding film 121p is formed into a "+" shape as seen from above. Note that, the common configuration is assigned with the same reference sign, and the detailed description thereof is omitted.

In the imaging element 121 configured as illustrated in FIG. 5, occurrence of electrical and optical crosstalk among the photo diodes 121*f*-1 to 121*f*-4 may be prevented because the photo diodes 121*f*-1 to 121*f*-4 are separated by the light-shielding film 121*p*. That is, the light-shielding film 121*p* in FIG. 5 is for preventing the crosstalk as is the case with the light-shielding film 121*p* of the imaging element 121 in FIG. 4 and is not for providing the incident angle directivity.

Although it is described later in detail, the photo diodes 121*f*-1 to 121*f*-4 have different incident angles at which the light-receiving sensitivity characteristics become high. That is, a desired incident angle directivity may be provided (set) to the output pixel value of the pixel 121*a* depending on the photo diode out of the photo diodes 121*f*-1 to 121*f*-4 from which the charge is read out. That is, the incident angle directivity of the output pixel value of the pixel 121*a* may be controlled.

In the configuration example of the imaging element 121 in FIG. 5, one FD unit 163 is shared by the four photo diodes 121*f*-1 to 121*f*-4. In the lower part of FIG. 5, the circuit configuration example in which one FD unit 163 is shared by the four photo diodes 121*f*-1 to 121*f*-4 is illustrated. Note that, in the lower part of FIG. 5, the description of the configuration the same as that in the lower part of FIG. 4 is not repeated.

The lower part of FIG. 5 differs from the circuit configuration in the lower part of FIG. 4 in that photo diodes 161-1 to 161-4 (corresponding to the photo diodes 121*f*-1 to 121*f*-4 in the upper part of FIG. 5) and transfer transistors 162-1 to 162-4 are provided in place of the photo diode 161 and the transfer transistor 162, respectively, to share the FD unit 163.

In the circuit illustrated in the lower part of FIG. 5, the photo diodes 161-1 to 161-4 are referred to as the photo diodes 161 in a case where it is not necessary to distinguish them from each other. Furthermore, the transfer transistors 162-1 to 162-4 are referred to as the transfer transistors 162 in a case where it is not necessary to distinguish them from each other.

In the circuit illustrated in the lower part of FIG. 5, when any one of the transfer transistors 162 is turned on, charges of the photo diode 161 corresponding to the transfer transistor 162 are read out and transferred to the common FD unit 163. Then, a signal corresponding to a level of the charges held in the FD unit 163 is read out as a detection signal of the pixel output unit. That is, the charges of each photo diode 161 may be read out independently of each other, and the photo diode 161 from which the charges are read out may be controlled depending on the transfer transistor 162 which is turned on. In other words, a degree of contribution of each photo diode 161 to the output pixel value may be controlled depending on the transfer transistor 162 which is turned on. For example, the photo diode 161 which contributes to the output pixel value may be made different between at least two pixels by making the photo diodes 161 from which the charges are read out different from each other. That is, a desired incident angle directivity may be provided (set) to the output pixel value of the pixel 121*a* by selecting the photo diode 161 from which the charges are read out. That is, the detection signal output from each pixel 121*a* may be made a value (output pixel value) modulated according to the incident angle of the incident light from the subject.

For example, in FIG. 5, by transferring the charges of the photo diodes 121*f*-1 and 121*f*-3 to the FD unit 163 and adding the signals obtained by reading out them, it is possible to provide (set) the incident angle directivity in a horizontal direction in the drawing to the output pixel value of the pixel 121*a*. Similarly, by transferring the charges of the photo diodes 121*f*-1 and 121*f*-2 to the FD unit 163 and adding the signals obtained by reading out them, it is possible to provide (set) the incident angle directivity in a vertical direction in the drawing to the output pixel value of the pixel 121*a*.

Note that, the signal obtained on the basis of the charges of each photo diode 121*f* of the pixel 121*a* in FIG. 5 may be added after being read out from the pixel, or may be added in the pixel (for example, the FD unit 163).

Furthermore, a combination of the photo diodes 121*f* the charges (or signals corresponding to the charges) of which are added is arbitrary, and is not limited to the above-described example. For example, the charges (or signals corresponding to the charges) of three or more photo diodes 121*f* may be added. Furthermore, for example, the charge of one photo diode 121*f* may be read out without addition.

Note that, it is possible to provide (set) a desired incident angle directivity to (the detection sensitivity of) the pixel 121*a* by resetting the detection value (charges) accumulated in the photo diode 161 (photo diode 121*f*) and the like before the charges are read out to the FD unit 163 by using an electronic shutter function.

For example, in a case where the electronic shutter function is used, by resetting immediately before reading out the charges of the photo diode 121*f* to the FD unit 163, it is possible to put the photo diode 121*f* into a state not contributing to the detection signal level of the pixel 121*a*, and by providing a time between the reset and the readout to the FD unit 163, it is possible to allow the same to partially contribute.

As described above, each of the pixels 121*a* in FIG. 5 includes the four photo diodes 121*f*, and the light-shielding film 121*b* is not formed for the light-receiving surface, but this is divided into a plurality of regions by the light-shielding film 121*p*, and the four photo diodes 121*f*-1 to 121*f*-4 are formed to express the detection signal of one pixel of the detection image having the incident angle directivity. In other words, for example, a range not contributing to the output of the photo diodes 121*f*-1 to 121*f*-4 serves similarly to the light-shielded region, so that the detection signal of one pixel of the detection image having the incident angle directivity is expressed. Note that, in a case where the detection signal of one pixel is expressed using the photo diodes 121*f*-1 to 121*f*-4, since the light-shielding film 121*b* is not used, the detection signal is not the signal obtained by the optical modulation.

The example in which the four photo diodes are arranged in the pixel is described above, but the number of photo diodes arranged in the pixel is arbitrary and is not limited to the above-described example. That is, the number of partial regions in which the photo diodes are arranged in the pixel is also arbitrary.

Furthermore, in the above description, it is described that the photo diodes are arranged in the four partial regions obtained by dividing the pixel into four; however, it is also possible that the partial regions are not equally divided. That is, it is possible that a size and a shape of each partial region are not unified (partial region having different size and shape may be included). Alternatively, a position (position in the partial region), a size, a shape and the like of the photo diode arranged in each partial region may be different for each photo diode (for each partial region). At that time, it is possible that all the sizes and shapes of the partial regions are unified or not.

Moreover, these parameters do not have to be unified in all the pixels of the imaging element 121. That is, in one or more pixels of the imaging element 121, one or more of these parameters may be different from those of other pixels.

For example, a pixel group of the imaging element 121 may include the pixel in which a division position for forming the partial region in which the photo diode is arranged in the pixel is different from that of the other pixels. That is, the imaging element 121 may include one or more pixels the partial region of which has different size and shape from other pixels. For example, by making the division position different for each pixel, even when only an upper left photo diode is used in a plurality of pixels, the incident angle directivities of the detection signals detected in the plurality of pixels may be made different from each other.

Furthermore, for example, the pixel group of the imaging element 121 may include the pixel in which the positions, sizes, shapes and the like of a plurality of photo diodes arranged in the pixel are different from those of the other pixels. That is, the imaging element 121 may include one or more pixels in which at least any one of the positions, sizes, or shapes of the plurality of photo diodes arranged is different from that of the other pixels. For example, by making the positions, sizes, shapes and the like of the photo diodes different for each pixel, even when only the upper left photo diode is used in a plurality of pixels, the incident angle directivities of the detection signals detected in the plurality of pixels may be made different from each other.

Moreover, for example, one or more pixels in which both the parameters (size and shape) of the partial region and the parameters (position, size, and shape) of the photo diode are different from those of the other pixels may be included.

Furthermore, for example, the pixel group of the imaging element 121 may include the pixel in which the division number for forming the partial region in which the photodiode is arranged in the pixel is different from that of the other pixels. That is, the imaging element 121 may include one or more pixels in which the number of photo diodes arranged is different from that of the other pixels. For example, by making the division number (number of photo diodes) different for each pixel, the incident angle directivity may be set more freely.

<Principle of Causing Incident Angle Directivity>

Figure 6:
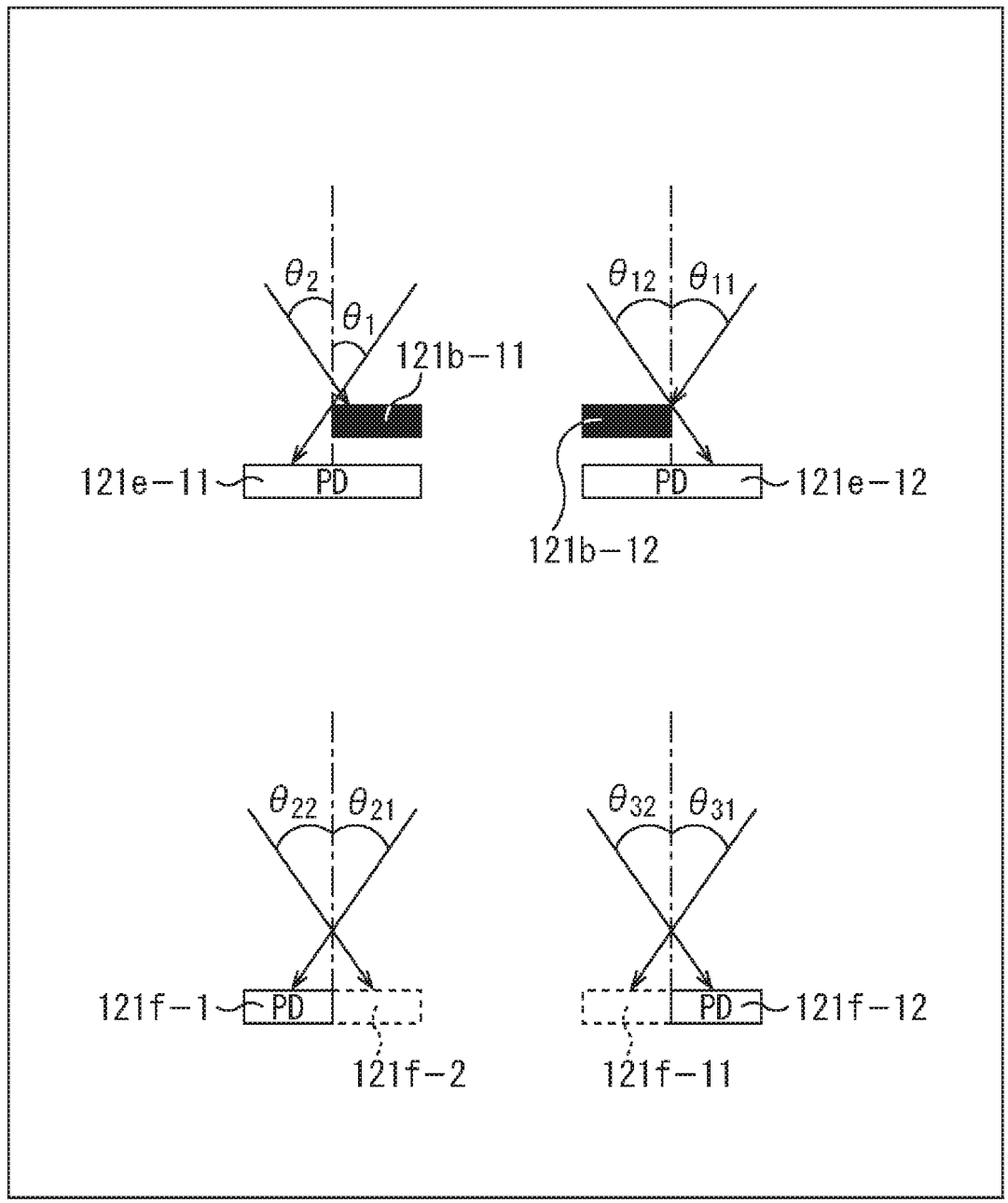
FIG. 6 is a view for illustrating a principle of incident angle directivity generation.

The incident angle directivity of each pixel of the imaging element 121 occurs, for example, by a principle illustrated in FIG. 6. Note that, a left upper part and a right upper part of FIG. 6 are views for illustrating the principle of occurrence of the incident angle directivity in the imaging element 121 in FIG. 4, and a lower left part and a lower right part of FIG. 6 are views for illustrating the principle of occurrence of the incident angle directivity in the imaging element 121 in FIG. 5.

Furthermore, each of the pixels in the upper left part and upper right part in FIG. 6 includes one photo diode 121e. In contrast, each of the pixels in the lower left part and lower right part in FIG. 6 includes two photo diodes 121f. Note that, herein, an example in which one pixel includes two photo diodes 121f is illustrated, but this is for convenience in explanation, and the number of photo diodes 121f forming one pixel may be other than this.

In the upper left part of FIG. 6, a light-shielding film 121b-11 is formed so as to light-shield a right half of a light-receiving surface of a photo diode 121e-11 when the incident light is incident from the upper part in the drawing downward. Furthermore, in the upper part of FIG. 6, a light-shielding film 121b-12 is formed so as to light-shield a left half of a light-receiving surface of a photo diode 121e-12. Note that, a dashed-dotted line in the drawing indicates a central position in a horizontal direction in the drawing of the light-receiving surface of the photo diode 121e in a direction perpendicular to the light-receiving surface.

For example, in a case of the configuration in the upper left part of FIG. 6, the incident light in a direction from upper right in the drawing indicated by an arrow forming an incident angle θ1 with respect to the dashed-dotted line in the drawing is easily received in a left-half range not light-shielded by the light-shielding film 121b-11 of the photo diode 121e-11; however, the incident light in a direction from upper left in the drawing indicated by an arrow forming an incident angle θ2 with respect to the dashed-dotted line in the drawing is less likely to be received in the left-half range not light-shielded by the light-shielding film 121b-11 of the photo diode 121e-11. Accordingly, in a case of the configuration in the upper left part of FIG. 6, the incident angle directivity is with a high light-receiving sensitivity characteristic for the incident light from upper right in the drawing and low light-receiving sensitivity characteristic for the incident light from upper left.

In contrast, for example, in a case of the configuration in the upper right part of FIG. 6, the incident light in a direction from upper right in the drawing indicated by an arrow forming an incident angle θ11 with respect to the dashed-dotted line in the drawing is less likely to be received in a left-half range light-shielded by the light-shielding film 121b-12 of the photo diode 121e-12; however, the incident light in a direction from upper left in the drawing indicated by an arrow forming an incident angle θ12 with respect to the dashed-dotted line in the drawing is easily received in a right-half range not light-shielded by the light-shielding film 121b-12 of the photo diode 121e-12. Accordingly, in a case of the configuration in the upper right part of FIG. 6, the incident angle directivity is with a low light-receiving sensitivity characteristic for the incident light from upper right in the drawing and high light-receiving sensitivity characteristic for the incident light from upper left.

Furthermore, in a case of the lower left part of FIG. 6, the photo diodes 121f-1 and 121f-2 are provided on left and right sides in the drawing, and a configuration has the incident angle directivity without the light-shielding film 121b provided by reading out the detection signal of one of them.

That is, as illustrated in the lower left part of FIG. 6, in a case where two photo diodes 121f-1 and 121f-2 are formed in the pixel 121a, the detection signal of the photo diode 121f-1 provided on the left side in the drawing contributes to the detection signal level of the pixel 121a, so that this may be provided with the incident angle directivity similar to that of the configuration in the upper left part of FIG. 6. That is, the incident light in the direction from upper right in the drawing indicated by an arrow which forms an incident angle θ21 with respect to the dashed-dotted line in the drawing is incident on the photo diode 121f-1 to be received, and the detection signal thereof is read out to contribute to the detection signal of the pixel 121a. In contrast, the incident light in the direction from upper left in the drawing indicated by an arrow which forms an incident angle θ22 with respect to the dashed-dotted line in the drawing is incident on the photo diode 121f-2, but the detection signal thereof is not read out and does not contribute to the detection signal of the pixel 121a.

Similarly, as illustrated in the lower right part of FIG. 6, in a case where two photo diodes 121f-11 and 121f-12 are formed in the pixel 121a, the detection signal of the photo diode 121f-12 provided on the left side in the drawing contributes to the detection signal level of the pixel 121a, so that this may be provided with the incident angle directivity similar to that of the configuration in the upper right part of FIG. 6. That is, the incident light in the direction from upper right in the drawing indicated by an arrow which forms an incident angle θ31 with respect to the dashed-dotted line in the drawing is incident on the photo diode 121f-11, but the detection signal thereof is not read out and does not contribute to the detection signal of the pixel 121a. In contrast, the incident light in the direction from upper left in the drawing indicated by an arrow which forms an incident angle θ32 with respect to the dashed-dotted line in the drawing is incident on the photo diode 121f-12 to be received, and the detection signal thereof is read out to contribute to the detection signal of the pixel 121a.

Note that, in FIG. 6, the example in which the dashed-dotted line in the vertical direction is the central position in the horizontal direction in the drawing of the light-receiving surface of the photo diode 121e is illustrated, but this is for convenience of description, and the position may be other positions. A different incident angle directivity may be generated by a different position in the horizontal direction of the light-shielding film 121b indicated by the dashed-dotted line in the vertical direction.

<Regarding Incident Angle Directivity in Configuration Including On-Chip Lens>

The principle of occurrence of the incident angle directivity is heretofore described; and the incident angle directivity in the configuration including the on-chip lens 121c is herein described.

Figure 7:
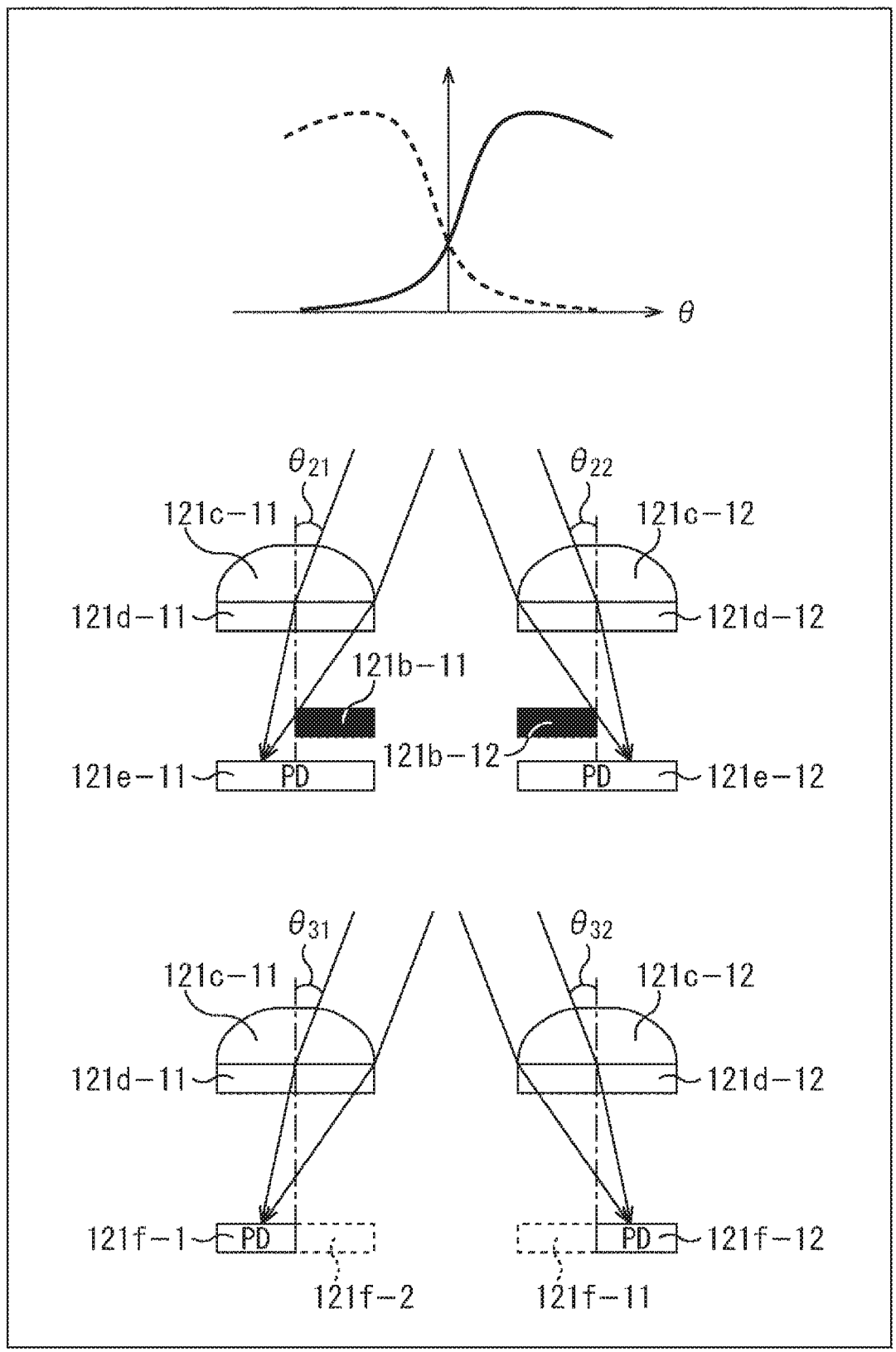
FIG. 7 is a view for illustrating a change in incident angle directivity using an on-chip lens.

That is, the incident angle directivity of each pixel in the imaging element 121 is set as illustrated in FIG. 7, for example, by using the on-chip lens 121c in addition to the above-described light-shielding film 121b. That is, in a middle left part of FIG. 7, an on-chip lens 121c-11 which condenses the incident light, a color filter 121d-11 which transmits light of a predetermined wavelength, and a photo diode 121e-11 which generates the pixel signal by photoelectric conversion are stacked in this order in the incident direction from the upper part in the drawing, and in a middle right part of FIG. 7, an on-chip lens 121c-12, a color filter 121d-12, and a photo diode 121e-12 are arranged in this order in the incident direction from the upper part in the drawing.

Note that, in a case where it is not necessary to distinguish between the on-chip lenses 121c-11 and 121c-12, between the color filters 121d-11 and 121d-12, and between the photo diodes 121e-11 and 121e-12, they are simply referred to as the on-chip lens 121c, the color filter 121d, and the photo diode 121e.

The imaging element 121 is further provided with light-shielding films 121b-11 and 121b-12 which light-shield a part of the region which receives the incident light as illustrated in the middle left part and the middle right part of FIG. 7.

As illustrated in the middle left part of FIG. 7, in a case where the light-shielding film 121b-11 which light-shields a right half of the photo diode 121e-11 in the drawing is provided, a detection signal level of the photo diode 121e-11 changes according to the incident angle θ of the incident light as indicated by a solid line waveform in an upper part of FIG. 7.

That is, the larger the incident angle θ being the angle formed by the incident light with respect to the dashed-dotted line in the central position of the photo diode 121e and the on-chip lens 121c and is perpendicular thereto (the larger the incident angle θ in a positive direction (the more this inclines rightward in the drawing)), the light is condensed in a range in which the light-shielding film 121b-11 is not provided, so that the detection signal level of the photo diode 121e-11 increases. In contrast, the smaller the incident angle θ (the larger the incident angle θ in a negative direction (the more this inclines leftward in the drawing)), the light is condensed in a range in which the light-shielding film 121b-11 is provided, so that the detection signal level of the photo diode 121e-11 decreases.

Note that, the incident angle θ is herein 0 degree in a case where the direction of the incident light coincides with the dashed-dotted line, the incident angle θ on an incident angle θ21 side in the middle left part of FIG. 7 at which the incident light from an upper right of the drawing is incident is a positive value, and the incident angle θ on an incident angle θ22 side in the middle right part of FIG. 7 is a negative value. Therefore, in FIG. 7, the incident angle of the incident light incident on the on-chip lens 121c from upper right is larger than that of the incident light incident from upper left. That is, the incident angle θ increases as a travel direction of the incident light inclines to right (increases in the positive direction) and decreases as this inclines to left (increases in the negative direction) in FIG. 7.

Furthermore, as illustrated in the middle right part of FIG. 7, in a case where the light-shielding film 121b-12 which light-shields a left half of the photo diode 121e-12 in the drawing is provided, a detection signal level of the photo diode 121e-12 changes according to the incident angle θ of the incident light as indicated by a dotted line waveform in the upper part of FIG. 7.

That is, as indicated by the dotted line waveform in the upper part of FIG. 7, the larger the incident angle θ being the angle formed by the incident light with respect to the dashed-dotted line in the central position of the photo diode 121e and the on-chip lens 121c and is perpendicular thereto (the larger the incident angle θ in the positive direction), the smaller the detection signal level of the photo diode 121e-12 because the light is condensed in the range in which the light-shielding film 121b-12 is provided. In contrast, the smaller the incident angle θ (the larger the incident angle θ in the negative direction), the larger the detection signal level of the photo diode 121e-12 because the light is incident on a range in which the light-shielding film 121b-12 is not provided.

Note that, in the upper part of FIG. 7, the incident angle θ is plotted along the abscissa, and the detection signal level in the photo diode 121e is plotted along the ordinate.

Since the solid line and dotted line waveforms indicating the detection signal levels according to the incident angle θ illustrated in the upper part of FIG. 7 may be changed according to the range of the light-shielding film 121b, it becomes possible to provide (set) the incident angle directivities different for each pixel. Note that, the solid line waveform in the upper part of FIG. 7 corresponds to a solid arrow indicating a state in which the incident light in a middle left part and a lower left part of FIG. 7 is condensed with the incident angle θ changed. Furthermore, the dotted line waveform in the upper part of FIG. 7 corresponds to a dotted arrow indicating a state in which the incident light in a middle right part and a lower right part of FIG. 7 is condensed with the incident angle θ changed.

The incident angle directivity herein is a characteristic of the detection signal level of each pixel according to the incident angle θ (light-receiving sensitivity characteristic), but this may also be a characteristic of a light-shielding value according to the incident angle θ in a case of the example in the middle part of FIG. 7. That is, the light-shielding film 121*b* shields the incident light in a specific direction at a high level, but cannot sufficiently shield the incident light in directions other than the specific direction. This change in shieldable level generates the detection signal level different according to the incident angle θ as illustrated in the upper part of FIG. 7. Therefore, when the direction in which the light-shielding at the highest level may be performed in each pixel is defined as the light-shielding direction of each pixel, having the different incident angle directivities in units of pixels means having the different light-shielding directions in units of pixels in other words.

Moreover, as illustrated in the lower left part of FIG. 7, by configuring such that two photo diodes 121*f*-1 and 121*f*-2 are provided for one on-chip lens 121*c*-11 (the two photo diodes 121*f*-1 and 121*f*-2 form the pixel output unit), it is possible to obtain the detection signal level the same as that in a state in which the right side of the photo diode 121*e*-11 is light-shielded in the middle left part of FIG. 7 by using the detection signal only of the photo diode 121*f*-1 in the left part of the drawing.

That is, the larger the incident angle θ being the angle formed by the incident light with respect to the dashed-dotted line in the central position of the on-chip lens 121*c* and perpendicular thereto (the larger the incident angle θ in the positive direction), the larger the detection signal level because the light is condensed in a range of the photo diode 121*f*-1 from which the detection signal is read out. In contrast, the smaller the incident angle θ (the larger the incident angle θ in the negative direction), the smaller the detection signal level because the light is condensed in a range of the photo diode 121*f*-2 from which the detection value is not read out.

Furthermore, similarly, as illustrated in the lower right part of FIG. 7, by configuring such that two photo diodes 121*f*-11 and 121*f*-12 are provided for one on-chip lens 121*c*-12, it is possible to obtain the detection signal of the output pixel unit at the same detection signal level as that in a state in which the left side of the photo diode 121*e*-12 is light-shielded in the middle right part of FIG. 7 by using the detection signal only of the photo diode 121*f*-12 in the right part of the drawing.

That is, the larger the incident angle θ being the angle formed by the incident light with respect to the dashed-dotted line in the central position of the on-chip lens 121*c* and perpendicular thereto (the larger the incident angle θ in a positive direction), the smaller the detection signal level of the detection signal of the output pixel unit because the light is condensed in a range of the photo diode 121*f*-11 the detection signal of which does not contribute to the detection signal of the output pixel unit. In contrast, the smaller the incident angle θ (the larger the incident angle θ in the negative direction), the larger the detection signal level of the detection signal of the output pixel unit because the light is condensed in a range of the photo diode 121*f*-12 the detection signal of which contributes to the detection signal of the output pixel unit.

Note that, as for the incident angle directivity, it is desirable that randomness is higher. This is because, for example, if adjacent pixels have the same incident angle directivity, equations (1) to (3) described above or equations (4) to (6) to be described later might be mutually the same equations, and a relationship between an unknown number as a solution of the simultaneous equations and the number of equations is not satisfied, so that a pixel value forming the restored image might not be obtained. Furthermore, in the configuration illustrated in the middle part of FIG. 7, one photo diode 121*e*-11 and one photo diode 121*e*-12 are formed in the pixel 121*a*. In contrast, in the configuration illustrated in the lower part of FIG. 7, two photo diodes 121*f*-1 and 121*f*-2 and two photo diodes 121*f*-11 and 121*f*-12 are formed in the pixel 121*a*. Therefore, for example, in the lower part of FIG. 7, a single photo diode 121*f* does not form one pixel.

Furthermore, as illustrated in the lower part of FIG. 7, in a case where a plurality of photo diodes 121*f* forms one pixel output unit, it may be regarded that the output pixel value of the pixel output unit is modulated according to the incident angle. Therefore, the characteristic of the output pixel value (incident angle directivity) may be made different for each pixel output unit, and the incident angle directivity in one pixel output unit is set. Moreover, in a case where a plurality of photo diodes 121*f* forms one pixel output unit, one on-chip lens 121*c* is an essential component for one pixel output unit in order to generate the incident angle directivity in one pixel output unit.

Furthermore, as illustrated in the upper part of FIG. 7, in a case where each of one photo diode 121*e*-11 or one photo diode 121*e*-12 forms one pixel output unit, the incident light on one photo diode 121*e*-11 or one photo diode 121*e*-12 forming one pixel output unit is modulated according to the incident angle, so that the output pixel value is modulated as a result. Therefore, the characteristic of the output pixel value (incident angle directivity) may be made different, and the incident angle directivity in one pixel output unit is set. Moreover, in a case where each of one photo diode 121*e*-11 or one photo diode 121*e*-12 forms one pixel output unit, the incident angle directivity is set at the time of manufacture independently by the light-shielding film 121*b* provided for each pixel output unit.

Furthermore, as illustrated in the lower part of FIG. 7, in a case where a plurality of photo diodes 121*f* forms one pixel output unit, the number of a plurality of photo diodes 121*f* for setting the incident angle directivity for each pixel output unit (division number of photo diodes 121*f* forming one pixel output unit) and the position thereof are set at the time of manufacture independently for each pixel output unit, and moreover, it is possible to switch at the time of imaging the photo diode 121*f* to be used to set the incident angle directivity out of them.

<Setting of Incident Angle Directivity>

Figure 8:
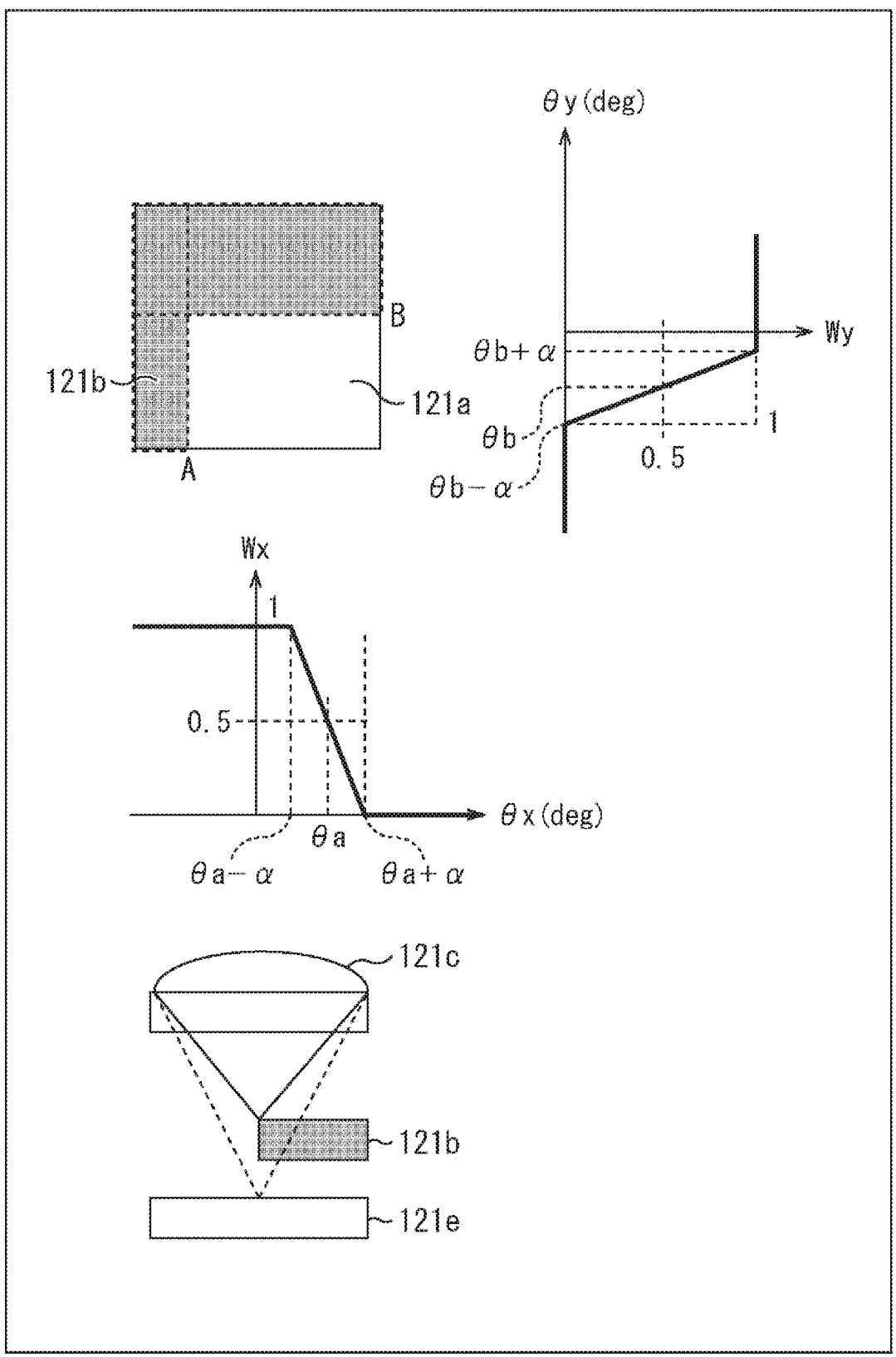
FIG. 8 is a view for illustrating a design of the incident angle directivity.

For example, as illustrated in an upper part of FIG. 8, a set range of the light-shielding film 121*b* is made a range from a left end to a position A in the horizontal direction in the pixel 121*a*, and a range from an upper end to a position B in the vertical direction.

In this case, a weight Wx of 0 to 1 in the horizontal direction serving as an index of the incident angle directivity according to an incident angle θx(deg) from the central position in the horizontal direction of each pixel is set. In further detail, in a case where it is assumed that the weight Wx is 0.5 at the incident angle θx=θa corresponding to the position A, a weight Wh is set such that the weight Wx is 1 at the incident angle θx<θa−α, (−(θx−θa)/2α+1/2) at θa−α incident angle θx≤θa+α, and 0 at the incident angle θx>θa+α. Note that, although an example in which the weight Wh is 0, 0.5, and 1 is herein described, the weight Wh becomes 0, 0.5, and 1 when an ideal condition is satisfied.

Similarly, a weight Wy of 0 to 1 in the vertical direction serving as the index of the incident angle directivity according to an incident angle θy(deg) from the central position in the vertical direction of each pixel is set. In further detail, in a case where it is assumed that the weight Wv is 0.5 at the incident angle θy=θb corresponding to the position B, the weight Wy is set such that the weight Wy is 0 at the incident angle θy<θb−α, ((θy−θb)/2α+1/2) at θb−α≤incident angle θy≤θb+α, and 1 at the incident angle θy>θb+α.

Then, by using the weights Wx and Wy obtained in this manner, it is possible to obtain coefficients (coefficient set) corresponding to the incident angle directivity, that is, the light-receiving sensitivity characteristic of each pixel 121a.

Furthermore, at that time, an inclination (1/2α) indicating a change in weight in a range in which the weight Wx in the horizontal direction and the weight Wy in the vertical direction are around 0.5 may be set by using the on-chip lenses 121c having different focal distances.

In other words, different focal distances may be obtained by using the on-chip lenses 121c having different curvatures.

For example, by using the on-chip lenses 121c having the different curvatures, when it is condensed such that the focal distance is on the light-shielding film 121b as indicated by a solid line in the lower part of FIG. 8, the inclination (1/2α) becomes steep. That is, the weight Wx in the horizontal direction and the weight Wy in the vertical direction in the upper part of FIG. 8 drastically change to 0 or 1 in the vicinity of a boundary of the incident angle θx=θa in the horizontal direction and the incident angle θy=θb in the vertical direction where the values are near 0.5.

Furthermore, for example, by using the on-chip lenses 121c having the different curvatures, when it is condensed such that the focal distance is on the photo diode 121e as indicated by a dotted line in the lower part of FIG. 8, the inclination (1/2α) is mild. That is, the weight Wx in the horizontal direction and the weight Wy in the vertical direction in the upper part of FIG. 8 mildly change to 0 or 1 in the vicinity of a boundary of the incident angle θx=θa in the horizontal direction and the incident angle θy=θb in the vertical direction where the values are near 0.5.

As described above, by making the different focal distances by using the on-chip lenses 121c having the different curvatures, it is possible to obtain different incident angle directivities, that is, different light-receiving sensitivity characteristics.

Therefore, the incident angle directivity of the pixel 121a may be set to different values by making the range in which the photo diode 121e is light-shielded by the light-shielding film 121b and the curvature of the on-chip lens 121c different. Note that, the curvature of the on-chip lens may be the same for all the pixels in the imaging element 121, or may be different for some pixels.

<Difference Between On-Chip Lens and Imaging Lens>

As described above, the imaging element 121 does not require the imaging lens. However, the on-chip lens 121c is necessary at least in a case of realizing the incident angle directivity by using a plurality of photo diodes in the pixel as described with reference to FIG. 5. The on-chip lens 121c and the imaging lens have different physical actions.

The imaging lens has a condensing function for allowing the incident light incident in the same direction to be incident on a plurality of adjacent pixels. In contrast, light passing through the on-chip lens 121c is incident only on the light-receiving surface of the photo diode 121e or 121f forming one corresponding pixel. In other words, the on-chip lens 121c is provided for each pixel output unit, and condenses the subject light incident thereon on only the corresponding pixel output unit. That is, the on-chip lens 121c does not have the condensing function for allowing diffused light emitted from a virtual point light source to be incident on a plurality of adjacent pixels.

<Relationship in Distance Between Subject Surface and Imaging Element>

Next, a relationship in distance between the subject surface and the imaging element 121 is described with reference to FIG. 9.

Figure 9:
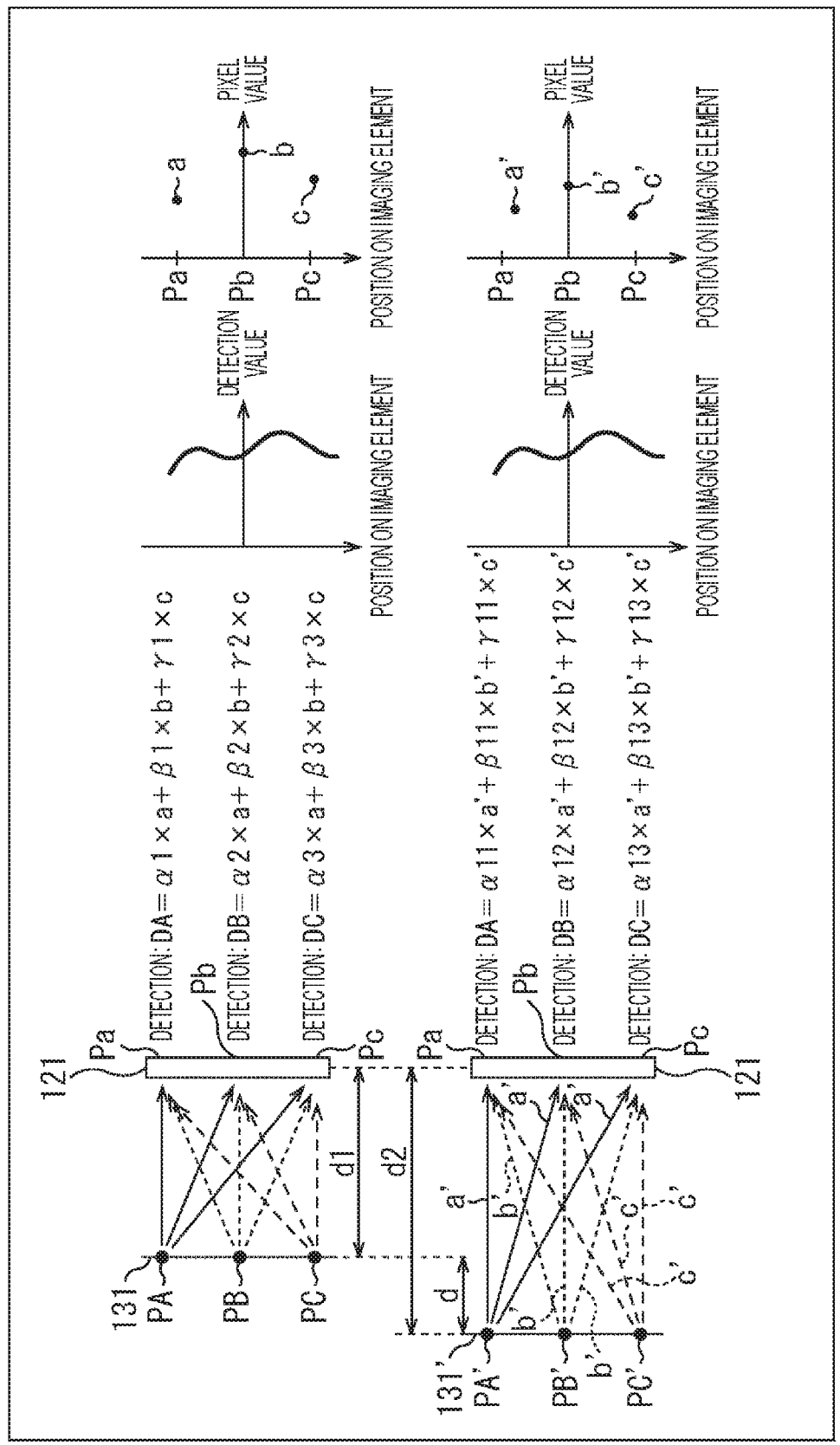
FIG. 9 is a view for illustrating a relationship between a subject distance and a coefficient indicating the incident angle directivity.

As illustrated in an upper left part of FIG. 9, in a case where a subject distance between the imaging element 121 and the subject surface 131 is a distance d1, for example, when the point light sources PA, PB, and PC on the subject surface 131 are set, the detection signal levels DA, DB, and DC in the positions Pa, Pb, and Pc on the corresponding imaging element 121 may be expressed by the same equations as equations (1) to (3) described above.

$$DA = \alpha1 \times a + \beta1 \times b + \gamma1 \times c \tag{1}$$

$$DB = \alpha2 \times a + \beta2 \times b + \gamma2 \times c \tag{2}$$

$$DC = \alpha3 \times a + \beta3 \times b + \gamma3 \times c \tag{3}$$

In contrast, as illustrated in a lower left part of FIG. 9, in a case of a subject surface 131' with a subject distance from the imaging element 121 being a distance d2 longer than the distance d1 by d, that is, a case of the subject surface 131' on a back side of the subject surface 131 as seen from the imaging element 121, the detection signal level is similar as for the detection signal levels DA, DB, and DC as illustrated in an upper central part and a lower central part of FIG. 9.

However, in this case, light beams having light intensities a', b', and c' from point light sources PA', PB', and PC' on the subject surface 131' are received by the respective pixels of the imaging element 121. At that time, since the incident angles of the light beams having the light intensities a', b', and c' received on the imaging element 121 are different (change), different coefficient sets are required, and the detection signal levels DA, DB, and DC in the positions Pa, Pb, and Pc, respectively, are expressed as expressed in following equations (4) to (6), for example.

[Mathematical Equation 2]

$$DA = \alpha11 \times a' + \beta11 \times b' + \gamma11 \times c' \tag{4}$$

$$DB = \alpha12 \times a' + \beta12 \times b' + \gamma12 \times c' \tag{5}$$

$$DC = \alpha13 \times a' + \beta13 \times b' + \gamma13 \times c' \tag{6}$$

Here, a coefficient set group including a coefficient set α11, β11, and γ11, a coefficient set α12, β12, and γ12, and a coefficient set α13, β13, and γ13 is the coefficient set group of the subject surface 131' corresponding to the coefficient set α1, β1, and γ1, the coefficient set α2, β2, and γ2, and the coefficient set α3, β3, and γ3 of the subject surface 131.

Therefore, by solving equations (4) to (6) using the coefficient set group α11, β11, γ11, α12, β12, γ12, α13, β13, and γ13 set in advance, it becomes possible to obtain the light intensities (a', b', and c') of the light beams from the point light sources PA', PB', and PC', respectively, as illustrated in a lower right part of FIG. 9 in a manner similar to that when obtaining the light intensities (a, b, and c) of the light beams from the point light sources PA, PB, and PC in a case of the subject surface 131 illustrated in an upper right part of FIG. 9, and as a result, a restored image of a subject of the subject surface 131' may be obtained.

That is, in the imaging device 100 in FIG. 1, by storing in advance the coefficient set group for each distance from the imaging element 121 to the subject surface, and creating the simultaneous equations while switching the coefficient set groups to solve the created simultaneous equations, it is possible to obtain the restored images of the subject surfaces at various subject distances on the basis of one detection image.

That is, only by imaging the detection image once, it is possible to generate the restored image at an arbitrary distance by switching the coefficient set group according to the distance to the subject surface to obtain the restored image in later processing.

Furthermore, in a case where it is desired to recognize an image or obtain a characteristic of the subject in a visible image and other than the visible image, it is possible to apply machine learning such as deep learning and the like to the detection signal of the imaging element to perform image recognition by using the detection signal itself without performing the image recognition on the basis of the restored image after obtaining the restored image.

Furthermore, in a case where the subject distance and a field of view may be specified, it is also possible to generate the restored image by using the detection image including the detection signal of the pixel having the incident angle directivity suitable for the imaging of the subject surface corresponding to the specified subject distance and field of view without using all the pixels. By doing so, it is possible to obtain the restored image by using the detection signal of the pixel suitable for the imaging of the subject surface corresponding to the specified subject distance and field of view.

Figure 10:
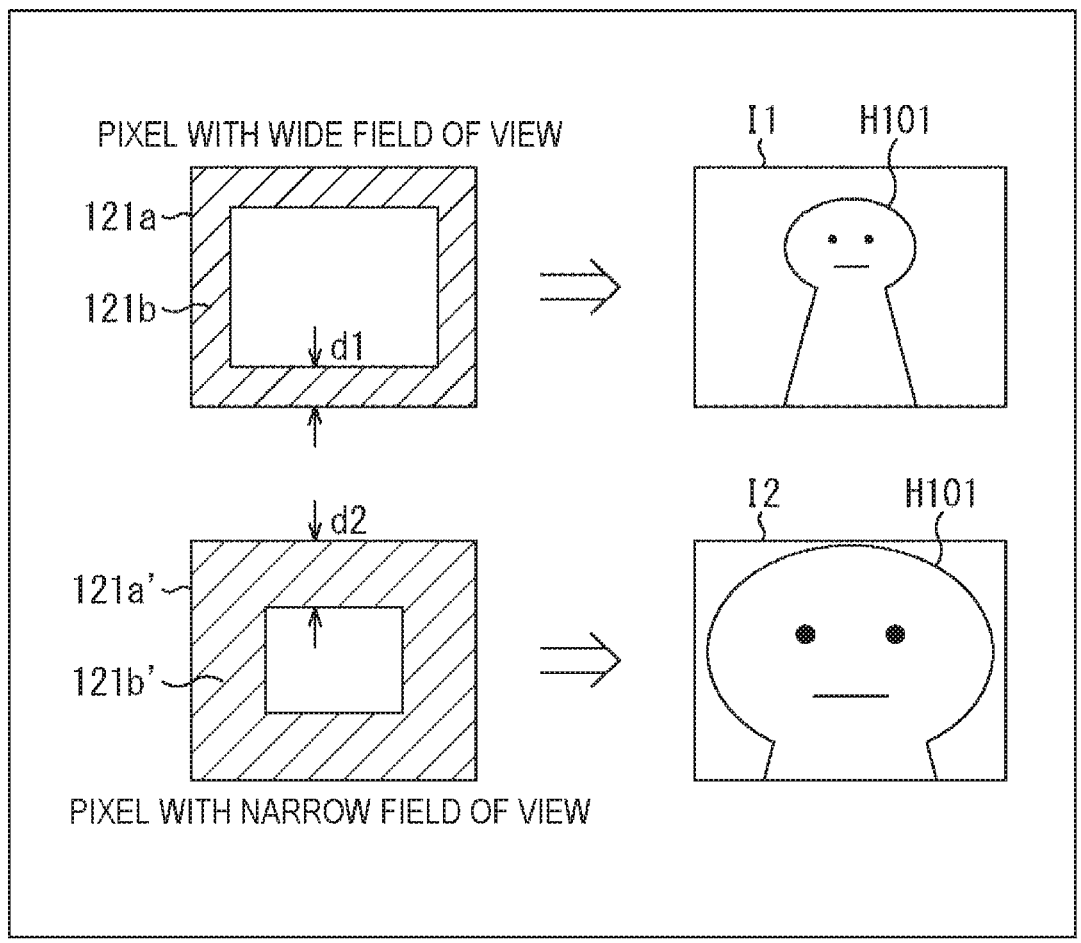
FIG. 10 is a view for illustrating a relationship between a pixel with narrow field of view and a pixel with wide field of view.

For example, the pixel 121a light-shielded by the light-shielding film 121b by a width d1 from each end of four sides as illustrated in an upper part of FIG. 10 and a pixel 121a' light-shielded by the light-shielding film 121b by a width d2(>d1) from each end of four sides as illustrated in a lower part of FIG. 10 are considered.

Figure 11:
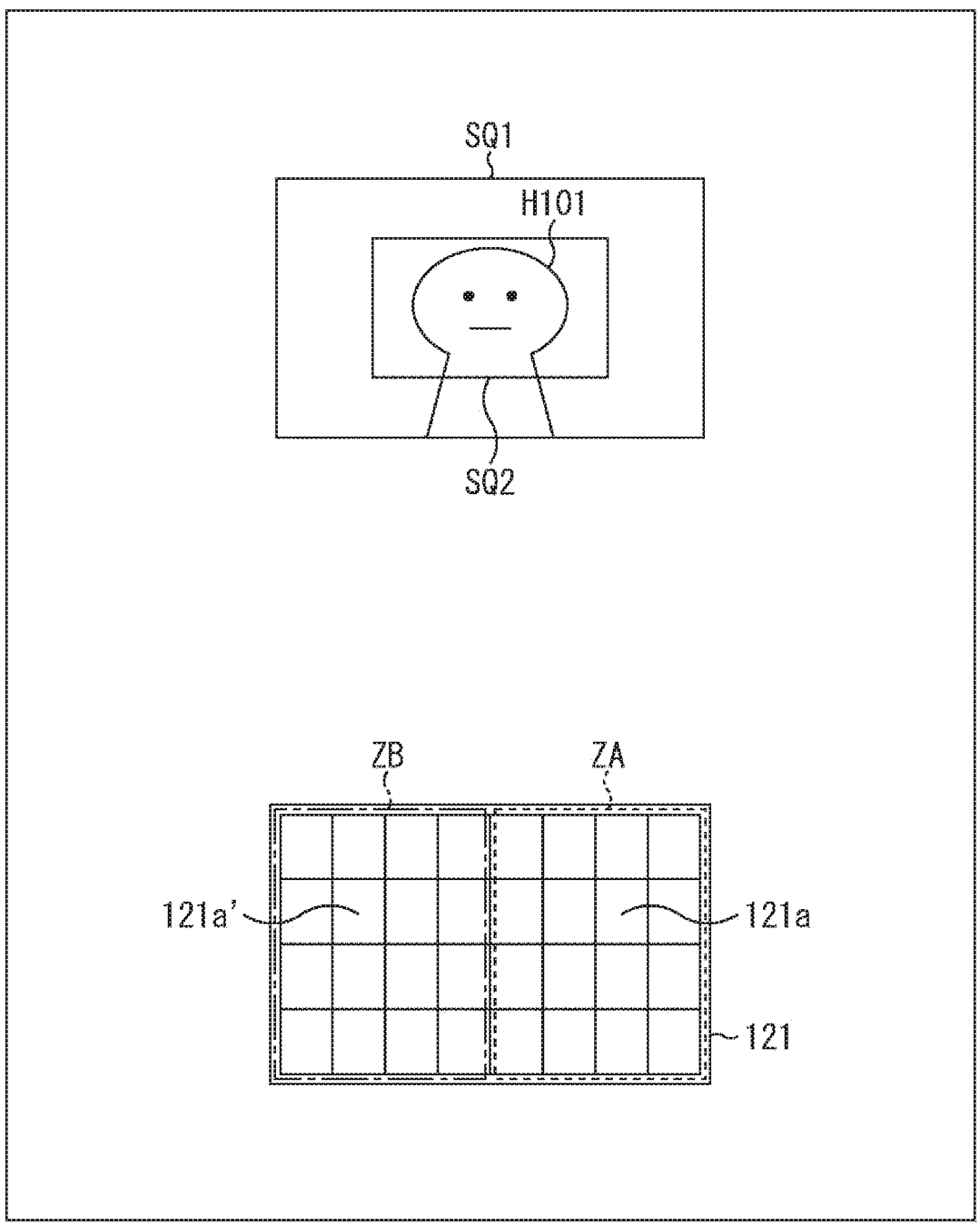
FIG. 11 is a view for illustrating a relationship between a pixel with narrow field of view and a pixel with wide field of view.

The pixel 121a is used, for example, for restoring an image I1 in FIG. 10 corresponding to a field of view SQ1 including an entire person H101 as the subject as illustrated in an upper part of FIG. 11. In contrast, the pixel 121a' is used, for example, for restoring an image I2 in FIG. 10 corresponding to a field of view SQ2 in which a periphery of a face of the person H101 as the subject is zoomed up as illustrated in an upper part of FIG. 11.

Figure 12:
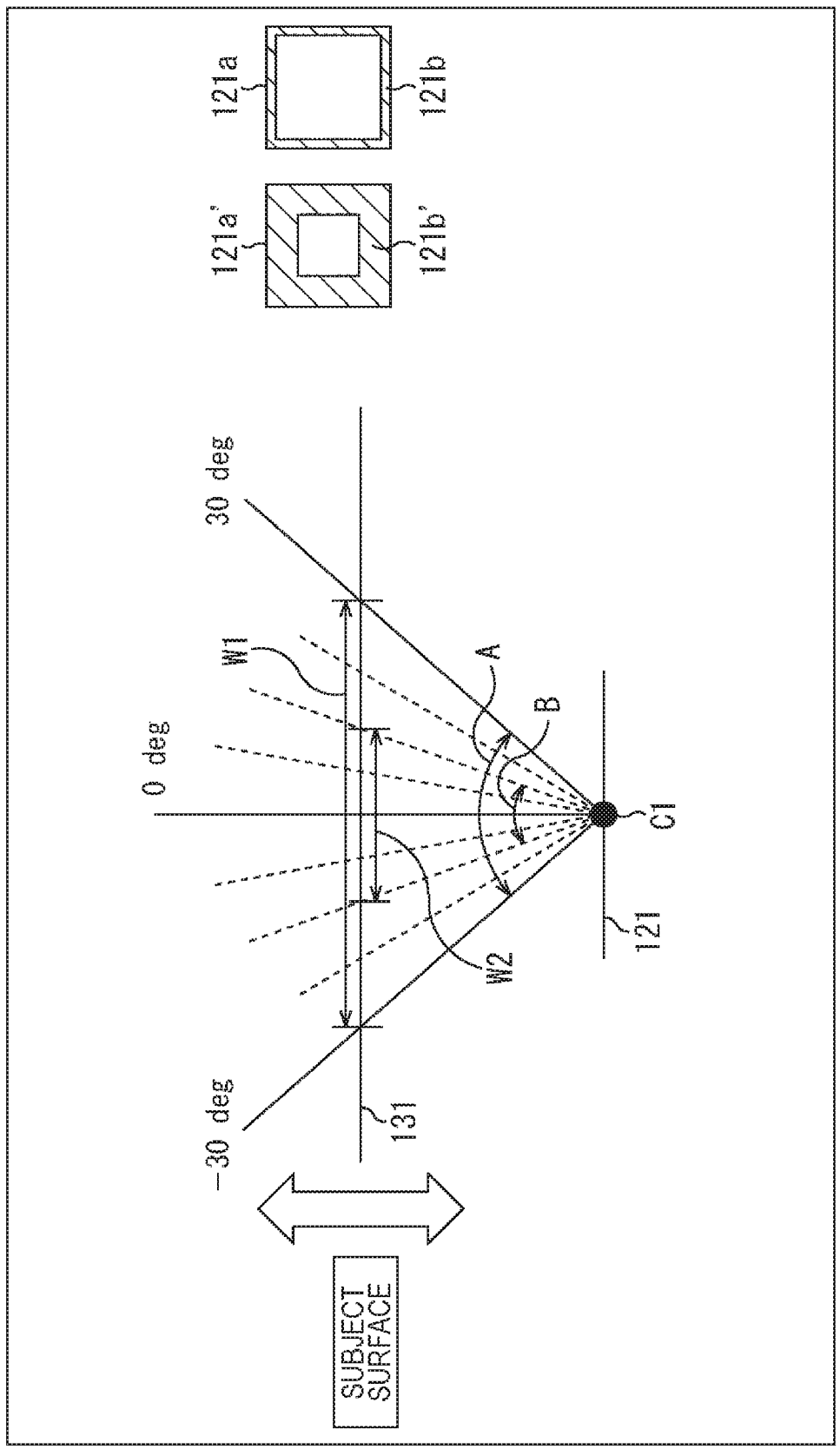
FIG. 12 is a view for illustrating a relationship between a pixel with narrow field of view and a pixel with wide field of view.

This is because the pixel 121a in FIG. 10 has an incident angular range A of the incident light for the imaging element 121 as illustrated in a left part of FIG. 12, so that the incident light by a subject width W1 in the horizontal direction may be received on the subject surface 131.

In contrast, since the pixel 121a' in FIG. 10 has a larger light-shielded range than the pixel 121a in FIG. 10, this has an incident angular range B (<A) of the incident light for the imaging element 121 as illustrated in the left part of FIG. 12, so that the incident light by a subject width W2 (<W1) in the horizontal direction is received on the subject surface 131.

That is, the pixel 121a in FIG. 10 having a narrow light-shielded range is the pixel with wide field of view suitable for imaging a wide range on the subject surface 131, whereas the pixel 121a' in FIG. 10 having a wide light-shielded range is the pixel with narrow field of view suitable for imaging a narrow range on the subject surface 131. Note that, the pixel with wide field of view and the pixel with narrow field of view here are expressions to compare both the pixels 121a and 121a' in FIG. 10, and are not limited when comparing pixels of other fields of view.

Note that, FIG. 12 illustrates a relationship between a position on the subject surface 131 and the incident angle of the incident light from each position with respect to the center position C1 of the imaging element 121. Furthermore, FIG. 12 illustrates the relationship between the position on the subject surface 131 and the incident angle of the incident light from each position on the subject surface 131 in the horizontal direction, and this is the similar relationship also in the vertical direction. Moreover, in a right part of FIG. 12, the pixels 121a and 121a' in FIG. 10 are illustrated.

With such a configuration, as illustrated in a lower part of FIG. 11, in a case of collecting the predetermined number of pixels 121a in FIG. 10 in a range ZA surrounded by a dotted line and collecting the predetermined number of pixels 121a' in FIG. 10 in a range ZB surrounded by a dashed-dotted line in the imaging element 121, when restoring the image with the field of view SQ1 corresponding to the subject width W1, it is possible to appropriately restore the image of the subject width W1 of the subject surface 131 by using the pixel 121a in FIG. 10 for imaging the field of view SQ1.

Similarly, when restoring the image with the field of view SQ2 corresponding to the subject width W2, it is possible to appropriately restore the image of the subject width W2 by using the detection signal level of the pixel 121a' in FIG. 10 for imaging the field of view SQ2.

Note that, in the lower part of FIG. 11, a configuration in which the predetermined number of pixels 121a' are provided on a left side in the drawing and the predetermined number of pixels 121a are provided on a right side is illustrated; however, this is illustrated as an example of simplifying the description, and it is desired that the pixels 121a and 121a' are randomly arranged in a mixed manner.

In this manner, since the field of view SQ2 is narrower than the field of view SQ1, in a case of restoring the images with the field of view SQ2 and the field of view SQ1 with the same predetermined number of pixels, it is possible to obtain the restored image with a higher image quality when restoring the image with the field of view SQ2 being a narrower field of view than when restoring the image of the field of view SQ1.

That is, in a case where it is considered to obtain the restored image using the same number of pixels, it is possible to obtain the restored image with the higher image quality when restoring the image with narrower field of view.

Note that, in a case where the image with wide field of view is obtained as the restored image, all the pixels with wide field of view may be used, or a part of the pixels with wide field of view may be used. Furthermore, in a case where the image with narrow field of view is obtained as the restored image, all the pixels with narrow field of view may be used, or a part of the pixels with narrow field of view may be used.

By using the imaging element 121 as described above, as a result, the imaging lens, the optical element such as the diffraction grating and the like, the pinhole and the like are not required (free from the imaging lens), so that it becomes possible to improve a degree of freedom in design of the device, and it is possible to make the device compact in the incident direction of the incident light, thereby reducing a manufacturing cost. Furthermore, a lens corresponding to the imaging lens for forming an optical image such as a focus lens becomes unnecessary.

Moreover, by using the imaging element 121, it becomes possible to generate the restored images of various subject distances and fields of view only by obtaining the detection image, by solving the simultaneous equations established by selectively using the coefficient set group corresponding to the subject distance and the field of view to obtain the restored image in later processing.

Moreover, since the imaging element 121 may have the incident angle directivity in units of pixels, it is possible to realize an increase in pixels as compared with the optical filter including the diffraction grating, the conventional imaging element and the like, and obtain the restored image at high resolution and high angular resolution. In contrast, in the imaging device including the optical filter and the conventional imaging element, it is difficult to realize the high resolution restored image and the like because it is difficult to miniaturize the optical filter even if the pixels are miniaturized.

Furthermore, since the imaging element 121 does not require the optical filter and the like including the diffraction grating, a use environment does not become high and the optical filter is not distorted by heat. Therefore, by using such imaging element 121, it is possible to realize a device with high environmental resistance.

<First Variation>

In the right part of FIG. 3, as the configuration of the light-shielding film 121b in each pixel 121a of the imaging element 121, the example of entirely light-shielding in the vertical direction and allowing the incident angle directivities to be different in the horizontal direction by changing the light-shielding width and position in the horizontal direction is illustrated; however, the configuration of the light-shielding film 121b is not limited to this example. For example, it is possible to light-shield entirely in the horizontal direction and change the width (height) and position in the vertical direction, thereby making the incident angle directivities in the vertical direction different.

Note that, as in the example illustrated in the right part of FIG. 3, the light-shielding film 121b which light-shields the entire pixel 121a in the vertical direction and light-shields the pixel 121a with a predetermined width in the horizontal direction is referred to as a lateral band-type light-shielding film 121b. In contrast, the light-shielding film 121b which light-shields the entire pixel 121a in the horizontal direction and light-shields the pixel 121a by a predetermined height in the vertical direction is referred to as a longitudinal band-type light-shielding film 121b.

Figure 13:
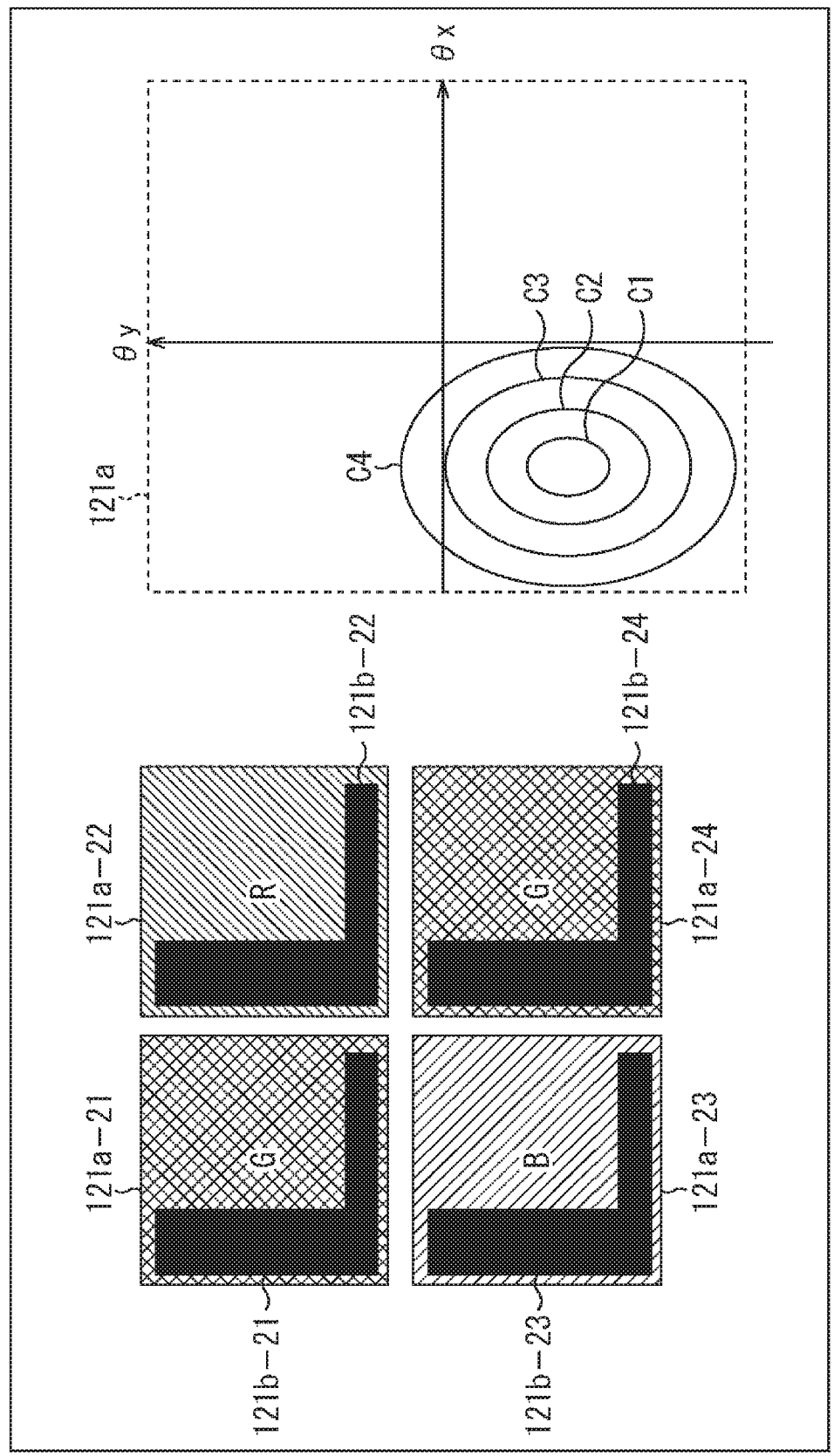
FIG. 13 is a view for illustrating a variation.

Furthermore, as in the example illustrated in a left part of FIG. 13, it is also possible to combine the longitudinal band-type and lateral band-type light-shielding films 121b to provide an L-shaped light-shielding film 121b on the pixel 121a. In the left part of FIG. 13, a part in black is the light-shielding film 121b. That is, light-shielding films 121b-21 to 121b-24 are the light-shielding films of pixels 121a-21 to 121a-24, respectively.

Each of these pixels (pixels 121a-21 to 121a-24) has the incident angle directivity as illustrated in a right part of FIG. 13. A graph in the right part of FIG. 13 illustrates light-receiving sensitivity in each pixel. An incident angle θx in the horizontal direction (x direction) of incident light is plotted along the abscissa, and an incident angle θy in the vertical direction (y direction) of the incident light is plotted along the ordinate. Then, the light-receiving sensitivity within a range C4 is higher than that outside the range C4, the light-receiving sensitivity within a range C3 is higher than that outside the range C3, the light-receiving sensitivity within a range C2 is higher than that outside the range C2, and the light-receiving sensitivity within a range C1 is higher than that outside the range C1.

Therefore, for each pixel, it is illustrated that a detection signal level of the incident light which satisfies conditions of the incident angle θx in the horizontal direction (x direction) and the incident angle θy in the vertical direction (y direction) within the range C1 is the highest, and the detection signal level decreases in the order of the conditions in the range C2, in the range C3, in the range C4, and the range other than the range C4. Such intensity of the light-receiving sensitivity is determined by the range light-shielded by the light-shielding film 121b.

Furthermore, in the left part of FIG. 13, an alphabet in each pixel 121a indicates a color of a color filter (this is illustrated for convenience of description and is not actually written). The pixel 121a-21 is a G pixel in which a green color filter is arranged, the pixel 121a-22 is an R pixel in which a red color filter is arranged, the pixel 121a-23 is a B pixel in which a blue color filter is arranged, and the pixel 121a-24 is a G pixel in which a green color filter is arranged. That is, these pixels form a Bayer array. It goes without saying that this is an example, and an arrangement pattern of the color filters is arbitrary. The arrangement of the light-shielding films 121b and the color filters have no relationship. For example, in a part or all of the pixels, a filter other than the color filter may be provided, or it is possible that no filter is provided.

In the left part of FIG. 13, an example in which the "L-shaped" light-shielding film 121b light-shields a left side and a lower side in the drawing of the pixel 121a is illustrated, but a direction of this "L-shaped" light-shielding film 121b is arbitrary, and is not limited to that in the example in FIG. 13. For example, the "L-shaped" light-shielding film 121b may light-shield the lower side and a right side in the drawing of the pixel 121a, or may light-shield the right side and an upper side in the drawing of the pixel 121a, or may light-shield the upper side and the left side in the drawing of the pixel 121a. It goes without saying that the direction of the light-shielding film 121b may be set independently for each pixel. Note that, the "L-shaped" light-shielding film 121b is also collectively referred to as the "L-shaped type light-shielding film 121b".

Although the light-shielding film is described above, the description of this example may also be applied to a case of providing (set) the incident angle directivity by selectively using a plurality of photo diodes arranged in the pixel. That is, for example, by appropriately setting a division position (size and shape of each partial region), and a position, a size, a shape and the like of each photodiode, or appropriately selecting the photodiode, the incident light directivity equivalent to the incident light directivity by the above-described L-shaped type light-shielding film 121b may be realized.

<Second Variation>

Figure 14:
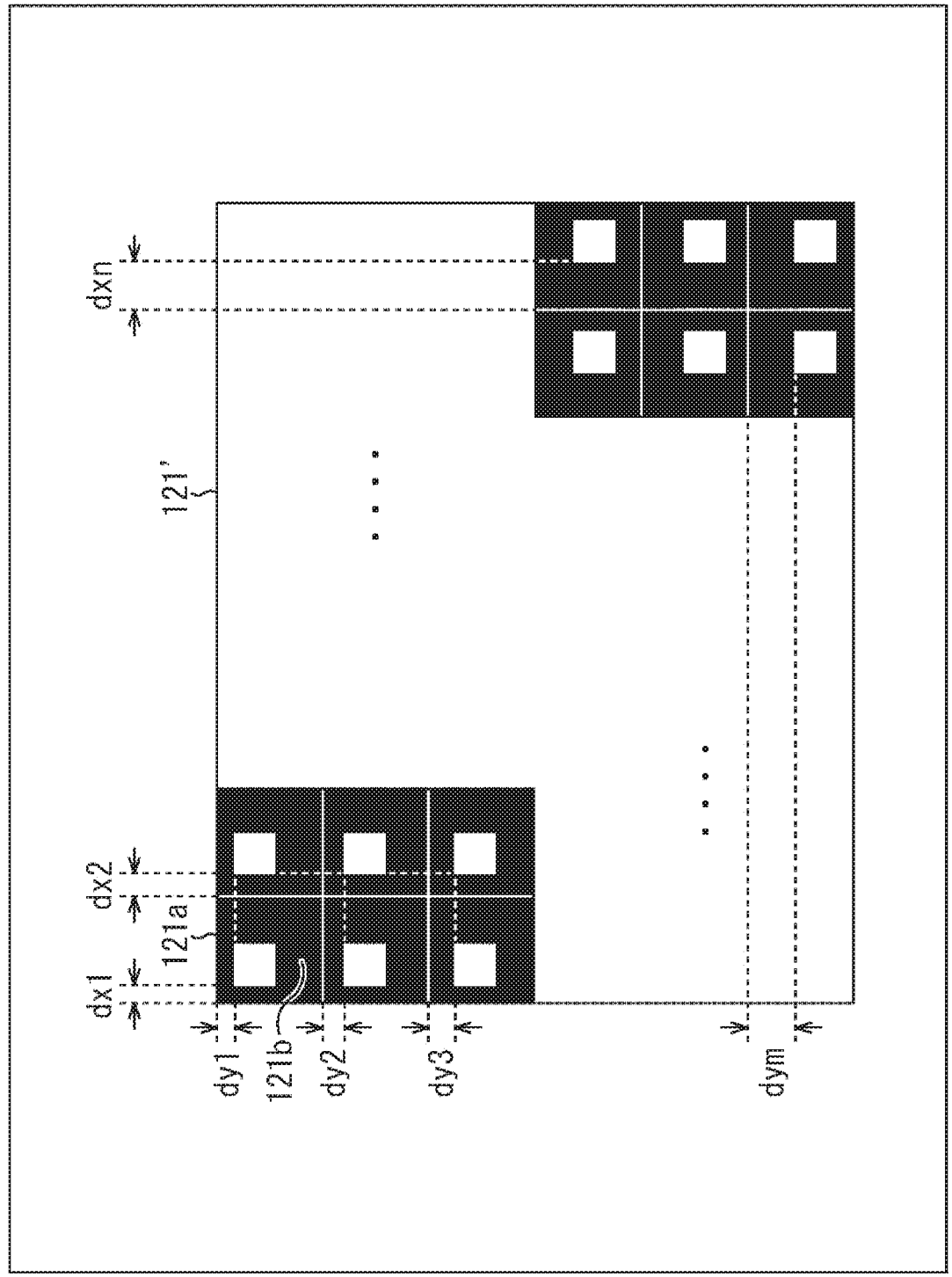
FIG. 14 is a view for illustrating the variation.

In the description above, the example in which the lateral band-type, the longitudinal band-type, and the L-shaped type light-shielding film is arranged in each pixel such that the light-shielded range randomly changes is described; however, for example, it is also possible to form a light-shielding film 121b (range in black in the drawing) which light-shields a range other than a range in the vicinity of a position in which a light beam is received in each pixel in a case where a rectangular opening is provided as illustrated in the imaging element 121' in FIG. 14.

That is, it is possible to provide, for each pixel, the light-shielding film 121b so as to have an incident angle directivity to receive only a light beam received through the rectangular opening out of the light beams emitted from a point light source forming a subject surface at a predetermined subject distance in a case where the rectangular opening is provided.

Note that, in FIG. 14, for example, a width in the horizontal direction of the light-shielding film 121b changes to widths dx1, dx2, . . . , and dxn in pixel arrangement in the horizontal direction, and a relationship dx1<dx2< . . . <dxn is satisfied. Similarly, a height in the vertical direction of the light-shielding film 121b changes to heights dy1, dy2, . . . , and dym in the pixel arrangement in the vertical direction, and a relationship dy1<dy2< . . . <dxm is satisfied. Furthermore, an interval in change of the width in the horizontal direction and the width in the vertical direction of the light-shielding film 121*b* depends on subject resolution (angular resolution) to be restored.

In other words, a configuration of each pixel 121*a* in the imaging element 121' in FIG. 14 is provided with the incident angle directivity so as to change the light-shielded range so as to correspond to the pixel arrangement in the imaging element 121' in the horizontal direction and the vertical direction.

Figure 15:
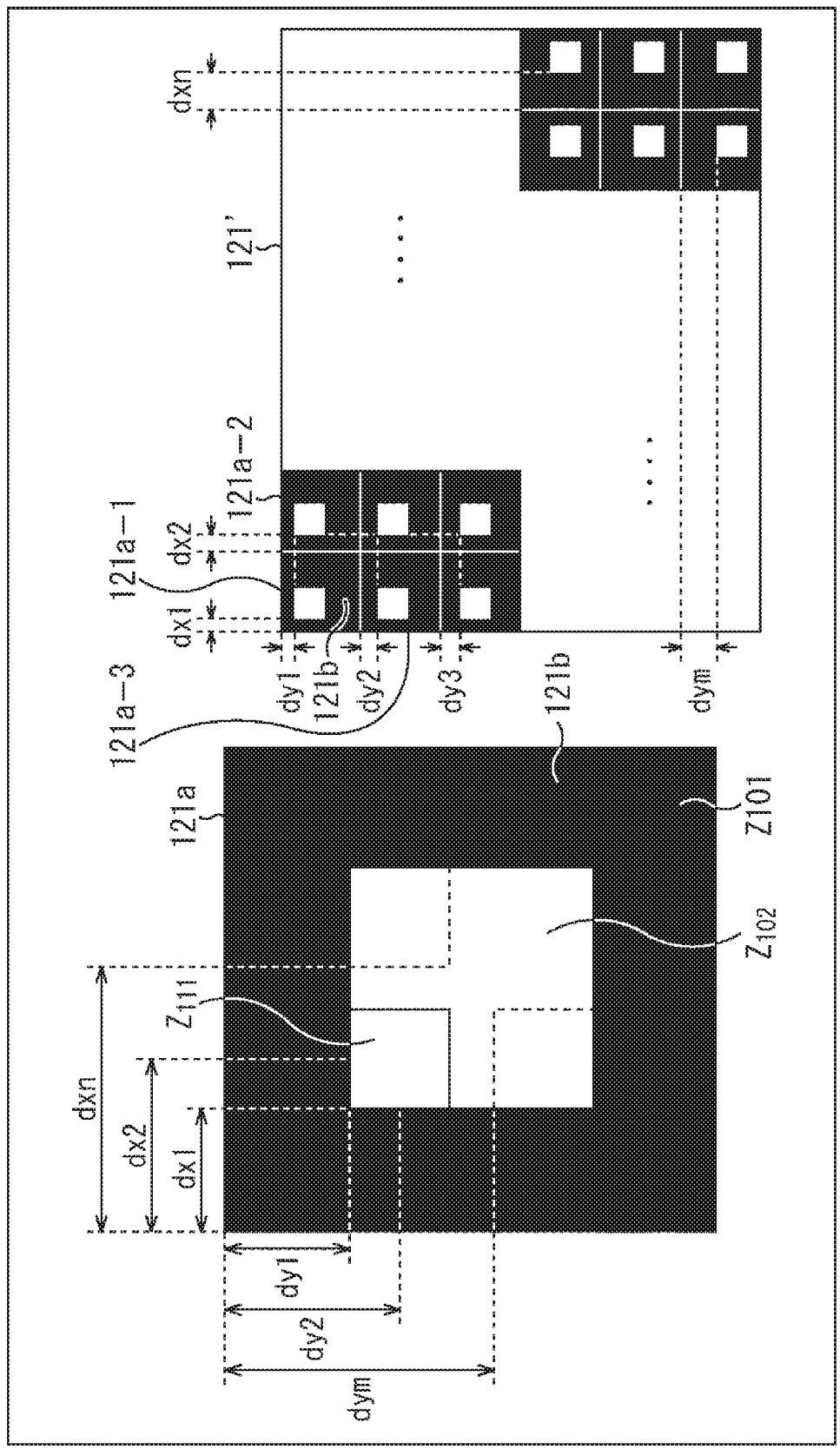
FIG. 15 is a view for illustrating the variation.

In further detail, the light-shielded range of each pixel 121*a* in FIG. 14 is determined, for example, according to a rule described by using the pixel 121*a* illustrated in a left part of FIG. 15.

Note that, a right part of FIG. 15 illustrates a configuration of the same imaging element 121' as that in FIG. 14. Furthermore, the left part of FIG. 15 illustrates the configuration of the pixel 121*a* of the imaging element 121' in the right part of FIG. 15 (the same as FIG. 14).

As illustrated in the left part of FIG. 15, it is light-shielded by the light-shielding film 121*b* by the width dx1 from upper and lower side ends of the pixel 121*a* to the inside of the pixel 121*a*, and it is light-shielded by the light-shielding film 121*b* by the height dy1 from left and right side ends to the inside of the pixel 121*a*. Note that, in FIGS. 15 and 16, the light-shielding film 121*b* is a range in black.

In the left part of FIG. 15, a range light-shielded by the light-shielding film 121*b* formed in this manner is hereinafter referred to as a main light-shielded portion 2101 (in black in the left part of FIG. 15) of the pixel 121*a*, and a square range other than this is referred to as a range 2102.

In the pixel 121*a*, a rectangular opening 2111 not light-shielded by the light-shielding film 121*b* is provided in the range 2102. Therefore, in the range 2102, a range other than the rectangular opening 2111 is light-shielded by the light-shielding film 121*b*.

As illustrated in the right part of FIG. 15 (the same as FIG. 14), the pixel arrangement in the imaging element 121' in FIG. 14 is such that, in a pixel 121*a*-1 on a left end and an upper end, the rectangular opening 2111 is arranged at such a distance that a left side thereof is at the width dx1 from the left side of the pixel 121*a* and an upper side thereof is at dy1 from the upper side of the pixel 121*a*.

Similarly, a pixel 121*a*-2 to the right of the pixel 121*a*-1 has a configuration in which the rectangular opening 2111 is arranged at such a distance that the left side thereof is at the width dx2 from the left side of the pixel 121*a* and the upper side thereof is at the height dy1 from the upper side of the pixel 121*a* and the range other than the rectangular opening 2111 is light-shielded by the light-shielding film 121*b*.

Hereinafter, similarly, in the pixels 121*a* adjacent in the horizontal direction, a right side of the rectangular opening Z111 moves from a right side of the pixel 121*a* by the widths dx1, dx2, . . . , and dxn as the arrangement shifts rightward in the drawing. Note that, a dotted square portion in an upper right part in the range 2102 in FIG. 15 illustrates a state in which the rectangular opening 2111 is arranged at such a distance that the left side thereof is at the width dxn from the left side of the pixel 121*a* and the upper side thereof is at the height dy1 from the upper side of the pixel 121*a*. Furthermore, an interval between the widths dx1, dx2, . . . , and dxn is a value obtained by dividing a width obtained by subtracting a width of the rectangular opening 2111 from a width in the horizontal direction of the range 2102 by the number of pixels n in the horizontal direction. In other words, the interval in change in the horizontal direction is determined by dividing by the number of pixels n in the horizontal direction.

Furthermore, the position in the horizontal direction of the rectangular opening 2111 in the pixel 121*a* in the imaging element 121' is the same in the pixels 121*a* (pixels 121*a* in the same column) in the same position in the horizontal direction in the imaging element 121'.

Moreover, a pixel 121*a*-3 immediately below the pixel 121*a*-1 has a configuration in which the rectangular opening 2111 is arranged at such a distance that the left side thereof is at the width dx1 from the left side of the pixel 121*a* and the upper side thereof is at the height dy2 from the upper side of the pixel 121*a* and the range other than the rectangular opening 2111 is light-shielded by the light-shielding film 121*b*.

Hereinafter, similarly, in the pixels 121*a* adjacent in the vertical direction, the upper side of the rectangular opening Z111 moves from the upper side of the pixel 121*a* by the heights dy1, dy2, . . . , and dyn as the arrangement shifts downward in the drawing. Note that, a dotted square portion in a lower left part in the range 2102 of FIG. 15 illustrates a state in which the rectangular opening 2111 is arranged at such a distance that the left side thereof is at the width dx1 from the left side of the pixel 121*a* and the upper side thereof is at the height dym from the upper side of the pixel 121*a*. Furthermore, an interval between the heights dy1, dy2, . . . , and dym is a value obtained by dividing a height obtained by subtracting a height of the rectangular opening 2111 from a height in the vertical direction of the range 2102 by the number of pixels m in the vertical direction. That is, the interval in change in the vertical direction is determined by dividing by the number of pixels m in the vertical direction.

Furthermore, the position in the vertical direction of the rectangular opening 2111 in the pixel 121*a* in the imaging element 121' is the same in the pixels 121*a* (pixels 121*a* in the same row) in the same position in the vertical direction in the imaging element 121'.

Moreover, it is possible to change a field of view by changing the main light-shielded portion 2101 and the rectangular opening 2111 of each pixel 121*a* forming the imaging element 121' illustrated in FIG. 15 (FIG. 14).

Figure 16:
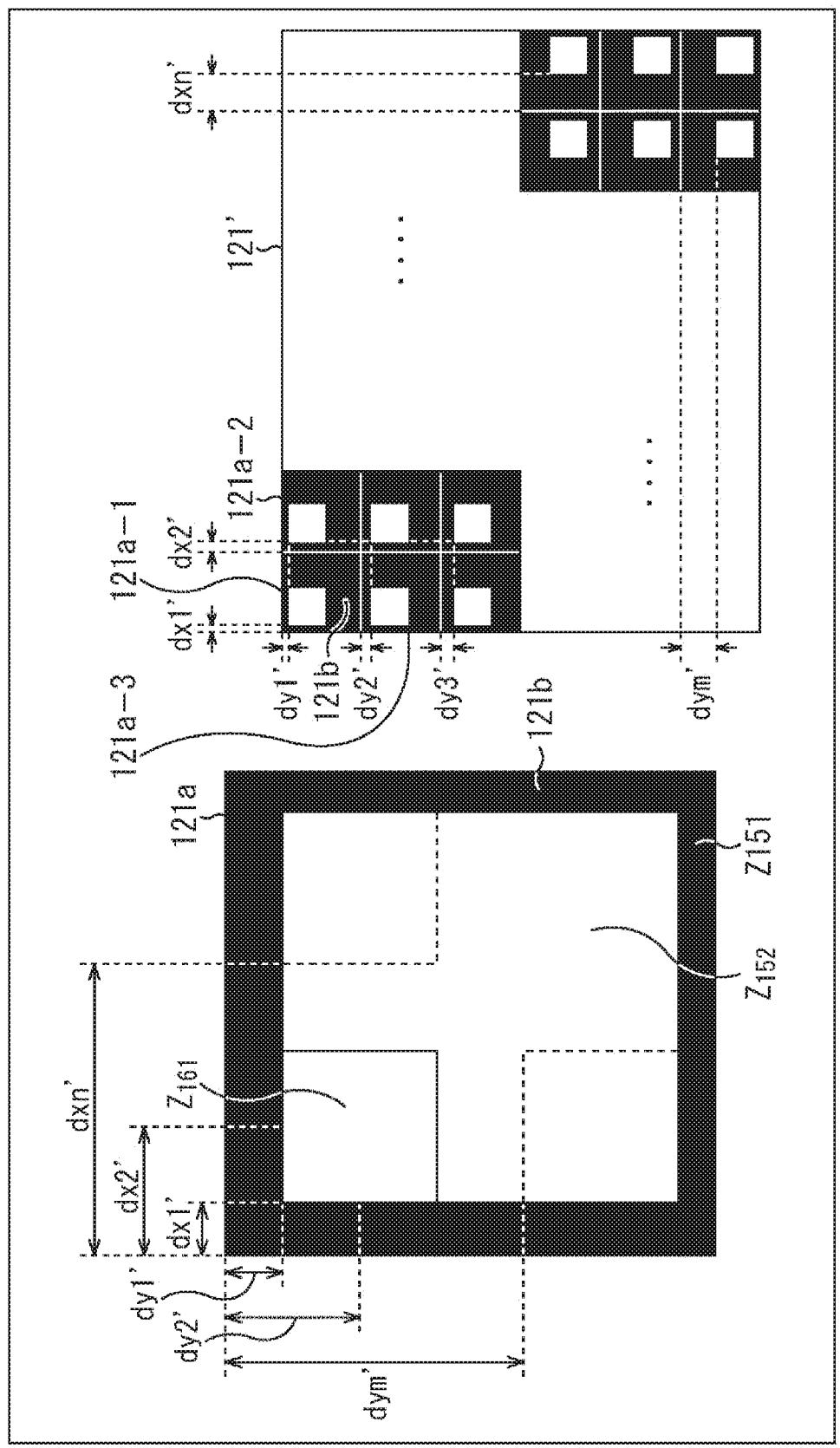
FIG. 16 is a view for illustrating an example in which a field of view is changed by applying the variation.

A right part of FIG. 16 illustrates a configuration of the imaging element 121' in a case where the field of view is made wider than that of the imaging element 121' of FIG. 15 (FIG. 14). Furthermore, a left part of FIG. 16 illustrates a configuration of the pixel 121*a* of the imaging element 121' in the right part of FIG. 16.

That is, as illustrated in the left part of FIG. 16, for example, in the pixel 121*a*, a main light-shielded portion 2151 (in black in the left part of FIG. 16) having a light-shielded range narrower than that of the main light-shielded portion 2101 in FIG. 15 is set, and a range other than this is set as a range Z152. Moreover, a rectangular opening 2161 having a larger opening area than that of the rectangular opening 2111 is set in the range 2152.

In further detail, as illustrated in the left part of FIG. 16, it is light-shielded by the light-shielding film 121*b* by a width dx1' (<dx1) from the upper and lower side ends of the pixel 121*a* to the inside of the pixel 121*a*, and it is light-shielded by the light-shielding film 121*b* by a height dy1' (<dy1) from the left and right side ends to the inside of the pixel 121*a*, so that the rectangular opening 2161 is formed.

Herein, as illustrated in the right part of FIG. 16, the pixel 121*a*-1 on the left end and the upper end is configured such that the rectangular opening 2161 is arranged at such a distance that the left side thereof is at the width dx1' from the left side of the pixel 121*a* and the upper side thereof is at the height dy1' from the upper side of the pixel 121*a*, and a range other than the rectangular opening 2161 is light-shielded by the light-shielding film 121*b*.

Similarly, the pixel 121*a*-2 to the right of the pixel 121*a*-1 has a configuration in which the rectangular opening 2161 is arranged such that the left side thereof is at a width dx2' from the left side of the pixel 121*a* and the upper side thereof is at the height dy1' from the upper side of the pixel 121*a*, and the range other than the rectangular opening 2161 is light-shielded by the light-shielding film 121*b*.

Hereinafter, similarly, in the pixels 121*a* adjacent in the horizontal direction, the right side of the rectangular opening Z161 moves from the right side of the pixel 121*a* by the widths dx1', dx2', . . . , and dxn' as the arrangement shifts rightward in the drawing. Here, an interval between the widths dx1', dx2', . . . , and dxn' is a value obtained by dividing a width obtained by subtracting a width in the horizontal direction of the rectangular opening 2161 from a width in the horizontal direction of the range 2152 by the number of pixels n in the horizontal direction. That is, the interval in change in the vertical direction is determined by dividing by the number of pixels n in the horizontal direction. Therefore, a change interval between the widths dx1', dx2', . . . , and dxn' is larger than the change interval between the widths dx1, dx2, . . . , and dxn.

Furthermore, the position in the horizontal direction of the rectangular opening 2161 in the pixel 121*a* in the imaging element 121' in FIG. 16 is the same in the pixels 121*a* (pixels 121*a* in the same column) in the same position in the horizontal direction in the imaging element 121'.

Moreover, a pixel 121*a*-3 immediately below the pixel 121*a*-1 has a configuration in which the rectangular opening 2161 is arranged such that the left side thereof is at the width dx1' from the left side of the pixel 121*a* and the upper side thereof is at the height dy2' from the upper side of the pixel 121*a* and the range other than the rectangular opening 2161 is light-shielded by the light-shielding film 121*b*.

Hereinafter, similarly, in the pixels 121*a* adjacent in the vertical direction, the upper side of the rectangular opening Z161 changes from the upper side of the pixel 121*a* by the heights dy1', dy2', . . . , and dym' as the arrangement shifts downward in the drawing. Here, a change interval between the heights dy1', dy2', . . . , and dym' is a value obtained by dividing a height obtained by subtracting a height of the rectangular opening 2161 from a height in the vertical direction of the range 2152 by the number of pixels m in the vertical direction. That is, the interval in change in the vertical direction is determined by dividing by the number of pixels m in the vertical direction. Therefore, the change interval between the width heights dy1', dy2', . . . , and dym' is larger than the change interval between the heights dy1, dy2, . . . , and dym.

Furthermore, the position in the vertical direction of the rectangular opening 2161 in the pixel 121*a* in the imaging element 121' in FIG. 16 is the same in the pixels 121*a* (pixels 121*a* in the same row) in the same position in the vertical direction in the imaging element 121'.

In this manner, by changing a combination of the light-shielded range of the main light-shielded portion and an opening range of the opening, it is possible to realize the imaging element 121' including the pixels 121*a* having various fields of view (having various incident angle directivities).

Moreover, the imaging element 121 may be realized by combining not only the pixels 121*a* having the same field of view but also the pixels 121*a* having various fields of view.

Figure 17:
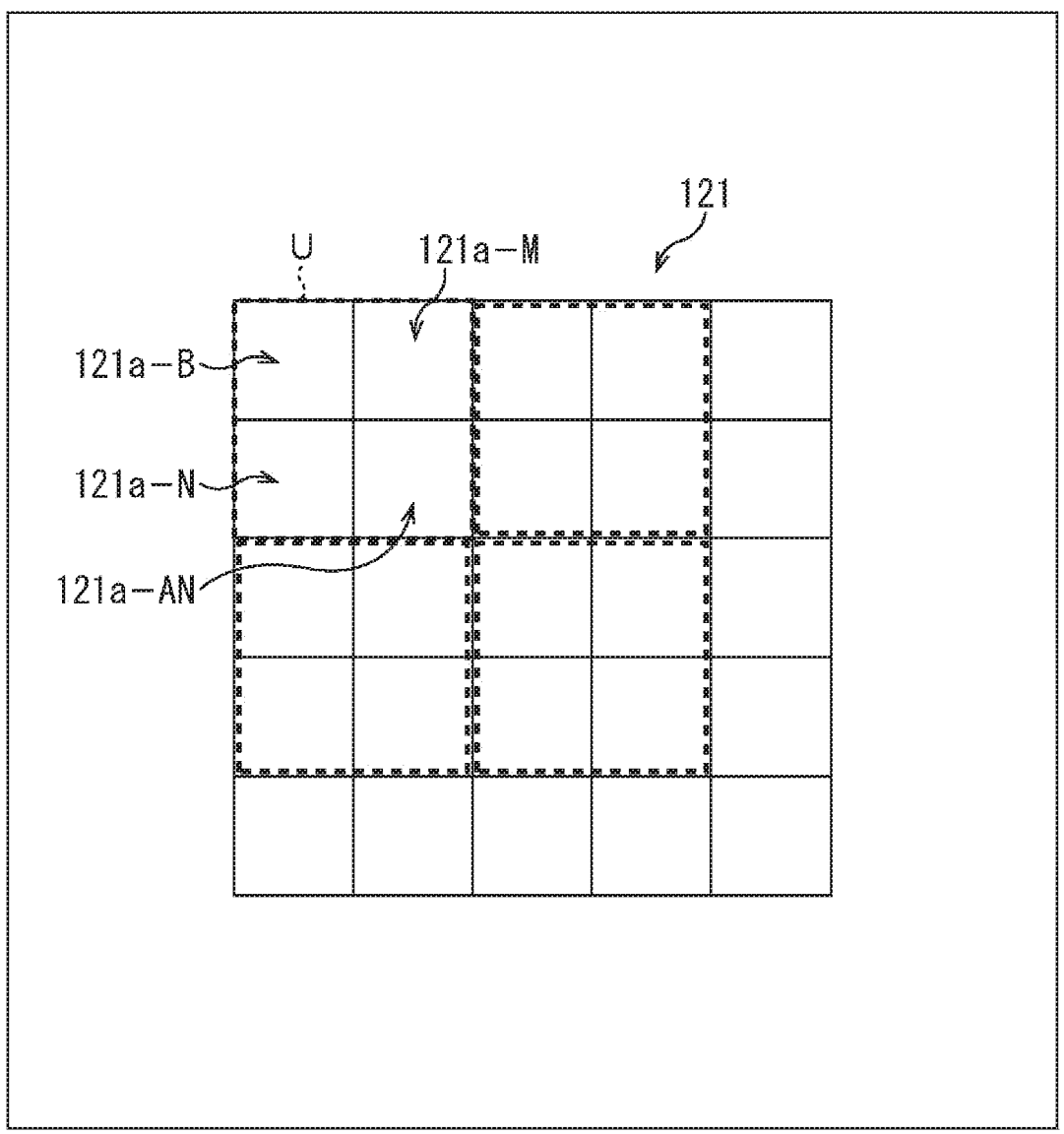
FIG. 17 is a view for illustrating an example of combining pixels of a plurality of fields of view when the field of view is changed by applying the variation.

For example, as illustrated in FIG. 17, four pixels including two pixels x two pixels indicated by a dotted line are made one unit U, and each unit U includes four pixels of a pixel 121*a*-W with wide field of view, a pixel 121*a*-M with medium field of view, a pixel 121*a*-N with narrow field of view, and a pixel 121*a*-AN with extremely narrow field of view.

In this case, for example, in a case where the number of all the pixels 121*a* is X, it becomes possible to restore a restored image using a detection image of X/4 pixels for each of the four types of fields of view. At that time, four types of coefficient sets different for each field of view are used, and the restored images with different fields of view are restored by four different simultaneous equations.

Therefore, by restoring the restored image with the field of view to be restored by using the detection image obtained from the pixel suitable for imaging the field of view to be restored, it becomes possible to restore appropriate restored images corresponding to the four types of fields of view.

Furthermore, it is also possible to interpolate to generate the image with the field of view between the four types of fields of view and the images with the fields of view around the same from the images with the four types of fields of view, and realize pseudo optical zoom by seamlessly generating the images with the various fields of view.

Although the light-shielding film is described above, the description of this example may also be applied to a case of providing (set) the incident angle directivity by selectively using a plurality of photo diodes arranged in the pixel. That is, for example, by appropriately setting a division position (size and shape of each partial region), and a position, a size, a shape and the like of each photodiode, or appropriately selecting the photodiode, it is possible to realize the incident light directivity equivalent to the incident light directivity by the light-shielding film 121*b* including the above-described rectangular opening. It goes without saying that, in this case also, the imaging element 121 may be realized by combining the pixels 121*a* with the various fields of view. Furthermore, it is also possible to interpolate to generate the image with the intermediate field of view and the images with the fields of view around the same from the images with a plurality of types of fields of view, and realize pseudo optical zoom by seamlessly generating the images with the various fields of view.

<Third Variation>

By the way, in a case where a light-shielded range by a light-shielding film 121*b* of a pixel 121*a* in an imaging element 121 has randomness, as disorder of a difference in the light-shielded range of the light-shielding film 121*b* is larger, a processing load by a restoration unit 124 and the like is larger. Therefore, it is possible to make a part of the difference in the light-shielded range of the light-shielding film 121*b* of the pixel 121*a* regular and reduce the disorder of the difference, thereby reducing the processing load.

For example, an L-shaped type light-shielding film 121*b* obtained by combining a longitudinal band-type and a lateral band-type is formed, and the lateral band-type light-shielding film 121*b* having the same width is combined in a predetermined column direction and the longitudinal band-type light-shielding film 121*b* having the same height is combined in a predetermined row direction. By doing so, the light-shielded range of the light-shielding film 121*b* of each pixel 121*a* is set to a value randomly different in each pixel with regularity in the column direction and the row direction. As a result, the disorder of the difference in the light-shielded range of the light-shielding film 121*b* of each pixel 121*a*, that is, a difference of incident angle directivity of each pixel may be reduced, and the processing load outside the imaging element 121 such as the restoration unit 124 and the like may be reduced.

Figure 18:
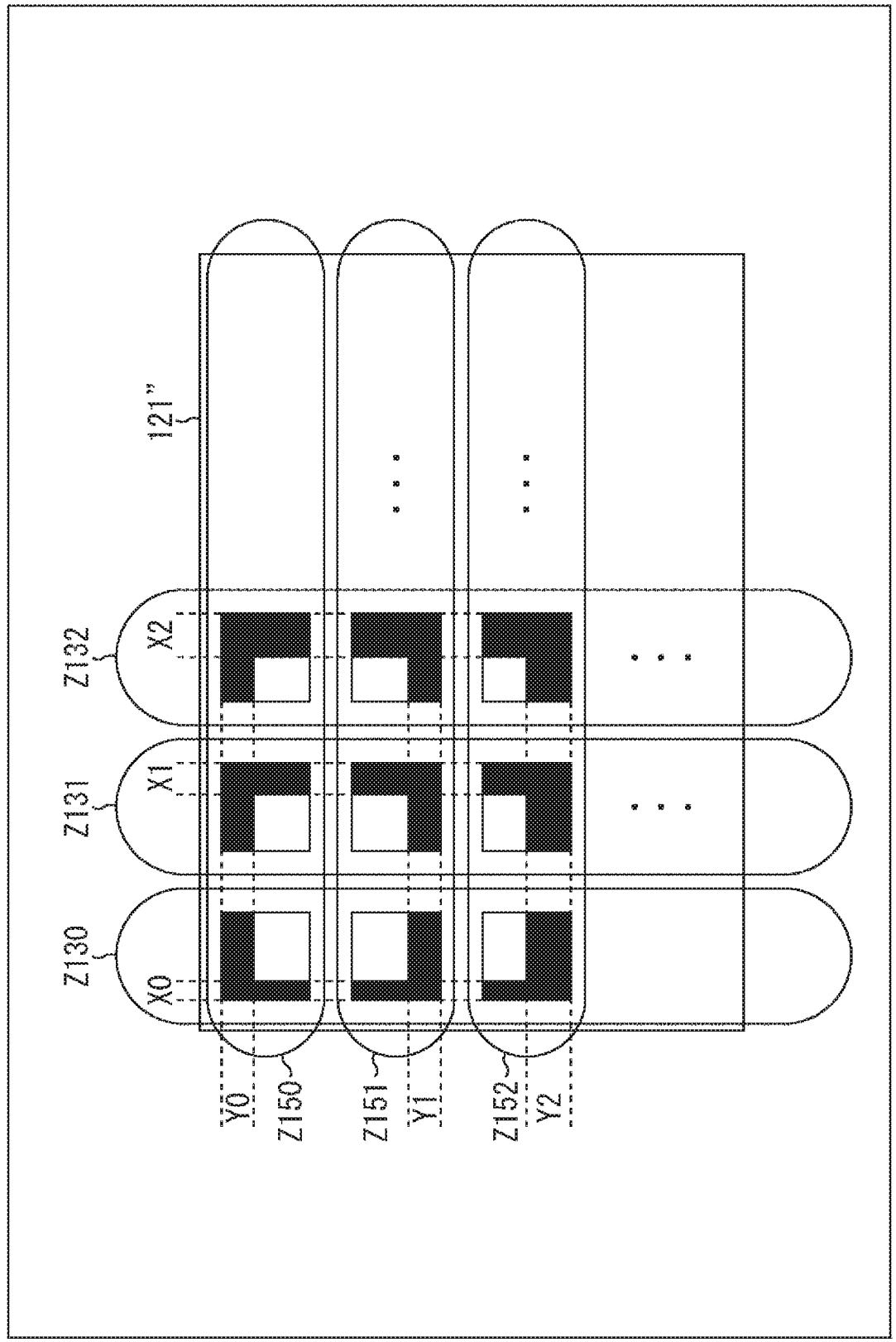
FIG. 18 is a view illustrating a variation.

For example, in a case of an imaging element 121" in FIG. 18, the lateral band-type light-shielding films 121*b* having the same width X0 are used for the pixels in the same column indicated by a range 2130, the longitudinal band-type light-shielding films 121*b* having the same height Y0 are used for the pixels in the same row indicated by a range 2150, and the L-shaped type light-shielding film 121*b* obtained by combining them is set for the pixel 121*a* specified by each column and row.

Similarly, the lateral band-type light-shielding films 121*b* having the same width X1 are used for the pixels in the same column indicated by a range 2131 adjacent to the range 2130, the longitudinal band-type light-shielding films 121*b* having the same height Y1 are used for the pixels in the same row indicated by a range 2151 adjacent to the range 2150, and the L-shaped type light-shielding film 121*b* obtained by combining them is set for the pixel 121*a* specified by each column and row.

Moreover, the lateral band-type light-shielding films having the same width X2 are used for the pixels in the same column indicated by a range 2132 adjacent to the range 2131, the longitudinal band-type light-shielding films having the same height Y2 are used for the pixels in the same row indicated by a range 2152 adjacent to the range 2151, and the L-shaped type light-shielding film 121*b* obtained by combining them is set for the pixel 121*a* specified by each column and matrix.

By doing so, it is possible to set the range of the light-shielding film to different values in each pixel while allowing the width and position in the horizontal direction and the height and position in the vertical direction of the light-shielding film 121*b* to have regularity, so that it is possible to control the disorder in the change in the incident angle directivity. As a result, it becomes possible to reduce patterns of the coefficient sets and reduce the processing load of arithmetic processing on a subsequent stage (for example, the restoration unit 124 and the like).

<Fourth Variation>

A variation of the shape of the light-shielding film 121*b* in each pixel is arbitrary, and is not limited to the above-described example. For example, it is possible to set the light-shielding film 121*b* to have a triangular shape and make a range thereof different, thereby giving (setting) different incident angle directivities, or to set the light-shielding film 121*b* to have a circular shape and make a range thereof different, thereby giving different incident angle directivities. Furthermore, for example, a linear light-shielding film in an oblique direction or the like may be used.

Furthermore, it is possible to set the variation (pattern) of the light-shielding film 121*b* in units of a plurality of pixels forming a unit including the predetermined number of plurality of pixels. This one unit may include any pixel. For example, assuming that an imaging element 121 is provided with a color filter, and this includes pixels forming a unit of a color array of the color filter. Furthermore, a pixel group obtained by combining pixels having different exposure times may be made a unit. Note that, it is desirable that randomness of the pattern of the range light-shielded by the light-shielding film 121*b* in each pixel forming the unit is high, that is, it is desirable that the pixels forming the unit have different incident angle directivities.

Furthermore, the arrangement pattern of the light-shielding film 121*b* may be set between the units. For example, a width and a position of the light-shielding film may be changed for each unit. Moreover, it is possible to set the pattern of the range light-shielded by the light-shielding film 121*b* in the unit including a plurality of pixels sorted into different categories or between the units.

Although the light-shielding film is described above, the description of this example may also be applied to a case of providing (set) the incident angle directivity by selectively using a plurality of photo diodes arranged in the pixel. That is, for example, by appropriately setting a division position (size and shape of each partial region), and a position, a size, a shape and the like of each photodiode, or appropriately selecting the photodiode, the incident light directivity equivalent to the incident light directivity in a case where a part of change in the range light-shielded by the light-shielding film 121*b* of the pixel 121*a* described above is made regular may be realized. By doing so, the disorder of the difference of the incident angle directivity of each pixel may be reduced, and the processing load outside the imaging element 121 such as the restoration unit 124 and the like may be reduced.

Although the light-shielding film is described above, the description of this example may also be applied to a case of providing (set) the incident angle directivity by selectively using a plurality of photo diodes arranged in the pixel. That is, by appropriately setting the division position (size and shape of each partial region), and the position, the size, the shape and the like of each photodiode, or appropriately selecting the photodiode, it is possible to realize the incident light directivity equivalent to the incident light directivity by the light-shielding film having an arbitrary shape such as a triangular shape, a circular shape, an oblique linear shape and the like, for example.

Furthermore, for example, the division position (size and shape of each partial region) may be set, the position, the size, the shape and the like of each photo diode may be set, and the photo diode may be selected for each unit as is the case with the above-described light-shielding film 121*b*.

<Control of Photo Diode>

In a case where a plurality of photo diodes arranged in the pixel as described above with reference to FIG. 5 is selectively used, it is possible to variously change the incident angle directivity of the output pixel value of the pixel output unit by changing presence or absence of contribution of a plurality of photo diodes 121*f* to the output pixel value of the pixel output unit and a degree thereof.

Figure 19:
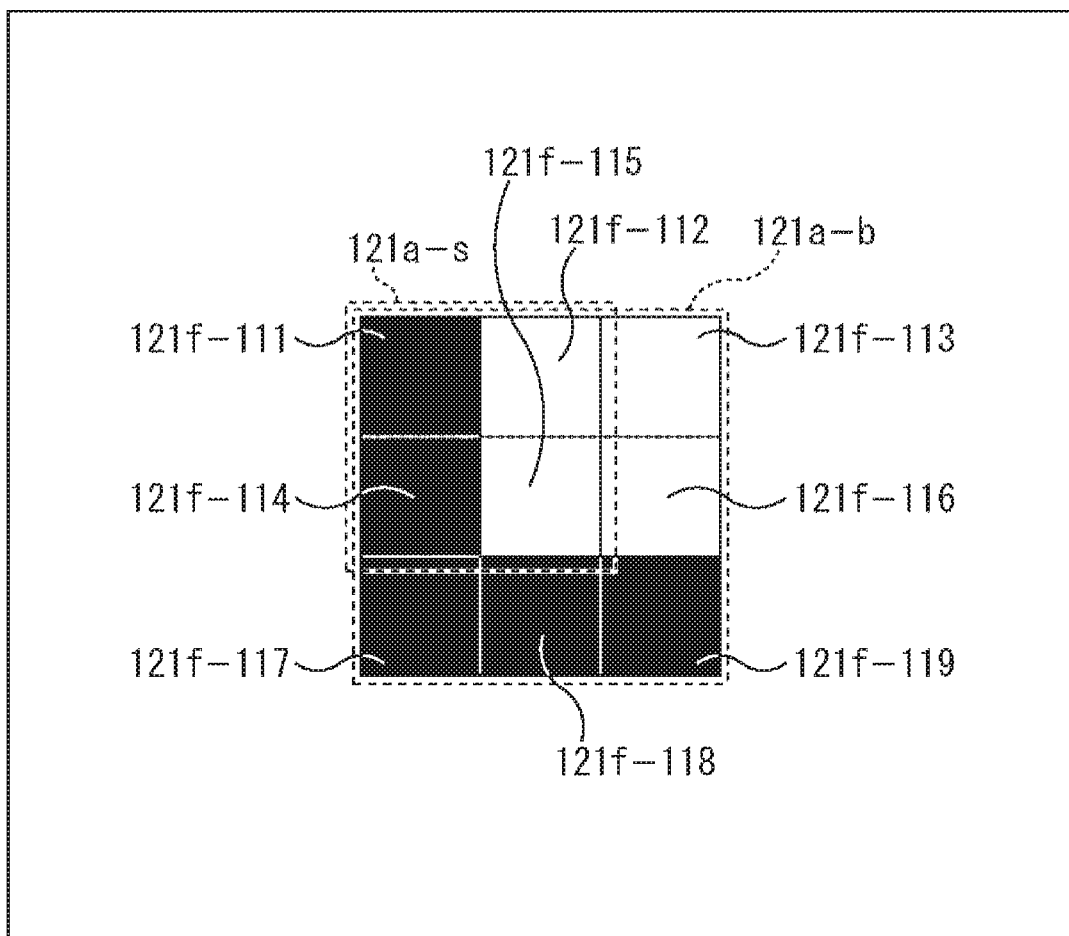
FIG. 19 is a view illustrating the variation.

For example, as illustrated in FIG. 19, it is assumed that nine (three vertical x three horizontal) photo diodes 121*f* which are photo diodes 121*f*-111 to 121*f*-119 are arranged in the pixel 121*a*. In this case, it is possible to use this pixel 121*a* as a pixel 121*a*-*b* including the photo diodes 121*f*-111 to 121*f*-119, or as a pixel 121*a*-*s* including the photo diodes 121*f*-111, 121*f*-112, 121*f*-114, and 121*f*-115.

For example, in a case where the pixel 121*a* is the pixel 121*a*-*b*, the incident angle directivity of the output pixel value is controlled by controlling the presence or absence of the contribution of the photo diodes 121*f*-111 to 121*f*-119 to the output pixel value of this pixel 121*a* and the degree thereof. In contrast, in a case where the pixel 121*a* is the pixel 121*a*-*s*, the incident angle directivity of the output pixel value is controlled by controlling the presence or absence of the contribution of the photo diodes 121*f*-111, 121*f*-112, 121*f*-114, and 121*f*-115 to the output pixel value of this pixel 121*a* and the degree thereof. In this case, the other photo diodes 121*f* (photo diodes 121*f*-113, 121*f*-116, and 121*f*-117 to 121*f*-119) are controlled so as not to contribute to the output pixel value.

That is, for example, in a case where the incident angle directivity of the output pixel value is different between a plurality of pixels 121a-b, the presence or absence of the contribution of at least any one of the photo diodes 121f-111 to 121f-119 to the output pixel value and the degree thereof are different. In contrast, for example, in a case where the incident angle directivity of the output pixel value is different between a plurality of pixels 121a-s, the presence or absence of the contribution of at least any one of the photo diodes 121f-111, 121f-112, 121f-114, and 121f-115 to the output pixel value and the degree thereof are different, and the other photo diodes 121f-113, 121f-116, and 121f-117 to 121f-119 do not contribute to the output pixel value in common among the pixels.

Note that, it is possible to set whether the pixel 121a is the pixel 121a-b or the pixel 121a-s for each pixel. Furthermore, this setting may also be performed for each unit (a plurality of pixels).

Figure 20:
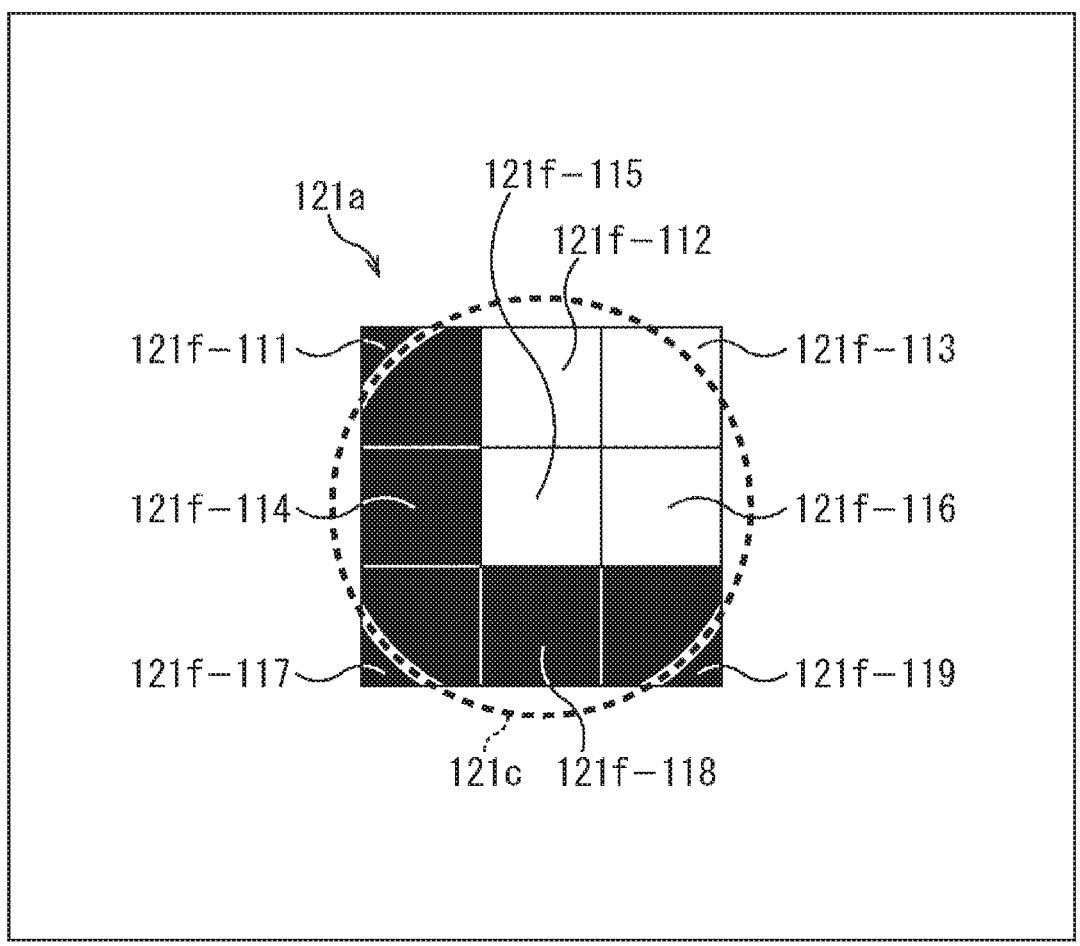
FIG. 20 is a view illustrating the variation.

Furthermore, one on-chip lens is formed on each pixel (each pixel output unit) of the imaging element 121. That is, in a case where the pixel 121a has a configuration as in the example illustrated in FIG. 19, as illustrated in FIG. 20, one on-chip lens 121c is provided for the photo diodes 121f-111 to 121f-119. Therefore, also in a case where the pixel 121a is the pixel 121a-b and in a case where this is the pixel 121a-s as described with reference to FIG. 19, one pixel (one pixel output unit) and one on-chip lens 121c corresponds one-to-one.

<Resolution Control of Detection Image>

The imaging device 100 in FIG. 1 uses the imaging element 121 having the characteristic described above. As described above, the imaging element 121 has the incident angle directivity for each pixel (pixel output unit). For example, as illustrated in FIG. 21, the incident angle directivity is formed by light-shielding a part of the pixel 121a (pixel output unit) with the light-shielding film 121b.

In the conventional imaging element, the resolution of the detection image could not be controlled. That is, the detection signals of all the pixels (pixel output units) of the imaging element were read out, and the detection image was generated using all the read out detection signals. Then, it is not disclosed how the detection image is processed to convert the resolution. Patent Document 1 and the like do not disclose or suggest this.

Therefore, for example, in order to lower the resolution of the imaged image, it has been required to convert the detection image into the imaged image, and then lower the resolution. That is, even in a case where the resolution is lowered, it has been required to read out the detection image from the imaging element 121 and convert the detection image into the imaged image (image processing) in a high resolution state. Therefore, there has been a possibility that a load increases unnecessarily, and power consumption increases unnecessarily.

Figure 21:
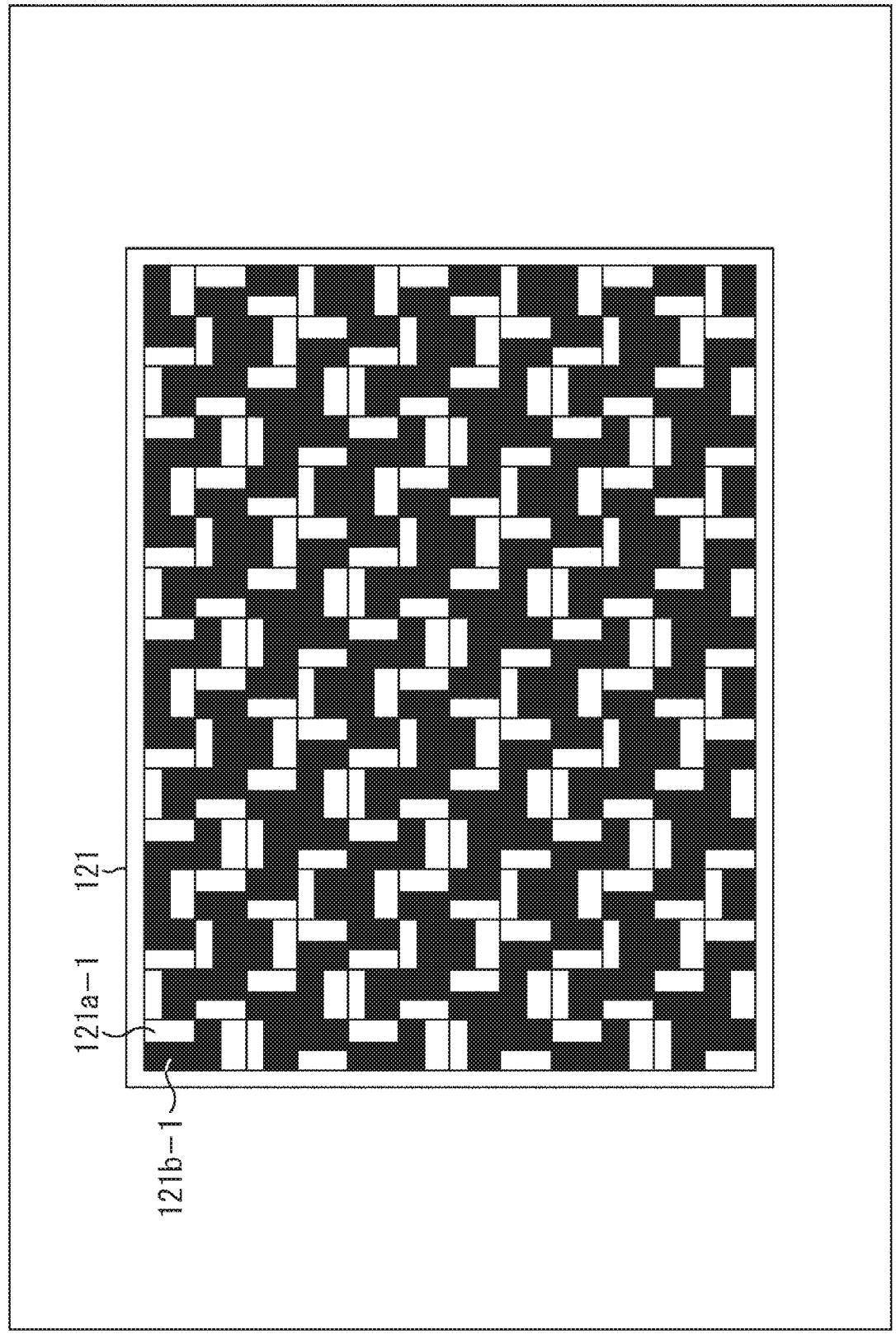
FIG. 21 is a view illustrating an example of a mask pattern using a light-shielding film.

In contrast, in the imaging device 100, the imaging element 121 has the incident angle directivity for each pixel (pixel output unit) as illustrated in FIG. 21, so that it is possible to select the detection signal for each pixel (pixel output unit). That is, it is possible to read out the detection signal only from a part of the pixel output units and include the same in the detection image. That is, the resolution of the detection image may be controlled. Therefore, for example, the resolution of the detection image may be lowered from that of the imaging element 121. That is, it is possible to drive a required pixel output unit, an analog digital converter (ADC) and the like according to desired resolution (suppress drive of unnecessary pixel output unit, ADC, or the like). Therefore, an unnecessary increase in power consumption may be suppressed.

<Imaging Element Including Area ADC>

Note that, the imaging element 121 is provided with the ADC which converts (A/D converts) an analog detection signal read out from the pixel output unit into a digital signal. This ADC is provided in association with the partial region of the pixel region in which the pixel (pixel output unit) is formed. That is, the ADC A/D converts the detection signal (analog signal) read out from the pixel output unit of the partial region corresponding to itself (pixel output unit formed in the partial region). Such ADC is also referred to as an area ADC.

<Substrate Configuration>

Figure 22:
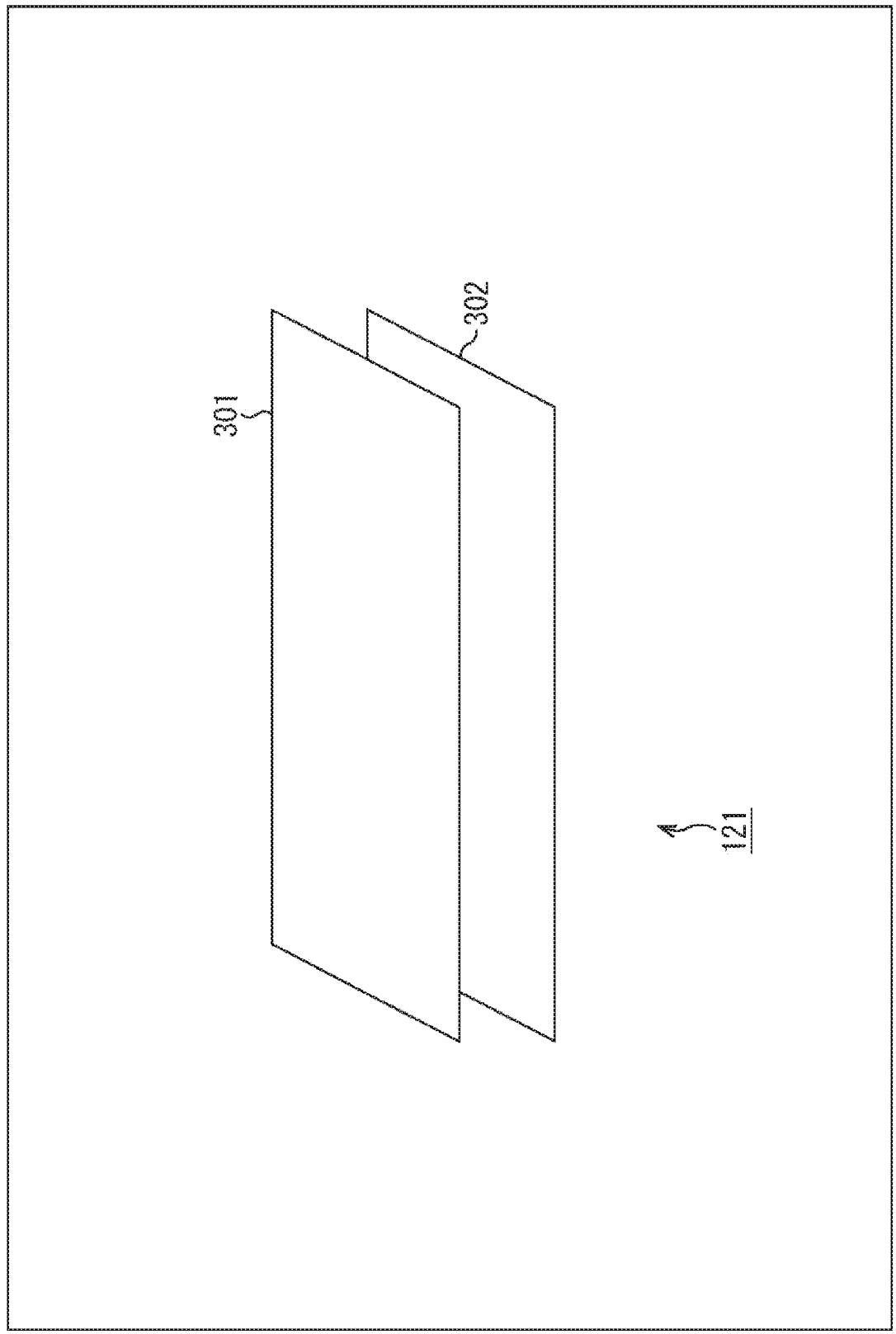
FIG. 22 is a view illustrating a configuration example of a substrate of an imaging element.

For example, as illustrated in FIG. 22, the circuit configuration of the imaging element 121 is formed on an upper substrate 301 and a lower substrate 302 which are two stacked substrates. Each of the upper substrate 301 and the lower substrate 302 may have any size (largeness or thickness or both) and shape, and may differ from each other in the size or shape or both. The circuit formed on the upper substrate 301 and the circuit formed on the lower substrate 302 are connected to each other by, for example, a via (VIA) and the like.

Note that, a substrate configuration of the imaging element 121 is arbitrary, and is not limited to the example in FIG. 22. For example, the imaging element 121 may include three or more substrates, or may be formed on one substrate. Furthermore, a configuration of the circuit and the like formed on each substrate is arbitrary.

<Upper Substrate Configuration>

Figure 23:
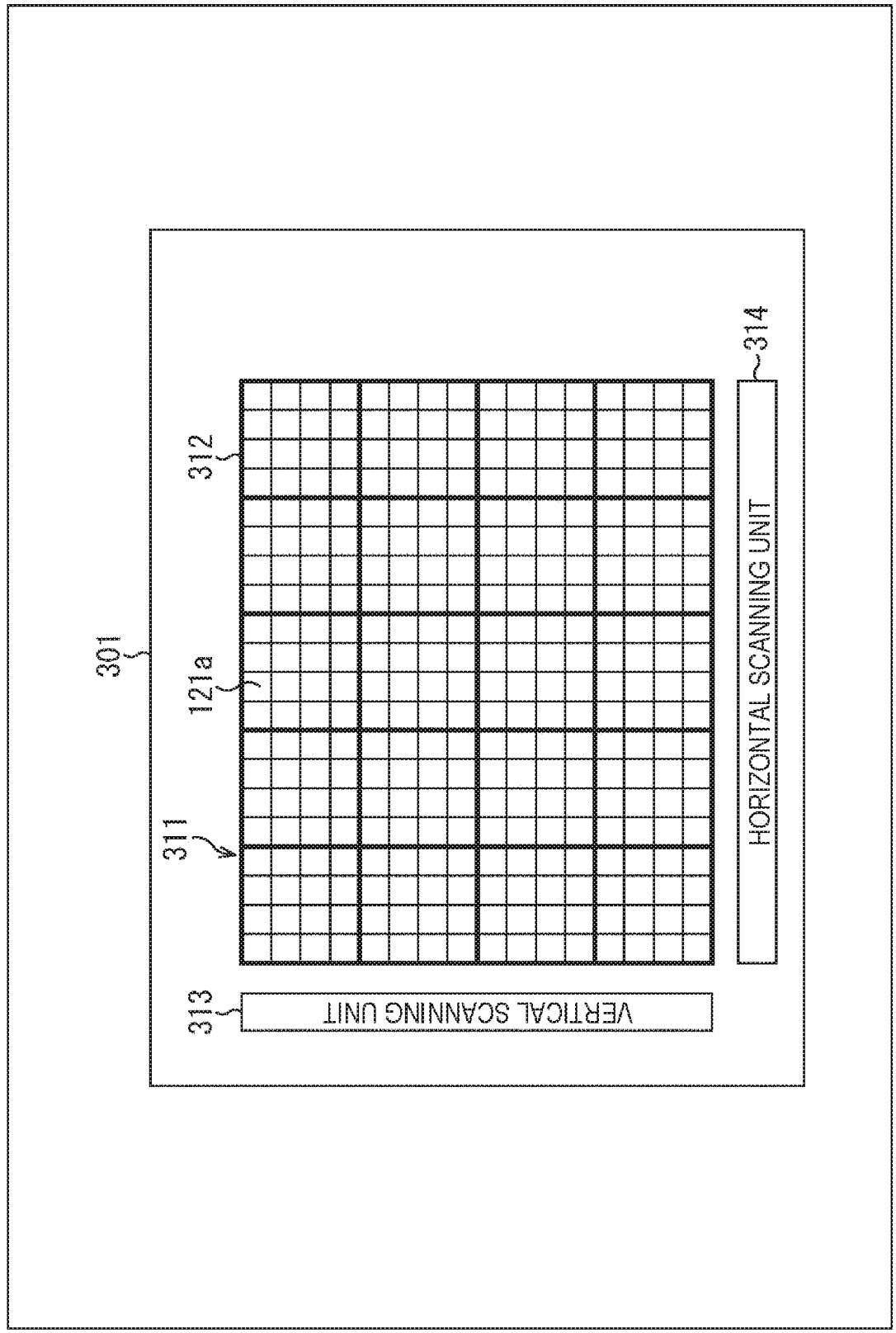
FIG. 23 is a view illustrating a main configuration example of an upper substrate.

FIG. 23 illustrates an example of a main circuit configuration formed on the upper substrate 301. As illustrated in FIG. 23, a pixel region 311 is formed on the upper substrate 301, for example. The pixel region 311 is a region where a set of pixels 121a (pixel output units) (that is, a plurality of pixels 121a) is formed. In FIG. 23, a small square in the pixel region 311 represents the pixel 121a. That is, in a case of the example in FIG. 23, 16 vertical x 20 horizontal pixels 121a are formed in the pixel region 311. Note that, the number of pixels 121a formed in the pixel region 311 is arbitrary as long as this is plural, and is not limited to the example in FIG. 23.

An arrangement pattern of a plurality of pixels 121a in the pixel region 311 is arbitrary. For example, in a case of the example in FIG. 23, a plurality of pixels 121a is formed into a matrix (array) in the pixel region 311. The pixels 121a (pixel output units) arranged into a matrix are also referred to as a pixel array (pixel output unit array). However, this example is merely an example, and the arrangement pattern of a plurality of pixels 121a is not limited to this example. For example, in the pixel region 311, a plurality of pixels 121a may be arranged in a honeycomb structure. Furthermore, a plurality of pixels 121a may be arranged in a line shape (for example, a straight line shape of one row or one column, or a curved line shape (for example, a meandering line shape, a spiral shape or the like)). Furthermore, the pixels may be apart from each other.

Furthermore, the partial region of the pixel region 311 is referred to as an area 312. For example, in a case of the example in FIG. 23, each partial region surrounded by a thick line of the pixel region 311 is the area 312. That is, each partial region of four pixels x four pixels is set as the area 312. Note that, in FIG. 23, only one area is numbered, but each partial region is the area 312 as described above.

That is, in a case of the example in FIG. 23, four vertical x five horizontal areas 312 are set on the upper substrate 301.

Note that, the area 312 may be set in any layout in the pixel region 311. That is, a shape, a size, and the number of the area 312 in the pixel region 311 are all arbitrary. For example, in a case where a plurality of areas 312 is provided in the pixel region 311, it is possible that all such parameters are unified among the plurality of areas 312 or not. That is, for example, there may be the area 312 different from the other areas 312 in shape and/or size. Furthermore, the areas 312 may overlap with each other.

Furthermore, a configuration in the area 312 is also arbitrary. That is, the number, layout and the like of the pixels 121a included in the area 312 are arbitrary. For example, in a case where a plurality of areas 312 is provided in the pixel region 311, it is possible that all such parameters are unified among the plurality of areas 312 or not. That is, for example, there may be the area 312 different from the other areas 312 in the number of included pixels and/or pixel arrangement.

Furthermore, the incident angle directivity of the output pixel value of the pixel (pixel output unit) formed in the area 312 with respect to the incident light from the subject is arbitrary. For example, an entire pixel (pixel output unit) group formed in the area 312 may have the incident angle directivity equivalent to that of the entire pixel (pixel output unit) group formed in the pixel region 311. Furthermore, for example, the entire pixel (pixel output unit) group formed in the area 312 may have the incident angle directivity different from that of the entire pixel (pixel output unit) group formed in the pixel region 311.

Note that, for example, in a case where a plurality of areas 312 is provided in the pixel region 311, it is possible that the incident angle directivities are unified among the areas 312 or not. That is, there may be the area 312 different from the other areas 312 in the incident angle directivity. For example, a size of a field of view of the entire pixel output unit group of a predetermined area 312 may be different from the size of the field of view of the entire pixel output unit group of the other areas 312 or the pixel region 311. For example, the area 312 with wide field of view and the area 312 with narrow field of view may be provided in the pixel region 311. Furthermore, for example, a direction of the field of view of the entire pixel output unit group of a predetermined area 312 may be different from the direction of the field of view of the entire pixel output unit group of the other areas 312 or the pixel region 311. For example, the directions of the fields of view may be different in directions in which parallax between the obtained images increases between the two areas 312. Furthermore, for example, there may be the area 312 in which all the incident angle directivities of the respective pixels (pixel output units) are perpendicular to the pixel region 311.

Furthermore, for example, in a case where a plurality of areas 312 is provided in the pixel region 311, an entire set of predetermined pixels (pixel output units) in each area 312 may have the incident angle directivity equivalent to that of the entire pixel (pixel output unit) group formed in the pixel region 311. For example, the entire set of the pixels (pixel output units) from which the signals are first read out of the respective areas 312 may have the incident angle directivity equivalent to that of the entire pixel (pixel output unit) group formed in the pixel region 311.

Note that, in the following, unless otherwise specified, it is assumed that the pixel array is formed over an entire pixel region 311 as in the example in FIG. 23, and each partial region obtained by dividing the pixel region 311 into a plurality of portions including the predetermined number of pixels is made the area 312.

A vertical scanning unit 313 performs processing regarding scanning of the pixel array of the pixel region 311 in a column direction (vertical direction in the drawing). A horizontal scanning unit 314 performs processing regarding scanning of the pixel array of the pixel region 311 in a row direction (horizontal direction in the drawing). That is, signal readout from the pixel 121a in the pixel region 311 is controlled by the vertical scanning unit 313 and the horizontal scanning unit 314. In other words, the signal is read out from the pixel 121a controlled to drive by the vertical scanning unit 313 and the horizontal scanning unit 314.

<Lower Substrate Configuration>

Figure 24:
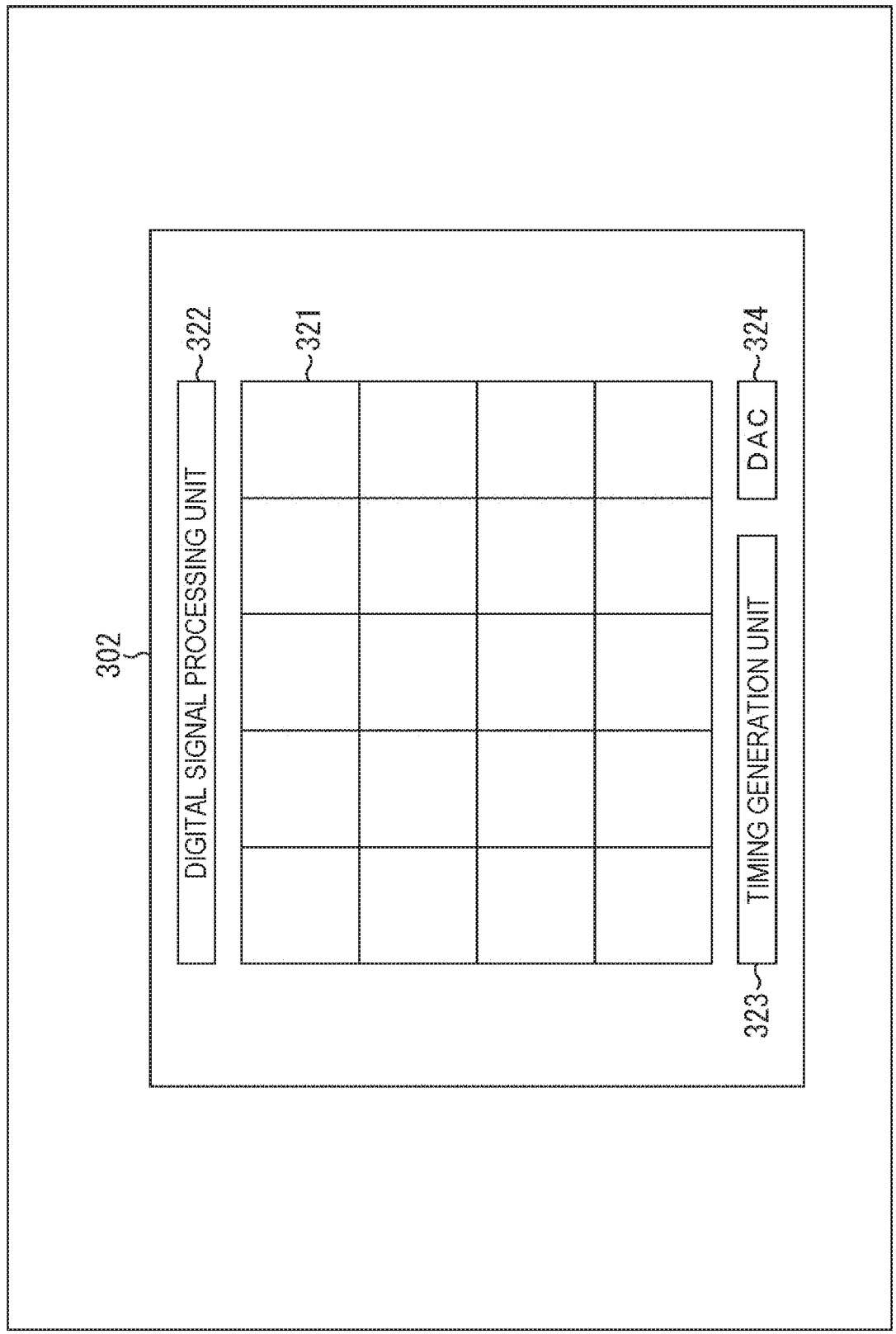
FIG. 24 is a view illustrating a main configuration example of a lower substrate.

FIG. 24 illustrates an example of a main circuit configuration formed on the lower substrate 302. As illustrated in FIG. 24, on the lower substrate 302, for example, an area ADC 321 corresponding to each area 312 on the upper substrate 301 is formed. In FIG. 24, a square illustrated in the center of the lower substrate 302 indicates the area ADC 321. In FIG. 24, only one square is numbered, but each square indicates the area ADC 321. That is, in a case of the example in FIG. 24, four vertical×five horizontal area ADCs 321 are formed on the lower substrate 302. These area ADCs 321 are associated with different areas 312 of the upper substrate 301, respectively.

The number of area ADCs 321 formed on the lower substrate 302 is arbitrary. The number may be the same as that of the areas 312 of the upper substrate 301, or may be larger or smaller than that of the areas 312. Furthermore, a plurality of area ADCs 321 may be associated with one area 312, or a plurality of areas 312 may be associated with one area ADC 321. In a case of the example in FIGS. 23 and 24, different areas 312 are associated with the area ADCs 321, respectively.

Note that, the term "to correspond" herein means a state in which both are connected to each other via a signal line, an element and the like. For example, "to associate A with B" means that A (or quasi-A) is connected to B (or quasi-B) via a signal line and the like. Furthermore, for example, "the area 312 corresponds to the area ADC 321" means that each pixel 121a of the area 312 and the area ADC 321 are connected to each other via a signal line and the like.

The area ADC 321 includes an A/D converter, A/D converts an input analog signal, and outputs the same as a digital signal (output pixel value). In other words, the area ADC 321 is a signal processing unit which processes (A/D converts) a signal read out from the pixel 121a in the area 312 corresponding to the same (the area ADC 321) and obtains the output pixel value.

Note that, it is only required that this connection be established when the signal is transferred from the pixel 121a to the area ADC 321. For example, the area ADC 321 may be connected to any pixel 121a in the area 312 via a switch and the like (the pixel 121a to which the area ADC 321 is connected is switched by the switch and the like).

Furthermore, as illustrated in FIG. 24, on the lower substrate 302, for example, a digital signal processing unit 322, a timing generation unit 323, a digital analog converter (DAC) 324 and the like are formed. The digital signal processing unit 322 performs processing regarding signal processing of the digital signal. Although not illustrated, the digital signal processing unit 322 is connected to each area ADC 321 by a signal line and the like. For example, the digital signal processing unit 322 performs signal processing on the digital signal obtained by A/D conversion in the area ADC 321. A content of this signal processing is arbitrary.

The timing generation unit 323 generates a timing signal serving as a reference for an operation timing of each configuration in the imaging element 121. Although not illustrated, the timing generation unit 323 is connected to other configurations in the imaging element 121 via signal lines and the like, and may supply the generated timing signal to a desired component. For example, the pixel region 311, the vertical scanning unit 313, and the horizontal scanning unit 314 of the upper substrate 301, and the area ADC 321, the digital signal processing unit 322, and the DAC 324 of the lower substrate 302 and the like operate at a timing on the basis of the timing signal supplied from the timing generation unit 323 (perform predetermined processing). This makes it possible to synchronize the processing timing among the configurations.

The DAC 324 includes a D/A convertor, performs D/A conversion on an input digital signal, and outputs the same as an analog signal. For example, the DAC 324 generates a ramp signal (Ramp) used in the area ADC 321 by the D/A conversion. Although not illustrated, the DAC 324 is connected to each area ADC 321 and supplies the generated ramp signal to each area ADC 321.

Note that, it is only required that this connection be established when the ramp signal is transferred from the DAC 324 to the area ADC 321. For example, the DAC 324 may be connected to any area ADC 321 via a switch and the like (the area ADC 321 to which the DAC 324 is connected is switched by the switch and the like).

<Configuration of Area ADC>

Figure 25:
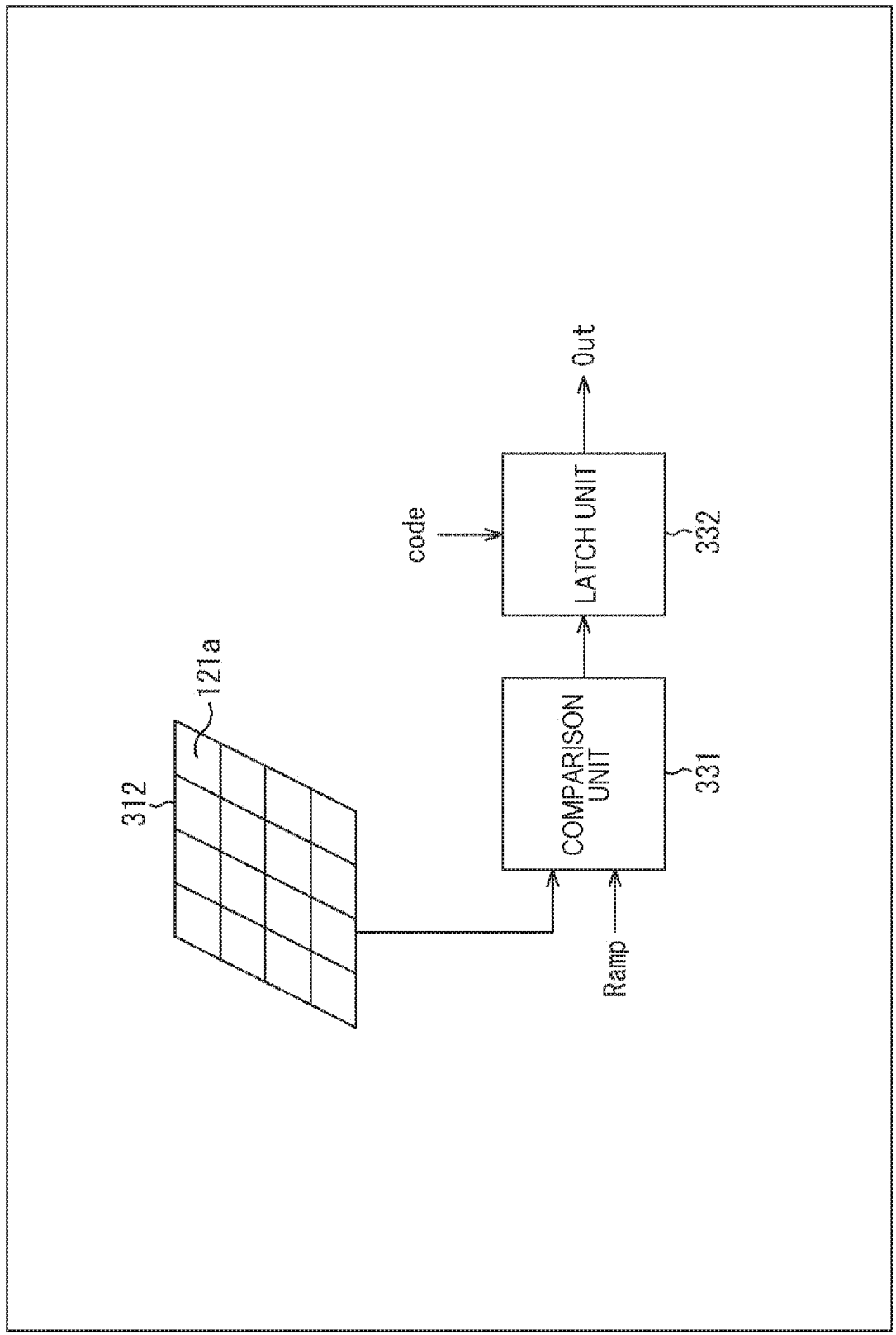
FIG. 25 is a view illustrating a main configuration example of an ADC.

FIG. 25 is a view illustrating a main configuration example of the area ADC 321. As illustrated in FIG. 25, the area ADC 321 includes a comparison unit 331 and a latch unit 332. The comparison unit 331 is connected to each pixel 121a in the area 312 corresponding to the area ADC 321 via a signal line and the like. Furthermore, the comparison unit 331 is also connected to the DAC 324 via a signal line and the like not illustrated. The comparison unit 331 compares sizes of a signal read out from the pixel 121a selected by the vertical scanning unit 313 and the horizontal scanning unit 314 in the area 312 to be supplied and the ramp signal (Ramp) supplied from the DAC 324. Furthermore, the comparison unit 331 is also connected to the latch unit 332 via a signal line and the like, and supplies a comparison result (a value indicating a larger one) to the latch unit 332.

To the latch unit 332, a code value indicating a length of time elapsed after the comparison unit 331 starts comparing is supplied from a counter not illustrated and the like. That is, a value of the code value changes over time. When the comparison result supplied from the comparison unit 331 changes, the latch unit 332 holds the code value input at that timing. That is, the length of the time elapsed after the comparison unit 331 starts comparing is latched. As described above, since comparison targets are the signal read out from the pixel 121a and the ramp signal, the length of the time indicates the size of the signal read out from the pixel 121a.

The latch unit 332 is connected to the digital signal processing unit 322 via a signal line and the like not illustrated. The latch unit 332 supplies the code value (held code value) indicating the size of the signal read out from the pixel 121a to the digital signal processing unit 322 as a digital detection signal.

<Readout Scanning>

Readout of the signal from each pixel 121a in the area 312 is performed in predetermined order (scanning order). That is, the vertical scanning unit 313 and the horizontal scanning unit 314 select the pixel 121a from which the signal is read out one pixel at a time according to the predetermined scanning order in the area 312 to be processed. This scanning order is arbitrary.

Figure 26:
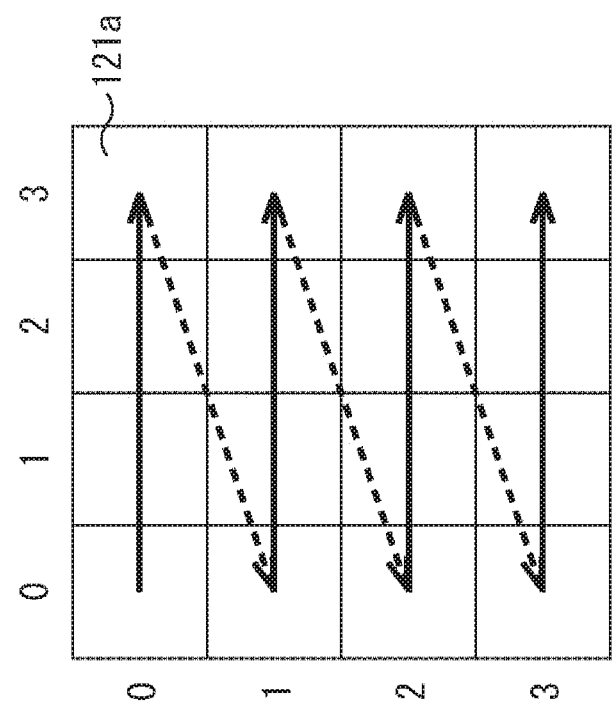
FIG. 26 is a view illustrating an example of scanning order of pixels in an area.

FIG. 26 is a view illustrating an example of this scanning order. In FIG. 26, each square schematically illustrates the pixel 121a formed in one area 312. That is, in a case of the example in FIG. 26, a pixel array of four pixels x four pixels is formed in one area 312. Furthermore, each numeral outside the square is given for explanation for indicating coordinates of each pixel 121a in the pixel array. For example, the coordinates of the pixel 121a on an upper left end in the drawing are (0,0), the coordinates of the pixel 121a on an upper right end in the drawing are (3,0), the coordinates of the pixel 121a on a lower left end in the drawing are (0,3), and the coordinates of the pixel 121a on a lower right end in the drawing are (3,3). Furthermore, arrows in the drawing indicate the scanning order.

That is, in a case of the scanning order in the example in FIG. 26, the pixels 121a are selected sequentially from the upper row. In each row, one column (that is, one pixel) is selected from left to right. More specifically, first, the pixels are selected one by one from the coordinates (0,0) toward the coordinates (0,3), then, the pixels are selected one by one from the coordinates (1,0) toward the coordinates (1,3), next, the pixels are selected one by one from the coordinates (2,0) toward the coordinates (2,3), and the pixels are selected one by one from the coordinates (3,0) toward the coordinates (3,3).

For example, the signal is read out from one pixel at a time in such scanning order to be supplied to the area ADC 321 corresponding to the area 312.

As described above, the scanning order in the area 312 is arbitrary, and is not limited to the example in FIG. 26. For example, the pixels 121a may be selected one column at a time (one row in each column), may be selected sequentially in an oblique direction, or may be selected sequentially in a spiral shape.

Furthermore, it is possible that the pixels continuously selected are not adjacent to each other or not. For example, the scanning order may be irregular such as the coordinates (0,0), coordinates (1,2), coordinates (3,1), coordinates (0,2), coordinates (3,3) and the like. Furthermore, it is possible to scan only a part of the pixels 121a in the area 312. Moreover, the scanning order may be variable. For example, the scanning order may be adaptively selected from a plurality of candidates according to a situation. Furthermore, the scanning order may be at random.

Furthermore, in a case where a plurality of areas 312 is present in the pixel region 311, signals may be read out from the pixels 121a in the respective areas 312 in parallel or the signals may be read out from one area 312 at a time. That is, the number of areas 312 to be processed (from which the signals are read out) is arbitrary.

Moreover, in a case where a plurality of areas 312 is present in the pixel region 311, the scanning order in each area 312 may be the same or may be different from each other.

<Configuration>

That is, it is only required that the imaging element 121 be provided with a plurality of pixel output units which receives the incident light incident without intervention of either the imaging lens or the pinhole and each outputs one detection signal indicating the output pixel value modulated by the incident angle of the incident light, and a signal processing unit provided so as to be associated with an area in which at least two pixel output units out of the plurality of pixel output units are formed which processes the signals read out from the pixel output units formed in the area and obtains the output pixel values thereof.

By using such imaging element 121, it is possible to read out the detection signals from the pixel output units more easily and in more various orders as compared with a case of using an imaging element which A/D converts the signals read out from all the pixel output units by one ADC, an imaging element which A/D converts the signals read out from the pixel output units of each column of the pixel array by a column ADC corresponding to the column and the like. Therefore, the imaging device 100 may obtain more various detection images more easily as compared with a case of using the imaging element which A/D converts the signals read out from all the pixel output units by one ADC, the imaging element which A/D converts the signals read out from the pixel output units of each column of the pixel array by the column ADC corresponding to the column and the like.

<Readout Control (Operation Mode)>
<All-Pixel Mode>

Figure 27:
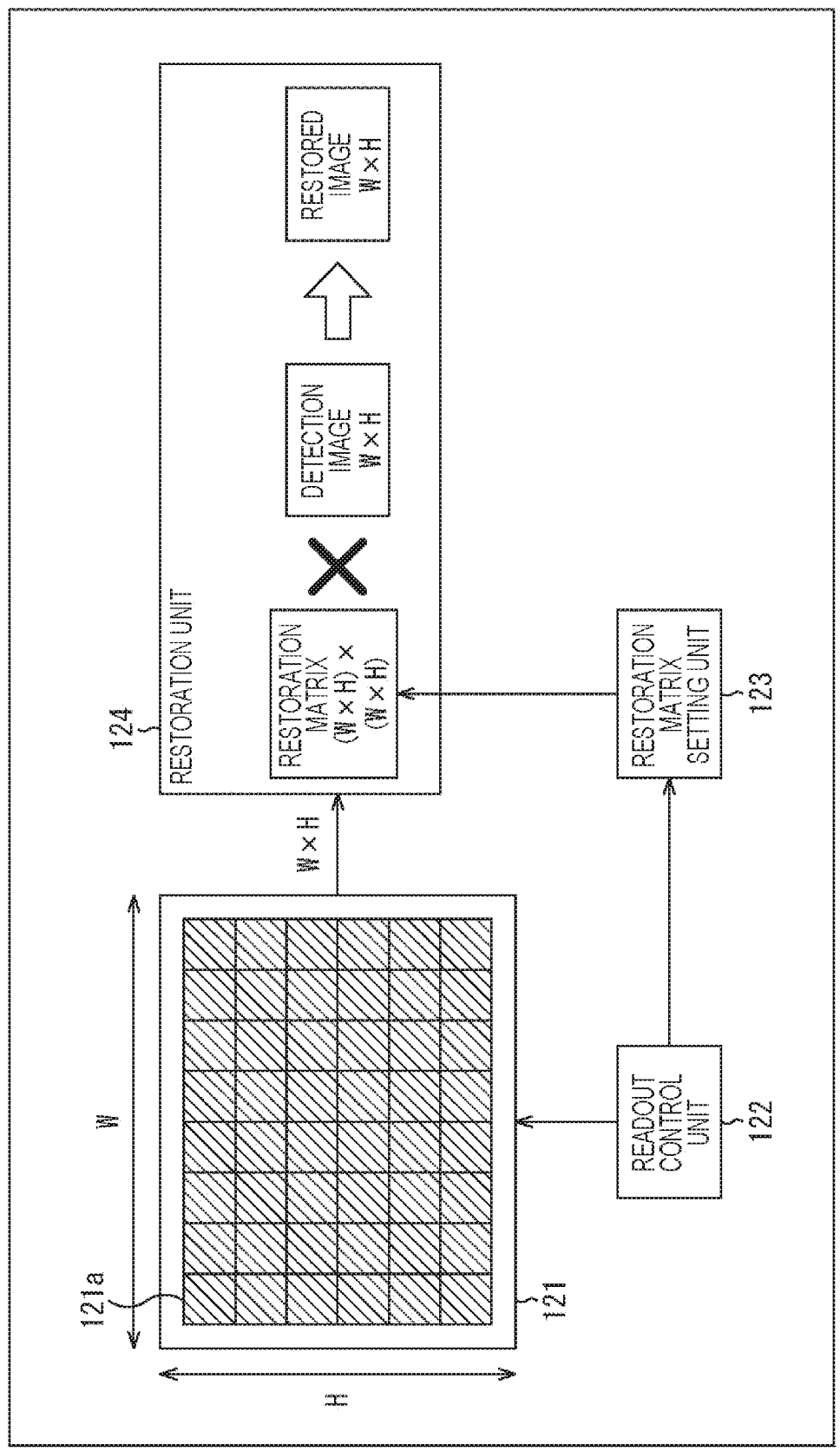
FIG. 27 is a view for illustrating an outline of a method of reading out from all the pixels.

Next, control by the readout control unit 122 is described. As illustrated in FIG. 27, the imaging device 100 may read out the detection signals of all the pixels of the imaging element 121, use all the detection signals to make the detection image, and convert the detection image into the restored image. Such an operation mode is referred to as an all-pixel mode.

In FIG. 27, each square in the imaging element 121 indicates the pixel 121a (pixel unit output), and a state of the pixel array is schematically illustrated in the imaging element 121. Note that, although the pixel array including eight pixels in the horizontal direction and six pixels in the vertical direction is illustrated in FIG. 27, the number of pixels of the imaging element 121 is arbitrary. In this specification, the imaging element 121 includes the pixel array including W pixels in the horizontal direction and H pixels in the vertical direction.

In a case of the all-pixel mode, the readout control unit 122 supplies a readout control signal to the imaging element 121 to read out the detection signals from all the pixels of the imaging element 121. That is, the detection image at resolution (W×H) is read out from the imaging element 121. In FIG. 27, a hatched pixel 121a indicates the pixel 121a from which the detection signal is read out. That is, in a case of the all-pixel mode, the detection signals are read out from all the pixels in the pixel array of the imaging element 121.

Furthermore, the readout control unit 122 supplies the readout control signal to the restoration matrix setting unit 123, too. In a case of generating the restored image at resolution (W×H), the restoration matrix setting unit 123 sets the restoration matrix including (W×H) vertical×(W×H) horizontal coefficients corresponding to the detection image at resolution (W×H) and the restored image at resolution (W×H) according to the readout control signal.

In a case of generating the restored image by the restoration unit 124, the restoration unit 124 obtains the detection image at resolution (W×H) read out from the imaging element 121, obtains the restoration matrix including (W×H) vertical×(W×H) horizontal coefficients set by the restoration matrix setting unit 123, and generates the restored image at resolution (W×H) by using them.

This detection image is obtained by the imaging element 121, information having the characteristic described above with reference to FIGS. 1 to 26. That is, the detection image is the detection image in which the subject including the detection signals obtained by the pixel output units is not visually recognized obtained by imaging the subject by the imaging element provided with a plurality of pixel output units which receives the incident light incident without intervention of either the imaging lens or the pinhole and each outputs one detection signal indicating the output pixel value modulated by the incident angle of the incident light, and the signal processing unit provided in association with the area being the partial region of the pixel region in which the pixel output units are formed which processes the signals read out from the pixel output units formed in the area to obtain the output pixel values thereof.

Then, the restoration matrix also is the restoration matrix described above with reference to FIGS. 1 to 26, and has the above-described characteristic. That is, this restoration matrix is the matrix including the coefficients used when restoring the restored image from the detection image in which the subject cannot be visually recognized. The restoration unit 124 restores the restored image from the detection image by using such restoration matrix.

<Pixel Regular Thinning Mode>

Figure 28:
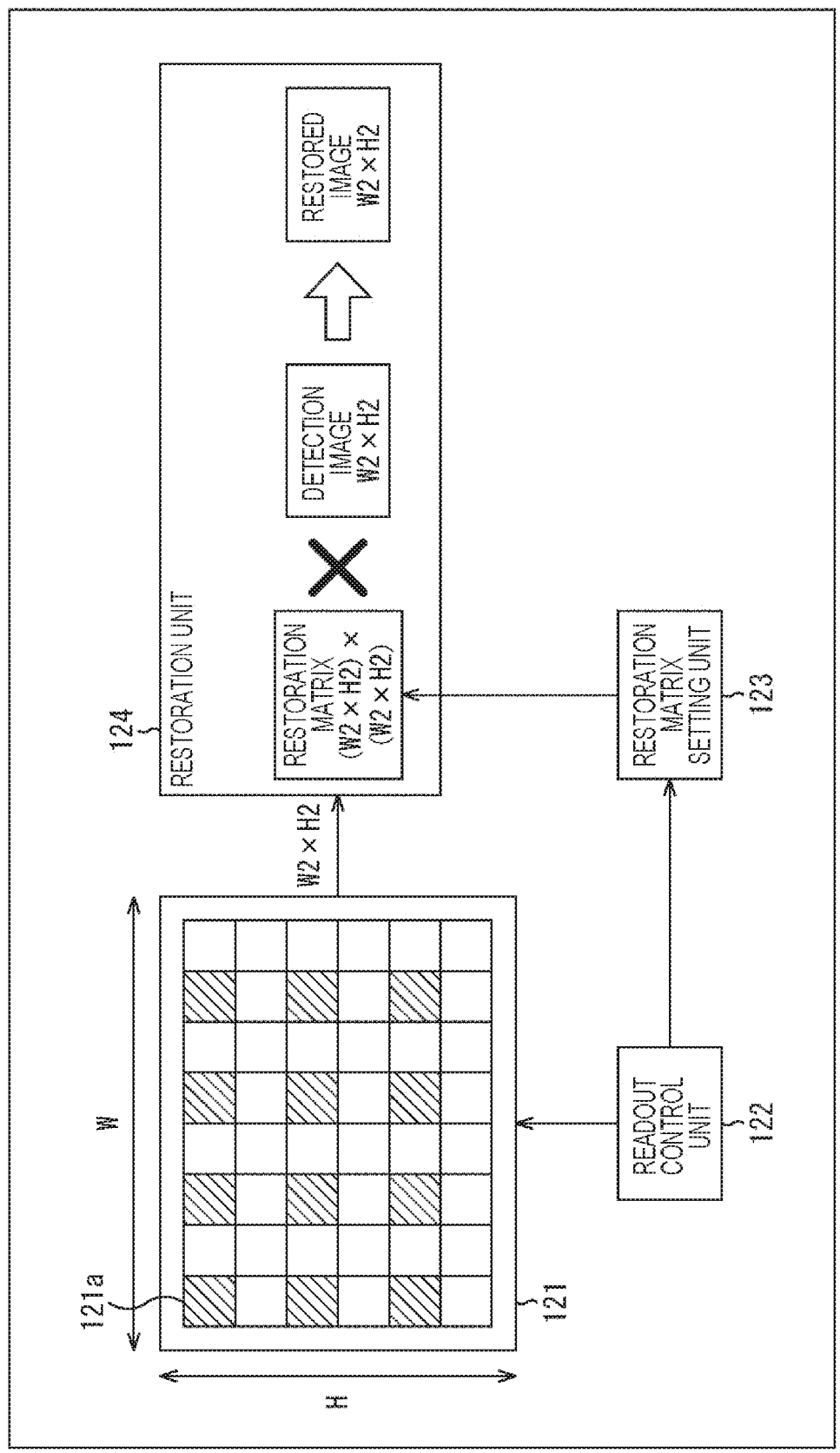
FIG. 28 is a view for illustrating an outline of a method of regularly reading out from a part of the pixels.

Furthermore, the imaging device 100 may read out the detection signals of a part of the pixels of the imaging element 121, use the read out detection signals of a part of the pixels to make the detection image, and convert the detection image into the restored image. Such an operation mode is referred to as a thinning mode. For example, as illustrated in FIG. 28, the imaging device 100 may read out the detection signals of a part of the pixels in a positional relationship with predetermined regularity of the imaging element 121, use the read out detection signals of the part of the pixels in the positional relationship with predetermined regularity to make the detection image, and convert the detection image into the restored image. Such operation mode is referred to as a pixel regular thinning mode.

FIG. 28 illustrates the pixel array in the imaging element 121 as is the case with FIG. 27. In the drawing, the hatched pixels 121a indicate the pixels 121a from which the detection signals are read out.

In a case of the pixel regular thinning mode, the readout control unit 122 supplies the readout control signal to the imaging element 121, and selects a part of the pixels 121a (pixel output units) in positions in the positional relationship with predetermined regularity out of the pixel array (a plurality of pixel output units) of the imaging element 121 to read out the detection signals from the selected pixels 121a (hatched pixels in the drawing). The readout control unit 122 may select the arbitrary number of pixels. For example, W2 horizontal×H2 vertical pixels may be selected. That is, the detection image at resolution (W2×H2) is read out from the imaging element 121.

By doing so, it is possible to reduce the resolution of the detection image. Furthermore, drive of the pixel 121a and the area ADC 321 may be reduced, a processing load (for example, power consumption) regarding readout of the detection signal may be reduced.

Figure 29:
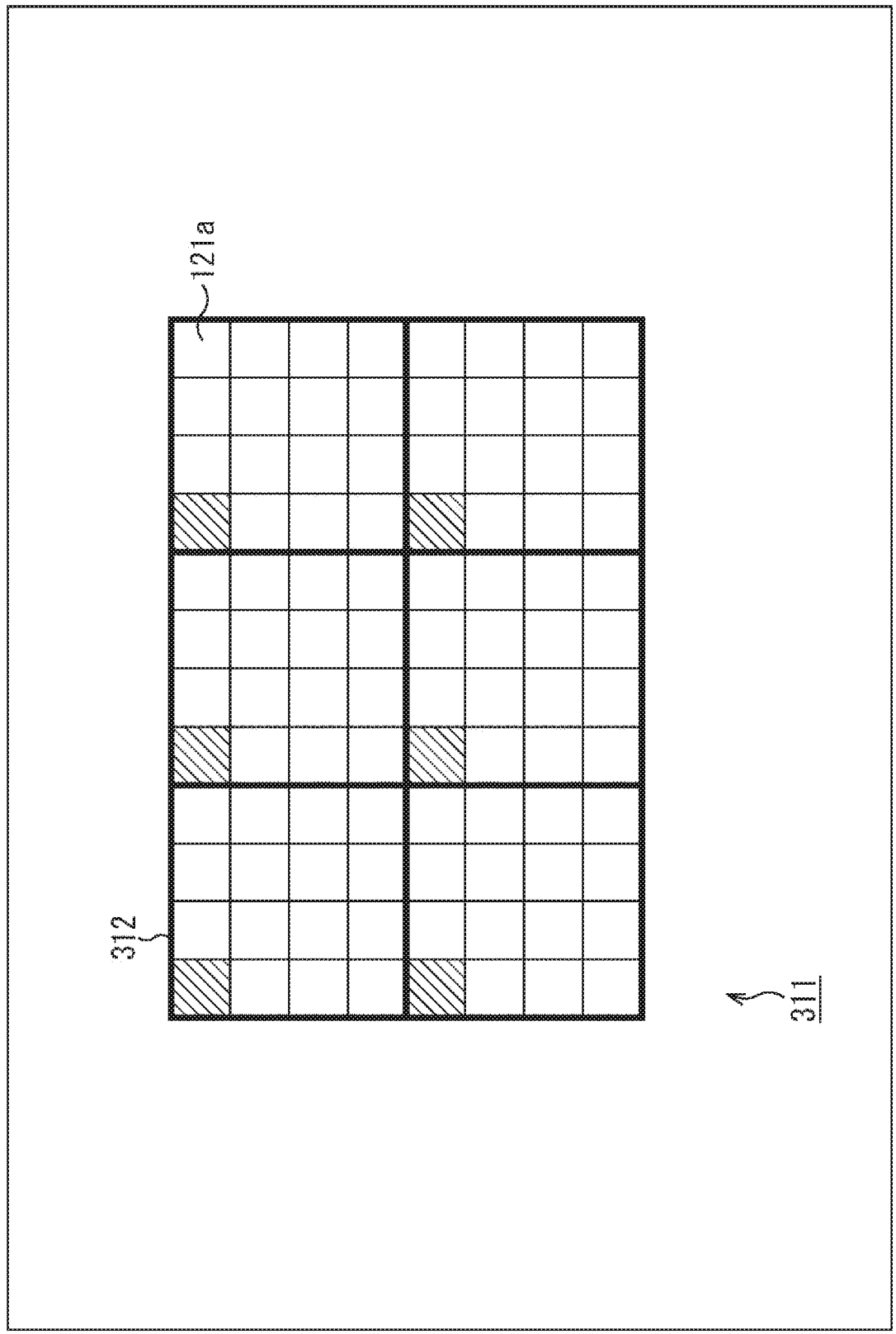
FIG. 29 is a view illustrating an example of a position of the pixel from which a signal is read out.

The pixel from which the signal is read out in this case may be, for example, the pixel in a predetermined position in each area 312 formed in the pixel region 311. For example, it is assumed that the areas 312 including four pixels x four pixels are set in the pixel region 311 without an interval as illustrated in FIG. 29.

In this manner, in a case where the respective areas 312 have the same shape and size, when the readout control unit 122 reads out the detection signal from the pixel in a predetermined position of each area 312 (for example, an upper left end pixel (hatched pixel), this may easily read out the detection signals from the pixels (one in every four pixels) in the positional relationship with predetermined regularity.

As described above, in this case, the number of pixels from which the detection signals are read out is smaller than that in the all-pixel mode. That is, in this case, the number of pixels 121a to be driven may be reduced as compared with that in the all-pixel mode. Furthermore, in this case, it is only required that each area ADC 321 A/D converts the signals read out from a part of the pixels 121a in the area 312 corresponding to the same. That is, in this case, a processing amount of each area ADC 321 may be reduced as compared with that in the all-pixel mode. Therefore, it is possible to reduce the processing load (for example, power consumption) regarding readout of the detection signal.

Moreover, the scanning order in each area 312 may be the same. For example, the scanning order in all the areas 312 may be the order in the example in FIG. 26. By unifying the scanning order in each area 312 in this manner, a readout timing of the pixel in the same position in each area 312 becomes substantially the same. That is, a generation timing of the detection signal read out from each area 312 (that is, a timing of the incident light from the subject for generating the detection signal) is substantially the same. Therefore, it is possible to obtain the detection image including the detection signals at substantially the same timing, so that it is possible to obtain the detection image capable of generating the restored image with less distortion and the like (subjectively high-quality restored image) as compared with a case where the generation timings of the detection signals are unsynchronized (not conform to each other).

For example, in a case of imaging a moving object, a deforming object and the like as the subject, if the generation timing (imaging timing) of the detection signal is different between the pixels, a state of the subject might change while the detection signal is generated in each pixel. Therefore, in the imaged image (restored image), the state of the subject differs between the pixels, and the subjective image quality might be reduced. As described above, since the scanning order in each area 312 is the same, the generation timing of the detection signal read out from each area 312 becomes substantially the same, so that reduction in subjective image quality of the restored image due to such factors may be suppressed.

It goes without saying that, even if the scanning order in each area 312 is not unified, a similar effect may be obtained as long as reading order of the pixel 121a in the area 312 (when this is read out) is the same.

Note that, only when the scanning order in each area 312 is approximated, the generation timing of the detection signal in each pixel (imaging timing) is approximated, so that the reduction in the subjective image quality of the restored image may be suppressed as compared with a case where the generation timings of the detection signals read out from the respective areas 312 are completely unsynchronized.

Moreover, the pixel 121a from which the detection signal is read out may be made a first pixel in the scanning order in the area 312 (that is, the pixel from which the signal is read out first in the area 312). By doing so, the detection signal may be read out earlier than in a case where the detection signal is read out from another pixel.

Note that, in FIG. 29, for simplification of description, only six areas 312 including four pixels x four pixels are illustrated, but the shape, size, number, and the like of the areas 312 are arbitrary as described above. Furthermore, the position of the pixel 121a (pixel output unit) from which the detection signal is read out in the area 312 is also arbitrary, and is not limited to that in the example in FIG. 29 (upper left end) (any position is available).

It is possible to determine in advance (the detection signal of) the pixel to be selected (determine the pixel from which the detection signal is read out, or the pixel the detection signal read out from which is to be selected) may be determined in advance. Furthermore, it is also possible that a plurality of candidates of setting of the pixel to be selected (pixel selection setting) is prepared in advance, and the readout control unit 122 selects from the plurality of candidates. In this case, the readout control unit 122 may select on the basis of an arbitrary condition such as an operation mode of imaging, a frame rate, resolution setting, a subject distance, brightness, time, a position, a user instruction and the like, for example.

Note that, the candidates of the pixel selection setting may be stored in an arbitrary processing unit and the like of the imaging device 100 such as a memory (not illustrated) in the readout control unit 122 and the storage unit 113. In this case, the candidates may be stored at the time of factory shipment of the imaging device 100, or may be stored (or updated) after the factory shipment. It goes without saying that, the candidates of the pixel selection setting may be prepared outside the imaging device 100, and the readout control unit 122 may select from the external candidates.

Furthermore, the readout control unit 122 may arbitrarily set (the detection signal of) the pixel to be selected. In this case, for example, it is possible to prepare an initial value (initial setting) of the pixel selection setting, and the readout control unit 122 updates the initial setting on the basis of an arbitrary condition (for example, the operation mode of the imaging, the frame rate, the resolution setting, the subject distance, the brightness, the time, the position, the user instruction and the like). Furthermore, for example, the readout control unit 122 may set the pixel to be selected on the basis of arbitrary information.

Note that, the readout control unit 122 may supply the readout control signal to the imaging element 121 to read out the detection signals from all the pixels 121a of the pixel array of the imaging element 121, and select the detection signals read out from a part of pixels in the positional relationship having predetermined regularity out of the readout detection signals as the detection signals to be included in the detection image. However, in this case, all the pixels 121a of the pixel array of the imaging element 121 are driven (all the area ADCs 321 are driven as is the case with the all-pixel mode), so that it is possible to reduce the processing load (for example, power consumption) regarding the readout of the detection signal in a case of reading out the detection signals from a part of the pixels 121a as described above as compared to a case of this method.

Furthermore, the readout control unit 122 supplies the readout control signal to be supplied to the imaging element 121 to the restoration matrix setting unit 123, too. For example, in a case of generating the restored image at resolution (W2×H2), the restoration matrix setting unit 123 sets the restoration matrix including (W2×H2) vertical× (W2×H2) horizontal coefficients corresponding to the detection image at resolution (W2×H2) and the restored image at resolution (W2×H2) according to the readout control signal.

In a case of generating the restored image by the restoration unit 124, the restoration unit 124 obtains the detection image at resolution (W2×H2) from the imaging element 121 or the readout control unit 122, obtains the restoration matrix including (W2×H2) vertical x (W2×H2) horizontal coefficients set by the restoration matrix setting unit 123, and generates the restored image at resolution (W2×H2) by using them.

<Pixel Arbitrary Thinning Mode>

Figure 30:
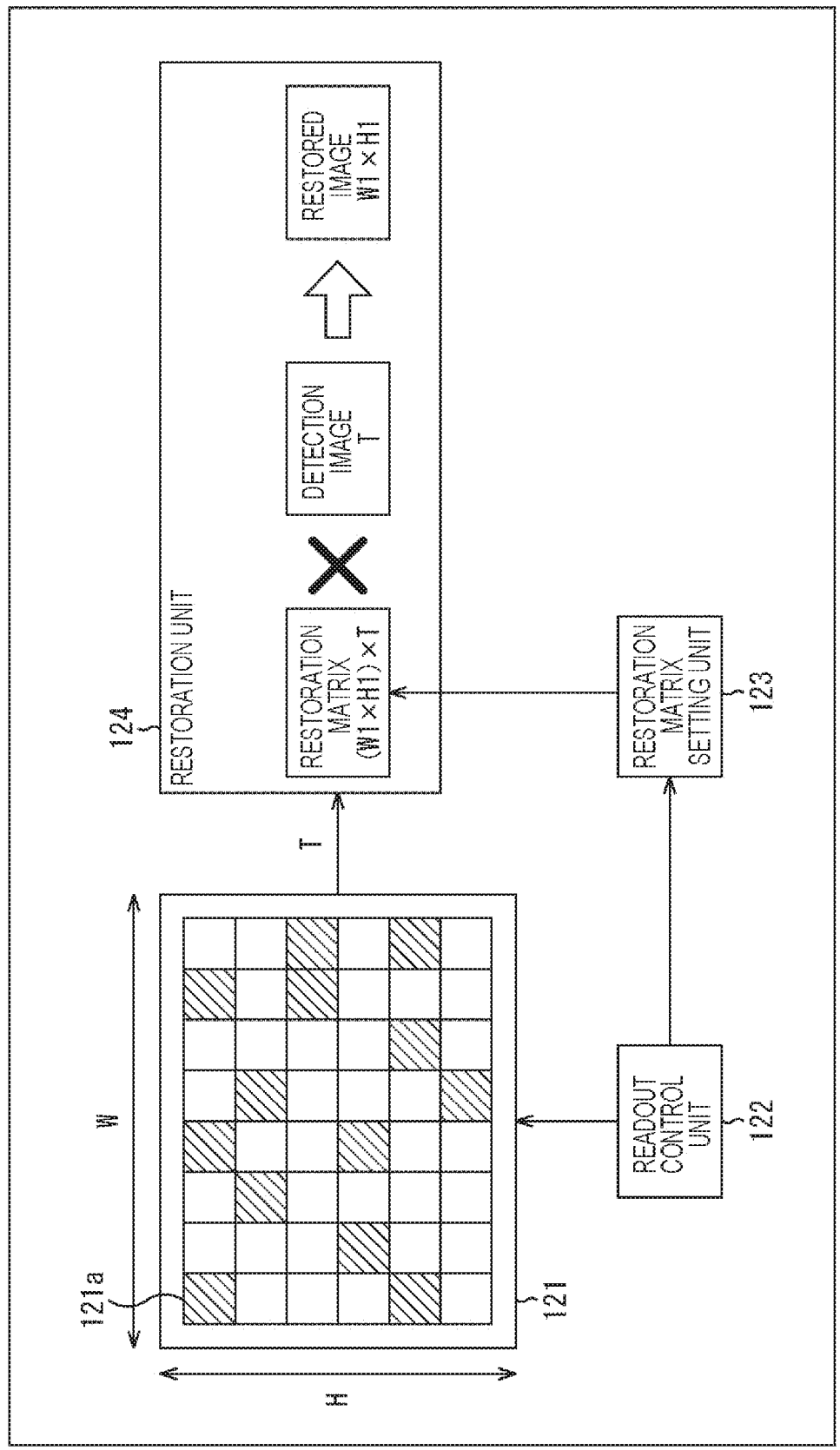
FIG. 30 is a view for illustrating an outline of a method of reading out from an arbitrary part of the pixels.

Furthermore, the imaging device 100 may read out the detection signals of an arbitrary part of the pixels of the imaging element 121, use the read out detection signals of the arbitrary part of the pixels as the detection image, and convert the detection image into the restored image as illustrated in FIG. 30 in a thinning mode. Such an operation mode is referred to as a pixel arbitrary thinning mode.

FIG. 30 illustrates the pixel array in the imaging element 121 as is the case with FIG. 27. In the drawing, the hatched pixels 121a indicate the pixels 121a from which the detection signals are read out.

In a case of the pixel arbitrary thinning mode, the readout control unit 122 supplies the readout control signal to the imaging element 121, and selects a part of the pixels 121a (pixel output units) in arbitrary positions out of the pixel array (a plurality of pixel output units) of the imaging element 121 to read out the detection signals from the selected pixels 121a (hatched pixels in the drawing). The readout control unit 122 may select the arbitrary number of pixels. For example, T pixels may be selected. That is, the detection image including T detection signals is read out from the imaging element 121.

By doing so, it is possible to reduce the resolution of the detection image as is the case with the pixel regular thinning mode. Furthermore, drive of the pixel 121a and the area ADC 321 may be reduced, a processing load (for example, power consumption) regarding readout of the detection signal may be reduced.

Figure 31:
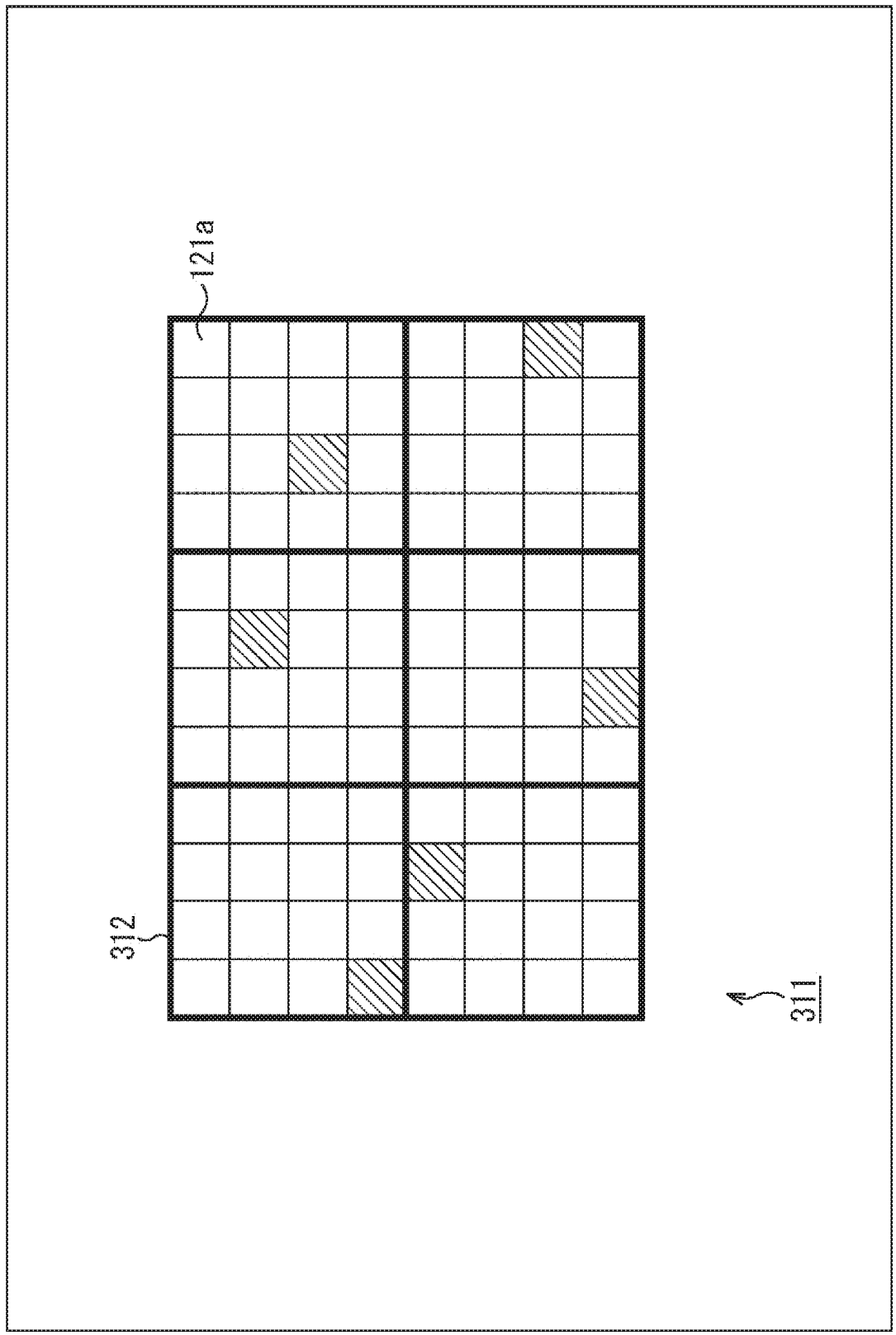
FIG. 31 is a view illustrating an example of a position of the pixel from which a signal is read out.

The pixel from which the signal is read out in this case may be, for example, the pixel in an arbitrary position in each area 312 formed in the pixel region 311. For example, as illustrated in FIG. 31, the pixel 121a (hatched pixel in the drawing) in an arbitrary position in each of the areas 312 including four pixels x four pixels set without any interval in the pixel region 311 may be the pixel 121a from which the detection signal is read out. The number of pixels 121a from which the detection signal is read out in each area 312 is arbitrary, and it is possible that this is unified or not in all the areas 312.

As described above, in this case also, as is the case with the pixel regular thinning mode, the number of pixels from which the detection signal is read out is smaller than that in the all-pixel mode. That is, in this case, the number of pixels 121a to be driven may be reduced as compared with that in the all-pixel mode. Furthermore, in this case, it is only required that each area ADC 321 A/D converts the signals read out from a part of the pixels 121a in the area 312 corresponding to the same. That is, in this case, a processing amount of each area ADC 321 may be reduced as compared with that in the all-pixel mode. Therefore, it is possible to reduce the processing load (for example, power consumption) regarding readout of the detection signal.

Moreover, it is possible that the scanning order in each area 312 is not unified. For example, the scanning order in each area 312 may be set such that the reading order in the area 312 of the pixel 121a (hatched pixel in the drawing) from which the detection signal is read out of each area 312 (when this is read out) is the same. By doing so, as is the case with the pixel regular thinning mode, it is possible to obtain the detection image including the detection signals at substantially the same timing, so that it is possible to obtain the detection image capable of generating the restored image with less distortion and the like (subjectively high-quality restored image) as compared with a case where the generation timings of the detection signals are unsynchronized (not conform to each other). That is, it is possible to suppress reduction in subjective image quality of the restored image.

Note that, only when the scanning order in each area 312 is approximated, the generation timing of the detection signal in each pixel (imaging timing) is approximated, so that the reduction in the subjective image quality of the restored image may be suppressed as compared with a case where the generation timings of the detection signals read out from the respective areas 312 are completely unsynchronized.

Moreover, the pixel 121a from which the detection signal is read out may be made a first pixel in the scanning order in the area 312 (that is, the pixel from which the signal is read out first in the area 312). By doing so, the detection signal may be read out earlier than in a case where the detection signal is read out from another pixel as is the case of the pixel regular thinning mode.

Note that, in FIG. 31, as is the case with FIG. 29, for simplification of description, only six areas 312 including four pixels×four pixels are illustrated, but the shape, the size, the number and the like of the areas 312 are arbitrary as described above. Furthermore, the position of the pixel 121a (pixel output unit) from which the detection signal is read out in the area 312 is also arbitrary, and is not limited to that in the example in FIG. 31 (any position is available).

Moreover, the number of pixels 121a from which the detection signal is read out of each area 312 is arbitrary, and a plurality of pixels may be read out from each area 312. Furthermore, it is possible that the number of pixels 121a from which the detection signal is read out in each area 312 is unified or not. The pixel to be selected may be determined in advance as is the case with the pixel regular thinning mode, the readout control unit 122 may select this from a plurality of candidates, or the readout control unit 122 may arbitrarily set the same.

Note that, the readout control unit 122 may supply the readout control signal to the imaging element 121 to read out the detection signals from all the pixels 121a of the pixel array of the imaging element 121, and select the detection signals read out from an arbitrary part of the pixels out of the read out detection signals as the detection signals to be included in the detection image. However, in this case, all the pixels 121a of the pixel array of the imaging element 121 are driven (all the area ADCs 321 are driven as is the case with the all-pixel mode), so that it is possible to reduce the processing load (for example, power consumption) regarding the readout of the detection signal in a case of reading out the detection signals from a part of the pixels 121a as described above as compared to a case of this method.

Furthermore, the readout control unit 122 supplies the readout control signal to be supplied to the imaging element 121 to the restoration matrix setting unit 123, too. In a case of generating the restored image at resolution (W1×H1), the restoration matrix setting unit 123 sets the restoration matrix including (W1×H1) vertical x T horizontal coefficients corresponding to the detection image including the T detection signals and the restored image at resolution (W1×H1) according to the readout control signal.

In a case of generating the restored image by the restoration unit 124, the restoration unit 124 obtains the detection image including the T detection signals from the imaging element 121 or the readout control unit 122, obtains the restoration matrix including (W1×H1) vertical x T horizontal coefficients set by the restoration matrix setting unit 123, and generates the restored image at resolution (W1×H1) by using them.

<Thinning Mode>

As described above, the imaging device 100 may read out the detection image from the imaging element 121 in the thinning mode (pixel regular thinning mode or pixel arbitrary thinning mode). That is, in the imaging element 121, the signal may be read out from a predetermined pixel 121a (pixel output unit) of a plurality of areas 312 formed in the pixel region 311, and each area ADC 321 (signal processing unit) associated with each of the plurality of areas 312 may perform processing (A/D conversion) on the detection signal read out from the pixel of the area 312 corresponding to the same. By doing so, the resolution of the detection image may be reduced as described above. Furthermore, it is possible to reduce the processing load (for example, power consumption) regarding the readout of the detection signal.

<Field of View Setting>

Note that, in a case where the resolution of the detection image is reduced as in the above-described thinning mode (pixel arbitrary thinning mode or pixel regular thinning mode), the incident angle directivity of the entire detection image after the resolution reduction may be equivalent to the incident angle directivity of the entire detection image before the resolution reduction, that is, the entire detection image in the all-pixel mode. That is, an entire set of pixels (pixel output units) from which the detection signals are read out in each area 312 may have the incident angle directivity equivalent to that of an entire pixel group in the pixel region 311.

The fact that the incident angle directivity is equivalent is intended to mean that the same range of the subject surface may be imaged, that is, the field of view is equivalent. For example, as illustrated in an upper part of FIG. 32, suppose that a range 362 is imaged when the imaging element 121 images the subject surface 361 at a field of view 363. In a case of considering only the horizontal direction in the drawing, the center of gravity of the incident angle directivity of each pixel 121a of the imaging element 121 is distributed in a range of the field of view 363. In other words, an angular range of the center of gravity of the incident angle directivity of each pixel 121a of the imaging element 121 is the field of view 363. That is, in a case of selecting the pixel such that the incident angle directivity is equivalent, (the detection signal of) the pixel is selected such that the angular range of the center of gravity of the incident angle directivity of each pixel is equivalent before and after the reduction in resolution.

When target resolution of the range 362 is determined, a size of resolution 364 of the field of view is determined. In other words, the resolution 364 is an angular difference between the centers of gravity of the incident angle directivities of the respective pixels. That is, when the resolution is reduced, it is necessary to increase the angular difference between the centers of gravity of the incident angle directivities of the respective pixels.

Figure 32:
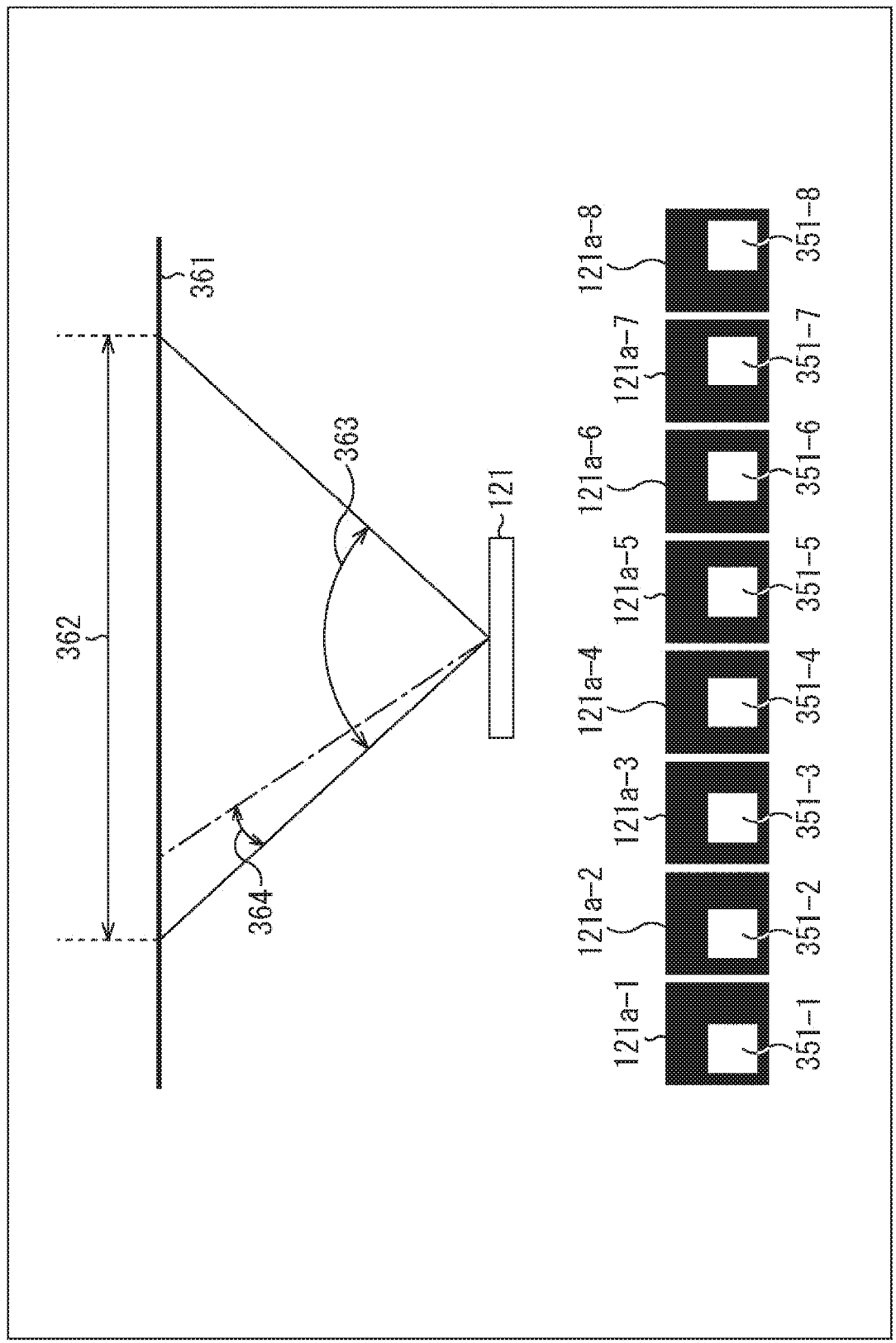
FIG. 32 is a view for illustrating a method of making directivity equivalent.

This may also be said from the fact that the number of pixels for realizing the field of view 363 is reduced. For example, as illustrated in a lower part of FIG. 32, it is assumed that the field of view 363 is realized by the pixels (pixels 121a-1 to 121a-8) having openings formed in eight positions in the horizontal direction. An opening 351-1 is formed on a light incident surface of the pixel 121a-1. Similarly, openings 351-2 to 351-8 are formed on light incident surfaces of the pixels 121a-2 to 121a-8, respectively. As illustrated in FIG. 32, the positions of the openings 351-1 to 351-8 in the respective pixels are shifted from left to right in the horizontal direction, and the opening 351-1 is formed on a leftmost side in the pixel and the opening 351-8 is formed on a rightmost side in the pixel. When the pixels 121a-1, 121a-3, 121a-5, and 121a-7 are selected therefrom, for example, the angular difference between the centers of gravity of the incident angle directivities of the respective pixels is approximately doubled, and it is possible to reduce the resolution with the field of view 363 substantially equivalent.

That is, by increasing the angular difference between the centers of gravity of the incident angle directivities represented by the respective pixel output units of the detection image to reduce the resolution so as to maintain the field of view 363, it is possible to make the incident angle directivity of the detection image equivalent before and after the resolution is reduced.

Although the horizontal direction is described above, it is similar to the vertical direction. That is, by increasing the angular difference between the centers of gravity of the incident angle directivities represented by the respective pixel output units of the detection image to reduce the resolution so as to maintain the field of view, it is possible to make the incident angle directivity of the detection image equivalent before and after the resolution is reduced.

By doing so, it is possible to reduce the resolution without reducing the field of view (FOV) of the restored image. That is, it is possible to reduce the resolution without changing a content of the restored image.

In order to do this in the pixel regular thinning mode, the entire pixel output unit group in the positional relationship having predetermined regularity of the imaging element 121 is designed to have the incident angle directivity equivalent to that of all the pixel output units of the imaging element 121. The readout control unit 122 is only required to select the pixel output unit group designed in this manner.

In order to do this in the pixel arbitrary thinning mode, the readout control unit 122 is only required to select the pixel output unit such that all the selected pixel output units has the incident angle directivity equivalent to that of all the pixel output units of the imaging element 121.

It goes without saying that the incident angle directivity of the entire pixel (pixel output unit) group selected as the pixels from which the detection signals are read out is made different from the incident angle directivity of all the pixel output units of the imaging element 121 in a case of the pixel regular thinning mode and in a case of the pixel arbitrary thinning mode. In any mode, it is only required that the incident angle directivity of the entire pixel (pixel output unit) group selected as the pixels from which the detection signals are read out be made such that the image quality of the restored image is more appropriate. That is, it is only required to design the directivity of each pixel (pixel output unit) selected as the pixel from which the detection signal is read out such that such incident angle directivity may be obtained (the image quality of the restored image is improved).

<Imaging Processing Flow>

An example of a flow of imaging processing in which the imaging device 100 performs imaging in the above-described all-pixel mode or thinning mode is described with reference to a flowchart in FIG. 33.

When the imaging processing is started, the control unit 101 selects the operation mode (all-pixel mode or thinning mode) at step S101. At step S102, the control unit 101 determines whether the operation mode selected at step S101 is the all-pixel mode or not. In a case where the mode is determined to be the all-pixel mode, the procedure shifts to step S103.

At step S103, the imaging device 100 executes all-pixel mode imaging processing and performs the imaging in the all-pixel mode. When the processing at step S103 is finished, the procedure shifts to step S105. Furthermore, in a case where the selected operation mode is determined not to be the all-pixel mode at step S102 (determined to be the thinning mode), the procedure shifts to step S104.

At step S104, the imaging device 100 performs the imaging in the thinning mode. When the processing at step S104 is finished, the procedure shifts to step S105.

At step S105, the control unit 101 determines whether to finish the imaging processing or not. In a case where it is determined that the imaging processing is not finished, the procedure returns to step S101. That is, at step S105, each processing at steps S101 to S105 is repeatedly executed until it is determined that the imaging processing is finished.

In a case where it is determined at step S105 that the imaging processing is finished, the imaging processing is finished.

<Flow of all-Pixel Mode Imaging Processing>

Figure 33:
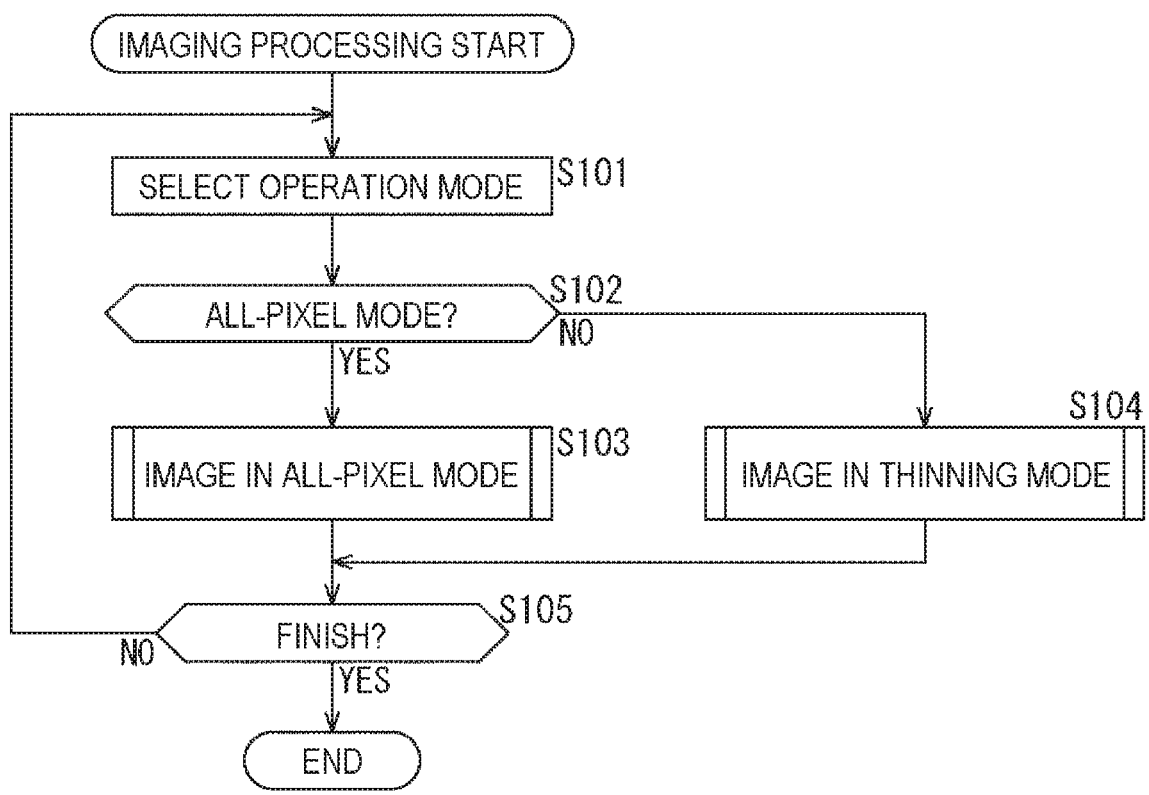
FIG. 33 is a flowchart for illustrating an example of a flow of imaging processing.
Figure 34:
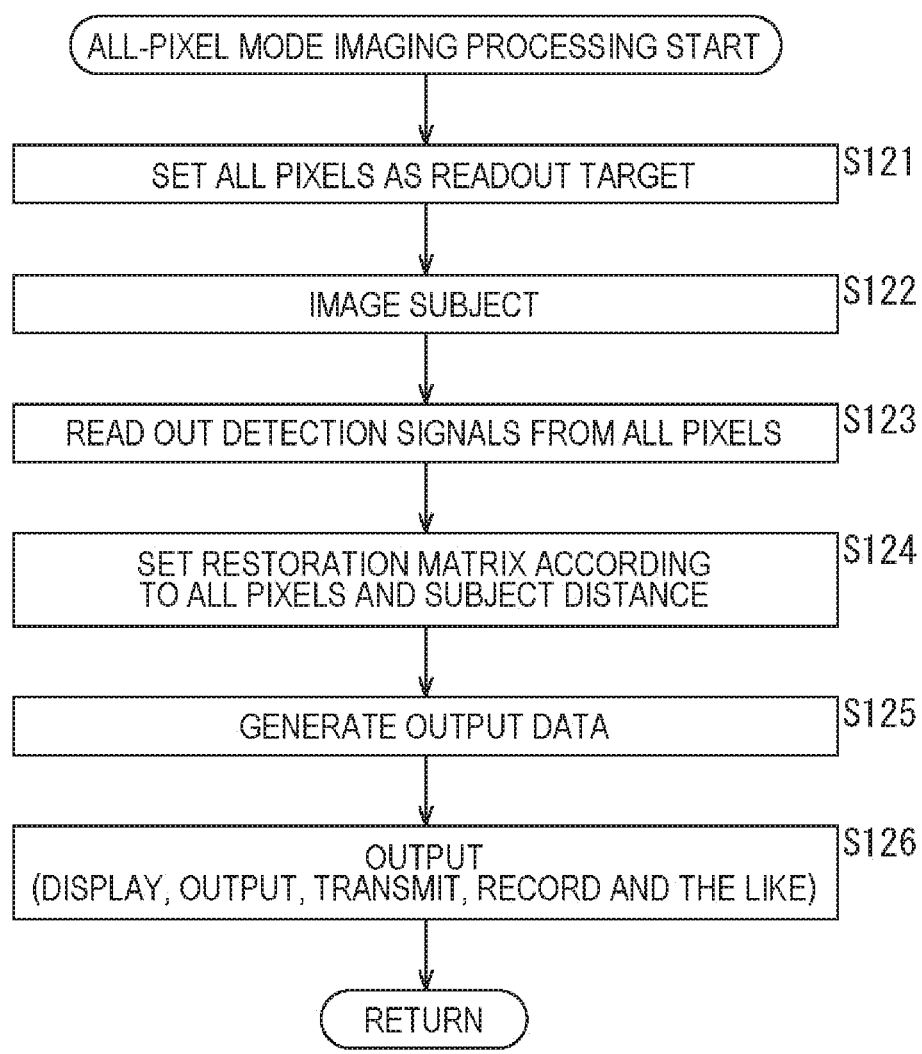
FIG. 34 is a flowchart for illustrating an example of a flow of all-pixel mode imaging processing.

Next, an example of a flow of the all-pixel mode imaging processing executed at step S103 in FIG. 33 is described with reference to a flowchart in FIG. 34.

When the all-pixel mode imaging processing is started, the readout control unit 122 sets all the pixels 121a in the pixel region 311 of the imaging element 121 as a target from which the detection signals are read out at step S121.

At step S122, the imaging element 121 images the subject. At step S123, the readout control unit 122 reads out the detection signals obtained by the processing at step S122 from all the pixels in the pixel region 311 of the imaging element 121 and generates the detection image by using them.

At step S124, the restoration matrix setting unit 123 sets the restoration matrix according to all the pixels (all-pixel mode) and the subject distance.

At step S125, the restoration unit 124 generates output data (for example, the restored image) from the detection image obtained by the processing at step S123 by using the restoration matrix set at step S124.

For example, the restoration unit 124 converts the detection image into the restored image by using the restoration coefficients. The restoration unit 124 makes data of the restored image the output data. Furthermore, for example, the association unit 125 associates data of the restoration coefficients with the data of the detection image and makes the same the output data.

At step S126, the output data is output. This output includes an arbitrary method. For example, this output may include image display, data output to another device and printing, storage in a storage medium, transmission to a communication partner, recording on a recording medium 116 and the like.

First, a case is described in which the raw image (this may be the restored image subjected to the synchronization processing, the color separation processing and the like (for example, the demosaic processing and the like)) is output. For example, in a case where the output is "display", the restoration unit 124 supplies data and the like of the raw image to the output unit 112. The output unit 112 displays the raw image on an image display device (for example, a liquid crystal display (LCD) and the like) or projects the same from a projector. Furthermore, for example, in a case where the output is "output", the restoration unit 124 supplies the data and the like of the raw image to the output unit 112. The output unit 112 outputs the data and the like of the raw image from an external output terminal to another device. Moreover, for example, in a case where the output is "storage", the restoration unit 124 supplies the data and the like of the raw image to the storage unit 113. The storage unit 113 stores the data and the like of the raw image in its own storage medium. Furthermore, for example, in a case where the output is "transmission", the restoration unit 124 supplies the data and the like of the raw image to the communication unit 114. The communication unit 114 communicates with another device using a predetermined communication method, and transmits the data and the like of the raw image to the communication partner. Moreover, for example, in a case where the output is "recording", the restoration unit 124 supplies the data and the like of the raw image to the recording/reproducing unit 115. The recording/reproducing unit 115 records the data and the like of the raw image on the recording medium 116 mounted thereon.

Next, a case where the data of the detection image and the image restoration coefficients and the like associated with each other are output is described. For example, in a case where the output is "display", the association unit 125 supplies the data of the detection image and the image restoration coefficients and the like associated with each other to the output unit 112. The output unit 112 displays information of an image, a character and the like regarding the data of the detection image and the image restoration coefficients and the like on an image display device (for example, a liquid crystal display (LCD) and the like) or projects the same from a projector. Furthermore, for example, in a case where the output is "output", the association unit 125 supplies the data of the detection image and the image restoration coefficients and the like associated with each other to the output unit 112. The output unit 112 outputs the data of the detection image and the image restoration coefficients and the like associated with each other from the external output terminal to another device. Moreover, for example, in a case where the output is "storage", the association unit 125 supplies the data of the detection image and the image restoration coefficients and the like associated with each other to the storage unit 113. The storage unit 113 stores the data of the detection image and the image restoration coefficients and the like associated with each other to a storage medium of its own. Furthermore, for example, in a case where the output is "transmission", the association unit 125 supplies the data of the detection image and the image restoration coefficients and the like associated with each other to the communication unit 114. The communication unit 114 communicates with another device using a predetermined communication method, and transmits the data of the detection image and the image restoration coefficients and the like associated with each other to the communication partner. Moreover, for example, in a case where the output is "recording", the association unit 125 supplies the data of the detection image and the image restoration coefficients and the like associated with each other to the recording/reproducing unit 115. The recording/reproducing unit 115 records the data of the detection image and the image restoration coefficients and the like associated with each other to the recording medium 116 mounted thereon.

When the output data is output, the all-pixel mode imaging processing ends, and the procedure returns to FIG. 33.

<Flow of Thinning Mode Imaging Processing>

Figure 35:
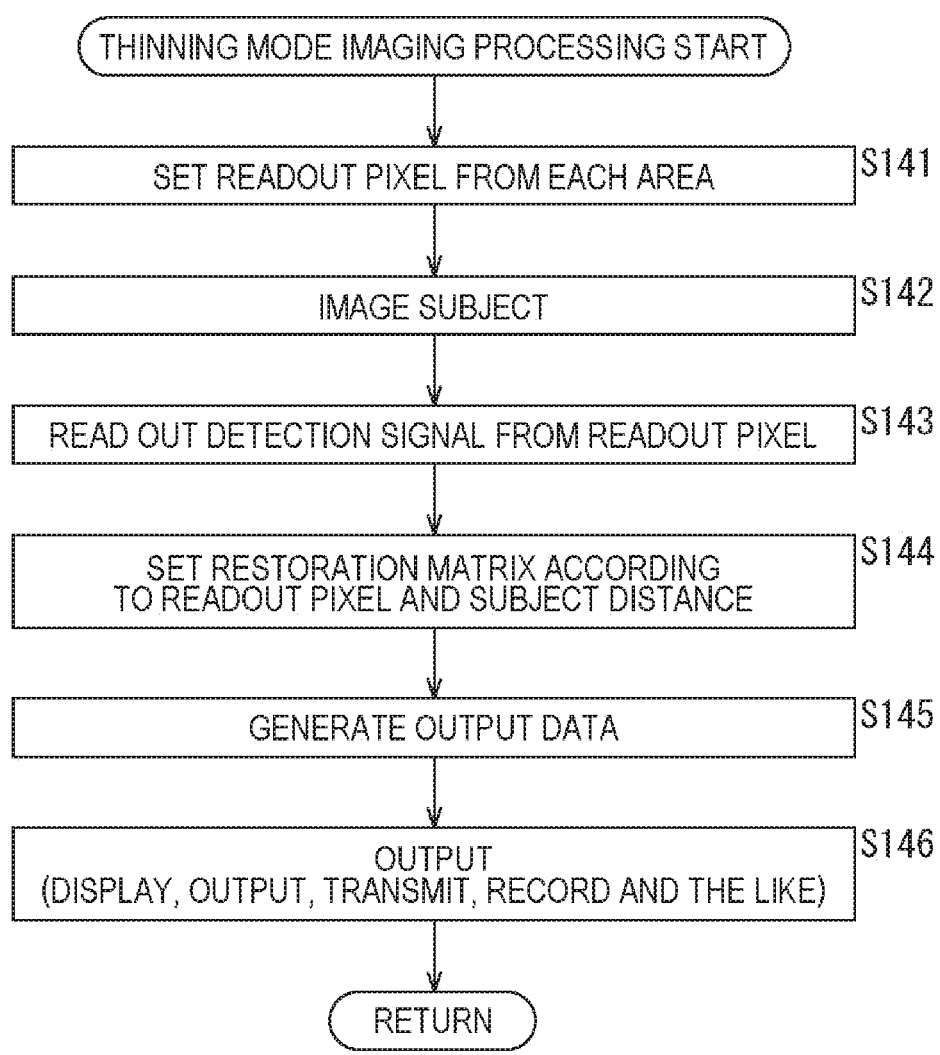
FIG. 35 is a flowchart for illustrating an example of a flow of thinning mode imaging processing.

Next, an example of a flow of thinning mode imaging processing executed at step S104 in FIG. 33 is described with reference to a flowchart in FIG. 35.

When the thinning mode imaging processing is started, at step S141, the readout control unit 122 sets the pixel from which the detection signal is read out (also referred to as a readout pixel) from each area 312 in the pixel region 311 of the imaging element 121.

At step S142, the imaging element 121 images the subject. At step S143, the readout control unit 122 reads out the detection signal obtained by the processing at step S142 from the readout pixel set at step S141 and generates the detection image by using the same.

At step S144, the restoration matrix setting unit 123 sets the restoration matrix according to the readout pixel (thinning mode) and the subject distance.

At step S145, the restoration unit 124 generates the output data (for example, the restored image) from the detection image obtained by the processing at step S143 by using the restoration matrix set at step S144.

For example, the restoration unit 124 converts the detection image into the restored image by using the restoration coefficients. The restoration unit 124 makes data of the restored image the output data. Furthermore, for example, the association unit 125 associates data of the restoration coefficients with the data of the detection image and makes the same the output data.

At step S146, the output data is output. This output includes an arbitrary method. For example, this output may include image display, data output to another device and printing, storage in a storage medium, transmission to a communication partner, recording on a recording medium 116 and the like.

The output of the output data is similar to that in a case of the all-pixel mode, so that the description thereof is omitted. When the output data is output, the thinning mode imaging processing ends, and the procedure returns to FIG. 33.

By executing each processing as described above, the resolution of the detection image may be controlled.

Note that, a case where the imaging may be performed in both the all-pixel mode and the thinning mode is described above; however, for example, it is also possible that the imaging may be performed only in the thinning mode. In this case, the imaging device 100 may execute the thinning mode imaging processing.

2. Second Embodiment

<Area Driving Mode>

Figure 36:
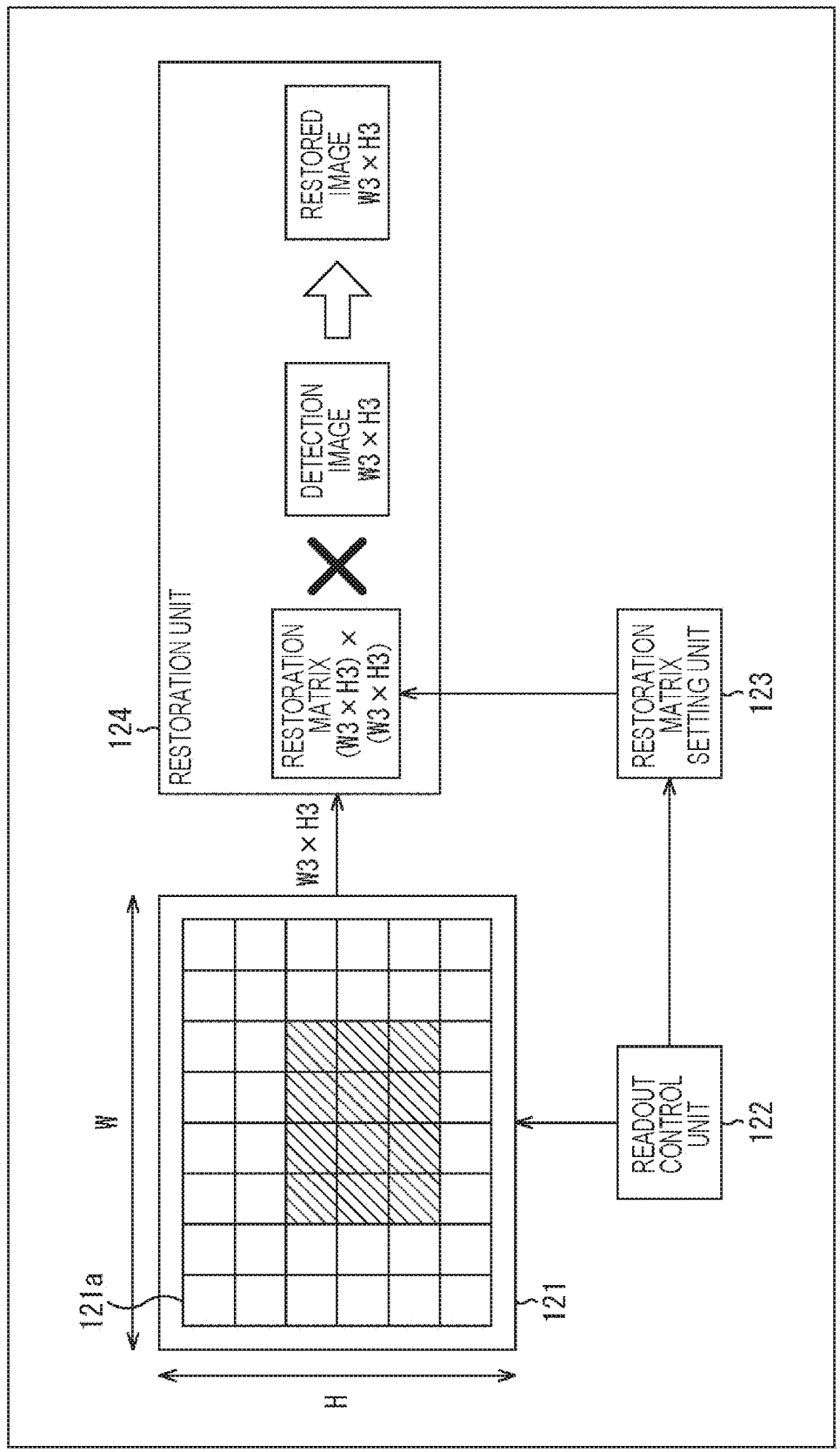
FIG. 36 is a view for illustrating an outline of a method of reading out from the pixels of a predetermined area.

Furthermore, an imaging device 100 may read out detection signals of pixels 121a (hatched pixels in the drawing) formed in an area 312 formed in a pixel region 311 of an imaging element 121, use the read out detection signals to make a detection image, and convert the detection image into a restored image as illustrated in FIG. 36. That is, it is possible that the pixels 121a (pixel output units) (also referred to as readout pixels) from which the detection signals are read out is selected in units of the area 312. Such an operation mode is referred to as an area driving mode.

FIG. 36 illustrates a pixel array in the imaging element 121 as is the case with FIG. 22. In the drawing, the hatched pixels 121a indicate the pixels 121a from which the detection signals are read out. For example, in a case where a predetermined area 312 includes W3 horizontal pixels x H3 vertical pixels, and a readout control unit 122 selects the pixels in this area 312 as the readout pixels, the detection image at resolution (W3×H3) is read out from the imaging element 121.

That is, by imaging in the area driving mode in this manner, the resolution of the detection image may be reduced. Furthermore, drive of the pixel 121a and the area ADC 321 may be reduced, a processing load (for example, power consumption) regarding readout of the detection signal may be reduced.

Figure 37:
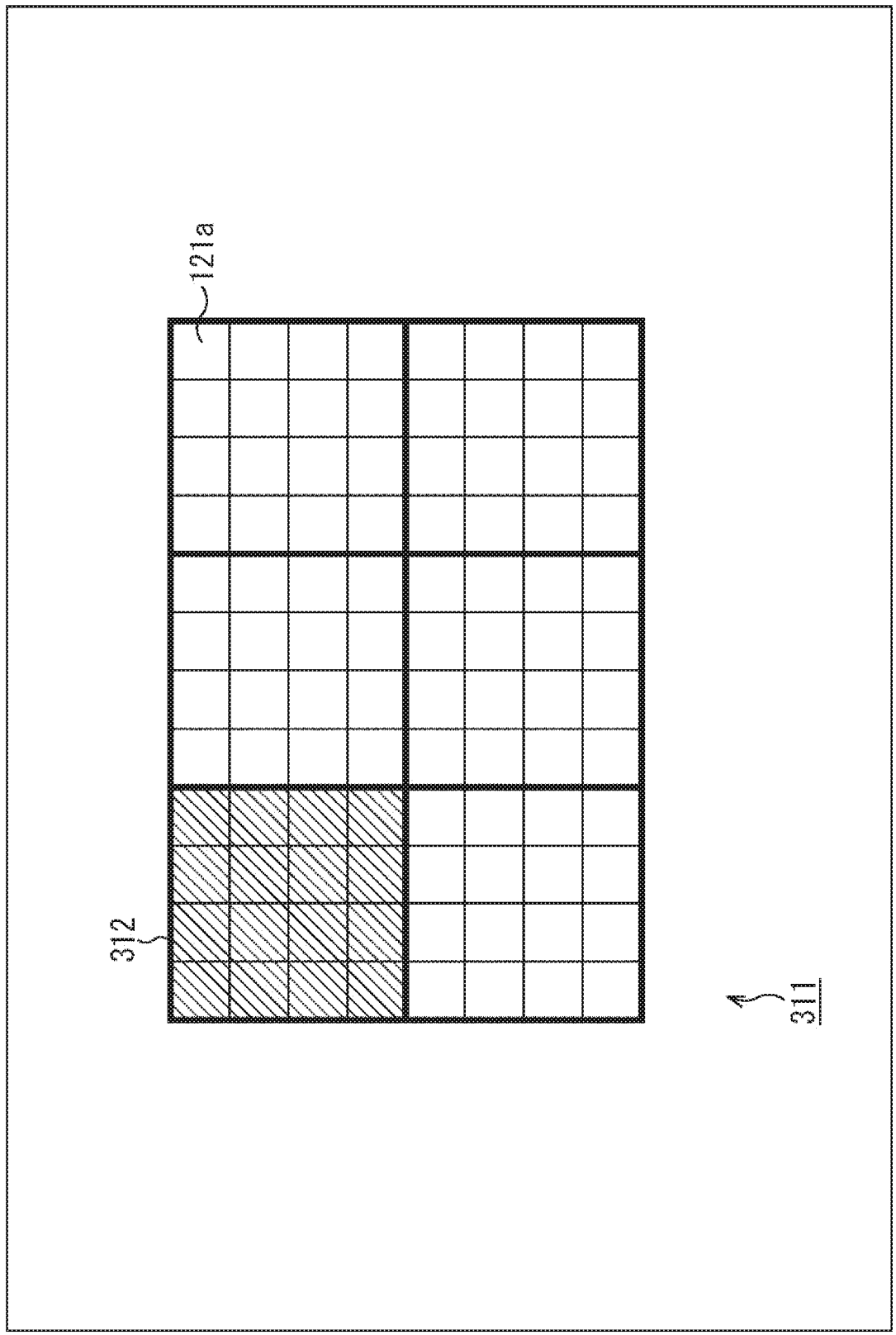
FIG. 37 is a view illustrating an example of a position of the pixel from which a signal is read out.

As described above, in a case of the area driving mode, the readout pixels are selected for each area 312 (in units of the area 312). For example, it is assumed that the areas 312 each including four pixels x four pixels are set in the pixel region 311 without an interval as illustrated in FIG. 37. In a case of the area driving mode, the readout control unit 122 selects the pixels 121a in any one area 312 out of the areas 312 as the pixels (readout pixels) from which the detection signals are read out. In a case of an example in FIG. 37, the pixels 121a in an upper left end area 312 are selected.

In this manner, the imaging device 100 may read out the detection image from the imaging elements 121 by the area driving mode. That is, in the imaging element 121, the signals may be read out from the respective pixel output units of a predetermined partial area 312 out of a plurality of areas 312 formed in the pixel region 311, and the area ADC 321 (signal processing unit) associated with the partial area 312 may perform processing (A/D conversion) on the detection signals read out from the respective pixel output units of the area 312 corresponding to the same.

Note that, in FIG. 37, as is the case with FIG. 29, for simplification of description, only six areas 312 each including four pixels x four pixels are illustrated, but a shape, a size, the number and the like of the areas 312 are arbitrary as described above.

By the way, the area ADC 321 is associated with each area 312 as described above. Therefore, all the signals read out from the respective pixels 121a in one selected area 312 are A/D converted by the corresponding area ADC 321. For example, if one area ADC 321 is associated with each area 312, in a case where the pixels 121a in one area 312 are selected as the readout pixels as illustrated in the example in FIG. 37, it is sufficient that only one area ADC 321 corresponding to the area 312 is driven. That is, in a case of the area driving mode, when the area 312 from which the detection signals are read out is selected, the area ADC 321 to be driven is also selected. Therefore, in a case of the area driving mode, the number of the area ADCs 321 to be driven may be reduced (the number of the area ADCs 321 to be driven unnecessarily may be suppressed), so that it is possible to reduce the processing load (for example, power consumption) regarding readout of the detection signal.

With reference to FIG. 36 again, the readout control unit 122 supplies the readout control signal to be supplied to the imaging element 121 to a restoration matrix setting unit 123, too. In a case of generating the restored image at resolution (W3×H3), the restoration matrix setting unit 123 sets a restoration matrix including (W3×H3) vertical x (W3×H3) horizontal coefficients corresponding to the detection image at resolution (W3×H3) and the restored image at resolution (W3×H3) according to the readout control signal.

In a case of generating the restored image by the restoration unit 124, the restoration unit 124 obtains the detection image at resolution (W3×H3) from the imaging element 121 or the readout control unit 122, obtains the restoration matrix including (W3×H3) vertical x (W3×H3) horizontal coefficients set by the restoration matrix setting unit 123, and generates the restored image at resolution (W3×H3) by using them.

Note that, an incident angle directivity with respect to incident light from a subject of each pixel 121a may be set independently for each area 312. As described above, in a case of the area driving mode, the readout pixels are selected in units of the area 312, so that a field of view of the restored image corresponds to a field of view of an entire pixel output unit group of the selected area 312. That is, by setting the incident angle directivity (field of view) for each area 312, it is possible to set the incident angle directivity (field of view) of the restored image generated from the detection image obtained in the area 312.

Figure 38:
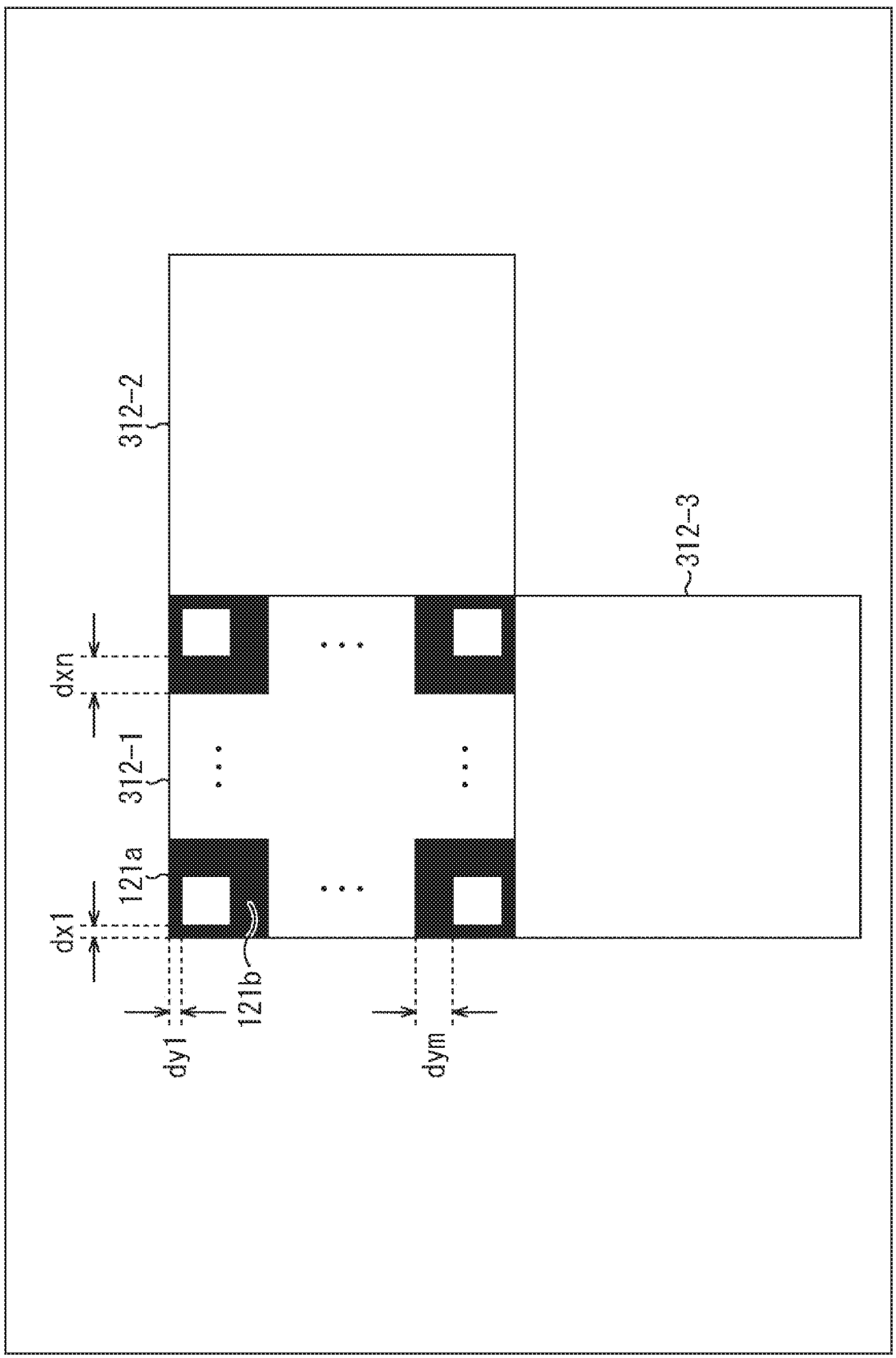
FIG. 38 is a view illustrating an example of a pattern of an opening.

For example, as illustrated in FIG. 38, a configuration of each pixel 121a in the area 312 may be similar to a configuration of each pixel 121a in an entire pixel region 311 illustrated in FIG. 14. For example, a light-shielding pattern of the pixels 121a in the area 312-1 illustrated in FIG. 38 (distribution of light-shielding films 121b and positions of rectangular openings in the respective pixels 121a) may be similar to that of the example in FIG. 14. That is, an entire pixel output unit group formed in the area 312-1 may be designed to have the incident angle directivity equivalent to that of all the pixel output units in the pixel region 311.

Note that, the number of pixels in a region to be processed is different between the example in FIG. 14 (the entire pixel region 311) and the example in FIG. 38 (area 312-1). However, the equivalent incident angle directivity may be obtained by thinning the pixels as described with reference to FIG. 32.

In this manner, by making the entire pixel (pixel output unit) group in the area 312 from which the signals are read out have the incident angle directivity equivalent to that of the entire pixel (pixel output unit) group in the pixel region 311, it is possible to obtain the restored image with the field of view equivalent to that of the restored image obtained from the entire pixel region 311 from the area 312. That is, in the area driving mode also, the restored image with the field of view similar to that in a case of the all-pixel mode may be obtained. Therefore, in this case, by imaging in the area driving mode, it is possible to control the resolution while suppressing a change in the field of view of the restored image.

Furthermore, the incident angle directivity of the other areas 312 such as areas 312-2, 312-3 and the like in FIG. 38 may be set to be similar to that of the area 312-1. In this case, the restored image having the similar field of view may be obtained regardless of the area 312 selected.

Figure 39:
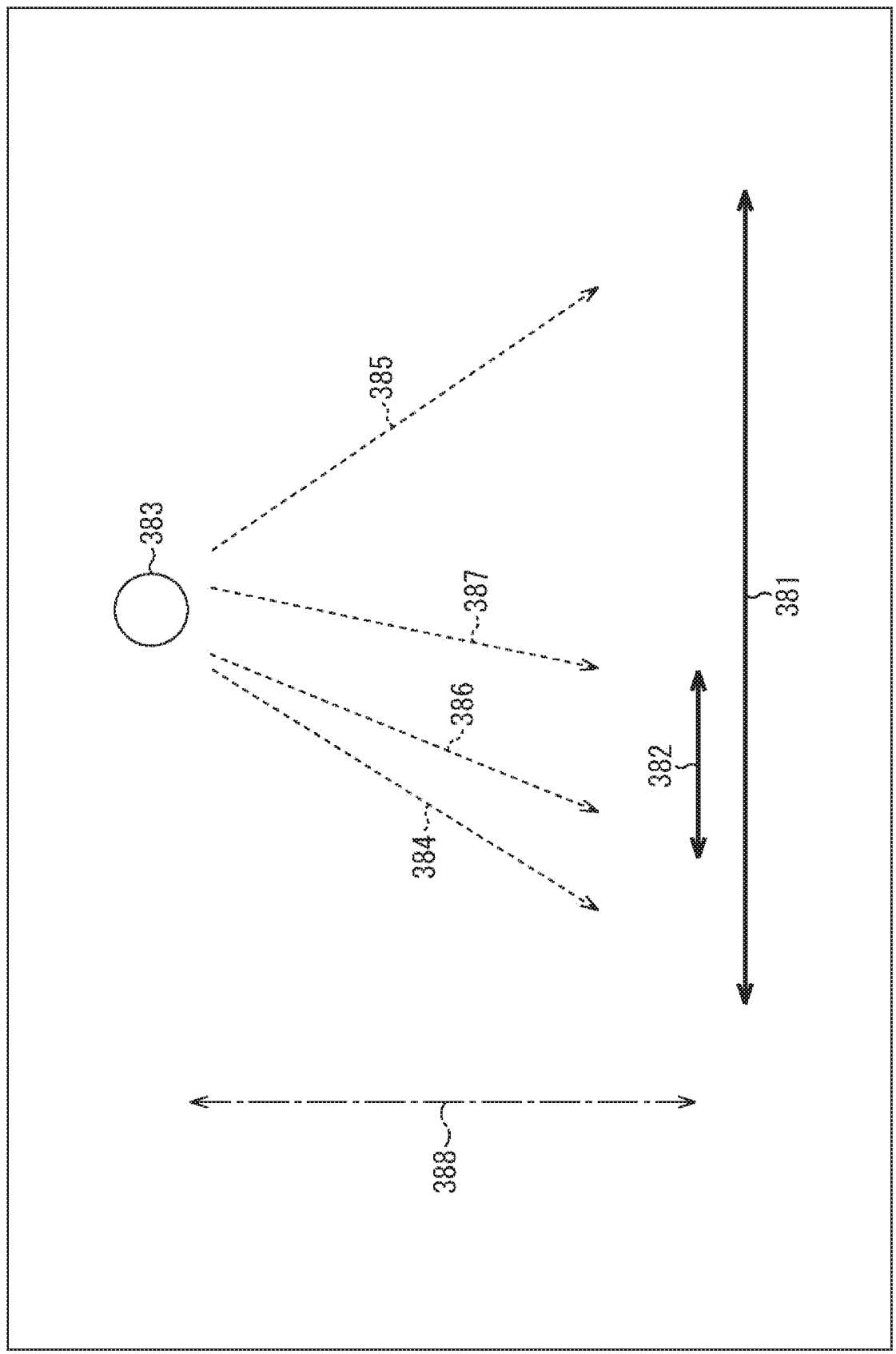
FIG. 39 is a view for illustrating a relationship between an area of a region size and a subject depth.

Since the area 312 is a partial region of the pixel region 311, a distribution range of the pixels 121a is narrow in at least one direction. For example, as illustrated in FIG. 39, assuming that the distribution range of the pixels 121a in the pixel region 311 is indicated by double arrow 381 in a certain direction, the distribution range of the pixels 121a in the area 312 is narrower than this as indicated by double arrow 382. That is, the distribution range of the pixels 121a from which the signals are read out in a case of the area driving mode is narrower than that in a case of the all-pixel mode. Note that, in a case of the thinning mode, basically, there is no restriction in the range of the pixels 121a, so that the distribution range of the pixels 121a is equivalent to that in a case of the all-pixel mode (double arrow 381).

For example, it is assumed that the incident light from a subject 383 is indicated by dotted arrows 384 to 387. In this case, the incident light on the pixels on both ends of the pixel region 311 is as indicated by dotted arrows 384 and 385. Furthermore, the incident light on the pixels on both ends of the area 312 is as indicated by dotted arrows 386 and 387.

Strength (output pixel value) of the detection signal obtained in each pixel 121a depends on the incident angle directivity of each pixel 121a and intensity of the incident light (that is, intensity and angle). In other words, in order to correctly obtain the restored image (correctly obtain a ratio of pixel values), in a case where the incident angles of the incident light on the respective pixels 121a are different from each other, the incident angles must be taken into consideration, but in a case where the incident angles of the incident light on the pixels 121a are uniform, there is no need to consider the incident angle.

Therefore, the closer the incident light from the subject on each pixel is to parallel light, the easier the setting of the restoration matrix for obtaining a correct restored image. For example, in theory, the light from the subject located at infinity from the imaging element 121 is the parallel light.

In a case of the example in FIG. 39, the incident light on the pixels on both the ends of the pixel region 311 (dotted arrows 384 and 385) has a larger difference in incident angle than that of the incident light on the pixels on both the ends of the area 312 (dotted arrows 386 and 387). That is, in a case where a distance from the imaging element 121 to the subject 383 (length of dashed-dotted double arrow 388) is the same, it is easier to set the restoration matrix for obtaining the correct restored image in the detection image obtained from the area 312 than in the detection image obtained from the entire pixel region 311. That is, it is possible to easily obtain the correct restored image in a case of the area driving mode than in a case of the all-pixel mode or the thinning mode.

Furthermore, in other words, in a case of the area driving mode, it is possible to regard a closer subject 383 than in a case of the all-pixel mode or the thinning mode as located at infinity. That is, the restored image with a deeper subject depth may be obtained in a case of the area driving mode than in a case of the all-pixel mode or the thinning mode. In this manner, by imaging in the area driving mode, the resolution and the subject depth of the restored image may be controlled.

It goes without saying that the entire pixel (pixel output unit) group in the area 312 from which the signals are read out may have the incident angle directivity different from that of the entire pixel (pixel output unit) group in the pixel region 311. In this case, by setting the area driving mode, the restored image having a different field of view from that in a case of the all-pixel mode may be obtained. That is, in this case, the resolution and the field of view of the restored image may be controlled by switching between the area driving mode and the all-pixel mode.

For example, the incident angle directivity of each of all the pixels 121a (pixel output units) in a predetermined area 312 may be perpendicular to the pixel region 311. That is, it is possible that the incident angle directivity of each pixel 121a in the area 312 from which the signal is read out is unified, and there is no bias (the direction is perpendicular to the pixel region 311). By making the imaging element 121 have such structure, the imaging in the area driving mode may be used for a specific application such as medical treatment and the like, for example.

For example, a size of the field of view of the entire pixel 121a (pixel output unit) group in a predetermined area 312 may be different from the size of the field of view of the entire pixel 121a (pixel output unit) group in the pixel region 311. For example, the field of view of the entire pixel 121a group in a predetermined area 312 may be larger or smaller than the field of view of the entire pixel 121a group in the pixel region 311. The resolution and the size of field of view of the restored image may be controlled by switching between the area driving mode and the all-pixel mode by making a structure of the imaging element 121 like this.

Furthermore, for example, a direction of the field of view of the entire pixel 121a (pixel output unit) group in a predetermined area 312 may be different from the direction of the field of view of the entire pixel 121a (pixel output unit) group in the pixel region 311. The resolution and the direction of field of view of the restored image may be controlled by switching between the area driving mode and the all-pixel mode by making the structure of the imaging element 121 like this.

Note that, the readout control unit 122 may supply the readout control signal to the imaging element 121 to read out the detection signals from all the pixels 121a (pixel output units) of the pixel region 311 of the imaging element 121, and select the detection signals read out from the pixels 121a formed in a predetermined area 312 out of the read out detection signals as the detection signals to be included in the detection image. However, in this case, all the pixels 121a (pixel output units) of the pixel region 311 of the imaging element 121 are driven (all the area ADCs 321 are driven as is the case with the all-pixel mode), so that it is possible to reduce the processing load (for example, power consumption) regarding readout of the detection signal in a case of reading out the detection signals from the pixels 121a in a partial area 312 as described above than in the case of this method.

<Imaging Processing Flow>

An example of a flow of the imaging processing in which the imaging device 100 images in the above-described all-pixel mode or area driving mode is described with reference to a flowchart in FIG. 40.

When the imaging processing is started, a control unit 101 selects the operation mode (all-pixel mode or area driving mode) at step S161. At step S162, the control unit 101 determines whether the operation mode selected at step S161 is the all-pixel mode or not. In a case where the mode is determined to be the all-pixel mode, the procedure shifts to step S163.

At step S163, the imaging device 100 executes all-pixel mode imaging processing and images in the all-pixel mode. The all-pixel mode imaging processing in this case is similar to that in a case described with reference to the flowchart in FIG. 34, so that the description thereof is omitted.

When the processing at step S163 is finished, the procedure shifts to step S165. Furthermore, in a case where the selected operation mode is determined not to be the all-pixel mode (determined to be the area driving mode) at step S162, the procedure shifts to step S164.

At step S164, the imaging device 100 images in the area driving mode. When the processing at step S164 is finished, the procedure shifts to step S165.

At step S165, the control unit 101 determines whether to finish the imaging processing or not. In a case where it is determined that the imaging processing is not finished, the procedure returns to step S161. That is, at step S165, each processing at steps S161 to S165 is repeatedly executed until it is determined that the imaging processing is finished.

In a case where it is determined at step S165 that the imaging processing is finished, the imaging processing is finished.

<Flow of Area Driving Mode Imaging Processing>

Figure 40:
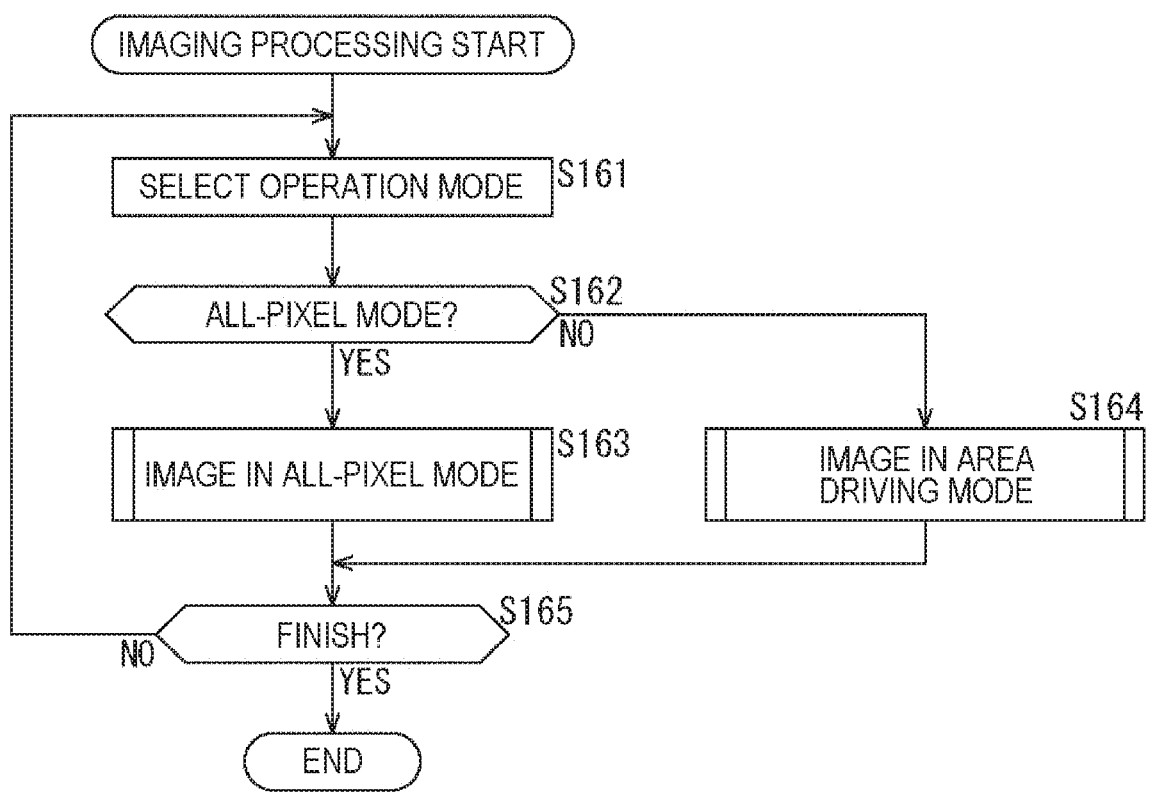
FIG. 40 is a flowchart for illustrating an example of a flow of imaging processing.
Figure 41:
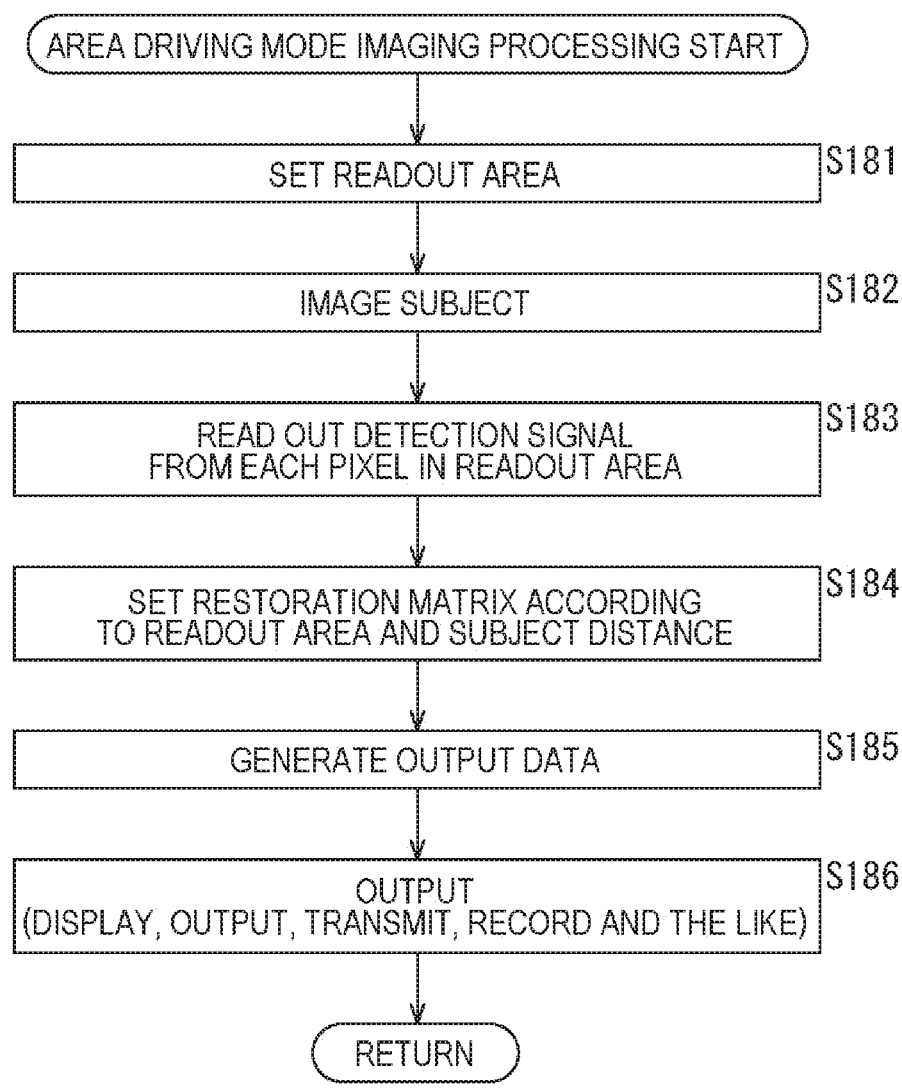
FIG. 41 is a flowchart for illustrating an example of a flow of area driving mode imaging processing.

Next, an example of a flow of area driving mode imaging processing executed at step S164 in FIG. 40 is described with reference to a flowchart in FIG. 41.

When the area driving mode imaging processing is started, at step S181, the readout control unit 122 sets the area 312 from which the detection signals are read out (also referred to as a readout area) from each area 312 in the pixel region 311 of the imaging element 121.

At step S182, the imaging element 121 images the subject. At step S183, the readout control unit 122 reads out the detection signal obtained by the processing at step S182 from each pixel 121a in the readout area set at step S181 and generates the detection image by using the same.

At step S184, the restoration matrix setting unit 123 sets the restoration matrix according to the area 312 being the readout area and the subject distance.

At step S185, the restoration unit 124 generates output data (for example, the restored image) from the detection image obtained by the processing at step S183 by using the restoration matrix set at step S184.

For example, the restoration unit 124 converts the detection image into the restored image by using the restoration coefficients. The restoration unit 124 makes data of the restored image the output data. Furthermore, for example, the association unit 125 associates data of the restoration coefficients with the data of the detection image and makes the same the output data.

At step S186, the output data is output. This output includes an arbitrary method. For example, this output may include image display, data output to another device and printing, storage in a storage medium, transmission to a communication partner, recording on a recording medium 116 and the like.

The output of the output data is similar to that in a case of the all-pixel mode, so that the description thereof is omitted. When the output data is output, the area driving mode imaging processing is finished, and the procedure returns to FIG. 40.

By executing each processing as described above, the resolution of the detection image may be controlled.

<Application Example of Area Driving Mode>

For example, in a case where a still image is imaged by the imaging device 100, imaging for obtaining an imaged image for output (display, output, transmission, recording and the like) may be performed in the all-pixel mode, and capturing (imaging) of a captured image to be displayed on a monitor and the like before the imaging may be performed in the area driving mode.

The captured image for display is generally a moving image displayed on a relatively small monitor, and is mainly for checking a composition and the like when obtaining the imaged image, so that a required image quality level is lower than that of the imaged image. For example, a size of the monitor which displays the captured image is generally small, and its display resolution is often lower than that of the imaged image. Furthermore, for example, a required level of accuracy of a focal distance is also low, and it is often sufficient if the entirety may be roughly grasped.

By capturing the captured image in the area driving mode, a subject depth may be made deeper than that in a case of the all-pixel mode, so that it is possible to obtain the captured image in which more subjects are seemed to be focused on. Furthermore, by imaging (capturing) in the area driving mode, the resolution may be reduced as described above, so that it is possible to suppress the resolution of the captured image from becoming unnecessarily high. That is, an image suitable for the captured image may be obtained. Moreover, an increase in load may be suppressed as described above.

In contrast, by imaging for obtaining the imaged image (still image) in the all-pixel mode, it is possible to obtain a higher-resolution imaged image than that in the imaging in the area driving mode. Furthermore, since the subject depth may be made shallower than that in a case of the area driving mode, more accurate focal distance control may be performed.

By selectively using the all-pixel mode and the area driving mode depending on the application in this manner, it is possible to obtain the captured image of more appropriate image quality while suppressing the reduction in the resolution and image quality of the imaged image (still image) and suppressing the increase in load. That is, it is possible to perform the imaging suitable for more various applications.

<Imaging Processing Flow>

Figure 42:
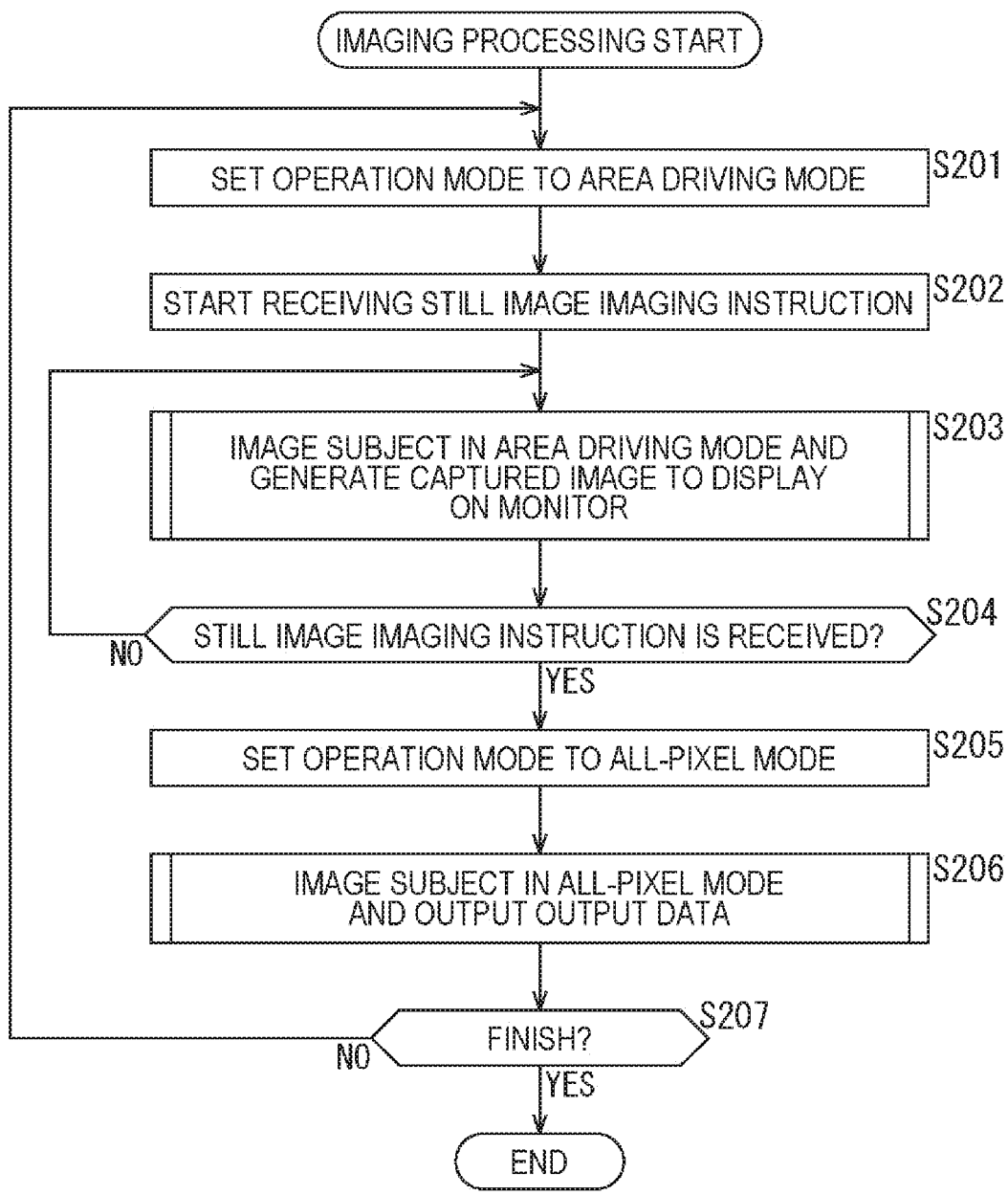
FIG. 42 is a flowchart for illustrating an example of a flow of imaging processing.

An example of a flow of the imaging processing in a case where such imaging is performed is described with reference to a flowchart in FIG. 42.

In this case, when the imaging processing is started, the control unit 101 sets the operation mode to the area driving mode at step S201.

At step S202, an input unit 111 starts receiving an instruction of still image imaging.

At step S203, processing units such as the imaging element 121, the readout control unit 122, the restoration matrix setting unit 123, the restoration unit 124, the output unit 112 and the like execute the area driving mode imaging processing, image the subject in the area driving mode to generate the captured image, and display the generated captured image on the monitor. This area driving mode imaging processing is executed in a flow basically similar to that in a case described with reference to the flowchart in FIG. 41. Therefore, the description is omitted.

At step S204, the input unit 111 determines whether the instruction of still image imaging is received or not. In a case where it is determined that the instruction of still image imaging is not received, the procedure returns to step S203. That is, the area driving mode imaging processing is repeatedly executed until the instruction of still image imaging is received. That is, the captured image is generated as the moving image and displayed on the monitor.

Then, at step S204, in a case where it is determined that the instruction of still image imaging is received, for example, by pressing of an imaging button (shutter button) by a user and the like, the procedure shifts to step S205.

At step S205, the control unit 101 sets the operation mode to the all-pixel mode (switches from the area driving mode to the all-pixel mode).

At step S206, processing units such as the imaging element 121, the readout control unit 122, the restoration matrix setting unit 123, the restoration unit 124, the association unit 125, the output unit 112 and the like execute the all-pixel mode imaging processing, image the subject in the all-pixel mode to generate the output data, and output the output data. This all-pixel mode imaging processing is executed in a flow basically similar to that in a case described with reference to the flowchart in FIG. 34. Therefore, the description is omitted.

That is, the output data obtained in this imaging is output as data corresponding to the imaged image (still image).

At step S207, the control unit 101 determines whether to finish the imaging processing or not. In a case where it is determined not to finish the imaging processing, the procedure returns to step S201 and the subsequent processing is performed. That is, each processing at steps S201 to S207 is repeatedly executed until the imaging processing is finished.

Then, in a case where it is determined at step S207 that the imaging processing is finished, the imaging processing is finished.

By performing the imaging using the all-pixel mode and the area driving mode as described above, the imaging suitable for more various applications may be performed.

Note that, in the above description, the all-pixel mode and the area driving mode are described to be selectively used for capturing the captured image and for obtaining the imaged image; however, the selective use of both the modes is not limited to this example. For example, both the modes may be selectively used for imaging the moving image and imaging the still image. For example, the imaging of the moving image may be performed in the area driving mode with a relatively small load, and the imaging of the still image may be performed in the all-pixel mode in which a higher-quality image may be obtained. By doing so, as is the case with the captured image and the imaged image described above, it is possible to more appropriately control the image quality and load depending on whether the obtained image is the moving image or the still image.

<Area Selection>

For example, a plurality of areas 312 available in the area driving mode may be provided in the pixel region 311 and any one of them may be selected to be used.

For example, in a case where a plurality of areas 312 is set as in the pixel region 311 in FIG. 23, any of the areas 312 may be selected in the area driving mode. That is, in that case, the readout control unit 122 selects the area 312 to be used from a plurality of candidates, and reads out the detection signals from the pixels 121a in the selected area 312.

The basis for selection of this area 312 (criterion by which it is selected) is arbitrary. For example, in a case where there is a defective pixel from which the detection signal cannot be read out normally in the area 312 (for example, there is a predetermined number or more of defective pixels), the readout control unit 122 may switch to another area 312 (another area 312 may be selected). The defective pixel may be detected, for example, on the basis of (the output pixel value of) the obtained detection image.

By doing so, it is possible to suppress a reduction in image quality of the restored image due to aging, manufacturing failure and the like.

Furthermore, for example, it is possible that a plurality of areas 312 having different characteristics is provided in the pixel region 311 and the readout control unit 122 selects the area 312 having a desired characteristic out of the areas 312. For example, a plurality of areas 312 with different incident angle directivities of the entire pixel output unit group in the area 312 may be provided, and the readout control unit 122 may select the area 312 with a desired incident angle directivity from the areas 312 according to the application and the like.

Figure 43:
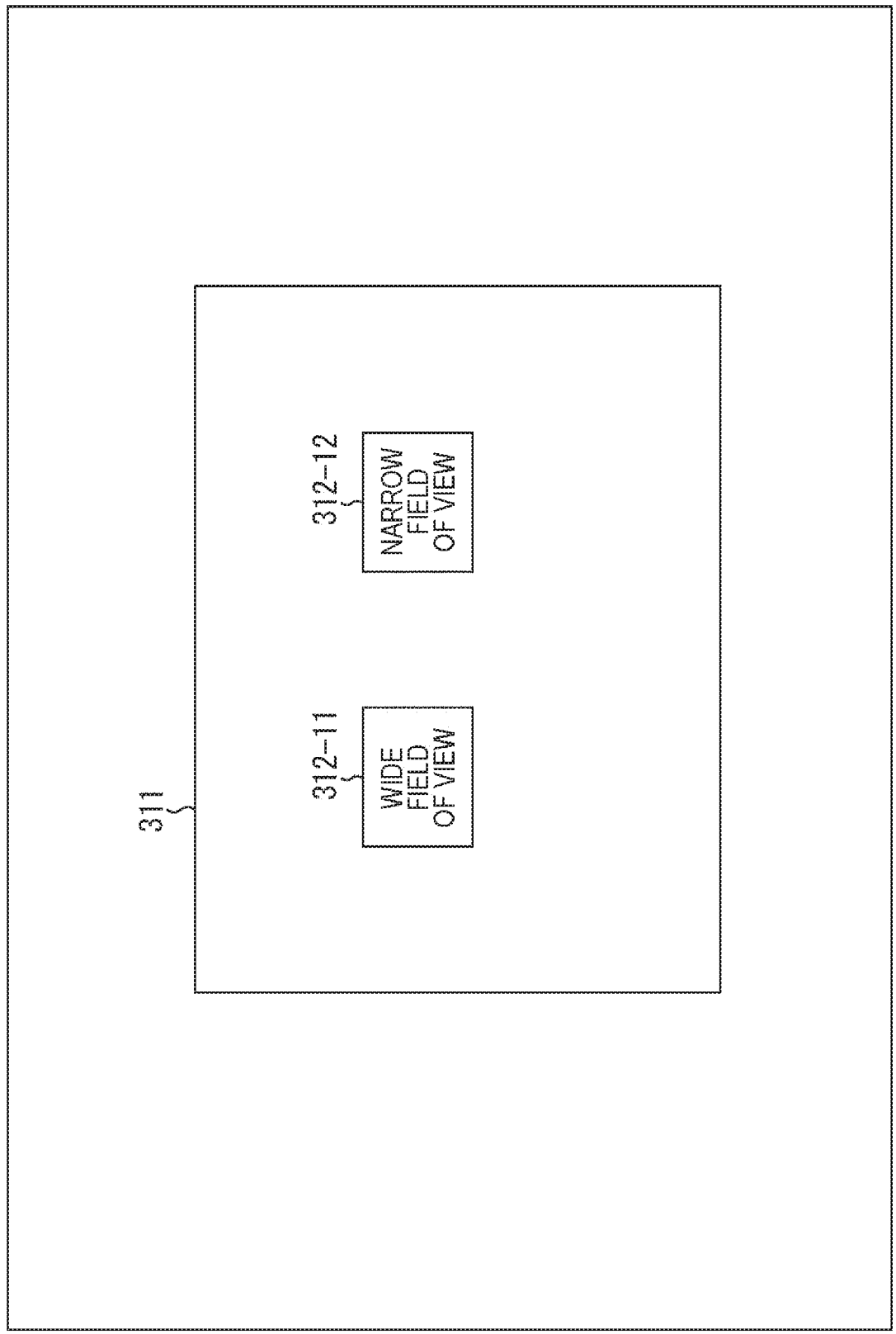
FIG. 43 is a view for illustrating an example of a characteristic of an area.

For example, as illustrated in FIG. 43, it is possible to provide a plurality of areas 312 with different sizes of the field of view of the entire pixel output unit group included therein in the pixel region 311. In a case of FIG. 43, in the pixel region 311, an area 312-11 having a relatively wide field of view of the entire pixel output unit group of the area 312 (with wide field of view) and an area 312-12 having a relatively narrow field of view of the entire pixel output unit group of the area 312 (with narrow field of view) are provided. The readout control unit 122 selects any one of them according to the size of the field of view required for the restored image. For example, in a case where it is desired to obtain the restored image with wide field of view, the readout control unit 122 selects the area 312-11. Furthermore, for example, in a case where it is desired to obtain the restored image with narrow field of view, the readout control unit 122 selects the area 312-12.

Furthermore, for example, it is possible to provide a plurality of areas 312 with different directions of the field of view of the entire pixel output unit group included therein in the pixel region 311.

Note that, parameters compared between a plurality of areas 312 in this manner are arbitrary, and may be other than the incident angle directivity (field of view). For example, this may be the size and shape of the area 312, and the number, size, shape, layout and the like of the included pixels 121a. Furthermore, the number of parameters compared between a plurality of areas 312 is arbitrary, this may be singular or plural.

By doing so, it is possible to obtain the restored image having appropriate characteristics according to more various applications and the like.

Note that, the number of areas 312 to be selected may be variable.

<Plural Area Selection>

For example, the readout control unit 122 may select a plurality of areas 312 and read out the detection image from each area 312. That is, the signal may be read out from each pixel 121a (pixel output unit) of a plurality of areas 312, and a signal processing unit associated with each of the plurality of areas may process the signal read out from each pixel output unit of the area 312 corresponding to the same.

For example, it is possible to simultaneously select the area 312 provided on the left side of the pixel region 311 and the area 312 provided on the right side of the pixel region 311, and read out the detection images from both the areas 312. By doing so, the restored images obtained from the respective detection images may be used as images for stereoscopic viewing mutually having parallax. Furthermore, for example, depth information and the like may be obtained by using the parallax between both the restored images (the areas 312).

3. Third Embodiment

<Switching of Low-Resolution Operation Mode>

The thinning mode and the area driving mode are described above. These operation modes are operation modes of a lower resolution than that of the all-pixel mode. The imaging device 100 may have both the thinning mode and the area driving mode as such low-resolution operation mode. That is, the imaging device 100 may include the all-pixel mode, the thinning mode, and the area driving mode as the operation modes.

<Imaging Processing Flow>

Figure 44:
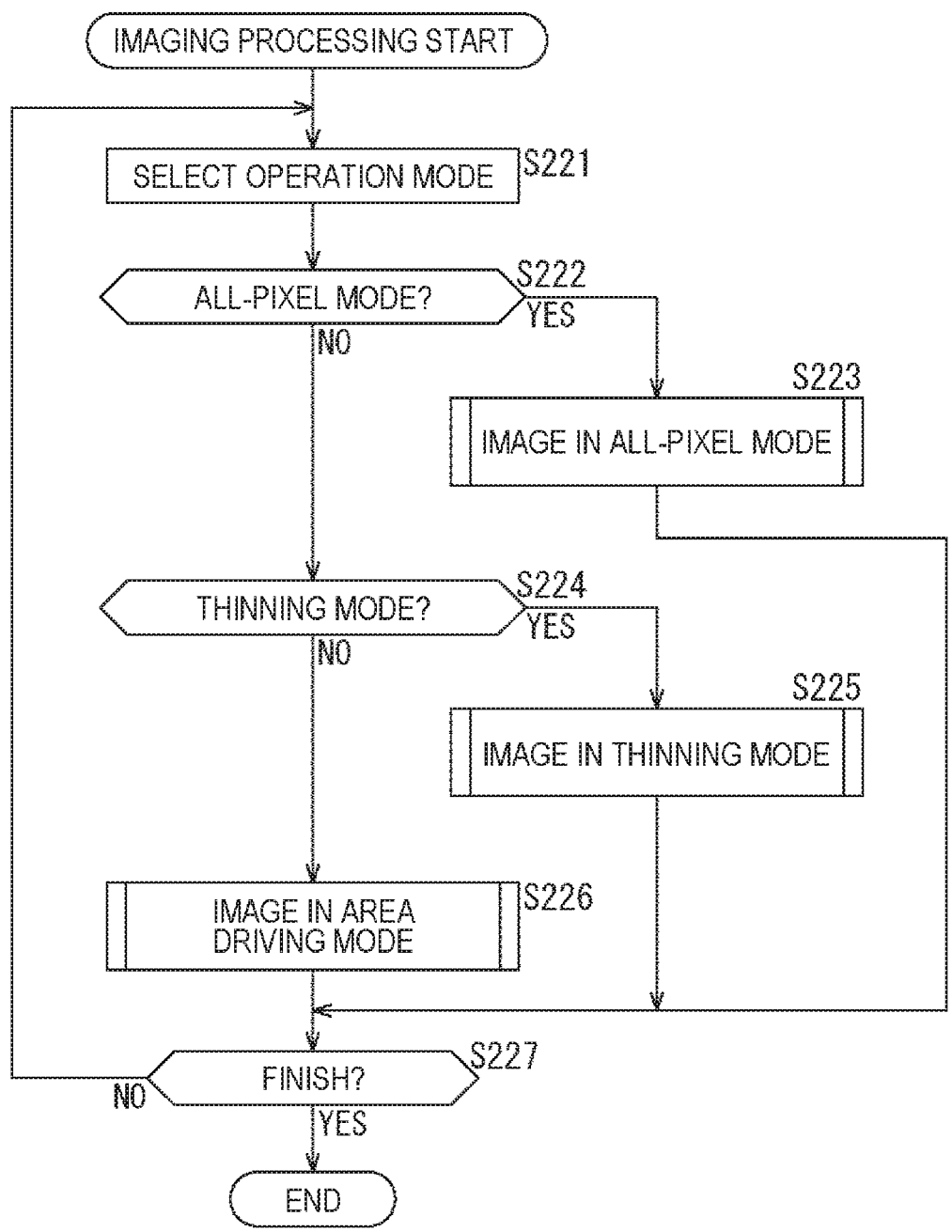
FIG. 44 is a flowchart for illustrating an example of a flow of imaging processing.

An example of a flow of the imaging processing in this case is described with reference to a flowchart in FIG. 44. When the imaging processing is started, the control unit 101 selects the operation mode (all-pixel mode, thinning mode, or area driving mode) at step S221. At step S222, the control unit 101 determines whether the operation mode selected at step S221 is the all-pixel mode or not. In a case where the mode is determined to be the all-pixel mode, the procedure shifts to step S223.

At step S223, the imaging device 100 executes the all-pixel mode imaging processing and performs the imaging in the all-pixel mode. This all-pixel mode imaging processing is executed in a flow similar to that in a case described with reference to the flowchart in FIG. 34. Therefore, the description is omitted.

When the processing at step S223 is finished, the procedure shifts to step S227. Furthermore, in a case where the selected operation mode is determined not to be the all-pixel mode at step S222 (determined to be the thinning mode or the area driving mode), the procedure shifts to step S224.

At step S224, the control unit 101 determines whether the operation mode selected at step S221 is the thinning mode or not. In a case where the mode is determined to be the thinning mode, the procedure shifts to step S225.

At step S225, the imaging device 100 executes the thinning mode imaging processing and performs the imaging in the thinning mode. This thinning mode imaging processing is executed in a flow similar to that in a case described with reference to the flowchart in FIG. 35. Therefore, the description is omitted.

When the processing at step S225 is finished, the procedure shifts to step S227. Furthermore, in a case where the selected operation mode is determined not to be the thinning mode (determined to be the area driving mode) at step S224, the procedure shifts to step S226.

At step S226, the imaging device 100 executes the area driving mode imaging processing and performs the imaging in the area driving mode. This area driving mode imaging processing is executed in a flow similar to that in a case described with reference to the flowchart in FIG. 41. Therefore, the description is omitted.

At step S227, the control unit 101 determines whether to finish the imaging processing or not. In a case where it is determined that the imaging processing is not finished, the procedure returns to step S221. That is, at step S227, each processing at steps S221 to S227 is repeatedly executed until it is determined that the imaging processing is finished.

In a case where it is determined at step S227 that the imaging processing is finished, the imaging processing is finished.

<Mode Selection According to Application Etc.>

By performing the imaging processing in this manner, it is possible to switch between the thinning mode and the area driving mode. The basis for this switching (mode selection) is arbitrary.

For example, it is possible to switch between the thinning mode and the area driving mode according to the application and the like. For example, the readout control unit 122 may select a more appropriate one of the thinning mode and the area driving mode in order to give a desired characteristic to the restored image to be generated (that is, for creating a picture).

For example, in a case where a subject depth of the restored image is made relatively shallow, the readout control unit 122 may select the thinning mode. Furthermore, in a case where the subject depth of the restored image is made relatively deep, the readout control unit 122 may select the area driving mode.

By doing so, the imaging device 100 may generate the restored images with more various characteristics.

<Mode Selection According to Subject Distance>

Furthermore, for example, it is possible to switch between the thinning mode and the area driving mode according to a distance to the subject (also referred to as a subject distance).

For example, as described with reference to FIG. 39, a pixel distribution range is narrower in a case of the area driving mode (double arrow 382) than in a case of the thinning mode (double arrow 381). Therefore, incident light is closer to parallel light in a case of the area driving mode than in a case of the thinning mode. That is, the subject depth may be made deeper in a case of the area driving mode than in a case of the thinning mode. Therefore, in the restored image, it is possible that the subject at a distance shorter than the subject distance (double-dotted arrow 388) is appeared to be focused in a case of the area driving mode than in a case of the thinning mode.

Therefore, the readout control unit 122 may select the area driving mode in a case where the subject distance is shorter than a predetermined threshold, and select the thinning mode in a case where the subject distance is longer than the threshold.

By doing so, it is possible to focus on the subject in a wider range of the subject distance.

<Control of Pixel Density>

Figure 45:
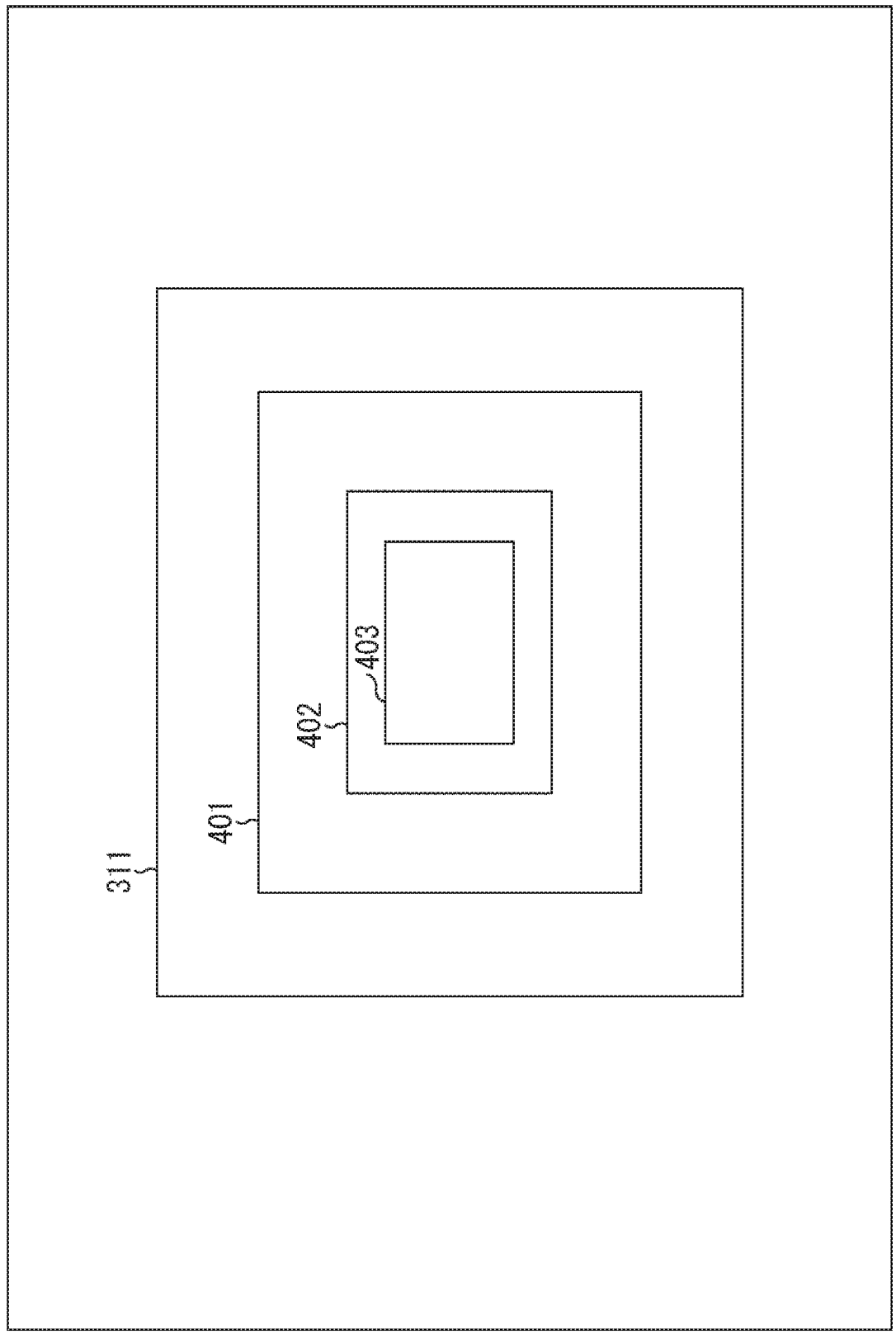
FIG. 45 is a view for illustrating an example of area selection.

Moreover, it is possible to perform both of mode selection between the thinning mode and the area driving mode and selection of the area 312 described in the second embodiment. Since a layout (arrangement) of the area 312 is arbitrary, for example, as illustrated in FIG. 45, it is possible to provide areas 401 to 403 in the pixel region 311 and perform the mode selection between the thinning mode and the area driving mode and the selection among the areas 401 to 403.

That is, in this case, when the thinning mode is selected, the pixel region 311 is selected. Therefore, it may be said that such selection of the operation mode and the area 312 is to select a range of the pixels 121a from which the detection signals are read out.

Here, for example, the number of pixels 121a from which the detection signals are read out may be set on the basis of allowable magnitude of power consumption. Furthermore, for example, the incident angle directivity of the entire pixel 121a group from which the detection signals are read out (that is, type of the incident angle directivity of the pixel to be selected) may be set according to the field of view required for the restored image. Then, the range of the distribution of the pixels 121a from which the detection signals are read out may be set on the basis of the above-described application and the like and the distance to the subject.

By doing so, the imaging device 100 may obtain the restored images with more various characteristics.

Note that, in addition, in a case where the number of the pixels 121a from which the detection signals are read out is set (fixed) on the basis of the allowable magnitude of the power consumption and the like, it may be said that the density of the pixels 121a from which the detection signals are read out is set by setting the range of the distribution of the pixels 121a from which the detection signals read out. That is, for example, it is possible to control the density of the pixels 121a from which the detection signals are read out on the basis of some factor such as the application, the subject distance and the like.

<Other Configuration Example of Imaging Device and Image Processing Device>

In the above description, it is described that the imaging device 100 includes the imaging element 121; the number of the imaging elements 121 included in the imaging device 100 is arbitrary. The imaging device 100 may include a single imaging element 121 or a plurality of imaging elements 121. Furthermore, in a case where the imaging device 100 includes a plurality of imaging elements 121, performance (for example, the number of pixels, shape, pixel structure, imaging characteristic, imaging method and the like) of the plurality of imaging elements 121 may all be unified or some of them are different.

Furthermore, the imaging device 100 may include a plurality of other processing units. For example, a plurality of readout control units 122 may be provided, and each of them may set the resolution of the detection image to read out. By doing so, it is possible to obtain the detection images of a plurality of resolutions simultaneously, for example. Furthermore, a plurality of restoration matrix setting units 123 may be provided accordingly.

4. Fourth Embodiment

<Monitoring System>

Next, an application example of an imaging device 100 to which the present technology as described above is applied is described. The imaging device 100 may be applied to, for example, a monitoring system which monitors a target using an image.

Figure 46:
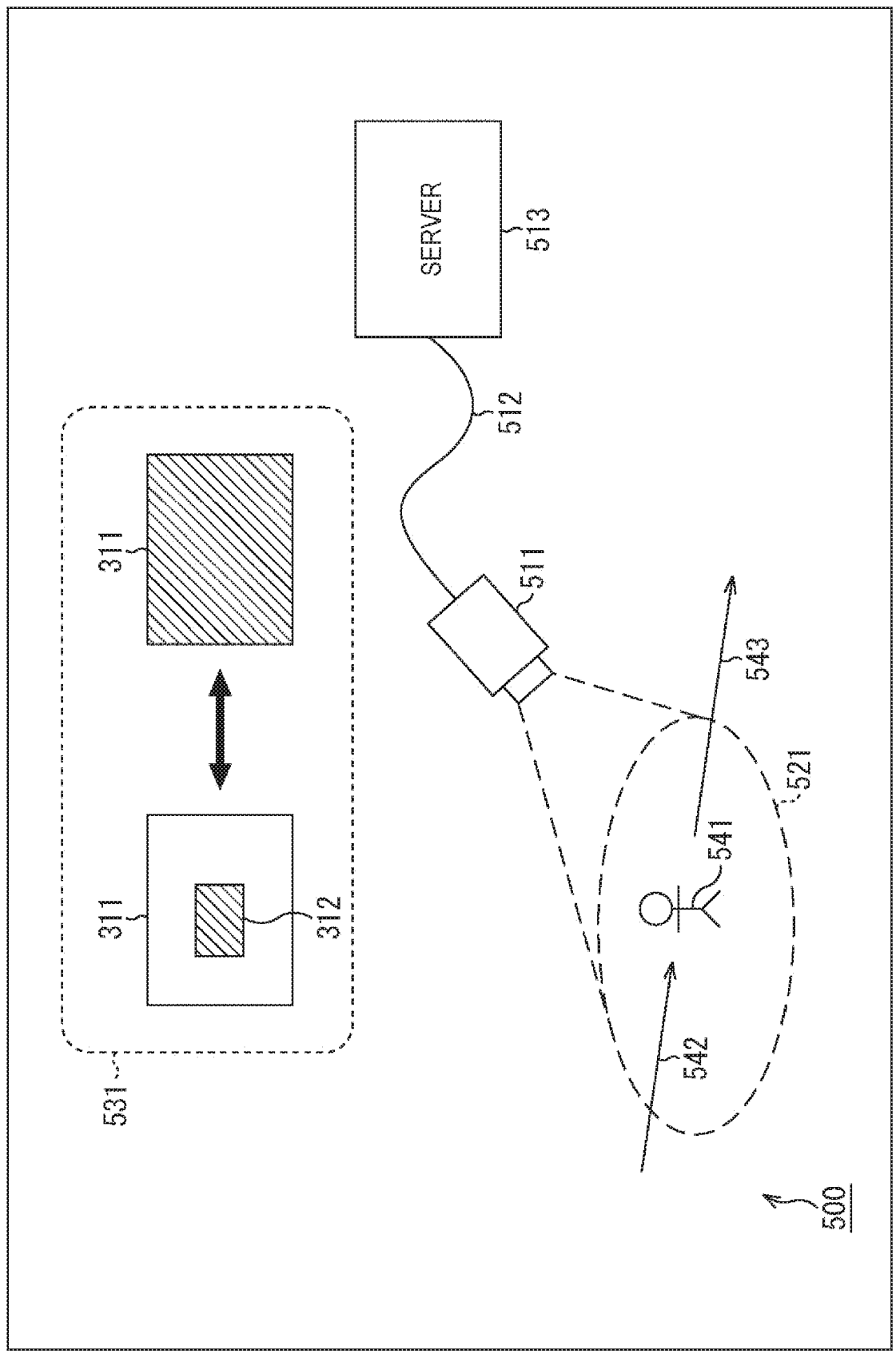
FIG. 46 is a view for illustrating a main configuration example of a monitoring system.

FIG. 46 is a view illustrating a main configuration example of a monitoring system being an embodiment of a system to which the present technology is applied. A monitoring system 500 illustrated in FIG. 46 is a system which images a monitoring target and monitors the monitoring target by the imaged image. For example, the monitoring system 500 performs suspiciousness detection (abnormality detection) and the like of the monitoring target.

As illustrated in FIG. 46, the monitoring system 500 includes a monitoring camera 511 and a server 553 connected to the monitoring camera 511 via a cable 512 so as to be able to communicate with each other.

The monitoring camera 511 images a predetermined region 521 as the monitoring target, for example. Then, the monitoring camera 511 supplies data of the imaged image to the server 513 via the cable 512.

The server 513 controls drive of the monitoring camera 511 via the cable 512, for example. Furthermore, the server 513 performs image processing on the imaged image supplied from the monitoring camera 511. Moreover, the server 513 analyzes the imaged image and detects a suspicious point of the monitoring target (detects abnormality). Furthermore, the server 513 performs processing such as warning and the like according to a detection result as necessary.

In such monitoring system 500, the above-described imaging device 100 may be applied as the monitoring camera 511. That is, the monitoring camera 511 has a configuration similar to that of the imaging device 100 described in the first to third embodiments, and may perform processing similar to that of the imaging device 100. Therefore, the monitoring camera 511 may obtain an effect similar to that described in the first to third embodiments.

For example, the monitoring camera 511 may switch operation modes in accordance with a suspiciousness detection result (state of the monitoring target). For example, it is assumed that a state in which no moving object is detected in the region 521 being the monitoring target is normal (there is no suspicious point). In this case, a picture of the imaged image (restored image) of the region 521 in the normal state does not substantially change. Furthermore, there is no particularly noticeable point. Therefore, there is no problem even if resolution of the imaged image is low.

In contrast, for example, when a person 541 enters the region 521, the person 541 which is the moving object is detected by the server 513 as the suspicious point (abnormality). In such a case, it is necessary to more accurately capture a characteristic of the person 541, so that the person 541 becomes a target of attention. That is, it is desirable to improve resolution of the image of the person 541.

Therefore, in a case where the monitoring target is in the normal state, the monitoring camera 511 operates in an area driving mode and reads out a detection image from a partial area 312 of a pixel region 311 as illustrated on a left side in a dotted rectangle 531.

Then, when the person 541 enters the region 521 as indicated by arrow 542 and the server 513 detects this as the suspicious point, the monitoring camera 511 changes the operation mode to an all-pixel mode and reads out the detection image from an entire pixel region 311 as illustrated on a right side in the dotted rectangle 531.

Moreover, when the person 541 leaves the region 521 as indicated by arrow 543, the suspiciousness of the region 521 is no longer detected. That is, the state of the region 521 returns to the normal state. Therefore, the monitoring camera 511 switches the operation mode to the area driving mode and reads out the detection image from the partial region 312 of the pixel region 311 as illustrated on the left side in the dotted rectangle 531.

By switching the operation mode in this manner, the monitoring camera 511 may reduce the resolution of the imaged image and suppress an increase in data amount, for example, in normal times when there is no notable site (suspicious point). Furthermore, in a case where the suspicious point is detected in the monitoring target and there is the notable site, the monitoring camera 511 may improve the resolution of the imaged image and suppress a decrease in image quality. That is, the monitoring camera 511 may obtain the imaged image of appropriate data amount and image quality according to a situation, and may perform monitoring (perform suspiciousness detection) on the basis of the imaged image. That is, it is possible to monitor more accurately while suppressing the increase in data amount.

<Flow of Monitoring Processing>

Figure 47:
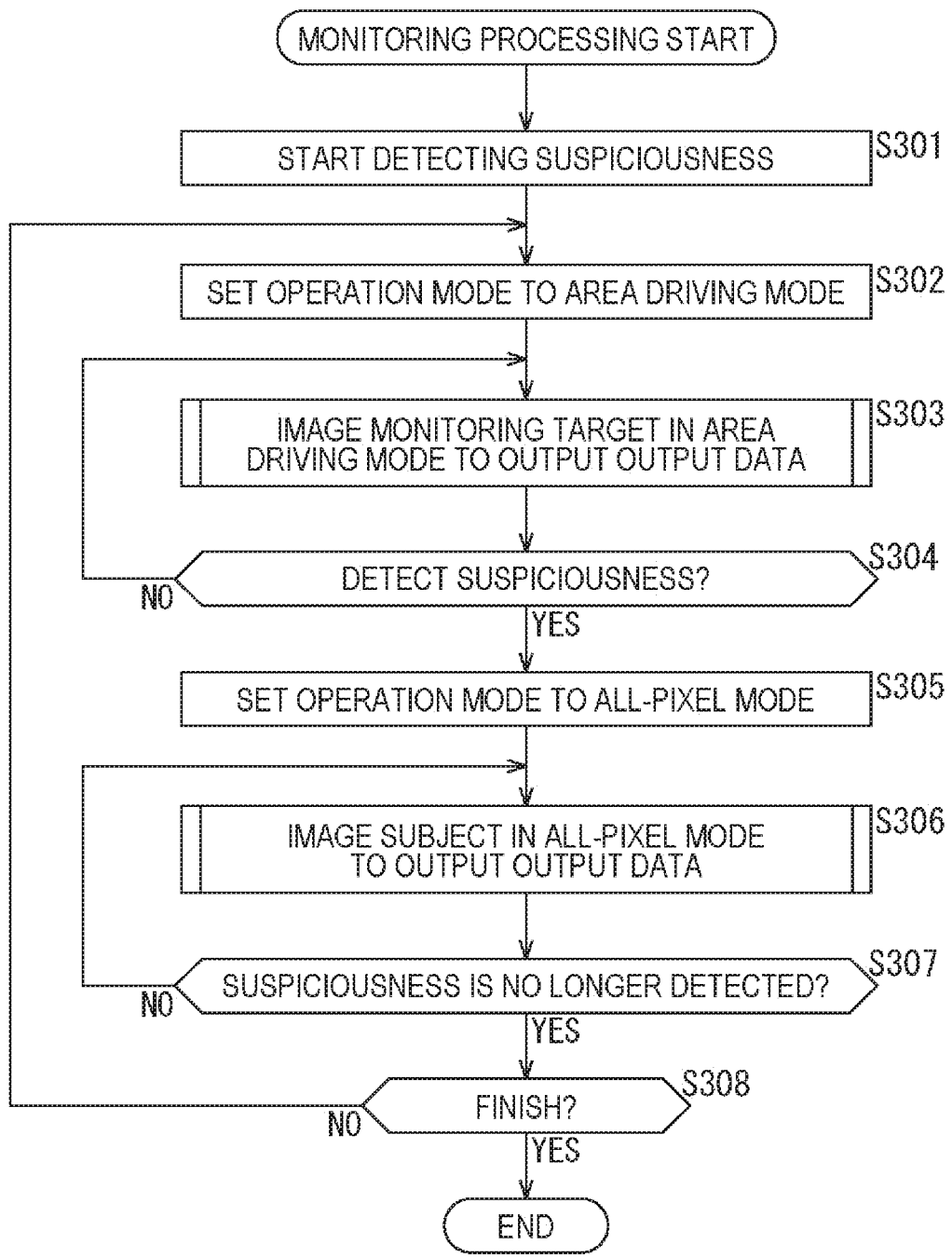
FIG. 47 is a flowchart for illustrating an example of a flow of monitoring processing.

An example of a flow of monitoring processing performed by such monitoring system 500 is described with reference to a flowchart in FIG. 47.

When the monitoring processing is started, the server 513 starts detecting the suspiciousness of the monitoring target at step S301.

At step S302, the monitoring camera 511 sets the operation mode to the area driving mode.

At step S303, the monitoring camera 511 images the monitoring target in the area driving mode and outputs output data. That is, the monitoring camera 511 performs area driving mode imaging processing, generates the output data in the area driving mode, and outputs the same to the server 513 in a flow similar to that in a case of describing with reference to the flowchart in FIG. 41.

At step S304, the server 513 determines whether the suspiciousness is detected or not. In a case where it is determined that the suspiciousness is not detected, the procedure returns to step S303. That is, in a case where the monitoring target is in the normal state in which no suspiciousness is detected, the processing at step S303 and step S304 is repeatedly executed. That is, a low-resolution imaged image is obtained.

Furthermore, in a case where it is determined that the suspiciousness is detected at step S304, the procedure shifts to step S305.

At step S305, the monitoring camera 511 switches (sets) the operation mode to the all-pixel mode.

At step S306, the monitoring camera 511 images the monitoring target in the all-pixel mode and outputs the output data. That is, the monitoring camera 511 performs all-pixel mode imaging processing, generates the output data in the all-pixel mode, and outputs the same to the server 513 in a flow similar to that in a case described with reference to the flowchart in FIG. 34.

At step S307, the server 513 determines whether the suspiciousness is no longer detected or not. In a case where it is determined that the suspiciousness is continuously detected, the procedure returns to step S306. That is, in a case where the monitoring target is in the state in which the suspiciousness is detected (abnormal state), the processing at step S306 and step S307 is repeatedly executed. That is, a high-resolution imaged image may be obtained.

Furthermore, in a case where it is determined that the suspiciousness is no longer detected at step S307, the procedure shifts to step S308.

At step S308, the monitoring camera 511 determines whether to finish the monitoring processing or not. In a case where it is determined that the monitoring processing is not finished, the procedure returns to step S302. That is, at step S308, each processing at steps S302 to S308 is repeatedly executed until it is determined that the monitoring processing is finished.

In a case where it is determined at step S308 that the monitoring processing is finished, the monitoring processing is finished.

By executing the monitoring processing as described above, it is possible to monitor more accurately while suppressing the increase in data amount.

5. Fifth Embodiment

<Ranging>

Figure 48:
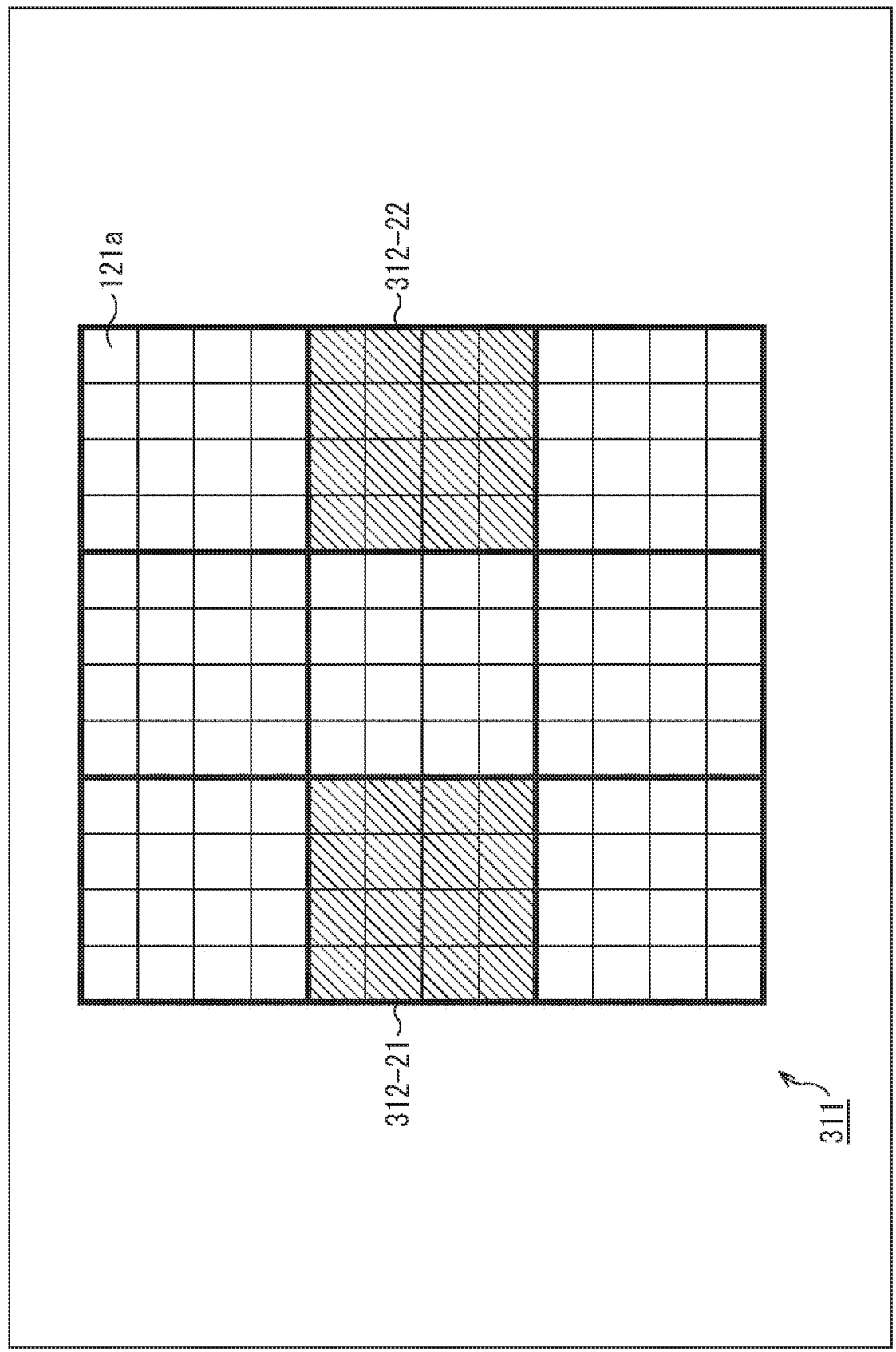
FIG. 48 is a view illustrating an example of a position of the pixel from which a signal is read out.

For example, as illustrated in FIG. 48, an imaging device 100 may read out detection images from a plurality of areas 312 separated from each other. By utilizing this, restored images obtained from the detection images may be made images for stereoscopic viewing by utilizing parallax between them.

In a case of an example in FIG. 48, a pixel region 311 is provided with a total of nine areas 312 (three vertical x three horizontal) each including four pixels x four pixels. Then, in an area driving mode, a readout control unit 122 selects pixels 121a in an area 312-21 on a left side of the pixel region 311 and pixels 121a in an area 312-22 on a right side as readout pixels (hatched pixels in the drawing).

Since positions of the areas 312-21 and 312-22 are different from each other, the restored images obtained from the areas 312 have mutual parallax. That is, a set of the restored images may be regarded as the image for stereoscopic viewing. That is, depth information of a subject may be obtained from the set of the restored images.

Note that, in the imaging element 121, A/D conversion of detection signals read out from the respective pixels 121a is performed by an area ADC 321, so that generation timings of the respective restored images may be made substantially the same. Therefore, the depth information may be obtained more accurately.

Note that, a direction of a field of view of the area 312-21 and a direction of the field of view of the area 312-22 may be different from each other in a direction in which the parallax is enlarged. By doing so, the parallax between the restored images is enlarged, so that more accurate depth information may be obtained.

Figure 49:
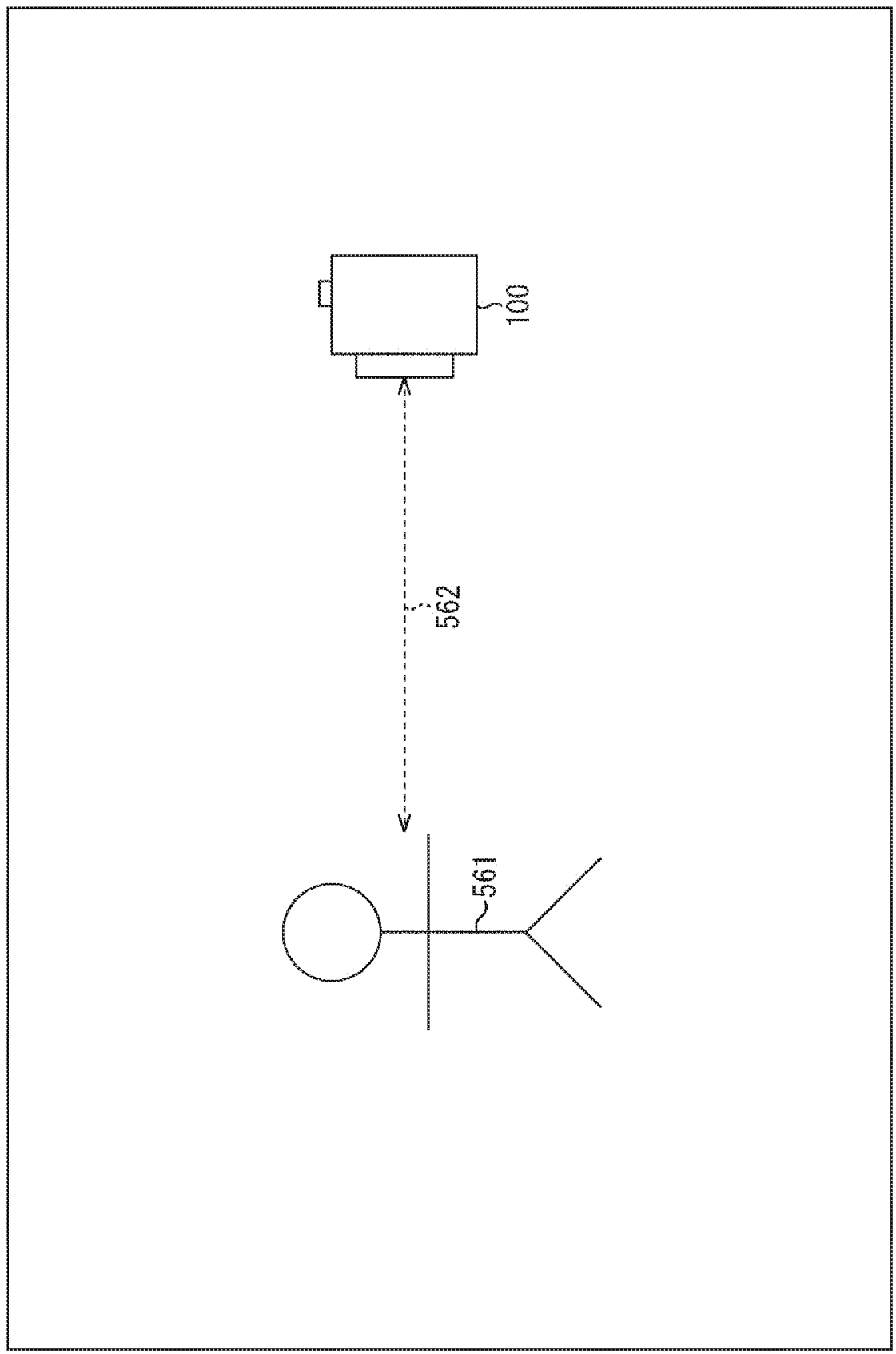
FIG. 49 is a view for illustrating a state of distance measurement to a subject.

By using such present technology, for example, as illustrated in FIG. 49, when imaging a subject 561 by using the imaging device 100, it is possible to obtain a distance (range) from the imaging device 100 to the subject 561 (dotted double arrow 562).

<Imaging Processing Flow>

An example of a flow of imaging processing executed by the imaging device 100 in this case is described with reference to flowcharts in FIGS. 50 and 51.

When the imaging process is started, a control unit 101 of the imaging device 100 initializes a subject distance at step S401.

At step S402, the control unit 101 sets an operation mode to an area driving mode.

At step S403, an input unit 111 starts receiving an instruction of still image imaging.

At step S404, the imaging device 100 executes area driving mode imaging processing, images the subject in the area driving mode, generates a captured image, and displays the captured image on a monitor. This area driving mode imaging processing is executed in a flow basically similar to that in a case described with reference to the flowchart in FIG. 41. Therefore, the description is omitted.

At step S405, the control unit 101 estimates the subject distance from a plurality of restored images corresponding to a plurality of areas 312, respectively, obtained by the processing at step S404.

At step S406, the control unit 101 determines whether to update the subject distance or not. In a case where the (estimated) subject distance changes and it is determined that the subject distance is updated, the procedure shifts to step S407.

At step S407, the control unit 101 updates the subject distance on the basis of a processing result at step S405. When the processing at step S407 is finished, the procedure shifts to step S408.

Furthermore, in a case where it is determined at step S406 that the subject distance does not change and the subject distance is not updated, the procedure shifts to step S408.

At step S408, the input unit 111 determines whether the instruction of still image imaging is received or not. In a case where it is determined that the instruction of the still image imaging is not received, the procedure returns to step S404 and the subsequent processing is repeated. That is, the captured image is captured as a moving image and displayed on the monitor. Furthermore, the subject distance is estimated and updated for each frame of the captured image.

Each processing at steps S404 to S408 is repeated until it is determined that the instruction of still image imaging is received at step S408.

Figure 51:
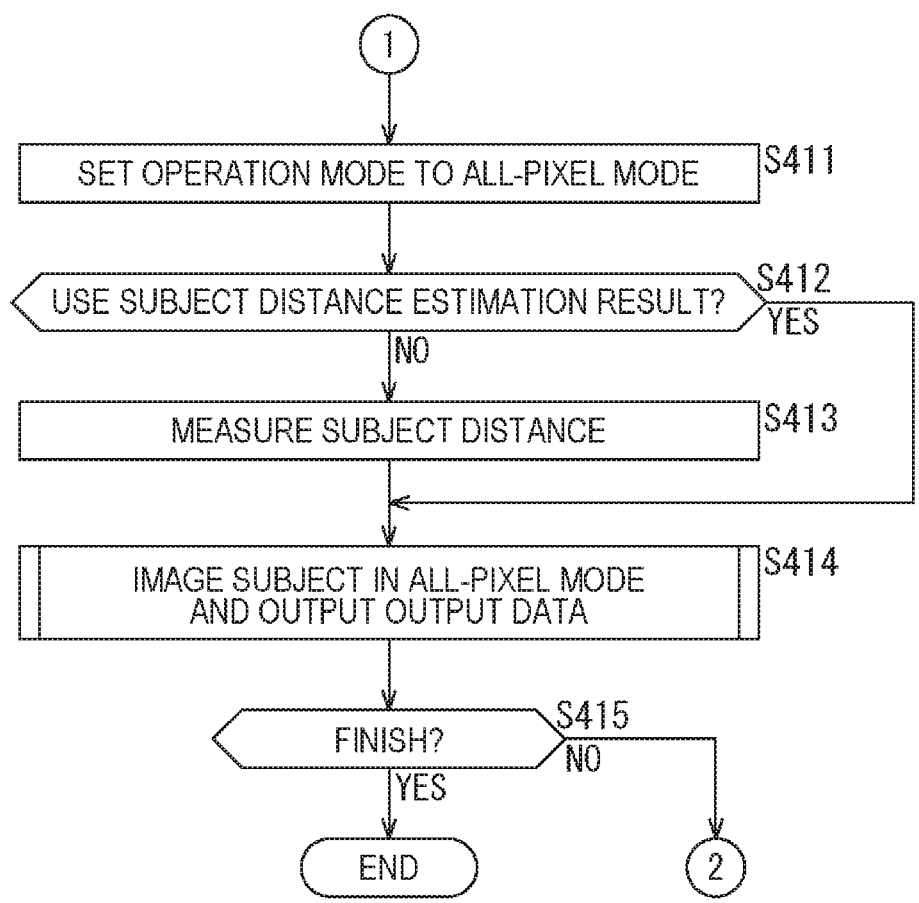
FIG. 51 is a flowchart continuous from FIG. 50 for illustrating an example of the flow of the imaging processing.

Then, in a case where it is determined that the instruction of still image imaging is received, for example, by pressing of an imaging button (shutter button) by a user and the like at step S408, the procedure shifts to FIG. 51.

At step S411 in FIG. 51, the control unit 101 switches (sets) the operation mode to an all-pixel mode.

Figure 50:
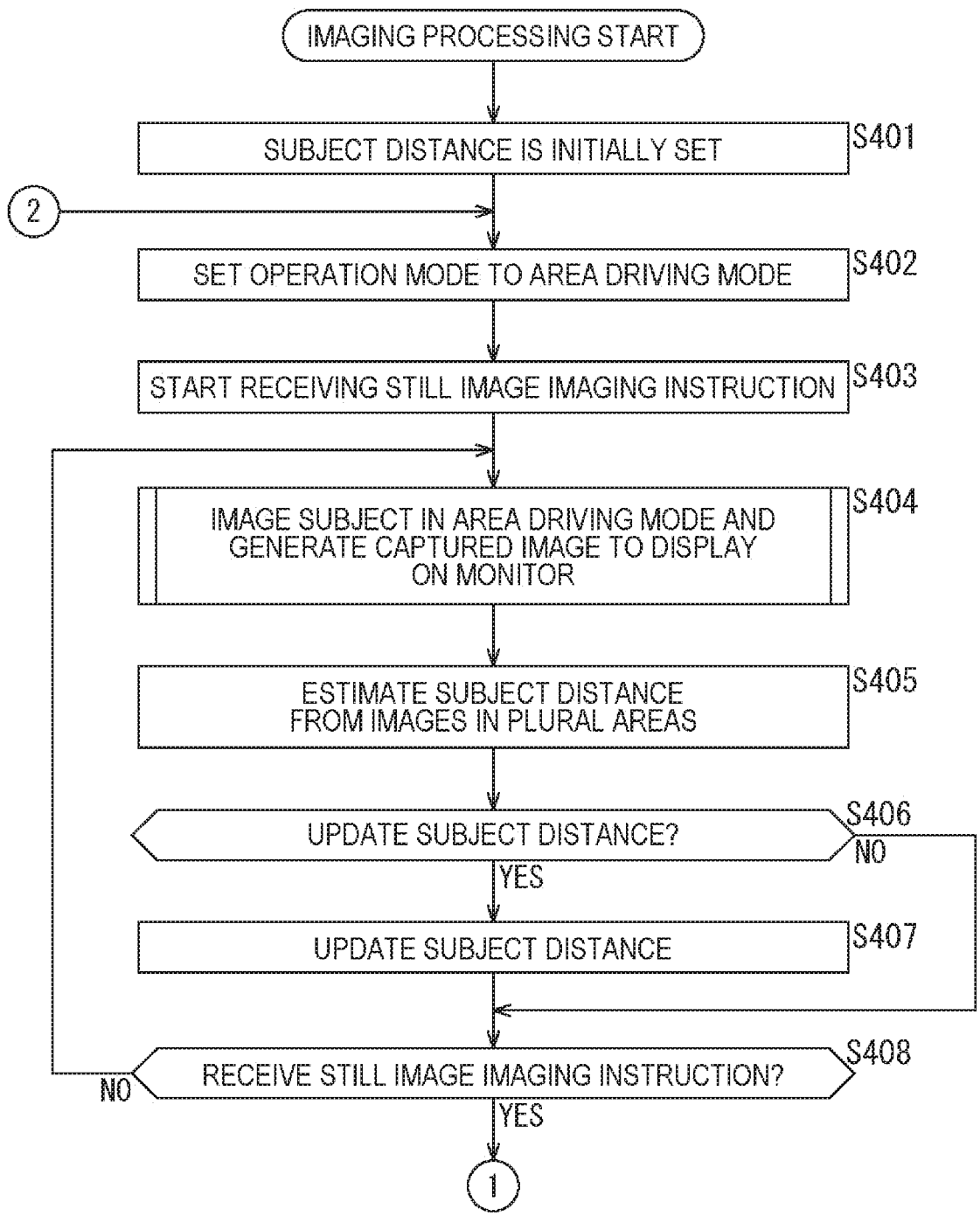
FIG. 50 is a flowchart for illustrating an example of a flow of imaging processing.

At step S412, the control unit 101 determines whether or not a subject distance estimation result at step S405 in FIG. 50 is utilized for imaging as a ranging result (for example, utilized for focal distance adjustment). In a case where it is determined that the subject distance estimation result is not used, the procedure shifts to step S413.

At step S413, the imaging device 100 measures the subject distance by another method (arbitrary method). When the processing at step S413 is finished, the procedure shifts to step S414. Furthermore, in a case where it is determined at step S412 that the subject distance estimation result is used, the processing at step S413 is omitted, and the procedure shifts to step S414.

At step S414, the imaging device 100 executes the all-pixel mode imaging processing, images the subject in the all-pixel mode, generates output data, and outputs the output data. This all-pixel mode imaging processing is executed in a flow basically similar to that in a case described with reference to the flowchart in FIG. 34. Therefore, the description is omitted.

At step S415, the control unit 101 determines whether to finish the imaging processing or not. In a case where it is determined that the imaging processing is not finished, the procedure returns to step S402 in FIG. 50 and the subsequent processing is performed. That is, each processing at step S402 in FIG. 50 to step S415 in FIG. 51 is repeatedly executed until the imaging processing is finished.

Then, in a case where it is determined at step S415 in FIG. 51 that the imaging processing is finished, the imaging processing is finished.

By performing the imaging processing as described above, the subject distance may be estimated, and the imaging may be performed on the basis of the subject distance estimation result. Therefore, a focal distance may be more accurately focused on the subject.

6. Sixth Embodiment

<Endoscope System>

Furthermore, the technology according to the present disclosure may be applied to, for example, an endoscopic surgery system.

Figure 52:
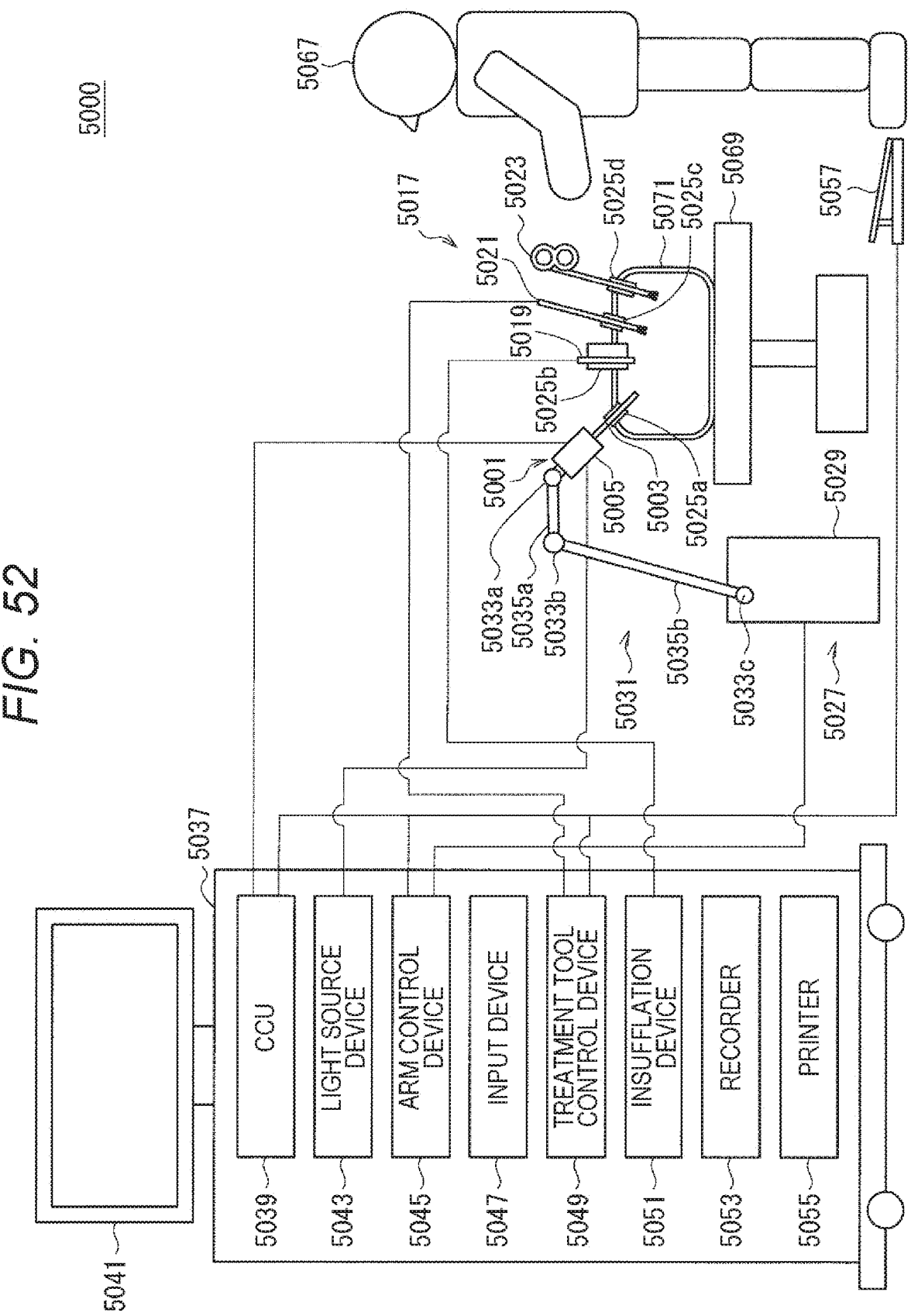
FIG. 52 is a view illustrating an example of a schematic configuration of an endoscopic surgery system.

FIG. 52 is a view illustrating a schematic configuration example of an endoscopic surgery system 5000 to which the technology according to the present disclosure may be applied. FIG. 52 illustrates a state in which an operator (surgeon) 5067 performs surgery on a patient 5071 on a patient bed 5069 by using the endoscopic surgery system 5000. As illustrated, the endoscopic surgery system 5000 includes an endoscope 5001, other surgical tools 5017, a support arm device 5027 which supports the endoscope 5001, and a cart 5037 on which various devices for endoscopic surgery are mounted.

In the endoscopic surgery, a plurality of tubular hole opening tools referred to as trocars 5025a to 5025d is tapped into the abdominal wall instead of incising the abdominal wall to open the abdomen. Then, a lens tube 5003 of the endoscope 5001 and other surgical tools 5017 are inserted into the body cavity of the patient 5071 from the trocars 5025a to 5025d. In the illustrated example, an insufflation tube 5019, an energy treatment tool 5021, and forceps 5023 are inserted into the body cavity of the patient 5071 as the other surgical tools 5017. Furthermore, the energy treatment tool 5021 is a treatment tool which performs incision and exfoliation of tissue, sealing of the blood vessel and the like by using high-frequency current and ultrasonic vibration. However, the illustrated surgical tools 5017 are merely an example, and various surgical tools generally used in the endoscopic surgery, such as tweezers, a retractor and the like, for example, may be used as the surgical tools 5017.

An image of a surgical site in the body cavity of the patient 5071 imaged by the endoscope 5001 is displayed on a display device 5041. The operator 5067 performs a procedure such as resection of an affected site and the like, for example, by using the energy treatment tool 5021 and the forceps 5023 while viewing the image of the surgical site displayed on the display device 5041 in real time. Note that, although not illustrated, the insufflation tube 5019, the energy treatment tool 5021, and the forceps 5023 are supported by the operator 5067, an assistant and the like during the surgery.

(Support Arm Device)

A support arm device 5027 includes an arm 5031 extending from a base 5029. In the illustrated example, the arm 5031 includes joints 5033a, 5033b, and 5033c and links 5035a and 5035b, and is driven by control from an arm control device 5045. The endoscope 5001 is supported by the arm 5031 and its position and attitude are controlled. Therefore, stable position fixing of the endoscope 5001 may be realized.

(Endoscope)

The endoscope 5001 includes the lens tube 5003 a region of a predetermined length from a distal end of which is inserted into the body cavity of the patient 5071 and a camera head 5005 connected to a proximal end of the lens tube 5003. In the illustrated example, the endoscope 5001 configured as a so-called rigid scope having a rigid lens tube 5003 is illustrated, but the endoscope 5001 may also be configured as a so-called flexible scope having a flexible lens tube 5003.

At the distal end of the lens tube 5003, an opening into which an objective lens is fitted is provided. A light source device 5043 is connected to the endoscope 5001 and light generated by the light source device 5043 is guided to the distal end of the lens tube by a light guide extending inside the lens tube 5003, and applied to an observation target in the body cavity of the patient 5071 via an objective lens. Note that, the endoscope 5001 may be a forward-viewing endoscope, an oblique-viewing endoscope, or a side-viewing endoscope.

An optical system and an imaging element are provided inside the camera head 5005, and reflected light (observation light) from the observation target is condensed on the imaging element by the optical system. The observation light is photoelectrically converted by the imaging element, and an electric signal corresponding to the observation light, that is, an image signal corresponding to the observation image is generated. The image signal is transmitted as RAW data to a camera control unit (CCU) 5039. Note that, the camera head 5005 has a function of adjusting magnification and a focal distance by appropriately driving the optical system.

Note that, the camera head 5005 may be provided with a plurality of imaging elements in order to support, for example, stereoscopic viewing (3D display) and the like. In this case, a plurality of relay optical systems is provided inside the lens tube 5003 to guide the observation light to each of the plurality of imaging elements.

(Various Devices Mounted on Cart)

The CCU 5039 includes a central processing unit (CPU), a graphics processing unit (GPU) and the like, and comprehensively controls operation of the endoscope 5001 and the display device 5041. Specifically, the CCU 5039 applies various types of imaging processing for displaying an image based on the image signal on the image signal received from the camera head 5005 such as, for example, synchronization processing, color separation processing and the like (for example, demosaic processing). The CCU 5039 provides the image signal subjected to the image processing to the display device 5041. Furthermore, the CCU 5039 transmits a control signal to the camera head 5005, and controls drive thereof. The control signal may include information regarding an imaging condition such as magnification, a focal distance and the like.

The display device 5041 displays the image based on the image signal subjected to the image processing by the CCU 5039 under the control of the CCU 5039. In a case where the endoscope 5001 supports high-resolution imaging such as 4K (3840 horizontal pixels×2160 vertical pixels), 8K (7680 horizontal pixels×4320 vertical pixels) and the like, and/or 3D display, for example, a device capable of performing high-resolution display and/or a device capable of performing 3D display may be used as the display device 5041 so as to support this. In a case of supporting the high-resolution imaging of 4K, 8K and the like, the use of the display device 5041 having a size of 55 inches or larger may provide a more immersive feeling. Furthermore, a plurality of display devices 5041 having different resolutions and sizes may be provided depending on the application.

The light source device 5043 includes a light source such as, for example, a light emitting diode (LED) and the like, and supplies the endoscope 5001 with irradiation light when imaging the surgical site.

The arm control device 5045 includes a processor such as a CPU and the like, for example, and operates according to a predetermined program to control drive of the arm 5031 of the support arm device 5027 according to a predetermined control method.

An input device 5047 is an input interface to the endoscopic surgery system 5000. The user may input various types of information and instructions to the endoscopic surgery system 5000 via the input device 5047. For example, the user inputs various types of information regarding the surgery, such as physical information of the patient and information regarding a surgical procedure and the like via the input device 5047. Furthermore, for example, the user inputs an instruction to drive the arm 5031, an instruction to change imaging conditions (type of irradiation light, magnification, focal distance and the like) by the endoscope 5001, an instruction to drive the energy treatment tool 5021 and the like via the input device 5047.

The type of the input device 5047 is not limited, and the input device 5047 may be various known input devices. As the input device 5047, for example, a mouse, a keyboard, a touch panel, a switch, a foot switch 5057 and/or a lever may be applied. In a case where the touch panel is used as the input device 5047, the touch panel may be provided on a display surface of the display device 5041.

Alternatively, the input device 5047 is a device worn by the user such as an eyeglass-type wearable device, a head mounted display (HMD) and the like, for example, and various inputs are performed in accordance with a user's gesture and line-of-sight detected by these devices. Furthermore, the input device 5047 includes a camera capable of detecting movement of the user, and performs various inputs in accordance with the user's gesture and line-of-sight detected from a video imaged by the camera. Moreover, the input device 5047 includes a microphone capable of collecting user's voice, and various inputs are performed by audio via the microphone. In this manner, the input device 5047 is configured to be able to input various types of information in a non-contact manner, so that especially the user belonging to a clean area (for example, the operator 5067) may operate a device belonging to an unclean area in a non-contact manner. Furthermore, since the user may operate the device without releasing his/her hand from the surgical tool in use, convenience for the user is improved.

A treatment tool control device 5049 controls drive of the energy treatment tool 5021 for cauterization and incision of tissue, sealing of the blood vessel or the like. An insufflation device 5051 injects gas into the body cavity via the insufflation tube 5019 to inflate the body cavity of the patient 5071 for the purpose of securing a visual field by the endoscope 5001 and securing a working space of the operator. A recorder 5053 is a device capable of recording various types of information regarding surgery. A printer 5055 is a device capable of printing various types of information regarding surgery in various formats such as text, image, graph or the like.

Hereinafter, a particularly characteristic configuration in the endoscopic surgery system 5000 is described in further detail.

(Support Arm Device)

The support arm device 5027 includes a base 5029 as a base, and the arm 5031 extending from the base 5029. In the illustrated example, the arm 5031 includes a plurality of joints 5033*a*, 5033*b*, and 5033*c*, and a plurality of links 5035*a* and 5035*b* connected by the joint 5033*b*, but in FIG. 52, for simplicity, the configuration of the arm 5031 is illustrated in a simplified manner. Actually, shapes, the numbers, and arrangements of the joints 5033*a* to 5033*c* and the links 5035*a* and 5035*b*, directions of rotational axes of the joints 5033a to 5033c and the like may be appropriately set so that the arm 5031 has a desired degree of freedom. For example, the arm 5031 may be preferably configured with six or more degrees of freedom. Therefore, since it becomes possible to feely move the endoscope 5001 within a movable range of the arm 5031, the lens tube 5003 of the endoscope 5001 may be inserted into the body cavity of the patient 5071 in a desired direction.

The joints 5033a to 5033c are provided with actuators, respectively, and the joints 5033a to 5033c are configured to be rotatable around a predetermined rotational axis by drive of the actuators. The drive of the actuator is controlled by the arm control device 5045, so that rotation angles of the respective joints 5033a to 5033c are controlled, and the drive of the arm 5031 is controlled. Therefore, control of the position and attitude of the endoscope 5001 may be realized. At that time, the arm control device 5045 may control the drive of the arm 5031 by various known control methods such as force control, position control or the like.

For example, when the operator 5067 performs an appropriate operation input via the input device 5047 (including the foot switch 5057), the drive of the arm 5031 is appropriately controlled by the arm control device 5045 in accordance with the operation input, and the position and attitude of the endoscope 5001 may be controlled. With this control, it is possible to move the endoscope 5001 at a distal end of the arm 5031 from an arbitrary position to an arbitrary position, and fixedly support this in the position after movement. Note that, the arm 5031 may be operated by a so-called master-slave method. In this case, the arm 5031 may be remotely operated by the user via the input device 5047 installed in a location away from the operating room.

Furthermore, in a case where the force control is applied, the arm control device 5045 may perform so-called power assist control of receiving an external force from the user to drive the actuators of the respective joints 5033a to 5033c so that the arm 5031 moves smoothly according to the external force. Therefore, when the user moves the arm 5031 while directly touching the arm 5031, the arm 5031 may be moved with a relatively light force. Therefore, the endoscope 5001 may be moved more intuitively and with a simpler operation, and the user convenience may be improved.

Here, generally, in the endoscopic surgery, the endoscope 5001 has been supported by a surgeon called a scopist. In contrast, by using the support arm device 5027, the position of the endoscope 5001 may be more reliably fixed without manual operation, so that an image of the surgical site may be stably obtained and the surgery may be performed smoothly.

Note that, the arm control device 5045 is not necessarily provided on the cart 5037. Furthermore, the arm control device 5045 is not necessarily one device. For example, the arm control device 5045 may be provided on each of the joints 5033a to 5033c of the arm 5031 of the support arm device 5027, and a plurality of arm control devices 5045 may cooperate with each other to realize driving control of the arm 5031.

(Light Source Device)

The light source device 5043 supplies the endoscope 5001 with the irradiation light when imaging the surgical site. The light source device 5043 includes, for example, a white light source including an LED, a laser light source, or a combination thereof. At that time, in a case where the white light source is formed by using the combination of RGB laser light sources, output intensity and output timing of each color (each wavelength) may be controlled with a high degree of accuracy, so that it is possible to adjust white balance of an imaged image by the light source device 5043. Furthermore, in this case, by irradiating the observation target with the laser light from each of the RGB laser light sources in time division manner and controlling the drive of the imaging element of the camera head 5005 in synchronism with the irradiation timing, it is possible to image images corresponding to RGB in time division manner. According to this method, a color image may be obtained without providing a color filter in the imaging element.

Furthermore, the drive of the light source device 5043 may be controlled such that the intensity of the light to be output is changed at a predetermined time interval. By controlling the drive of the imaging element of the camera head 5005 in synchronization with the timing of the change of the light intensity to obtain images in a time division manner and combining the images, an image of a high dynamic range without black defect and halation may be generated.

Furthermore, the light source device 5043 may be configured to be able to supply light of a predetermined wavelength band corresponding to special light observation. In the special light observation, for example, by using wavelength dependency of absorption of light in the body tissue, by applying light of a narrower band than that of the irradiation light (that is, white light) at ordinary observation, so-called narrow band imaging is performed in which predetermined tissue such as the blood vessel in the mucosal surface layer and the like is imaged with high contrast. Alternatively, in the special light observation, fluorescent observation for obtaining an image by fluorescence generated by irradiation of excitation light may be performed. In the fluorescent observation, it is possible to irradiate the body tissue with the excitation light to observe the fluorescence from the body tissue (autonomous fluorescent observation) or to locally inject a reagent such as indocyanine green (ICG) and the like to the body tissue and irradiate the body tissue with the excitation light corresponding to a fluorescent wavelength of the reagent, thereby obtaining a fluorescent image. The light source device 5043 may be configured to be able to supply the narrow band light and/or excitation light supporting such special light observation.

(Camera Head and CCU)

Figure 53:
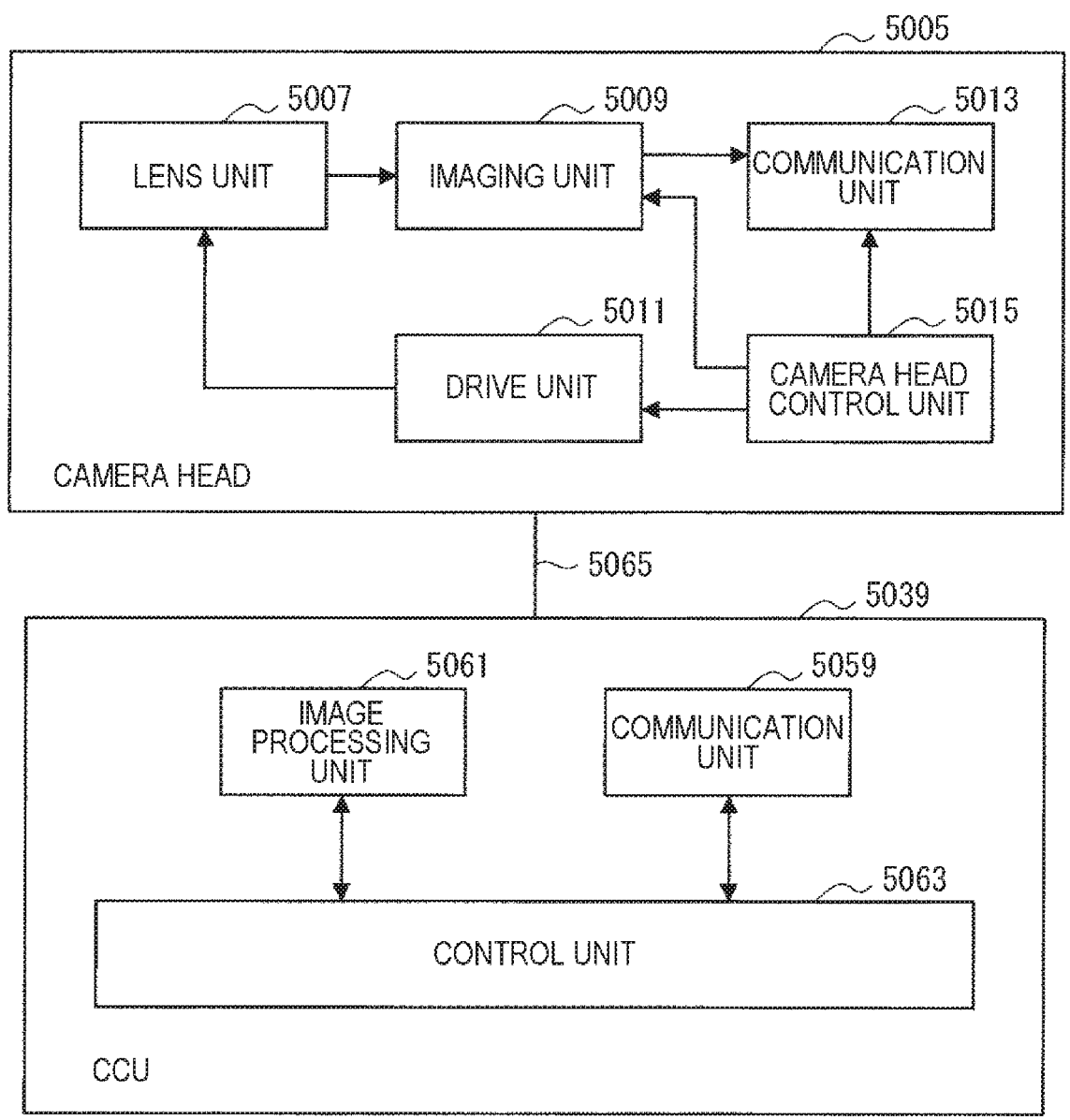
FIG. 53 is a block diagram illustrating an example of functional configurations of a camera head and a CCU illustrated in FIG. 52.

With reference to FIG. 53, functions of the camera head 5005 and the CCU 5039 of the endoscope 5001 are described in further detail. FIG. 53 is a block diagram illustrating an example of functional configurations of the camera head 5005 and the CCU 5039 illustrated in FIG. 52.

With reference to FIG. 53, the camera head 5005 includes a lens unit 5007, an imaging unit 5009, a drive unit 5011, a communication unit 5013, and a camera head control unit 5015 as functions thereof. Furthermore, the CCU 5039 includes a communication unit 5059, an image processing unit 5061, and a control unit 5063 as functions thereof. The camera head 5005 and the CCU 5039 are connected to each other so as to be able to bidirectionally communicate by a transmission cable 5065.

First, the functional configuration of the camera head 5005 is described. The lens unit 5007 is an optical system provided at a connection to the lens tube 5003. The observation light taken in from the distal end of the lens tube 5003 is guided to the camera head 5005 and is incident on the lens unit 5007. The lens unit 5007 is formed by combining a plurality of lenses including a zoom lens and a focus lens. An optical characteristic of the lens unit 5007 is adjusted such that the observation light is condensed on a light-receiving surface of the imaging element of the imaging unit 5009. Furthermore, the zoom lens and the focus lens are configured such that positions thereof on an optical axis are movable for adjusting magnification and focal point of the imaged image.

The imaging unit 5009 includes an imaging element, and is arranged on a subsequent stage of the lens unit 5007. The observation light which passes through the lens unit 5007 is condensed on the light-receiving surface of the imaging element, and the image signal corresponding to the observation image is generated by photoelectric conversion. The image signal generated by the imaging unit 5009 is provided to the communication unit 5013.

As the imaging element which forms the imaging unit 5009, for example, a complementary metal oxide semiconductor (CMOS) type image sensor having a Bayer array capable of performing color imaging is used. Note that, as the imaging element, that capable of supporting the imaging of a high-resolution image of, for example, 4K or more may be used. Since the image of the surgical site at high resolution may be obtained, the operator 5067 may grasp the state of the surgical site in further detail, and may proceed with the surgery more smoothly.

Furthermore, the imaging element forming the imaging unit 5009 includes a pair of imaging elements for obtaining image signals for right eye and left eye corresponding to three-dimensional (3D) display. By the 3D display, the operator 5067 may grasp a depth of the living tissue in the surgical site more accurately. Note that, in a case where the imaging unit 5009 is of a multiple plate type, a plurality of systems of lens units 5007 is provided so as to correspond to the respective imaging elements.

Furthermore, the imaging unit 5009 is not necessarily provided on the camera head 5005. For example, the imaging unit 5009 may be provided inside the lens tube 5003 immediately after the objective lens.

The drive unit 5011 includes an actuator and moves the zoom lens and the focus lens of the lens unit 5007 by a predetermined distance along the optical axis under the control of the camera head control unit 5015. Therefore, the magnification and focal point of the image imaged by the imaging unit 5009 may be appropriately adjusted.

The communication unit 5013 includes a communication device for transmitting and receiving various types of information to and from the CCU 5039. The communication unit 5013 transmits the image signal obtained from the imaging unit 5009 as RAW data to the CCU 5039 via the transmission cable 5065. At that time, it is preferable that the image signal be transmitted by optical communication in order to display the imaged image of the surgical site with low latency. At the time of the surgery, the operator 5067 performs surgery while observing the state of the affected site with the imaged image, so that it is required that the moving image of the surgical site is displayed in real time as much as possible for safer and more reliable surgical procedure. In a case where optical communication is performed, the communication unit 5013 includes a photoelectric conversion module which converts an electric signal into an optical signal. The image signal is converted into the optical signal by the photoelectric conversion module, and then transmitted to the CCU 5039 via the transmission cable 5065.

Furthermore, the communication unit 5013 receives a control signal for controlling drive of the camera head 5005 from the CCU 5039. The control signal includes, for example, information regarding imaging conditions such as information specifying a frame rate of the imaged image, information specifying an exposure value at the time of imaging, and/or information specifying the magnification and focal point of the imaged image. The communication unit 5013 provides the received control signal to the camera head control unit 5015. Note that, the control signal from the CCU 5039 may also be transmitted by optical communication. In this case, the communication unit 5013 is provided with a photoelectric conversion module which converts the optical signal into the electric signal, and the control signal is converted into the electric signal by the photoelectric conversion module, and then provided to the camera head control unit 5015.

Note that the above-described imaging conditions such as the frame rate, the exposure value, the magnification, the focal point and the like are automatically set by the control unit 5063 of the CCU 5039 on the basis of the obtained image signal. That is, the endoscope 5001 is equipped with a so-called auto exposure (AE) function, an auto focus (AF) function, and an auto white balance (AWB) function.

The camera head control unit 5015 controls the drive of the camera head 5005 on the basis of the control signal from the CCU 5039 received via the communication unit 5013. For example, the camera head control unit 5015 controls the drive of the imaging element of the imaging unit 5009 on the basis of the information of specifying the frame rate of the imaged image and/or the information of specifying the exposure at the time of imaging. Furthermore, for example, the camera head control unit 5015 appropriately moves the zoom lens and the focus lens of the lens unit 5007 via the drive unit 5011 on the basis of information of specifying the magnification and the focal point of the imaged image. The camera head control unit 5015 may further have a function of storing information for identifying the lens tube 5003 and the camera head 5005.

Note that, by arranging configurations such as the lens unit 5007, the imaging unit 5009 and the like in a hermetically sealed structure having high airtightness and waterproofness, the camera head 5005 may have resistance to autoclave sterilization.

Next, the functional configuration of the CCU 5039 is described. The communication unit 5059 includes a communication device for transmitting and receiving various types of information to and from the camera head 5005. The communication unit 5059 receives the image signal transmitted from the camera head 5005 via the transmission cable 5065. At that time, as described above, the image signal may be preferably transmitted by optical communication. In this case, the communication unit 5059 is provided with a photoelectric conversion module which converts an optical signal into an electric signal corresponding to optical communication. The communication unit 5059 provides the image signal converted into the electric signal to the image processing unit 5061.

Furthermore, the communication unit 5059 transmits a control signal for controlling the drive of the camera head 5005 to the camera head 5005. The control signal may also be transmitted by optical communication.

The image processing unit 5061 applies various types of image processing on the image signal which is the RAW data transmitted from the camera head 5005. Examples of the image processing includes, for example, various types of known signal processing such as development processing, high image quality processing (such as band enhancement processing, super-resolution processing, noise reduction (NR) processing and/or camera shake correction processing), and/or scaling processing (electronic zoom processing). Furthermore, the image processing unit 5061 performs wave detection processing on the image signal for performing AE, AF, and AWB.

The image processing unit 5061 includes a processor such as a CPU, a GPU and the like, and the above-described image processing and wave detection processing may be performed by the processor operating according to a predetermined program. Note that, in a case where the image processing unit 5061 includes a plurality of GPUs, the image processing unit 5061 divides information regarding the image signal as appropriate, and performs image processing in parallel by the plurality of GPUs.

The control unit 5063 performs various types of control regarding imaging of the surgical site by the endoscope 5001 and display of the imaged image. For example, the control unit 5063 generates the control signal for controlling the drive of the camera head 5005. At that time, in a case where the imaging condition is input by the user, the control unit 5063 generates the control signal on the basis of the input by the user. Alternatively, in a case where the endoscope 5001 has the AE function, AF function, and AWB function, the control unit 5063 appropriately calculates optimal exposure value, focal distance, and white balance in accordance with a result of wave detection processing by the image processing unit 5061 to generate the control signal.

Furthermore, the control unit 5063 allows the display device 5041 to display the image of the surgical site on the basis of the image signal subjected to the image processing by the image processing unit 5061. In this case, the control unit 5063 recognizes various objects in the surgical site image by using various image recognition technologies. For example, the control unit 5063 may detect a shape, a color and the like of an edge of an object included in the surgical image, thereby recognizing the surgical tool such as forceps and the like, a specific living-body site, bleeding, mist when using the energy treatment tool 5021 and the like. When allowing the display device 5041 to display the image of the surgical site, the control unit 5063 superimposes to display various types of surgery support information on the image of the surgical site using a recognition result. The surgery support information is superimposed to be displayed, and presented to the operator 5067, so that it becomes possible to more safely and reliably proceed with the surgery.

The transmission cable 5065 connecting the camera head 5005 and the CCU 5039 is an electric signal cable supporting communication of electric signals, an optical fiber supporting the optical communication, or a composite cable thereof.

Here, in the illustrated example, the communication is performed by wire using the transmission cable 5065, but the communication between the camera head 5005 and the CCU 5039 may be performed wirelessly. In a case where the communication between the two is performed wirelessly, it is not necessary to lay the transmission cable 5065 in the operating room, so that a situation in which movement of a medical staff in the operating room is hindered by the transmission cable 5065 may be solved.

An example of the endoscopic surgery system 5000 to which the technology according to the present disclosure may be applied is described above. Note that, here, the endoscopic surgery system 5000 is described as an example, but a system to which the technology according to the present disclosure may be applied is not limited to such an example. For example, the technology according to the present disclosure may be applied to an inspection flexible endoscope system or a microscopic surgery system.

The technology according to the present disclosure may be preferably applied to the imaging unit 5009 out of the configurations described above. Specifically, the imaging device 100 (FIG. 1) may be applied as the imaging unit 5009. In this manner, by applying the technology according to the present disclosure to the imaging unit 5009, the resolution of the detection image (restored image) may be controlled.

Therefore, for example, during surgical work, imaging may be performed at high resolution in an all-pixel mode and the like, and when the work (surgery) is not performed, imaging may be performed at low resolution in a thinning mode or an area driving mode. Furthermore, for example, in normal times, imaging is performed at low resolution in the thinning mode or the area driving mode, and in a case where suspiciousness such as bleeding and the like is detected in the surgical site, for example, it may be switched to the all-pixel mode and the imaging may be performed at high resolution.

In this manner, by imaging in an appropriate operation mode according to the situation, purpose and the like, it is possible to suppress an increase in load of imaging and to suppress a reduction in image quality of the restored image. Therefore, the surgery may be performed more safely and more reliably.

<Microscopic Surgery System>

Furthermore, the technology according to the present disclosure may be applied to, for example, a microscopic surgery system.

Figure 54:
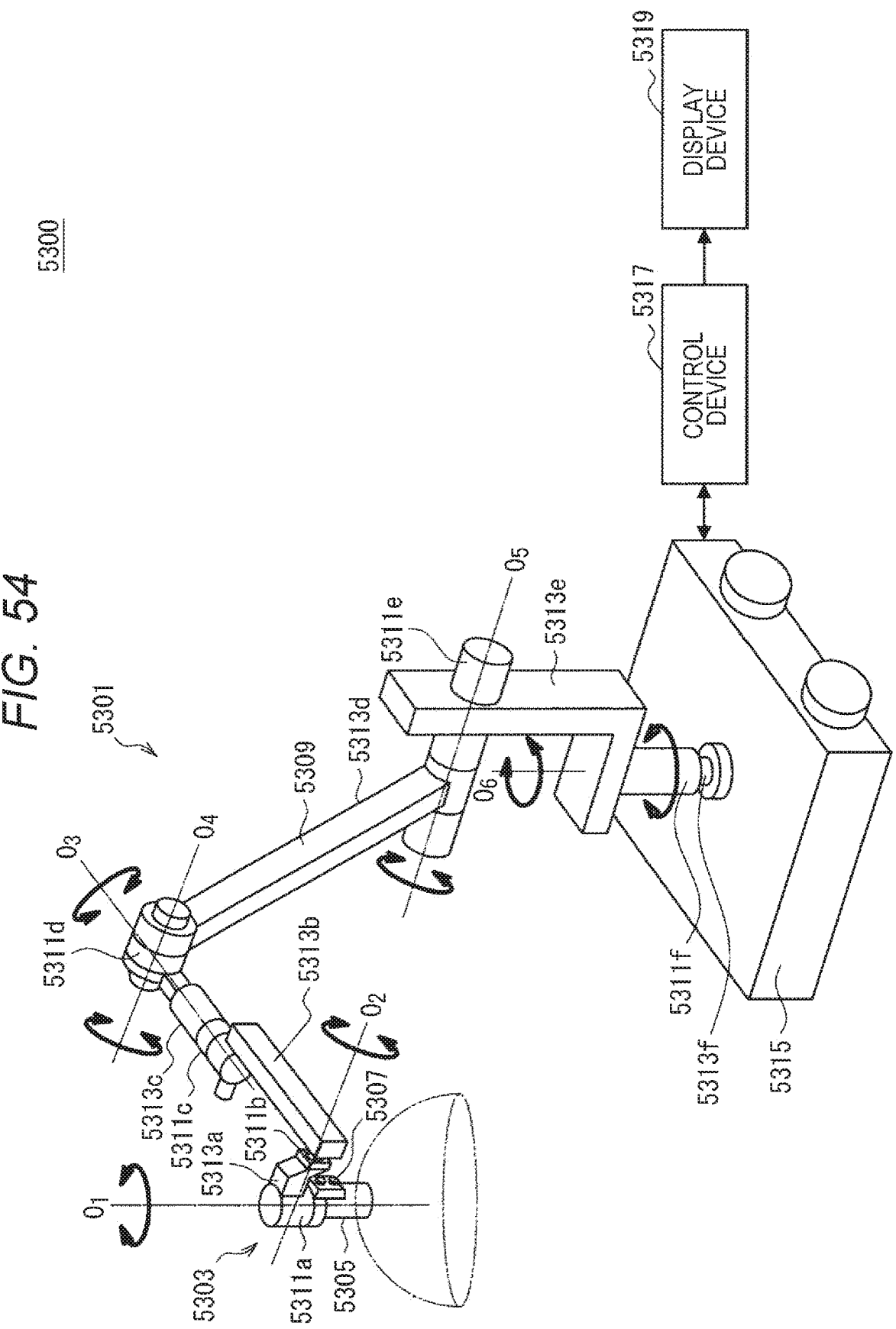
FIG. 54 is a view illustrating an example of a schematic configuration of a microscopic surgery system.

FIG. 54 is a view illustrating a schematic configuration example of a microscopic surgery system 5300 to which the technology according to the present disclosure may be applied. With reference to FIG. 54, the microscopic surgery system 5300 includes a microscope device 5301, a control device 5317, and a display device 5319. Note that, in the following description of the microscopic surgery system 5300, a "user" means an arbitrary medical staff who uses the microscopic surgery system 5300 such as an operator, an assistant and the like.

The microscope device 5301 includes a microscope unit 5303 for magnifying and observing an observation target (patient's surgical site), an arm 5309 which supports the microscope unit 5303 at a distal end thereof, and a base 5315 which supports a proximal end of the arm 5309.

The microscope unit 5303 includes a substantially cylindrical tubular portion 5305, an imaging unit (not illustrated) provided inside the tubular portion 5305, and an operation unit 5307 provided in a partial region on an outer periphery of the tubular portion 5305. The microscope unit 5303 is an electronic imaging microscope unit (so-called video microscope unit) which electronically images an image by the imaging unit.

A cover glass for protecting an internal imaging unit is provided on an opening surface at a lower end of the tubular portion 5305. Light from an observation target (hereinafter also referred to as observation light) passes through the cover glass to be incident on the imaging unit inside the tubular portion 5305. Note that, a light source of, for example, a light emitting diode (LED) and the like may be provided inside the tubular portion 5305, and at the time of imaging, the observation target may be irradiated with the light from the light source via the cover glass.

The imaging unit includes an optical system which condenses the observation light and an imaging element which receives the observation light condensed by the optical system. The optical system is configured by combination of a plurality of lenses including a zoom lens and a focus lens, and an optical characteristic thereof is adjusted such that an image of the observation light is formed on a light-receiving surface of the imaging element. The imaging element receives the observation light and photoelectrically converts the same to generate a signal corresponding to the observation light, that is, an image signal corresponding to the observation image. As the imaging element, for example, that including a Bayer array capable of color imaging is used. The imaging element may be various types of known imaging elements such as a complementary metal oxide semiconductor (CMOS) image sensor, a charge coupled device (CCD) image sensor or the like. The image signal generated by the imaging element is transmitted to the control device 5317 as RAW data. Here, the transmission of the image signal may be preferably performed by optical communication. At a surgical site, the operator performs surgery while observing the state of the affected site with the imaged image, so that it is required that the moving image of the surgical site is displayed in real time as much as possible for safer and more reliable surgical procedure. By transmitting the image signal by the optical communication, the imaged image may be displayed with low latency.

Note that, the imaging unit may include a drive mechanism which moves the zoom lens and the focus lens of the optical system along the optical axis. By appropriately moving the zoom lens and the focus lens by the drive mechanism, magnification of the imaged image and a focal distance at the time of imaging may be adjusted. Furthermore, the imaging unit may be equipped with various functions which may be generally provided on an electronic imaging microscope unit such as an auto exposure (AE) function, an auto focus (AF) function and the like.

Furthermore, the imaging unit may be configured as a so-called single-plate imaging unit having one imaging element, or may be configured as a so-called multiple-plate imaging unit having a plurality of imaging elements. In a case where the imaging unit is of the multiple-plate type, for example, the image signals corresponding to RGB may be generated by the respective imaging elements, and a color image may be obtained by combining them. Alternatively, the imaging unit may include a pair of imaging elements for obtaining image signals for right eye and left eye corresponding to stereoscopic (3D) display. By the 3D display, the operator may grasp the depth of the living tissue in the surgical site more accurately. Note that, in a case where the imaging unit is of the multiple-plate type, a plurality of optical systems may be provided so as to correspond to the respective imaging elements.

The operation unit 5307 is formed by using, for example, a cross lever, a switch or the like, and is an input means which receives a user operation input. For example, the user may input an instruction to change the magnification of the observation image and the focal distance to the observation target via the operation unit 5307. By appropriately moving the zoom lens and the focus lens by the drive mechanism of the imaging unit according to the instruction, the magnification and the focal distance may be adjusted. Furthermore, for example, the user may input an instruction to switch an operation mode (all-free mode and fixed mode to be described later) of the arm 5309 via the operation unit 5307. Note that, in a case where the user wants to move the microscope unit 5303, it is assumed that the user moves the microscope unit 5303 in a state where the user grips the tubular portion 5305. Therefore, the operation unit 5307 is preferably provided in a position where the user may easily operate the same with a finger while holding the tubular portion 5305 such that the user may operate the same while moving the tubular portion 5305.

The arm 5309 includes a plurality of links (first link 5313a to sixth link 5313f) being rotatably connected to each other by a plurality of joints (first joint 5311a to sixth joint 5311f).

The first joint 5311a has a substantially cylindrical shape, and supports an upper end of the tubular portion 5305 of the microscope unit 5303 so as to be rotatable about a rotational axis (first axis $O_1$) parallel to a central axis of the tubular portion 5305 at a distal end (lower end) thereof. Here, the first joint 5311a may be configured such that the first axis $O_1$ coincides with the optical axis of the imaging unit of the microscope unit 5303. Therefore, by rotating the microscope unit 5303 around the first axis $O_1$, it becomes possible to change a visual field so as to rotate the imaged image.

The first link 5313a fixedly supports the first joint 5311a at a distal end thereof. Specifically, the first link 5313a is a rod-shaped member having a substantially L shape, and while one side on the distal end side thereof extends in a direction orthogonal to the first axis $O_1$, an end of the one side is connected to the first joint 5311a so as to abut an upper end of an outer periphery of the first joint 5311a. The second joint 5311b is connected to an end of another side on a proximal side of the substantially L-shape of the first link 5313a.

The second joint 5311b has a substantially cylindrical shape and supports the proximal end of the first link 5313a so as to be rotatable around a rotational axis (second axis $O_2$) orthogonal to the first axis $O_1$. A distal end of the second link 5313b is fixedly connected to a proximal end of the second joint 5311b.

The second link 5313b is a rod-shaped member having a substantially L shape, and while one side on the distal end side thereof extends in a direction orthogonal to the second axis $O_2$, an end of the one side is fixedly connected to the proximal end of the second joint 5311b. The third joint 5311c is connected to another side on a proximal end side of the substantially L shape of the second link 5313b.

The third joint 5311c has a substantially cylindrical shape and supports the proximal end of the second link 5313b so as to be rotatable around a rotational axis (third axis $O_3$) orthogonal to the first and second axes $O_1$ and $O_2$ at a distal end thereof. A distal end of the third link 5313c is fixedly connected to a proximal end of the third joint 5311c. The microscope unit 5303 may be moved so as to change the position of the microscope unit 5303 in a horizontal plane by rotating the configuration on the distal end side including the microscope unit 5303 around the second axis $O_2$ and the third axis $O_3$. That is, by controlling the rotation around the second axis $O_2$ and the third axis $O_3$, the visual field of the imaged image may be moved in a plane.

The third link 5313c is configured such that the distal end side thereof has a substantially cylindrical shape, and the proximal end of the third joint 5311c is fixedly connected to the distal end of the cylindrical shape such that central axes of both of them are substantially the same. A proximal end side of the third link 5313c has a prismatic shape, and the fourth joint 5311d is connected to an end thereof.

The fourth joint 5311d has a substantially cylindrical shape, and supports the proximal end of the third link 5313c at a distal end thereof so as to be rotatable around a rotational axis (fourth axis $O_4$) orthogonal to the third axis $O_3$. A distal end of the fourth link 5313d is fixedly connected to a proximal end of the fourth joint 5311d.

The fourth link 5313d is a rod-shaped member extending substantially linearly, and while extending so as to be orthogonal to the fourth axis $O_4$, an end on the distal end thereof is fixedly connected to the fourth joint 5311d so as to abut a substantially cylindrical side surface of the fourth joint 5311d. The fifth joint 5311e is connected to a proximal end of the fourth link 5313d.

The fifth joint 5311e has a substantially cylindrical shape, and supports the proximal end of the fourth link 5313d at a distal end side thereof so as to be rotatable around a rotational axis (fifth axis $O_5$) parallel to the fourth axis $O_4$. A distal end of the fifth link 5313e is fixedly connected to a proximal end of the fifth joint 5311e. The fourth axis $O_4$ and the fifth axis $O_5$ are the rotational axes capable of moving the microscope unit 5303 in the vertical direction. By rotating the configuration on the distal end side including the microscope unit 5303 around the fourth axis $O_4$ and the fifth axis $O_5$, a height of the microscope unit 5303, that is, a distance between the microscope unit 5303 and the observation target may be adjusted.

The fifth link 5313e is formed by combination of a first member having a substantially L shape in which one side extends in the vertical direction and the other side extends in the horizontal direction, and a second member in a rod shape extending vertically downward from a site extending horizontally of the first member. The proximal end of the fifth joint 5311e is fixedly connected in the vicinity of an upper end of the site extending vertically of the first member of the fifth link 5313e. The sixth joint 5311f is connected to a proximal end (lower end) of the second member of the fifth link 5313e.

The sixth joint 5311f has a substantially cylindrical shape and supports the proximal end of the fifth link 5313e at a distal end side thereof so as to be rotatable around a rotational axis (sixth axis $O_6$) parallel to the vertical direction. A distal end of the sixth link 5313f is fixedly connected to a proximal end of the sixth joint 5311f.

The sixth link 5313f is a rod-shaped member extending in the vertical direction, and a proximal end thereof is fixedly connected to an upper surface of the base 5315.

A rotatable range of the first joint 5311a to the sixth joint 5311f is appropriately set such that the microscope unit 5303 may move desirably. Therefore, in the arm 5309 having the above-described configuration, movement of a total of six-degree freedom of translational three-degree freedom and rotational three-degree freedom may be realized as for the movement of the microscope unit 5303. In this manner, by configuring the arm 5309 such that the six-degree freedom is realized as for the movement of the microscope unit 5303, it is possible to freely control the position and attitude of the microscope unit 5303 within the movable range of the arm 5309. Therefore, the surgical site may be observed from any angle, and the surgery may be performed more smoothly.

Note that, the configuration of the arm 5309 illustrated is merely an example, and the number and shapes (lengths) of the links forming the arm 5309, the number and arranged positions of the joints, the directions of the rotational axes and the like may be designed as appropriate such that a desired degree of freedom may be realized. For example, as described above, in order to freely move the microscope unit 5303, the arm 5309 is preferably configured with the six-degree freedom, but the arm 5309 may also be configured with a larger degree of freedom (that is, redundant degree of freedom). In a case where there is the redundant degree of freedom, the arm 5309 may change the attitude of the arm 5309 in a state in which the position and attitude of the microscope unit 5303 are fixed. Therefore, for example, control which is more convenient for the operator may be realized, such as control of the attitude of the arm 5309 so that the arm 5309 does not interfere with an eyesight of the operator who looks at the display device 5319 and the like, for example.

Here, each of the first joint 5311a to the sixth joint 5311f may be provided with an actuator equipped with a drive mechanism such as a motor and the like, and an encoder and the like which detects a rotation angle at each joint. Then, the drive of each actuator provided on the first joint 5311a to the sixth joint 5311f is appropriately controlled by the control device 5317, so that the attitude of the arm 5309, that is, the position and attitude of the microscope unit 5303 may be controlled. Specifically, the control device 5317 may grasp current attitude of the arm 5309 and current position and attitude of the microscope unit 5303 on the basis of information regarding the rotation angle of each joint detected by the encoder. The control device 5317 calculates a control value (for example, rotation angle, generated torque or the like) for each joint which realizes movement of the microscope unit 5303 according to the operation input from the user by using the grasped information, and drives the drive mechanism of each joint according to the control value. Note that, at that time, a control method of the arm 5309 by the control device 5317 is not limited, and various known control methods such as force control, position control or the like may be applied.

For example, when the operator appropriately performs the operation input via an input device not illustrated, the drive of the arm 5309 may be appropriately controlled by the control device 5317 in accordance with the operation input, and the position and attitude of the microscope unit 5303 may be controlled. With this control, it is possible to move the microscope unit 5303 from an arbitrary position to an arbitrary position, and fixedly support this in the position after movement. Note that, as for the input device, in consideration of the convenience of the operator, it is preferable to apply the one which may be operated even if the operator has a surgical tool in his/her hand such as, for example, a foot switch and the like. Furthermore, a contactless operation input may be performed on the basis of gesture detection or line-of-sight detection using a wearable device or a camera provided in an operating room. Therefore, even a user belonging to a clean area may operate a device belonging to an unclean area with a higher degree of freedom. Alternatively, the arm 5309 may be operated in a so-called master slave method. In this case, the arm 5309 may be remotely operated by the user via an input device installed in a place away from the operating room.

Furthermore, in a case where the force control is applied, so-called power assist control of receiving an external force from the user to drive the actuators of the first to sixth joints 5311a to 5311f so that the arm 5309 moves smoothly according to the external force may be performed. Therefore, when the user grips the microscope unit 5303 and directly moves the position thereof, the microscope unit 5303 may be moved with a relatively light force. Therefore, the microscope unit 5303 may be moved more intuitively and with a simpler operation, and user convenience may be improved.

Furthermore, the drive of the arm 5309 may be controlled so as to perform a pivot operation. Here, the pivot operation is an operation of moving the microscope unit 5303 so that the optical axis of the microscope unit 5303 always faces a predetermined point in space (hereinafter referred to as a pivot point). According to the pivot operation, the same observation position may be observed in various directions, so that more detailed observation of the affected site becomes possible. Note that, in a case where the microscope unit 5303 is configured so as not to be able to adjust a focal distance thereof, it is preferable that the pivot operation is performed in a state in which a distance between the microscope unit 5303 and the pivot point is fixed. In this case, the distance between the microscope unit 5303 and the pivot point may be adjusted to a fixed focal distance of the microscope unit 5303. Therefore, the microscope unit 5303 moves on a hemisphere (illustrated schematically in FIG. 54) having a radius corresponding to the focal distance centered on the pivot point, and a sharp imaged image may be obtained even when the observation direction is changed. In contrast, in a case where the microscope unit 5303 is configured to be able to adjust the focal distance thereof, it is possible that the pivot operation is performed in a state in which the distance between the microscope unit 5303 and the pivot point is variable. In this case, for example, the control device 5317 may calculate the distance between the microscope unit 5303 and the pivot point on the basis of information regarding the rotation angle of each joint detected by the encoder, and automatically adjust the focal distance of the microscope unit 5303 on the basis of a calculation result. Alternatively, in a case where the microscope unit 5303 has an AF function, the focal distance may be automatically adjusted by the AF function every time the distance between the microscope unit 5303 and the pivot point is changed by the pivot operation.

Furthermore, the first joint 5311a to the sixth joint 5311f may be provided with a brake which restricts the rotation thereof. The operation of the brake may be controlled by the control device 5317. For example, in a case where it is desired to fix the position and attitude of the microscope unit 5303, the control device 5317 activates the brake of each joint. Therefore, since the attitude of the arm 5309, that is, the position and attitude of the microscope unit 5303 may be fixed without driving the actuator, power consumption may be reduced. In a case where it is desired to move the position and attitude of the microscope unit 5303, the control device 5317 may release the brake of each joint and drive the actuator according to a predetermined control method.

Such a brake operation may be performed in response to an operation input by the user via the operation unit 5307 described above. In a case where the user wants to move the position and attitude of the microscope unit 5303, the user operates the operation unit 5307 to release the brake of each joint. Therefore, the operation mode of the arm 5309 shifts to a mode (all-free mode) in which the rotation at each joint may be freely performed. Furthermore, in a case where the user wants to fix the position and attitude of the microscope unit 5303, the user operates the operation unit 5307 to activate the brake of each joint. Therefore, the operation mode of the arm 5309 shifts to a mode (fixed mode) in which the rotation at each joint is restricted.

The control device 5317 comprehensively controls the operation of the microscopic surgery system 5300 by controlling the operations of the microscope device 5301 and the display device 5319. For example, the control device 5317 controls the drive of the arm 5309 by operating the actuators of the first joint 5311a to the sixth joint 5311f according to a predetermined control method. Furthermore, for example, the control device 5317 changes the operation mode of the arm 5309 by controlling the operation of the brake of the first joint 5311a to the sixth joint 5311f. Furthermore, for example, the control device 5317 generates image data for display by applying various types of signal processing on the image signal obtained by the imaging unit of the microscope unit 5303 of the microscope device 5301 and displays the image data on the display device 5319. As the signal processing, for example, various types of known signal processing such as synchronization processing and color separation processing (for example, demosaic processing and the like), high image quality processing (such as band enhancement processing, super-resolution processing, noise reduction (NR) processing and/or camera shake correction processing) and/or scaling processing (that is, electronic zoom processing) may be performed.

Note that, the communication between the control device 5317 and the microscope unit 5303 and the communication between the control device 5317 and the first joint 5311a to the sixth joint 5311f may be wired communication or wireless communication. In a case of the wired communication, communication using electric signals may be performed, or optical communication may be performed. In this case, a transmission cable used for the wired communication may be configured as an electric signal cable, an optical fiber, or a composite cable thereof depending on the communication method. In contrast, in a case of the wireless communication, it is not necessary to lay the transmission cable in the operating room, so that a situation in which movement of a medical staff in the operating room is hindered by the transmission cable may be solved.

The control device 5317 may be a microcomputer, a control board or the like on which a processor such as a central processing unit (CPU), a graphics processing unit (GPU) and the like are mounted, or the processor and a storage element such as a memory are mixedly mounted. The various functions described above may be realized by the processor of the control device 5317 operating according to a predetermined program. Note that, in the illustrated example, the control device 5317 is provided as a separate device from the microscope device 5301; however, the control device 5317 may be installed inside the base 5315 of the microscope device 5301 to be integrated with the microscope device 5301. Alternatively, the control device 5317 may include a plurality of devices. For example, it is possible that a microcomputer, a control board and the like are arranged on each of the microscope unit 5303 and the first joint 5311a to the sixth joint 5311f of the arm 5309, and they are connected so as to be able to communicate with each other, so that a function similar to that of the control device 5317 is realized.

The display device 5319 is provided in the operating room, and displays an image corresponding to the image data generated by the control device 5317 under the control of the control device 5317. That is, the display device 5319 displays an image of the surgical site imaged by the microscope unit 5303. Note that, the display device 5319 may display various types of information regarding the surgery such as physical information of the patient, information regarding a surgical procedure and the like, for example, in place of or together with the image of the surgical site. In this case, the display of the display device 5319 may be appropriately switched by an operation by the user. Alternatively, a plurality of display devices 5319 may be provided, and each of a plurality of display devices 5319 may display the image of the surgical site and various types of information regarding the surgery. Note that, as the display device 5319, various known display devices such as a liquid crystal display device, an electro luminescence (EL) display device or the like may be applied.

Figure 55:
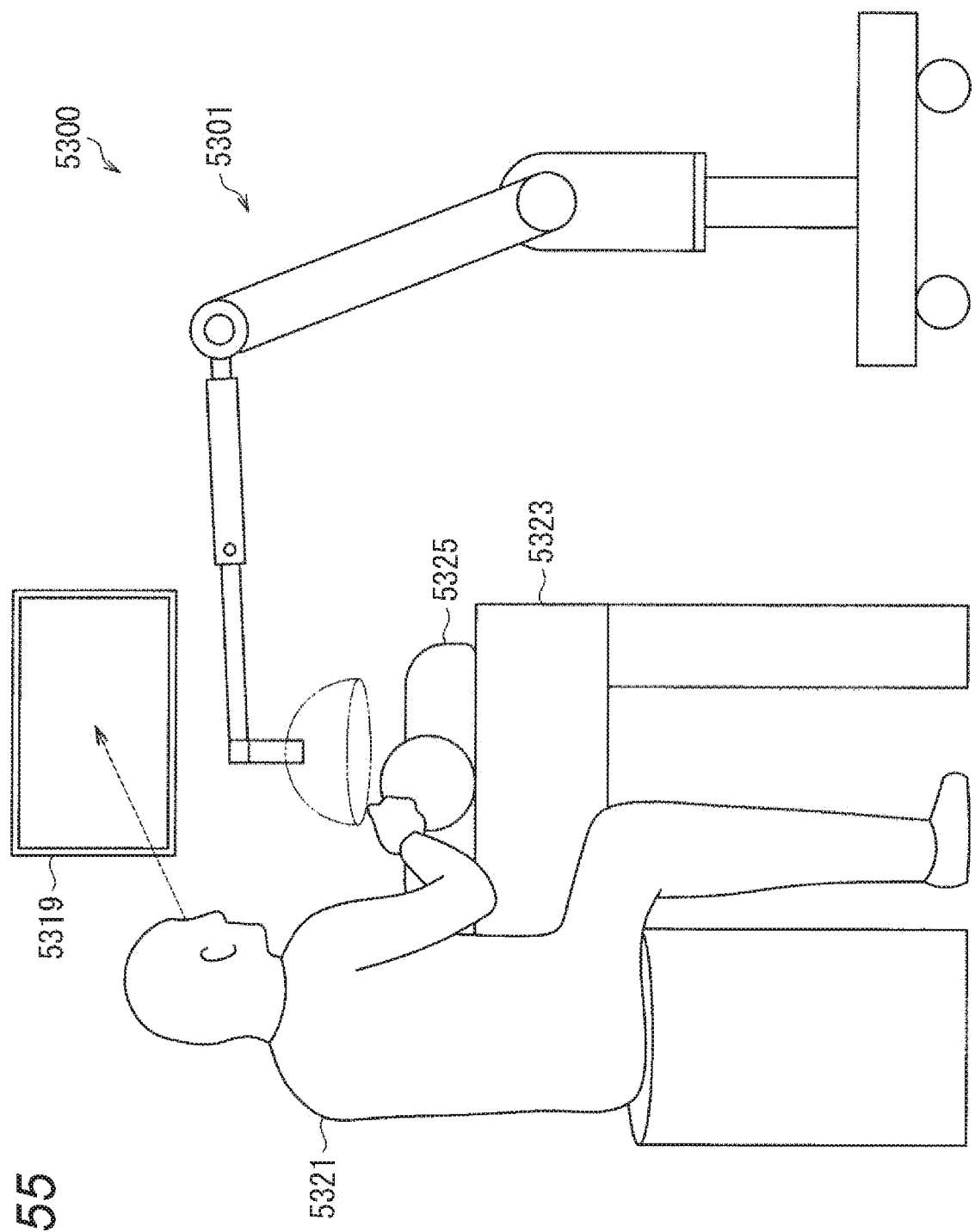
FIG. 55 is a view illustrating a state of surgery using the microscopic surgery system illustrated in FIG. 54.

FIG. 55 is a view illustrating a state of the surgery using the microscopic surgery system 5300 illustrated in FIG. 54. FIG. 55 schematically illustrates a state in which the operator 5321 performs surgery on the patient 5325 on the patient bed 5323 by using the microscopic surgery system 5300. Note that, in FIG. 55, for simplicity, the control device 5317 out of the configuration of the microscopic surgery system 5300 is not illustrated, and the microscope device 5301 is illustrated in a simplified manner.

As illustrated in FIG. 55, at the time of surgery, the image of the surgical site imaged by the microscope device 5301 is displayed in an enlarged manner on the display device 5319 installed on a wall surface of the operating room using the microscopic surgery system 5300. The display device 5319 is installed in a position facing the operator 5321, and the operator 5321 performs various procedures on the surgical site such as resection of the affected site and the like, for example, while observing the state of the surgical site by a video image displayed on the display device 5319.

An example of the microscopic surgery system 5300 to which the technology according to the present disclosure may be applied is described above. Note that, the microscopic surgery system 5300 is herein described as an example, but a system to which the technology according to the present disclosure may be applied is not limited to such an example. For example, the microscope device 5301 may serve as a support arm device which supports another observation device or another surgical tool in place of the microscope unit 5303 at the distal end thereof. As the other observation devices, for example, an endoscope may be applied. Furthermore, as the other surgical tools, forceps, tweezers, an insufflation tube for insufflation, an energy treatment tool for incising tissue or sealing the blood vessel by cauterization or the like may be applied. By supporting such observation devices and surgical tools with the support arm device, it is possible to fix the position more stably and reduce a burden on the medical staff as compared to a case where the medical staff supports the same manually. The technology according to the present disclosure may be applied to the support arm device which supports such configuration other than the microscope unit.

The technology according to the present disclosure may be preferably applied to the imaging unit of the microscope unit 5303 out of the configurations described above. Specifically, the imaging device 100 in FIG. 1 may be applied as the imaging unit of the microscope unit 5303. In this manner, by applying the technology according to the present disclosure to the imaging unit of the microscope unit 5303, the resolution of the detection image (restored image) may be controlled.

Therefore, for example, during surgical work, imaging may be performed at high resolution in an all-pixel mode and the like, and when the work (surgery) is not performed, imaging may be performed at low resolution in a thinning mode or an area driving mode. Furthermore, for example, in normal times, imaging is performed at low resolution in the thinning mode or the area driving mode, and in a case where suspiciousness such as bleeding and the like is detected in the surgical site, for example, it may be switched to the all-pixel mode and the imaging may be performed at high resolution.

In this manner, by imaging in an appropriate operation mode according to the situation, purpose and the like, it is possible to suppress an increase in load of imaging and to suppress a reduction in image quality of the restored image. Therefore, the surgery may be performed more safely and more reliably.

<In-Vivo Information Obtaining Device (Capsule Endoscope)>

Furthermore, the technology according to the present disclosure may be applied to, for example, an in-vivo information obtaining system of a patient using a capsule endoscope.

Figure 56:
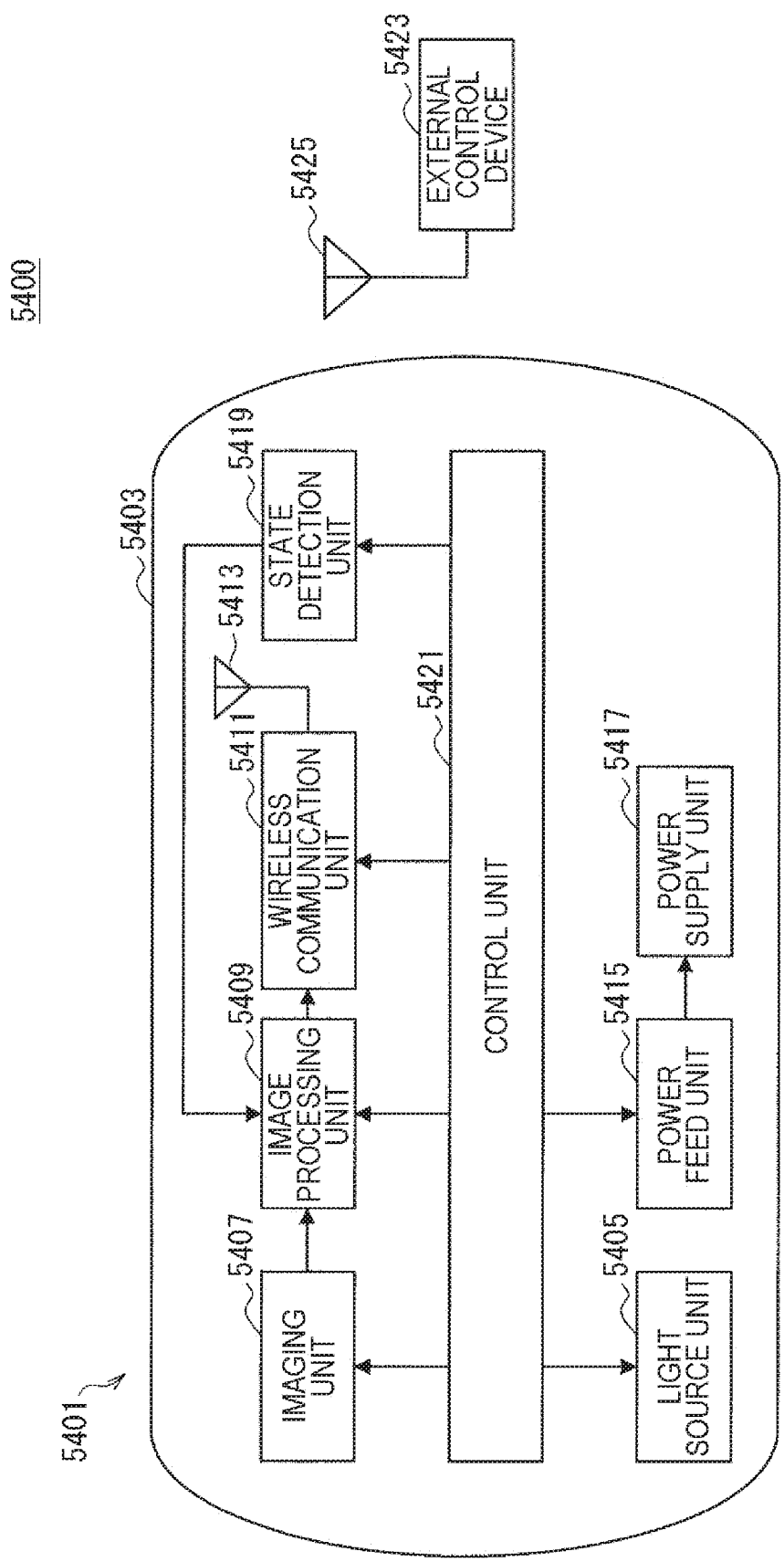
FIG. 56 is a block diagram illustrating an example of a schematic configuration of an in-vivo information obtaining system.

FIG. 56 is a view illustrating a schematic configuration example of an in-vivo information obtaining system 5400 to which the technology according to the present disclosure may be applied. With reference to FIG. 56, the in-vivo information obtaining system 5400 includes a capsule endoscope 5401 and an external control device 5423 which comprehensively controls operation of the in-vivo information obtaining system 5400. At the time of examination, the capsule endoscope 5401 is swallowed by the patient. The capsule endoscope 5401 has an imaging function and a wireless communication function and sequentially images in organs (hereinafter, also referred to as in-vivo images) at a predetermined interval while moving in the organs such as the stomach, the intestines and the like by peristaltic movement and the like until being naturally discharged from the patient, and sequentially wirelessly transmits information regarding the in-vivo images to the external control device 5423 outside the body. The external control device 5423 generates image data for displaying the in-vivo image on a display device (not illustrated) on the basis of the received information regarding the in-vivo image. In the in-vivo information obtaining system 5400, it is possible to obtain as needed the image of the inside the patient's body from when the capsule endoscope 5401 is swallowed until this is discharged in this manner.

Configurations and functions of the capsule endoscope 5401 and the external control device 5423 are described in further detail. As illustrated, the capsule endoscope 5401 has functions of a light source unit 5405, an imaging unit 5407, an image processing unit 5409, a wireless communication unit 5411, a power feed unit 5415, a power supply unit 5417, a state detection unit 5419, and a control unit 5421 in a capsule-shaped casing 5403.

The light source unit 5405 includes a light source such as, for example, a light emitting diode (LED) and the like, and irradiates an imaging visual field of the imaging unit 5407 with light.

The imaging unit 5407 includes an optical system including an imaging element and a plurality of lenses provided on a preceding stage of the imaging element. Reflected light (hereinafter referred to as observation light) of the light applied to body tissue to be observed is condensed by the optical system and is incident on the imaging element. The imaging element receives the observation light and photoelectrically converts the same to generate an electric signal corresponding to the observation light, that is, an image signal corresponding to an observation image. The image signal generated by the imaging unit 5407 is provided to the image processing unit 5409. Note that, as the imaging element of the imaging unit 5407, various types of known imaging elements such as a complementary metal oxide semiconductor (CMOS) image sensor, a charge coupled device (CCD) image sensor or the like may be used.

The image processing unit 5409 includes a processor such as a central processing unit (CPU), a graphics processing unit (GPU) and the like, and performs various types of signal processing on the image signal generated by the imaging unit 5407. The signal processing may be minimum processing (such as image data compression, frame rate conversion, data rate conversion and/or format conversion, for example) for transmitting the image signal to the external control device 5423. Since the image processing unit 5409 is configured to perform only requisite minimum processing, the image processing unit 5409 may be realized with a smaller size and lower power consumption, so that this is preferable as the capsule endoscope 5401. However, in a case where there is a space in the casing 5403 and extra power consumption, it is possible to perform further signal processing (for example, noise removal processing, other high image quality processing and the like) in the image processing unit 5409. The image processing unit 5409 provides the image signal subjected to the signal processing to the wireless communication unit 5411 as RAW data. Note that, in a case where information regarding a state (movement, attitude and the like) of the capsule endoscope 5401 is obtained by the state detection unit 5419, the image processing unit 5409 may provide the image signal to the wireless communication unit 5411 in association with the information. Therefore, it is possible to associate a position in the body in which the image is imaged, an imaging direction of the image and the like with the imaged image.

The wireless communication unit 5411 includes a communication device capable of transmitting/receiving various types of information to/from the external control device 5423. The communication device includes an antenna 5413, a processing circuit for performing modulation processing and the like for transmitting and receiving signals and the like. The wireless communication unit 5411 performs predetermined processing such as modulation processing on the image signal subjected to the signal processing by the image processing unit 5409 and transmits the image signal to the external control device 5423 via the antenna 5413. Furthermore, the wireless communication unit 5411 receives a control signal regarding drive control of the capsule endoscope 5401 from the external control device 5423 via the antenna 5413. The wireless communication unit 5411 provides the received control signal to the control unit 5421.

The power feed unit 5415 includes an antenna coil for power reception, a power regeneration circuit for regenerating electric power from current generated in the antenna coil, a booster circuit and the like. In the power feed unit 5415, electric power is generated using a so-called non-contact charging principle. Specifically, a magnetic field (electromagnetic wave) of a predetermined frequency is externally given to the antenna coil of the power feed unit 5415, so that induced electromotive force is generated in the antenna coil. The electromagnetic wave may be a carrier wave transmitted from the external control device 5423 via an antenna 5425, for example. Electric power is regenerated from the induced electromotive force by the power regeneration circuit, and electric potential thereof is appropriately adjusted in the booster circuit, so that electric power for storage is generated. The electric power generated by the power feed unit 5415 is stored in the power supply unit 5417.

The power supply unit 5417 includes a secondary battery and stores electric power generated by the power feed unit 5415. In FIG. 56, for the sake of simplicity of the drawing, arrows and the like indicating a supply destination of electric power from the power supply unit 5417 and the like is not illustrated; however, the electric power accumulated in the power supply unit 5417 is supplied to the light source unit 5405, the imaging unit 5407, the image processing unit 5409, the wireless communication unit 5411, the state detection unit 5419, and the control unit 5421, and may be used for driving them.

The state detection unit 5419 includes a sensor for detecting the state of the capsule endoscope 5401 such as an acceleration sensor and/or a gyro sensor. The state detection unit 5419 may obtain the information regarding the state of the capsule endoscope 5401 from a detection result by the sensor. The state detection unit 5419 provides the obtained information regarding the state of the capsule endoscope 5401 to the image processing unit 5409. As described above, in the image processing unit 5409, the information regarding the state of the capsule endoscope 5401 may be associated with the image signal.

The control unit 5421 includes a processor such as a CPU and the like, and comprehensively controls operation of the capsule endoscope 5401 by operating according to a predetermined program. The control unit 5421 appropriately controls drive of the light source unit 5405, the imaging unit 5407, the image processing unit 5409, the wireless communication unit 5411, the power feed unit 5415, the power supply unit 5417, and the state detection unit 5419 according to the control signal transmitted from the external control device 5423, thereby realizing the function in each unit as described above.

The external control device 5423 may be a microcomputer, a control board or the like on which a processor such as a CPU, a GPU and the like are mounted, or the processor and a storage element such as a memory and the like are mixedly mounted. The external control device 5423 includes the antenna 5425 and is configured to be able to transmit and receive various types of information to and from the capsule endoscope 5401 via the antenna 5425. Specifically, the external control device 5423 controls the operation of the capsule endoscope 5401 by transmitting the control signal to the control unit 5421 of the capsule endoscope 5401. For example, an irradiation condition of the light to the observation target in the light source unit 5405 might be changed by the control signal from the external control device 5423. Furthermore, an imaging condition (for example, a frame rate, exposure value and the like in the imaging unit 5407) might be changed by the control signal from the external control device 5423. Furthermore, a content of the processing in the image processing unit 5409 and a condition (for example, transmission interval, the number of transmitted images and the like) for the wireless communication unit 5411 to transmit the image signal may be changed by the control signal from the external control device 5423.

Furthermore, the external control device 5423 applies various types of image processing to the image signal transmitted from the capsule endoscope 5401 and generates the image data for displaying the imaged in-vivo image on the display device. As for the image processing, for example, various types of known signal processing such as synchronization processing and color separation processing (for example, demosaic processing and the like), high image quality processing (such as band enhancement processing, super-resolution processing, noise reduction (NR) processing and/or camera shake correction processing) and/or scaling processing (electronic zoom processing) may be performed. The external control device 5423 controls drive of the display device (not illustrated) to display the in-vivo image imaged on the basis of the generated image data. Alternatively, the external control device 5423 may allow a recording device (not illustrated) to record the generated image data or allow a printing device (not illustrated) to print out the same.

The technology according to the present disclosure may be preferably applied to the imaging unit 5407 out of the configurations described above. Specifically, the imaging device 100 (FIG. 1) may be applied as the imaging unit 5407. In this manner, by applying the technology according to the present disclosure to the imaging unit 5407, the resolution of the detection image (restored image) may be controlled.

Therefore, for example, imaging may be performed at high resolution in the all-pixel mode and the like in the vicinity of the affected site, and imaging may be performed at low resolution in the thinning mode or the area driving mode in other sites.

In this manner, by imaging in an appropriate operation mode according to the situation, purpose and the like, it is possible to suppress an increase in load of imaging and to suppress a reduction in image quality of the restored image. Therefore, a sharper surgical site image may be obtained, so that accuracy of examination is improved. Furthermore, capacity of a battery may be reduced to suppress an increase in load (power consumption). Therefore, the capsule endoscope 5401 may be made further smaller, so that the burden on the patient may be further reduced.

<Flow Cytometry>

Furthermore, the technology according to the present disclosure may be applied to, for example, flow cytometry.

Figure 57:
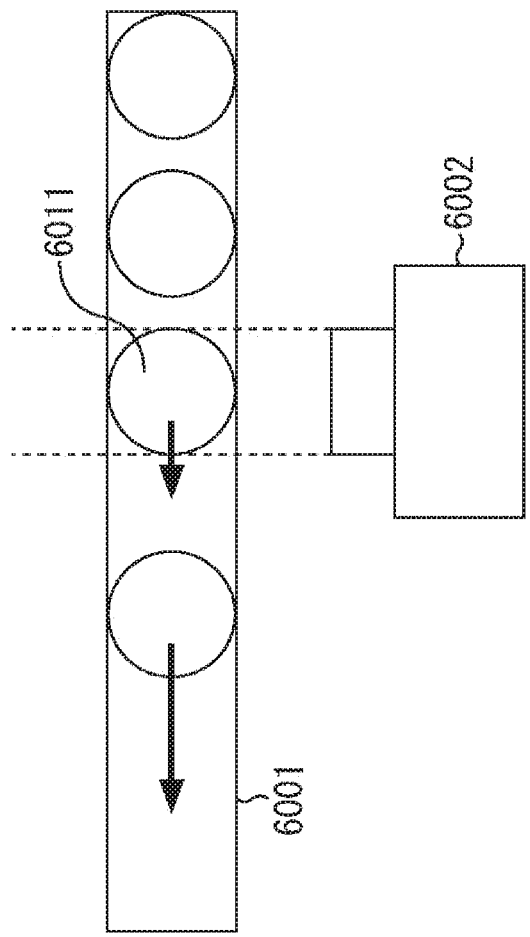
FIG. 57 is a view illustrating an example of a schematic configuration of a flow cytometry system.

Flow cytometry is a method of dispersing fine particles in fluid, allow the fluid to flow finely, and optically analyzing individual particles. For example, as illustrated in FIG. 57, fluid is allowed to flow through a flow path 6001 formed by using a fine tube and the like, and fine particles 6011 (for example, cells and the like) contained in the fluid are irradiated with laser light to be excited, and at the same time, an imaging unit 6002 is allowed to image fluorescence thereof to detect. By doing so, the fine particles 6011 in the fluid may be detected.

Fine particles may also be selectively recovered. A device used for flow cytometry is referred to as a flow cytometer. A device for sorting is referred to as a sorter, and a device without a sorting function is referred to as an analyzer. This is mainly used when observing cells individually.

A light beam of a certain wavelength (a laser beam in general) is applied to the fluid, and in general, forward scatter (FSC) in a direction slightly shifted from the light beam (because a detector is saturated by strong light from the light source on the same axis as the light beam) and a side scatter (SSC) in a direction perpendicular to the light beam are detected. Furthermore, many devices are provided with one or more fluorescence detectors that label the microparticles with a fluorescent substance and detect the fluorescence generated by the laser light. These detectors detect light and fluorescence affected by the particles in the fluid. Physical and chemical properties of the particles may be estimated from a set of detected light. In a case of cells, it is possible to analyze a cell size from FSC and analyze complexity in the cell (derived from nucleus shape, subcellular organelle, membrane structure and the like) from SSC. A significantly wide variety of analyzes are possible by combination of detectors, fluorescent substances, and immunostaining.

As such imaging unit 6002, the imaging device 100 (FIG. 1) may be applied. In this manner, by applying the technology according to the present disclosure to the imaging unit 5009, the resolution of the detection image (restored image) may be controlled.

Note that, in a case of an imaging device including an imaging lens, observation at a light wavelength level might be difficult due to aberration of the lens and the like. That is, in a case where a subject is extremely fine as in the flow cytometry, it might be difficult to perform correct observation.

In contrast, since the imaging element 121 of the imaging device 100 does not have an imaging lens, this has no aberration, and may sufficiently observe fine particles, which is preferable.

Figure 58:
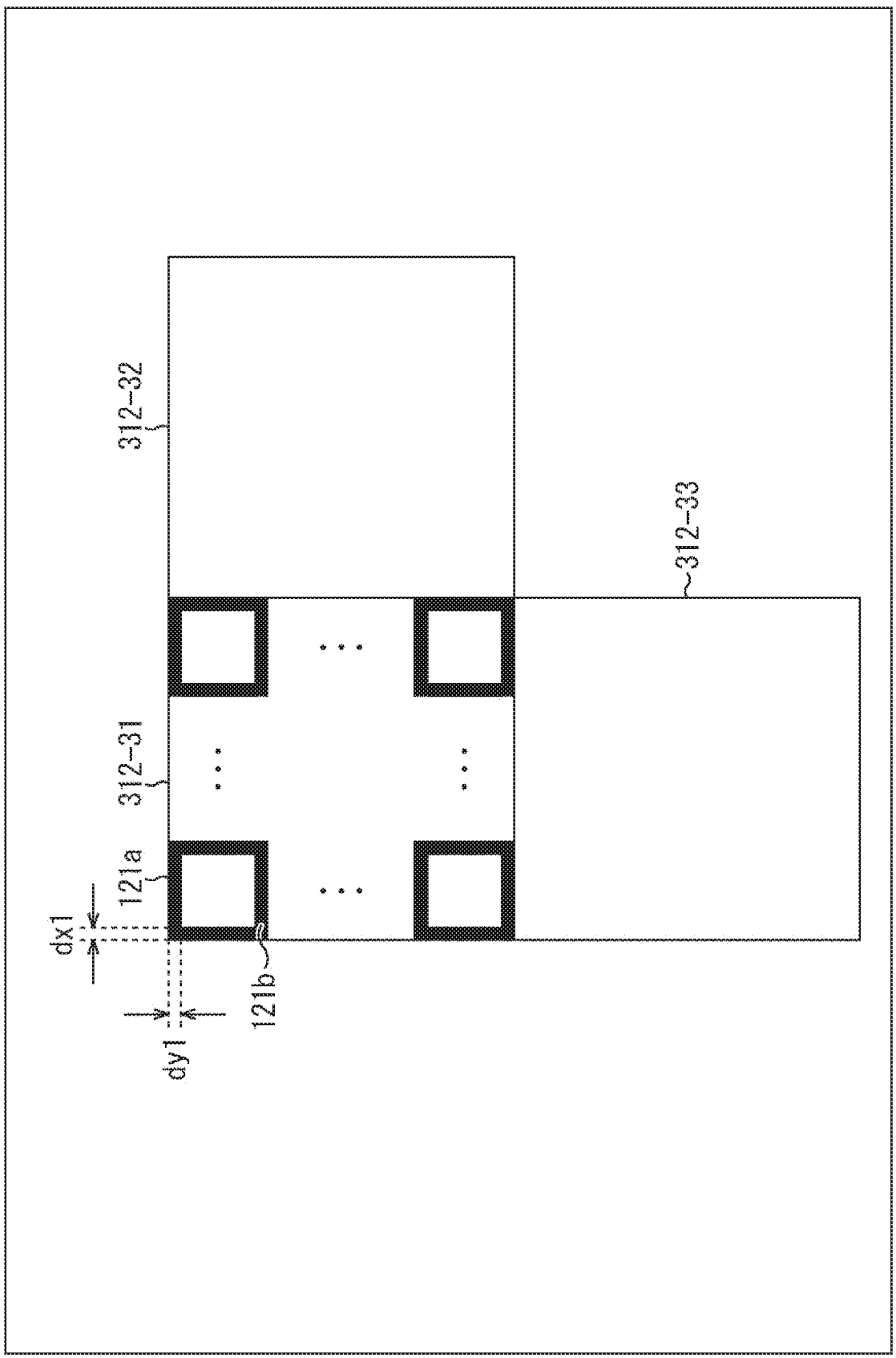
FIG. 58 is a view illustrating an example of a pattern of an opening.

Note that, in a case where the subject is extremely fine as in the flow cytometry, a subject distance becomes extremely short, too, so that strength of the detection signal is different between pixels even when the incident angle directivity for each pixel is not set, and imaging of the subject becomes possible. Therefore, it is possible that the incident angle directivity of each pixel is not changed. For example, as illustrated in FIG. 58, in an area 312-31 used for observing the fine particles, the incident angle directivity of each of all the pixels may be perpendicular to a pixel region 311 (that is, the incident angle directivity is not biased).

Note that such area 312 may be provided singly or plurally in the pixel region 311. That is, all the areas 312 provided in the pixel region 311 may be made such areas without bias of the incident angle directivity, or a part of the areas 312 provided in the pixel region 311 may be made such areas without bias of the incident angle directivity. For example, in FIG. 58, areas 312-32 and 312-33 may be made similar to the area 312-31 or not.

7. Seventh Embodiment

<On-Vehicle System>

Furthermore, the technology according to the present disclosure may be realized as a device mounted on any type of mobile body such as an automobile, an electric automobile, a hybrid electric automobile, a motorcycle, a bicycle, a personal mobility, an airplane, a drone, a ship, a robot, a constructing machine, an agriculture machine (tractor) and the like, for example.

Figure 59:
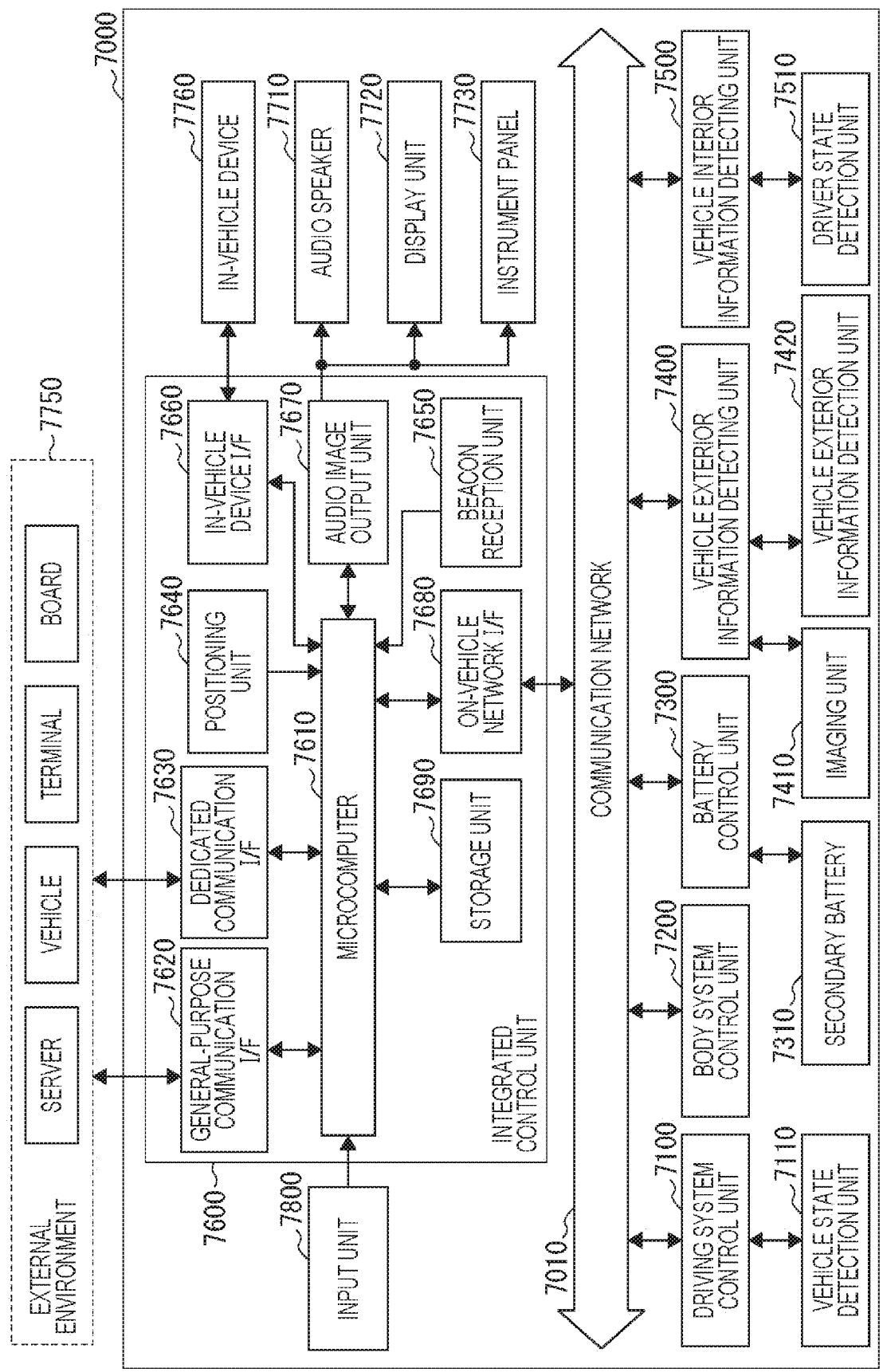
FIG. 59 is a block diagram illustrating an example of a schematic configuration of a vehicle control system.

FIG. 59 is a block diagram illustrating a schematic configuration example of a vehicle control system 7000 which is an example of a mobile body control system to which the technology according to the present disclosure may be applied. The vehicle control system 7000 is provided with a plurality of electronic control units connected to one another via a communication network 7010. In the example illustrated in FIG. 59, the vehicle control system 7000 is provided with a drive system control unit 7100, a body system control unit 7200, a battery control unit 7300, a vehicle exterior information detecting unit 7400, a vehicle interior information detecting unit 7500, and an integrated control unit 7600. The communication network 7010 connecting the plurality of control units may be an on-vehicle communication network compliant with any standard of Controller Area Network (CAN), Local Interconnect Network (LIN), Local Area Network (LAN), or FlexRay (registered trademark) and the like, for example.

Each control unit is provided with a microcomputer which performs arithmetic processing according to various programs, a storage unit which stores the programs executed by the microcomputer, parameters used for various arithmetic operations and the like, and a drive circuit which drives various devices to be controlled. Each control unit is provided with a network I/F for communicating with other control units via the communication network 7010, and a communication I/F for communicating with devices, sensors or the like inside and outside the vehicle by wired communication or wireless communication. In FIG. 59, as a functional configuration of the integrated control unit 7600, a microcomputer 7610, a general-purpose communication I/F 7620, a dedicated communication I/F 7630, a positioning unit 7640, a beacon reception unit 7650, an in-vehicle device I/F 7660, an audio image output unit 7670, an on-vehicle network I/F 7680, and a storage unit 7690 are illustrated. Other control units are similarly provided with a microcomputer, a communication I/F, a storage unit and the like.

The drive system control unit 7100 controls operation of devices regarding a drive system of a vehicle according to various programs. For example, the drive system control unit 7100 serves as a control device of a driving force generating device for generating driving force of the vehicle such as an internal combustion engine, a driving motor and the like, a driving force transmitting mechanism for transmitting the driving force to wheels, a steering mechanism for adjusting a rudder angle of the vehicle, a braking device for generating braking force of the vehicle and the like. The drive system control unit 7100 may have a function as a control device of an antilock brake system (ABS), electronic stability control (ESC) or the like.

A vehicle state detection unit 7110 is connected to the drive system control unit 7100. The vehicle state detection unit 7110 includes, for example, a gyro sensor which detects an angular velocity of axial rotational movement of a vehicle body, an acceleration sensor which detects acceleration of the vehicle, or at least one of sensors for detecting an operation amount of an accelerator pedal, an operation amount of a brake pedal, a steering angle of a steering wheel, an engine speed, a rotational speed of a wheel or the like. The drive system control unit 7100 performs arithmetic processing using a signal input from the vehicle state detection unit 7110 to control the internal combustion engine, the driving motor, an electric power steering device, a brake device or the like.

The body system control unit 7200 controls operation of various devices mounted on a vehicle body in accordance with various programs. For example, the body system control unit 7200 serves as a control device of a keyless entry system, a smart key system, a power window device, or various lights such as a head light, a backing light, a brake light, a blinker, a fog light or the like. In this case, a radio wave transmitted from a portable device which substitutes for a key or signals of various switches may be input to the body system control unit 7200. The body system control unit 7200 receives an input of the radio wave or signals and controls a door lock device, the power window device, the lights and the like of the vehicle.

The battery control unit 7300 controls a secondary battery 7310 which is a power supply source of the driving motor according to various programs. For example, information such as battery temperature, a battery output voltage, remaining battery capacity or the like is input to the battery control unit 7300 from the battery device including the secondary battery 7310. The battery control unit 7300 performs arithmetic processing using these signals, and controls temperature adjustment of the secondary battery 7310 or the cooling device and the like provided in the battery device.

The vehicle exterior information detecting unit 7400 detects information outside the vehicle on which the vehicle control system 7000 is mounted. For example, the vehicle exterior information detecting unit 7400 is connected to at least one of an imaging unit 7410 or a vehicle exterior information detection unit 7420. The imaging unit 7410 includes at least one of a time of flight (ToF) camera, a stereo camera, a monocular camera, an infrared camera, or other cameras. The vehicle exterior information detection unit 7420 includes, for example, at least one of an environmental sensor for detecting current weather or meteorological phenomenon, or an ambient information detection sensor for detecting other vehicles, obstacles, pedestrians or the like around the vehicle on which the vehicle control system 7000 is mounted.

The environmental sensor may be, for example, at least one of a raindrop sensor which detects rainy weather, a fog sensor which detects fog, a sunshine sensor which detects sunlight intensity, or a snow sensor which detects snowfall. The ambient information detection sensor may be at least one of an ultrasonic sensor, a radar device, or light detection and ranging, laser imaging detection and ranging (LIDAR) device. The imaging unit 7410 and the vehicle exterior information detection unit 7420 may be provided as independent sensors or devices, or may be provided as a device in which a plurality of sensors or devices are integrated.

Figure 60:
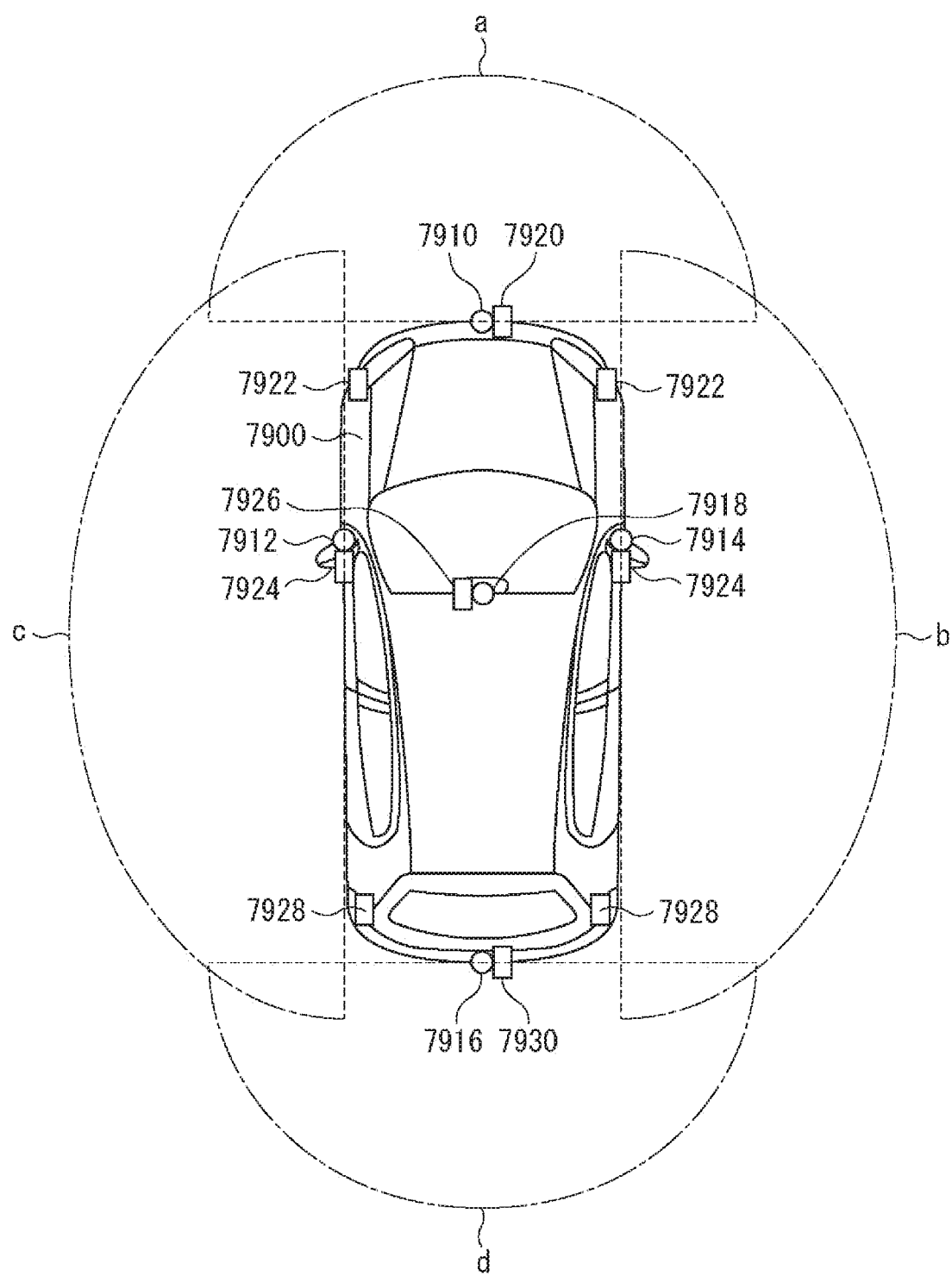
FIG. 60 is an illustrative view illustrating an example of an installation position of a vehicle exterior information detection unit and an imaging unit.

Here, FIG. 60 illustrates an example of installation positions of the imaging unit 7410 and the vehicle exterior information detection unit 7420. Each of imaging units 7910, 7912, 7914, 7916, and 7918 are provided in at least one position out of, for example, a front nose, a side mirror, a rear bumper, a rear door, or an upper portion of a front windshield in a vehicle interior of the vehicle 7900. The imaging unit 7910 provided on the front nose and the imaging unit 7918 provided in the upper portion of the front windshield in the vehicle interior principally obtain images in front of the vehicle 7900. The imaging units 7912 and 7914 provided on the side mirrors principally obtain images of the sides of the vehicle 7900. The imaging unit 7916 provided on the rear bumper or the rear door principally obtains an image behind the vehicle 7900. The imaging unit 7918 provided in the upper portion of the front windshield in the vehicle interior is mainly used for detecting a preceding vehicle, a pedestrian, an obstacle, a traffic signal, a traffic sign, a lane or the like.

Note that, FIG. 60 illustrates an example of imaging ranges of the imaging units 7910, 7912, 7914, and 7916. An imaging range a indicates the imaging range of the imaging unit 7910 provided on the front nose, imaging ranges b and c indicate the imaging ranges of the imaging units 7912 and 7914 provided on the side mirrors, and an imaging range d indicates the imaging range of the imaging unit 7916 provided on the rear bumper or the rear door. For example, image data imaged by the imaging units 7910, 7912, 7914, and 7916 are superimposed, so that an overlooking image of the vehicle 7900 as seen from above is obtained.

Vehicle exterior information detection units 7920, 7922, 7924, 7926, 7928, and 7930 provided on front, rear, side, corner, and the upper portion of the windshield of the vehicle interior of the vehicle 7900 may be ultrasonic sensors or radar devices, for example. The vehicle exterior information detection units 7920, 7926, and 7930 provided on the front nose, the rear bumper, the rear door, and the upper portion of the front windshield in the vehicle interior of the vehicle 7900 may be, for example, the LIDAR device. These vehicle exterior information detection units 7920 to 7930 are mainly used for detecting the preceding vehicle, the pedestrian, the obstacle or the like.

Returning to FIG. 59, the description is continued. The vehicle exterior information detecting unit 7400 allows the imaging unit 7410 to image an image outside the vehicle and receives imaged image data. Furthermore, the vehicle exterior information detecting unit 7400 receives detection information from the vehicle exterior information detection unit 7420 connected thereto. In a case where the vehicle exterior information detection unit 7420 is the ultrasonic sensor, the radar device, or the LIDAR device, the vehicle exterior information detecting unit 7400 transmits ultrasonic waves, electromagnetic waves and the like, and receives information of received reflected wave. The vehicle exterior information detecting unit 7400 may perform detection processing of objects such as a person, a vehicle, an obstacle, a sign, a character on a road surface or the like or distance detection processing on the basis of the received image. The vehicle exterior information detecting unit 7400 may perform environment recognition processing for recognizing rainfall, fog, road surface conditions or the like on the basis of the received information. The vehicle exterior information detecting unit 7400 may calculate a distance to an object outside the vehicle on the basis of the received information.

Furthermore, the vehicle exterior information detecting unit 7400 may perform image recognition processing of recognizing a person, a vehicle, an obstacle, a sign, a character on a road surface or the like or distance detection processing on the basis of the received image. The vehicle exterior information detecting unit 7400 may perform processing such as distortion correction, alignment or the like on the received image data, and combine the image data imaged by different imaging units 7410 to generate an overhead image or a panoramic image. The vehicle exterior information detecting unit 7400 may perform viewpoint conversion processing using the image data imaged by the different imaging units 7410.

The vehicle interior information detecting unit 7500 detects information in the vehicle. The vehicle interior information detecting unit 7500 is connected to, for example, a driver state detection unit 7510 for detecting a state of a driver. The driver state detection unit 7510 may include a camera which images the driver, a biometric sensor which detects biometric information of the driver, a microphone which collects sound in the vehicle interior or the like. The biometric sensor is provided, for example, on a seat surface, a steering wheel or the like, and detects biometric information of a passenger sitting on the seat or the driver holding the steering wheel. The vehicle interior information detecting unit 7500 may calculate a driver's fatigue level or concentration level or may determine whether the driver is not dozing on the basis of detection information input from the driver state detection unit 7510. The vehicle interior information detecting unit 7500 may perform processing such as noise canceling processing or the like on the collected audio signal.

The integrated control unit 7600 controls the overall operation in the vehicle control system 7000 according to various programs. An input unit 7800 is connected to the integrated control unit 7600. The input unit 7800 is realized by a device which may be operated by the passenger to input, such as a touch panel, a button, a microphone, a switch, a lever or the like, for example. To the integrated control unit 7600, data obtained by audio recognition of audio input by the microphone may be input. The input unit 7800 may be, for example, a remote control device using infrared rays or other radio waves, or may be an external connection device such as a mobile phone, a personal digital assistant (PDA) or the like which supports the operation of the vehicle control system 7000. The input unit 7800 may be, for example, a camera, an in that case, the passenger may input information by gesture. Alternatively, data obtained by detecting movement of a wearable device worn by the passenger may be input. Moreover, the input unit 7800 may include, for example, an input control circuit and the like which generates an input signal on the basis of information input by the passenger and the like using the input unit 7800 described above and outputs to the integrated control unit 7600. The passenger and the like operates the input unit 7800 to input various data to the vehicle control system 7000 or indicates a processing operation.

The storage unit 7690 may include a read only memory (ROM) which stores various programs executed by the microcomputer, and a random access memory (RAM) which stores various parameters, operation results, sensor values or the like. Furthermore, the storage unit 7690 may be realized by a magnetic storage device such as a hard disc drive (HDD) and the like, a semiconductor storage device, an optical storage device, a magneto-optical storage device and the like.

The general-purpose communication I/F 7620 is a general-purpose communication I/F which mediates communication with various devices present in an external environment 7750. The general-purpose communication I/F 7620 may implement a cellular communication protocol such as global system of mobile communications (GSM (registered trademark)), WiMAX (registered trademark), long term evolution (LTE (registered trademark)), LTE-advanced (LTE-A) or the like, or other wireless communication protocols such as wireless LAN (also referred to as Wi-Fi (registered trademark)), Bluetooth (registered trademark) and the like. The general-purpose communication I/F 7620 may be connected to a device (for example, an application server or a control server) present on an external network (for example, the Internet, a cloud network, or an operator-specific network) via, for example, a base station or an access point. Furthermore, the general-purpose communication I/F 7620 may use, for example, a peer to peer (P2P) technology to connect to a terminal present in the vicinity of the vehicle (for example, a driver, a pedestrian or a store terminal, or a machine type communication (MTC) terminal.

The dedicated communication I/F 7630 is a communication I/F which supports a communication protocol planned for use in a vehicle. The dedicated communication I/F 7630 may implement standard protocols such as wireless access in vehicle environment (WAVE) which is a combination of lower-layer IEEE802.11p and upper-layer IEEE1609, dedicated short range communications (DSRC), or cellular communication protocol, for example. The dedicated communication I/F 7630 typically executes V2X communication being a concept including one or more of vehicle-to-vehicle communication, vehicle-to-infrastructure communication, vehicle-to-home communication, and vehicle-to-pedestrian communication.

The positioning unit 7640 receives a GNSS signal from a global navigation satellite system (GNSS) satellite (for example, a GPS signal from a global positioning system (GPS) satellite) to execute positioning, and generates positional information including the latitude, longitude, and altitude of the vehicle, for example. Note that the positioning unit 7640 may specify the current position by exchanging signals with the wireless access point, or may obtain positional information from a terminal such as a mobile phone, PHS, or smartphone having a positioning function.

For example, the beacon reception unit 7650 receives radio waves or electromagnetic waves transmitted from a wireless station and the like installed on the road, and obtains information such as the current position, traffic jam, closed road, required time or the like. Note that the function of the beacon reception unit 7650 may be included in the dedicated communication I/F 7630 described above.

The in-vehicle device I/F 7660 is a communication interface which mediates connections between the microcomputer 7610 and various in-vehicle devices 7760 present in the vehicle. The in-vehicle device I/F 7660 may establish a wireless connection using a wireless communication protocol such as wireless LAN, Bluetooth (registered trademark), near field communication (NFC), or wireless USB (WUSB). Furthermore, the in-vehicle device I/F 7660 may establish a wired connection such as universal serial bus (USB), high-definition multimedia interface (HDMI (registered trademark)), mobile high-definition link (MHL) or the like via a connection terminal (and a cable if necessary) not illustrated. The in-vehicle device 7760 may include, for example, at least one of a mobile device or a wearable device which the passenger has, or an information device carried in or attached to the vehicle. Furthermore, the in-vehicle device 7760 may include a navigation device which searches for a route to an arbitrary destination. The in-vehicle device I/F 7660 exchanges control signals or data signals with these in-vehicle devices 7760.

The on-vehicle network I/F 7680 is an interface which mediates communication between the microcomputer 7610 and the communication network 7010. The on-vehicle network I/F 7680 transmits and receives signals and the like in accordance with a predetermined protocol supported by the communication network 7010.

The microcomputer 7610 of the integrated control unit 7600 controls the vehicle control system 7000 according to various programs on the basis of information obtained via at least one of the general-purpose communication I/F 7620, the dedicated communication I/F 7630, the positioning unit 7640, the beacon reception unit 7650, the in-vehicle device I/F 7660, or the on-vehicle network I/F 7680. For example, the microcomputer 7610 may calculate a control target value of the driving force generating device, the steering mechanism, or the braking device on the basis of the obtained information inside and outside the vehicle and output a control instruction to the drive system control unit 7100. For example, the microcomputer 7610 may perform cooperative control for realizing functions of advanced driver assistance system (ADAS) including collision avoidance or impact attenuation of the vehicle, following travel based on the distance between the vehicles, vehicle speed maintaining travel, vehicle collision warning, vehicle lane departure warning or the like. Furthermore, the microcomputer 7610 may perform the cooperative control for realizing automatic driving and the like to autonomously travel independent from the operation of the driver by controlling the driving force generating device, the steering mechanism, the braking device or the like on the basis of the obtained information around the vehicle.

The microcomputer 7610 may generate three-dimensional distance information between the vehicle and peripheral structure, person and the like on the basis of information obtained via at least one of the general-purpose communication I/F 7620, the dedicated communication I/F 7630, the positioning unit 7640, the beacon reception unit 7650, the in-vehicle device I/F 7660, or the on-vehicle network I/F 7680 to create local map information including peripheral information of the current position of the vehicle. Furthermore, the microcomputer 7610 may generate a warning signal by predicting a danger such as vehicle collision, approach of a pedestrian and the like or entry to a closed road and the like on the basis of the obtained information. The warning signal may be, for example, a signal for generating a warning sound or lighting a warning light.

The audio image output unit 7670 transmits at least one of audio or image output signal to an output device capable of visually or audibly notifying the passenger of the vehicle or the outside the vehicle of the information. In the example in FIG. 59, as the output device, an audio speaker 7710, a display unit 7720, and an instrument panel 7730 are illustrated. The display unit 7720 may include at least one of an on-board display or a head-up display, for example. The display unit 7720 may include an augmented reality (AR) display function. In addition to these devices, the output device may be other devices such as a headphone, a wearable device such as an eyeglass-type display and the like worn by the passenger, a projector, light or the like. In a case where the output device is the display device, the display device visually displays results obtained by various types of processing performed by the microcomputer 7610 or information received from other control units in various formats such as text, image, table, graph and the like. Furthermore, in a case where the output device is an audio output device, the audio output device converts an audio signal including reproduced audio data, acoustic data or the like into an analog signal and outputs the aurally.

Note that, in the example illustrated in FIG. 59, at least two control units connected via the communication network 7010 may be integrated as one control unit. Alternatively, each control unit may include a plurality of control units. Moreover, the vehicle control system 7000 may be provided with another control unit not illustrated. Furthermore, in the above description, a part or all of the functions of any of the control units may be assigned to other control units. That is, as long as information is transmitted and received via the communication network 7010, predetermined arithmetic processing may be performed by any control unit. Similarly, a sensor or a device connected to any control unit may be connected to another control unit, and a plurality of control units may transmit/receive detection information to/from each other via the communication network 7010.

In the vehicle control system 7000 described above, the imaging device 100 according to this embodiment described with reference to FIG. 1 may be applied to the imaging unit 7410 of the application example illustrated in FIG. 59. In this manner, by applying the technology according to the present disclosure to the imaging unit 7410, the resolution of the detection image (restored image) may be controlled.

Therefore, for example, in a case where there is a target to be noticed (target of interest) such as an obstacle such as a person and an object, a vehicle in front, a vehicle behind, an oncoming vehicle, a traffic light and traffic sign, a white line and a character on a road and the like around the vehicle, for example, in a case where imaging is performed at high resolution in the all-pixel mode and the like and there is no such target of interest, it is possible to image at low resolution in the thinning mode and the area driving mode.

In this manner, by imaging in an appropriate operation mode according to the situation, purpose and the like, it is possible to suppress an increase in load of imaging and to suppress a reduction in image quality of the restored image. Therefore, safer driving support may be realized.

<Driving Support Processing Flow>

Figure 61:
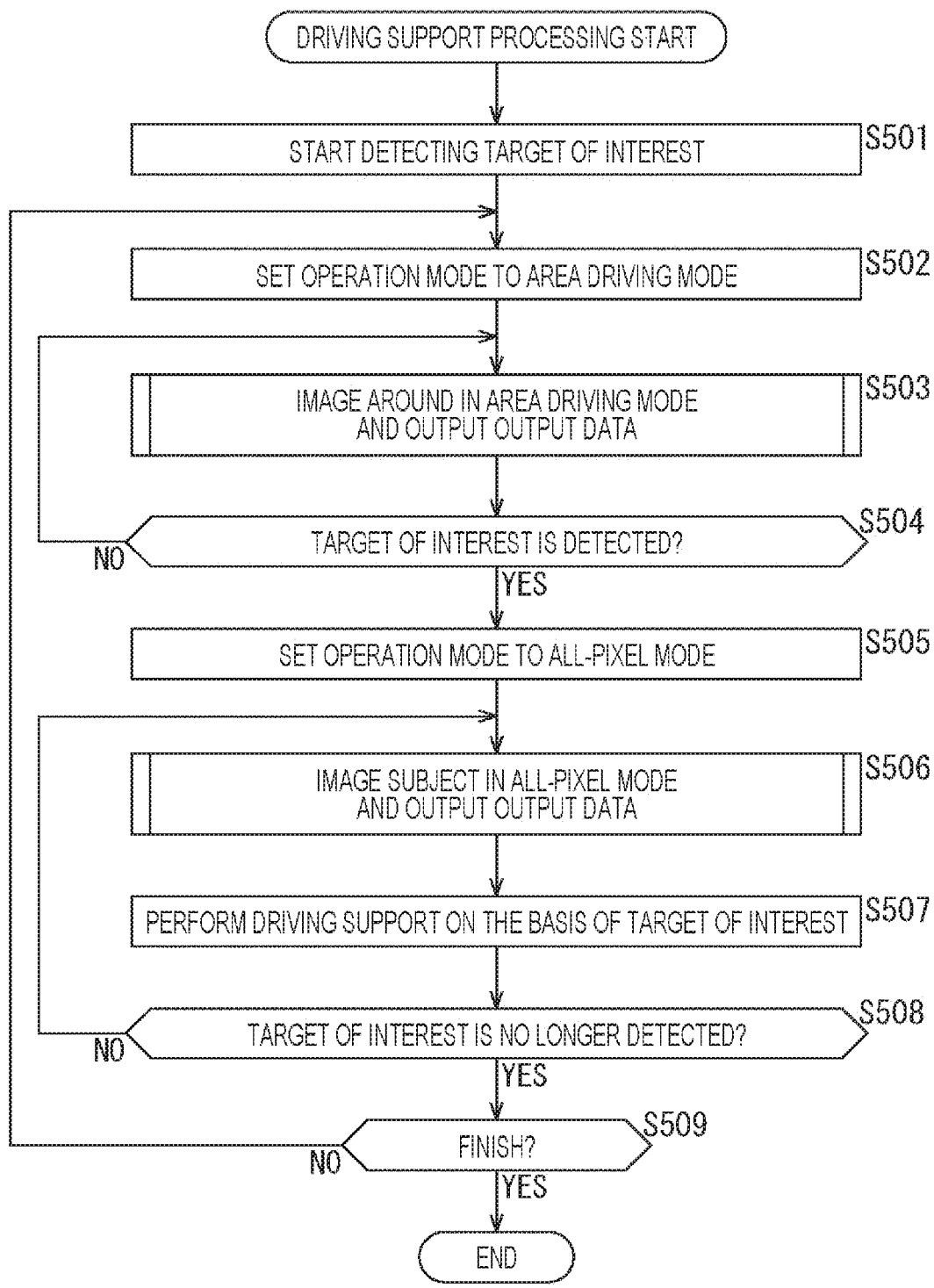
FIG. 61 is a flowchart for illustrating an example of a flow of driving support processing.

An example of a flow of such driving support processing is described with reference to a flowchart in FIG. 61.

When the driving support processing is started, the vehicle exterior information detecting unit 7400 starts detecting the target of interest around the vehicle at step S501.

At step S502, the vehicle exterior information detecting unit 7400 sets the operation mode to the area driving mode.

At step S503, the imaging unit 7410 images a monitoring target in the area driving mode and outputs output data. That is, the imaging unit 7410 performs area driving mode imaging processing, generates the output data in the area driving mode, and outputs the same to the vehicle exterior information detecting unit 7400 and the like in a flow similar to that in a case of describing with reference to the flowchart in FIG. 41.

At step S504, the vehicle exterior information detecting unit 7400 determines whether the target of interest is detected or not. In a case where it is determined that the target of interest is not detected, the procedure returns to step S503. That is, in a case of a normal state in which the target of interest is not detected, each processing at step S503 and step S504 is repeatedly executed. That is, a low-resolution imaged image is obtained.

Furthermore, in a case where it is determined that the target of interest is detected at step S504, the procedure shifts to step S505.

At step S505, the vehicle exterior information detecting unit 7400 switches (sets) the operation mode to the all-pixel mode.

At step S506, the imaging unit 7410 images the monitoring target in the all-pixel driving mode and outputs the output data. That is, the imaging unit 7410 performs all-pixel mode imaging processing, generates the output data in the all-pixel mode, and outputs the same to the vehicle exterior information detecting unit 7400 in a flow similar to that in a case of describing with reference to the flowchart in FIG. 34.

At step S507, the microcomputer 7610 performs driving support on the basis of the target of interest.

At step S508, the vehicle exterior information detecting unit 7400 determines whether the target of interest is no longer detected or not. In a case where it is determined that the target of interest is continuously detected, the procedure returns to step S506. That is, in a case where the target of interest is detected, each processing at step S506 and step S507 is repeatedly executed. That is, a high-resolution imaged image may be obtained.

Furthermore, in a case where it is determined that the target of interest is no longer detected at step S508, the procedure shifts to step S509.

At step S509, the imaging unit 7410 determines whether to finish the driving support processing or not. In a case where it is determined that the driving support processing is not finished, the procedure returns to step S502. That is, at step S509, each processing at steps S502 to S509 is repeatedly executed until it is determined that the driving support processing is finished.

In a case where it is determined at step S508 that the driving support processing is finished, the driving support processing is finished.

By executing the driving support processing as described above, it is possible to perform safer driving support while suppressing an increase in data amount.

8. Eighth Embodiment

<Another Configuration Example of Imaging Element>

Although the example of the imaging element 121 has been described above, the imaging element 121 is only required to be provided with a plurality of pixel output units which receives the incident light incident without intervention of either the imaging lens or the pinhole and each outputs one detection signal indicating the output pixel value modulated by the incident angle of the incident light, and the configuration is arbitrary.

For example, it is possible to modulate light incident on an imaging surface of the imaging element 121 in accordance with a black-and-white pattern or light interference by using a random black-and-white pattern mask or an optical interference mask as a modulation element.

Figure 62:
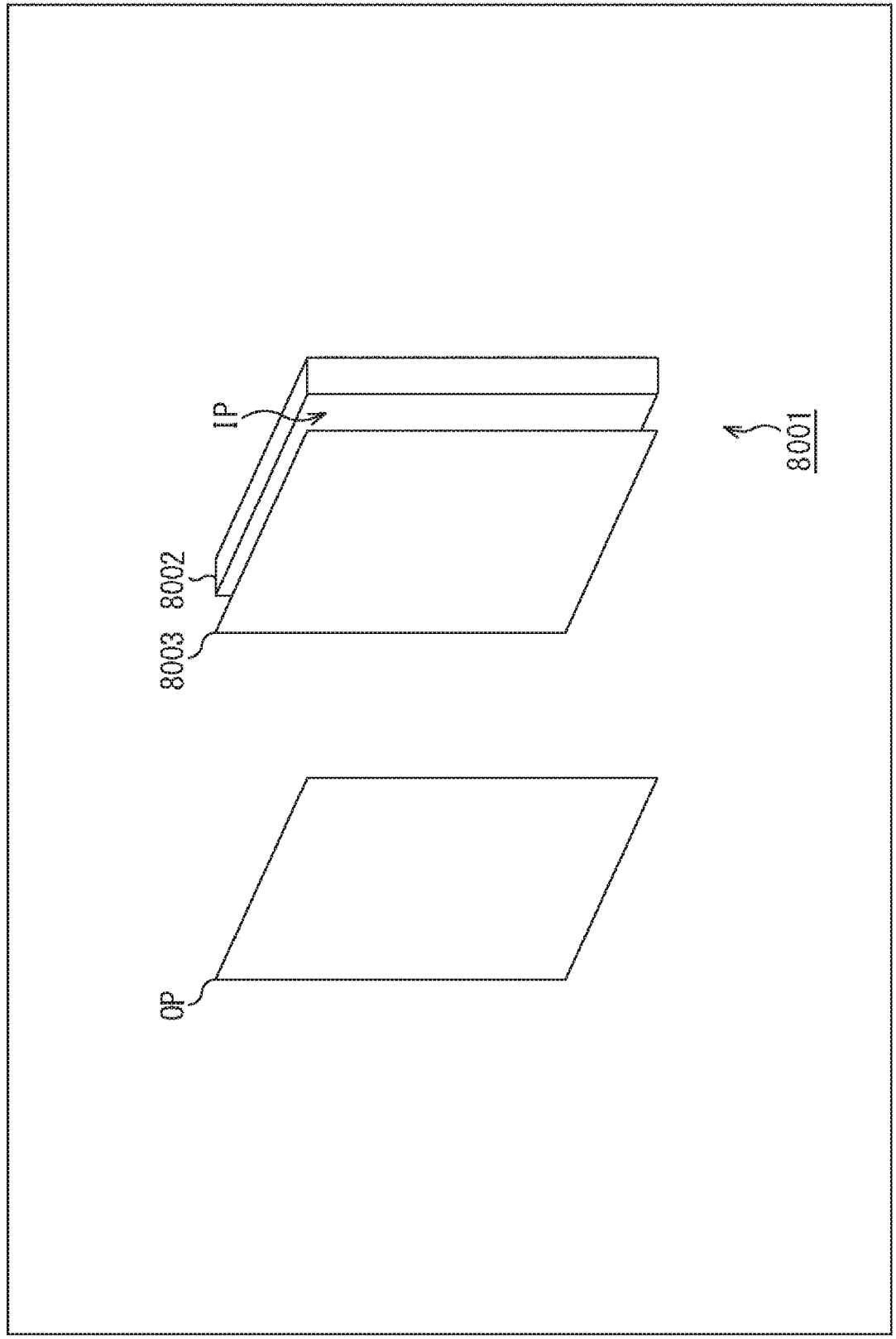
FIG. 62 is a view illustrating a main configuration example of an imaging element.

FIG. 62 illustrates another configuration of the imaging element. The imaging element 8001 is configured such that a mask 8003 which is the modulation element is fixed to an imaging element 8002 so as to have a predetermined interval with respect to an imaging surface IP of the imaging element 8002, and light from a subject surface OP is modulated by the mask 8003 and then incident on the imaging surface IP of the imaging element 8002.

Figure 63A:
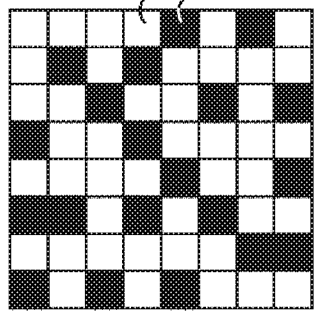
FIGS. 63A and 63B are views illustrating a case where a black-and-white pattern mask is used.
Figure 63B:
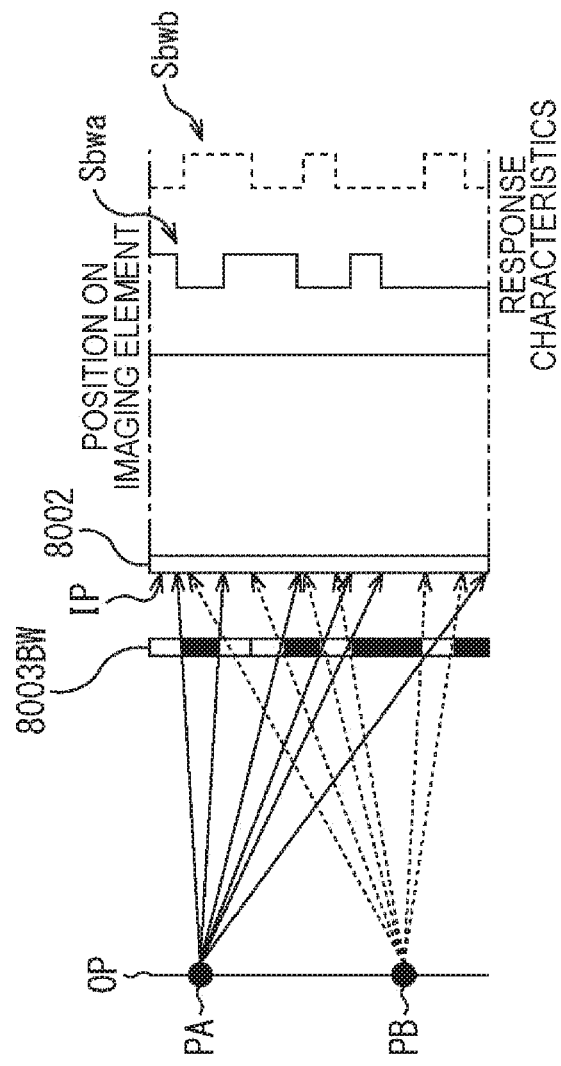

FIGS. 63A and 63B illustrate a case where the black-and-white pattern mask is used. FIG. 63A illustrates the black-and-white pattern mask. A black-and-white pattern mask 8003BW has a configuration in which a white pattern portion which transmits light and a black pattern portion which shields light are randomly arranged, and a pattern size is set independently of a pixel size of the imaging element 8002. FIG. 63B schematically illustrates an irradiation state of light emitted from a point light source PA and light emitted from a point light source PB on the imaging surface IP. Furthermore, FIG. 63B also schematically illustrates an example of a response of the imaging element in a case where the black-and-white pattern mask 8003BW is used, separately for the light emitted from the point light source PA and the light emitted from the point light source PB. The light from the subject surface OP is modulated by the black-and-white pattern mask 8003BW, and then incident on the imaging surface IP of the imaging element 8002. Therefore, the response of the imaging element corresponding to the light emitted from the point light source PA on the subject surface OP is Sbwa. Furthermore, the response of the imaging element corresponding to the light emitted from the point light source PB on the subject surface OP is Sbwb. Therefore, pixel output information output from the imaging element 8002 is information of one image obtained by combining the responses of the respective point light sources for each pixel output unit. In a case of this configuration, the incident angle directivity cannot be set independently for each pixel output unit, and the pixel output units in close positions have the incident angle directivities close to each other.

FIGS. 64A and 64B illustrate a case where the optical interference mask is used. As illustrated in FIG. 64A, the light emitted from the point light sources PA and PB on the subject surface OP is applied to the imaging surface IP of the imaging element 8002 via a light interference mask 8003LF. A light incident surface, for example, of the optical interference mask 8003LF is provided with an irregularity of about a wavelength of light as illustrated in FIG. 64A. Furthermore, in the optical interference mask 8003LF, transmission of light having a specific wavelength emitted in the vertical direction is the maximum. When a change in incident angle (inclination with respect to the vertical direction) of the light having the specific wavelength emitted from the point light sources PA and PB of the subject surface OP on the optical interference mask 8003LF increases, an optical path length changes. Here, when the optical path length is an odd multiple of a half wavelength, the light beams weaken each other, and when this is an even multiple of the half wavelength, the light beams strengthen each other. That is, intensities of transmission light having the specific wavelength emitted from the point light sources PA and PB and transmitted through the optical interference mask 8003LF are modulated according to the incident angle with respect to the optical interference mask 8003LF to be incident on the imaging surface IP of the imaging element 8002 as illustrated in FIG. 64B. Therefore, pixel output information output from each output pixel unit of the imaging element 8002 is information obtained by combining the modulated light intensities of the respective point light sources transmitted through the optical interference mask 823LF. In a case of this configuration, the incident angle directivity cannot be set independently for each pixel output unit, and the pixel output units in close positions have the incident angle directivities close to each other.

Note that, an optical filter 8003HW in FIG. 65 may be used in place of the optical filter 8003BW. The optical filter 8003HW is provided with linear polarizing elements 8011A and 8011B having the same polarization direction, and a half-wavelength plate 8012, and the half-wavelength plate 8012 is interposed between the linear polarizing elements 8011A and 8011B. The half-wavelength plate 8012 includes a polarizing portion indicated by oblique lines in place of the black pattern portion of the optical filter 8003BW, and the white pattern portion and the polarizing portion are randomly arranged.

The linear polarizing element 8011A transmits only a light component in a predetermined polarization direction among substantially non-polarized light emitted from the point light source PA. Hereinafter, it is assumed that the linear polarizing element 8011A transmits only a light component of which polarization direction is parallel to a paper surface. Out of polarized light transmitted through the linear polarizing element 8011A, the polarized light transmitted through the polarizing portion of the half-wavelength plate 8012 is such that a polarizing surface is rotated and the polarization direction changes in a direction perpendicular to the paper surface. In contrast, out of the polarized light transmitted through the linear polarizing element 8011A, the polarized light transmitted through the white pattern portion of the half-wavelength plate 8012 is such that the polarization direction remains unchanged from the direction parallel to the paper surface. Then, the linear polarizing element 8011B transmits the polarized light transmitted through the white pattern portion and hardly transmits the polarized light transmitted through the polarizing portion. Accordingly, a light amount of the polarized light transmitted through the polarizing portion is reduced compared to the polarized light transmitted through the white pattern portion. Therefore, a shaded pattern substantially similar to that in a case of using the optical filter 8003BW is generated on a light-receiving surface (imaging surface) IP of the imaging element 8002.

However, in a case of these configurations, since it is necessary to add another configuration such as a mask and the like to the imaging element, the imaging element 121 of the configuration example described in the first embodiment may be further downsized.

As described above, in the present technology, the imaging element 121 may have the configuration described with reference to FIG. 4, the configuration described with reference to FIG. 5, the configuration described with reference to FIGS. 62, 63A and 63B, or the configuration described with reference to FIGS. 64A and 64B. That is, the imaging element 121 is only required to be provided with a plurality of pixel output units which receives the incident light incident without intervention of either the imaging lens or the pinhole and each outputs one detection signal indicating the output pixel value modulated by the incident angle of the incident light.

Furthermore, the present technology may be applied to the imaging element 121 having the configuration described with reference to FIG. 4 or the configuration described with reference to FIG. 5. That is, a plurality of pixel output units of the imaging element 121 may have a configuration in which the incident angle directivity indicating the directivity with respect to the incident angle of the incident light from the subject of the output pixel value may be independently set for each pixel output unit.

Furthermore, the present technology may be applied to an imaging element having the configuration as described with reference to FIG. 4. That is, a plurality of pixel output units of the imaging element 121 may have a configuration in which the incident angle directivity indicating the directivity with respect to the incident angle of the incident light from the subject may be independently set for each pixel output unit.

Furthermore, the present technology may be applied to the imaging element having the configuration as described with reference to FIG. 5. That is, a plurality of pixel output units of the imaging element 121 may independently set the incident angle directivity indicating the directivity with respect to the incident angle of the incident light from the subject of the output pixel value for each pixel output unit by making photo diodes (PDs) contributing to the output different from each other.

9. Others

<Software>

It is possible that the above-described series of processes is executed by hardware or executed by software. Furthermore, it is possible that a part of processes is executed by hardware and other processes are executed by software. In a case where a series of processes is performed by software, a program which forms the software is installed on a computer.

This program may be installed from a recording medium, for example. For example, in a case of the imaging device 100 in FIG. 1, this recording medium is configured by a recording medium 116 on which the program is recorded distributed for distributing the program to a user, separately from the device main body. In this case, for example, by loading the recording medium 116 on the recording/reproducing unit 115, the program stored in the recording medium 116 may be read out and installed in the storage unit 113.

Furthermore, the program may also be provided through a wired or wireless transmission medium such as a local area network, the Internet, and digital satellite broadcasting. In a case of the imaging device 100 in FIG. 1, for example, the program may be received by the communication unit 114 to be installed on the storage unit 113.

In addition, the program may be installed in advance on the storage unit, the ROM and the like. For example, in a case of the imaging device 100 in FIG. 1, the program may be installed in advance in the storage unit 113, the ROM (not illustrated) in the control unit 101 and the like.

<Supplement>

The embodiments of the present technology are not limited to the above-described embodiments and various modifications may be made without departing from the gist of the present technology.

For example, the present technology may be implemented as any configuration forming a device or a system, for example, a processor as a system large scale integration (LSI) and the like, a module using a plurality of processors and the like, a unit using a plurality of modules and the like, a set obtained by adding still another function to the unit and the like (that is to say, a partial configuration of the device).

Furthermore, each processing unit described above may be realized by an arbitrary configuration. For example, this may include a circuit, an LSI, a system LSI, a processor, a module, a unit, a set, a device, an apparatus, a system or the like. Furthermore, a plurality of them may be combined. At that time, for example, the same type of configurations such as a plurality of circuits, a plurality of processors and the like may be combined, or different types of configurations such as a circuit, an LSI and the like may be combined.

Note that, in this specification, a system is intended to mean a set of a plurality of components (devices, modules (parts) and the like) and it does not matter whether all the components are in the same casing or not. Therefore, a plurality of devices stored in different casings connected through a network and one device obtained by storing a plurality of modules in one casing are the systems.

Furthermore, for example, it is also possible to divide the configuration described as one device (or processing unit) into a plurality of devices (or processing units). Other way round, it is also possible to put the configurations described above as a plurality of devices (or processing units) together as one device (or processing unit). Furthermore, it goes without saying that it is possible to add a configuration other than the above-described one to the configuration of each device (or each processing unit). Moreover, it is also possible that a part of the configuration of a certain device (or processing unit) is included in the configuration of another device (or another processing unit) as long as a configuration and operation as an entire system are substantially the same.

Furthermore, for example, the present technology may be configured as cloud computing in which one function is shared by a plurality of devices through a network for processing in cooperation.

Furthermore, for example, the above-described program may be executed by an arbitrary device. In that case, it is only required that the device has necessary functions (functional blocks and the like) so that necessary information may be obtained.

Furthermore, for example, each step described in the above-described flowchart may be executed by one device or executed by a plurality of devices in a shared manner. Moreover, in a case where a plurality of processes is included in one step, a plurality of processes included in one step may be executed by one device or by a plurality of devices in a shared manner. In other words, a plurality of processes included in one step may be executed as processes of a plurality of steps. Conversely, the processes described as a plurality of steps may be collectively executed as one step.

The program executed by the computer may be such that processes at steps of describing the program are executed in chronological order in the order described in this specification or that the processes are executed in parallel or individually at required timing such as when a call is issued. That is, as long as there is no inconsistency, the processes at respective steps may be executed in order different from the order described above. Moreover, the process at the step of describing the program may be executed in parallel with the process of another program, or may be executed in combination with the process of another program.

As long as there is no inconsistency, each of a plurality of present technologies described in this specification may be independently implemented alone. It goes without saying that it is also possible to implement by combining arbitrary plural present technologies. For example, a part of or the entire present technology described in any of the embodiments may be implemented in combination with a part of or the entire present technology described in other embodiments. Furthermore, an arbitrary part of or the entire present technology described above may be implemented in combination with other technologies not described above.

The present technology may also have following configurations.

(1) An imaging device provided with:
an imaging element provided with:
a plurality of pixel output units that receives incident light incident without intervention of either an imaging lens or a pinhole and each outputs one detection signal indicating an output pixel value modulated by an incident angle of the incident light; and
a signal processing unit provided so as to be associated with an area in which at least two pixel output units out of the plurality of pixel output units are formed that processes signals read out from the pixel output units formed in the area and obtains output pixel values; and
a readout control unit that selectively reads out the output pixel value of each pixel output unit of the imaging element.

(2) An imaging method of selectively reading out an output pixel value of each pixel output unit of
an imaging element provided with:
a plurality of pixel output units that receives incident light incident without intervention of either an imaging lens or a pinhole and each outputs one detection signal indicating an output pixel value modulated by an incident angle of the incident light; and
a signal processing unit provided so as to be associated with an area in which at least two pixel output units out of the plurality of pixel output units are formed that processes signals read out from the pixel output units formed in the area and obtains output pixel values.

(3) An imaging element provided with:
a plurality of pixel output units that receives incident light incident without intervention of either an imaging lens or a pinhole and each outputs one detection signal indicating an output pixel value modulated by an incident angle of the incident light; and
a signal processing unit provided so as to be associated with an area in which at least two pixel output units out of the plurality of pixel output units are formed that processes signals read out from the pixel output units formed in the area and obtains output pixel values.

(4) The imaging element according to (3),
in which a signal is read out from a predetermined pixel output unit of a plurality of areas, and
each signal processing unit associated with each of the plurality of areas processes the signal read out from the pixel output unit of the area corresponding to the signal processing unit.

(5) The imaging element according to (4),
in which the pixel output unit of each area is the pixel output unit from which the signal is first read out in the area.

(6) The imaging element according to (4) or (5),
in which signal readout order of each pixel output unit in each area is the same.

(7) The imaging element according to any one of (4) to (6),
in which an entire set of pixel output units of respective areas has an incident angle directivity indicating a directivity with respect to the incident angle of the incident light from a subject equivalent to the incident angle directivity of an entire pixel output unit group of a pixel region.

(8) The imaging element according to any one of (3) to (7),
in which a signal is read out from each pixel output unit of a predetermined partial area out of a plurality of areas, and
a signal processing unit associated with the partial area processes the signal read out from each pixel output unit of the area corresponding to the signal processing unit.

(9) The imaging element according to (8),
in which an entire pixel output unit group of the area from which the signals are read out has an incident angle directivity indicating a directivity with respect to an incident angle of the incident light from a subject equivalent to the incident angle directivity of an entire pixel output unit group of a pixel region.

(10) The imaging element according to (8),
in which an entire pixel output unit group of the area from which the signals are read out has an incident angle directivity indicating a directivity with respect to an incident angle of the incident light from a subject different from the incident angle directivity of an entire pixel output unit group of a pixel region.

(11) The imaging element according to (10),
in which the incident angle directivity of each of all the pixel output units of the area from which the signals are read out is perpendicular to the pixel region.

(12) The imaging element according to (10) or (11),
in which a size of a field of view of an entire pixel output unit group of a predetermined area is different from a size of a field of view of an entire pixel output unit group of another area or the pixel region.

(13) The imaging element according to any one of (10) to (12),
in which a direction of a field of view of an entire pixel output unit group of a predetermined area is different from a direction of a field of view of an entire pixel output unit group of another area or the pixel region.

(14) The imaging element according to any one of (3) to (13),
in which a signal is read out from each pixel output unit of a plurality of areas, and
the signal processing unit associated with each of the plurality of areas processes the signal read out from each pixel output unit of the area corresponding to the signal processing unit.

(15) The imaging element according to any one of (3) to (14),
in which the signal processing unit obtains the output pixel values by A/D converting the signals read out from the pixel output units of the area corresponding to the signal processing unit.

(16) The imaging element according to any one of (3) to (15),
in which a configuration is a configuration capable of independently setting an incident angle directivity indicating a directivity with respect to the incident angle of the incident light from a subject of the output pixel value for each pixel output unit.

(17) The imaging element according to any one of (3) to (16),
in which a configuration is a configuration capable of independently setting an incident angle directivity indicating a directivity with respect to the incident angle of the incident light from a subject for each pixel output unit.

(18) The imaging element according to any one of (3) to (17),
in which the plurality of pixel output units is capable of independently setting an incident angle directivity indicating a directivity with respect to the incident angle of the incident light from a subject of the output pixel value for each pixel output unit by making photo diodes (PDs) contributing to an output different from each other.

REFERENCE SIGNS LIST

100 Imaging device
120 Imaging unit
121 Imaging element
122 Readout control unit
123 Restoration matrix setting unit
124 Restoration unit
125 Association unit
126 Sensor unit
301 Upper substrate
302 Lower substrate
311 Pixel region
312 Area
313 Vertical scanning unit
314 Horizontal scanning unit
321 Area ADC
322 Digital signal processing unit
323 Timing generation unit
324 DAC
331 Comparison unit
332 Latch unit
401 to 403 Area
500 Monitoring system
511 Monitoring camera
512 Cable
513 Server

The invention claimed is:

1. An imaging device, comprising:
an imaging element that comprises:
a plurality of pixel output units configured to receive an incident light, wherein
the incident light is incident without intervention of either an imaging lens or a pinhole, and
each pixel output unit of the plurality of pixel output units is configured to output a detection signal indicating an output pixel value modulated based on an incident angle of the incident light; and
a signal processing unit associated with an area in which at least two pixel output units out of the plurality of pixel output units are formed, wherein
the signal processing unit is configured to:
process signals read out from the at least two pixel output units formed in the area; and
obtain output pixel values based on the signals read out from the at least two pixel output units formed in the area; and
a readout control unit configured to selectively read out the output pixel value of each pixel output unit of the plurality of pixel output units of the imaging element, wherein
the readout control unit is further configured to read out a signal from each pixel output unit of a determined partial area out of a plurality of areas, and
the signal processing unit associated with the determined partial area is configured to process the signal read out from each pixel output unit of the determined partial area corresponding to the signal processing unit.

2. An imaging method, comprising:
selectively reading out, by a readout control unit, an output pixel value of each pixel output unit of a plurality of pixel output units of an imaging element, wherein
the plurality of pixel output units is configured to receive an incident light incident without intervention of either an imaging lens or a pinhole, and
each pixel output unit of the plurality of pixel output units is configured to output a detection signal indicating an output pixel value modulated based on an incident angle of the incident light; and
processing, by a signal processing unit associated with an area in which at least two pixel output units out of the plurality of pixel output units are formed, signals read out from the at least two pixel output units formed in the area;

obtaining output pixel values based on the signals read out from the at least two pixel output units formed in the area;

reading out, by the readout control unit, a signal from each pixel output unit of a determined partial area out of a plurality of areas; and processing, by the signal processing unit associated with the determined partial area, the signal read out from each pixel output unit of the determined partial area corresponding to the signal processing unit.

3. An imaging element, comprising:
a plurality of pixel output units configured to receive incident light, wherein
   the incident light is incident without intervention of either an imaging lens or a pinhole, and
   each pixel output unit of the plurality of pixel output units is configured to output a detection signal indicating an output pixel value modulated based on an incident angle of the incident light; and
a signal processing unit associated with an area in which at least two pixel output units out of the plurality of pixel output units are formed, wherein the signal processing unit is configured to:
   process signals read out from the at least two pixel output units formed in the area; and
   obtain output pixel values based on the signals read out from the at least two pixel output units formed in the area, wherein
a signal is read out from each pixel output unit of a determined partial area out of a plurality of areas, and
the signal processing unit associated with the determined partial area is configured to process the signal read out from each pixel output unit of the determined partial area corresponding to the signal processing unit.

4. The imaging element according to claim 3, wherein
a signal is read out from a determined pixel output unit of a plurality of areas, and
each signal processing unit associated with each of the plurality of areas is configured to process the signal read out from the determined pixel output unit of each area of the plurality of areas corresponding to each signal processing unit.

5. The imaging element according to claim 4, wherein the determined pixel output unit of each area of the plurality of areas is a pixel output unit from which the signal is first read out in the area of the plurality of areas.

6. The imaging element according to claim 4, wherein a signal readout order of each pixel output unit in each area of the plurality of areas is the same.

7. The imaging element according to claim 4, wherein an entire set of pixel output units of respective areas has an incident angle directivity, indicating a directivity with respect to the incident angle of the incident light from a subject, equivalent to an incident angle directivity of an entire pixel output unit group of a pixel region.

8. The imaging element according to claim 3, wherein an entire pixel output unit group of the area from which the signals are read out has an incident angle directivity, indicating a directivity with respect to the incident angle of the incident light from a subject, equivalent to an incident angle directivity of an entire pixel output unit group of a pixel region.

9. The imaging element according to claim 3, wherein an entire pixel output unit group of the area from which the signals are read out has an incident angle directivity, indicating a directivity with respect to the incident angle of the incident light from a subject, different from an incident angle directivity of an entire pixel output unit group of a pixel region.

10. The imaging element according to claim 9, wherein the incident angle directivity of each of the pixel output units of the area from which the signals are read out is perpendicular to the pixel region.

11. The imaging element according to claim 9, wherein a size of a field of view of a first entire pixel output unit group of a first area is different from a size of a field of view of a second entire pixel output unit group of a second area or the pixel region.

12. The imaging element according to claim 9, wherein a direction of a field of view of a first entire pixel output unit group of a first area is different from a direction of a field of view of a second entire pixel output unit group of a second area or the pixel region.

13. The imaging element according to claim 3, wherein
a signal is readout from each pixel output unit of a plurality of areas, and
the signal processing unit associated with each of the plurality of areas is configured to process the signal read out from each pixel output unit of an area of the plurality of areas corresponding to the signal processing unit.

14. The imaging element according to claim 3, wherein the signal processing unit is further configured to obtain the output pixel values based on A/D conversion of the signals read out from the at least two pixel output units of the area corresponding to the signal processing unit.

15. The imaging element according to claim 3, wherein
in a configuration of the imaging element, an incident angle directivity of the output pixel value for each pixel output unit is independently set, and
the incident angle directivity indicates a directivity with respect to the incident angle of the incident light from a subject.

16. The imaging element according to claim 3, wherein
in a configuration of the imaging element, an incident angle directivity for each pixel output unit is independently set, and
the incident angle directivity indicates a directivity with respect to the incident angle of the incident light from a subject.

17. The imaging element according to claim 3, wherein
the plurality of pixel output units is further configured to independently set an incident angle directivity of the output pixel value for each pixel output unit based on photo diodes (PDs) that contribute to an output different from each other, and
the incident angle directivity indicates a directivity with respect to the incident angle of the incident light from a subject.

* * * * *